US010940791B2

(12) United States Patent
Correa et al.

(10) Patent No.: US 10,940,791 B2
(45) Date of Patent: Mar. 9, 2021

(54) APPARATUS, SYSTEM AND METHOD TO AVOID GLARE WHILE DRIVING, USING INTERMITTENT LIGHT PULSE EMISSION DURING NIGHT VISION ENCOUNTERS

(71) Applicants: Carlos Correa, San Juan (AR); Eduardo Hoese, San Juan (AR)

(72) Inventors: Carlos Correa, San Juan (AR); Eduardo Hoese, San Juan (AR)

( * ) Notice: Subject to any disclaimer, the term of this patent is extended or adjusted under 35 U.S.C. 154(b) by 794 days.

(21) Appl. No.: 15/802,490

(22) Filed: Nov. 3, 2017

(65) Prior Publication Data

US 2018/0132340 A1 May 10, 2018

Related U.S. Application Data

(60) Provisional application No. 62/419,667, filed on Nov. 9, 2016, provisional application No. 62/442,096, filed on Jan. 4, 2017.

(51) Int. Cl.

| | |
|---|---|
| ***B60Q 1/14*** | (2006.01) |
| ***F21S 41/64*** | (2018.01) |
| ***B60W 50/00*** | (2006.01) |
| ***B60Q 1/08*** | (2006.01) |

(52) U.S. Cl.

CPC ............. *B60Q 1/143* (2013.01); *B60Q 1/085* (2013.01); *B60W 50/0098* (2013.01); *F21S 41/645* (2018.01); *B60Q 2300/47* (2013.01)

(58) Field of Classification Search

CPC ..... B60Q 2300/47; B60Q 1/143; B60Q 1/085
See application file for complete search history.

(56) References Cited

U.S. PATENT DOCUMENTS 10,195,982 B2 * 2/2019 Hue ...................... G02F 1/0121

* cited by examiner

*Primary Examiner* — Robert J May
(74) *Attorney, Agent, or Firm* — Luis Figarella

(57) ABSTRACT

An Optoelectronic apparatus, systems and methods to avoid the night-time dazzling of a driver's vision produced by the glare from the headlights of other vehicles. The disclosed embodiments include:

(a) Intermittent lighting to illuminate the road, at least at times when glare should be avoided, as a substitute for the conventional continuous illumination produced by vehicle headlamps;
(b) Synchronization of such intermittent illumination so that vehicles traveling in the same direction exhibit the same intermittent illumination phase and vehicles in opposite directions exhibit opposite intermittent illumination phases;
(c) Protection of the driver(s) vision by preventing or attenuating at regular intervals of time the arrival of light into their eyes, including intermittent light pulses received from the already synchronized incoming vehicles;
(d) Protection of the driver(s) vision by preventing or attenuating, at regular intervals of time, the arrival of reflected light, via rear-view mirrors, to their eyes, such protection including intermittent light pulses received from the already synchronized vehicles circulating in the same direction and behind said vehicle.

29 Claims, 88 Drawing Sheets

Drawings:

B A

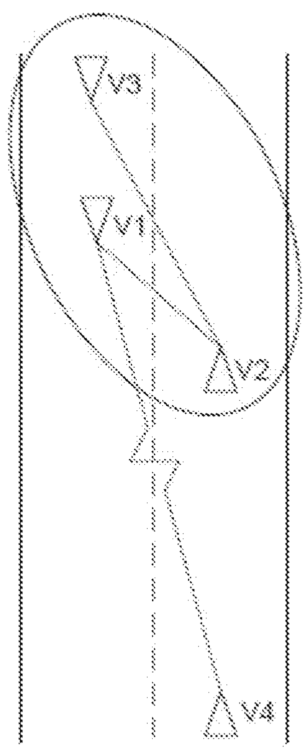
Figure 13E
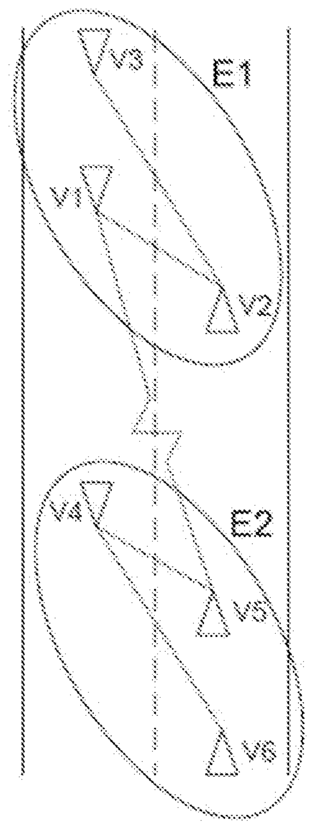
Figure 13F
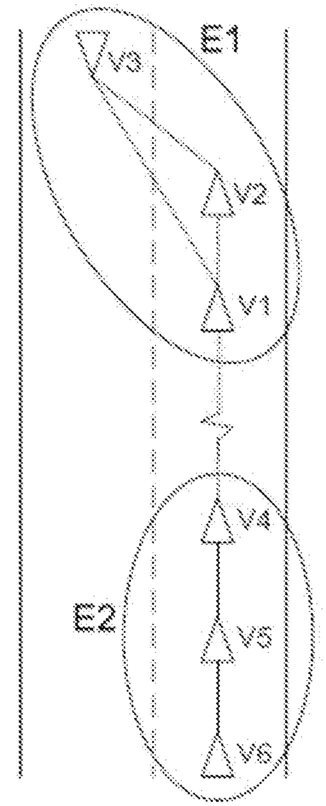
Figure 13G
Figure 13H
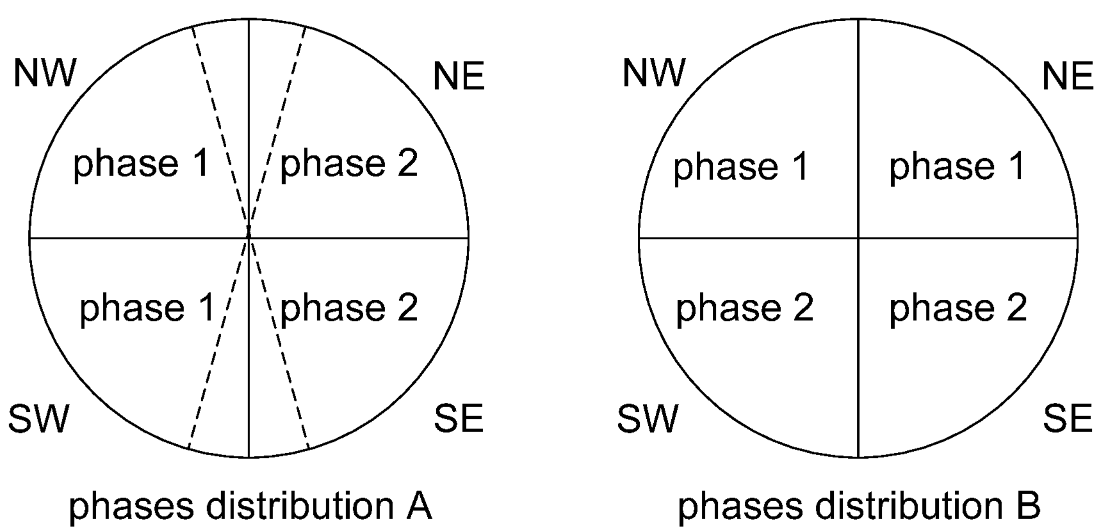
H Figure 18
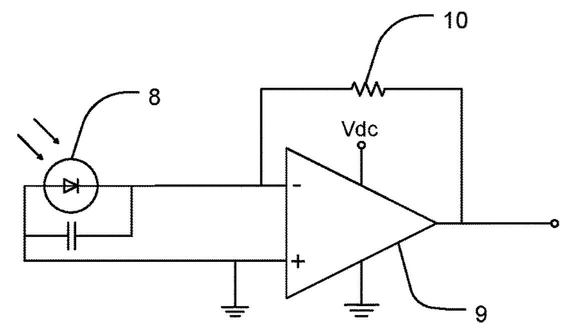
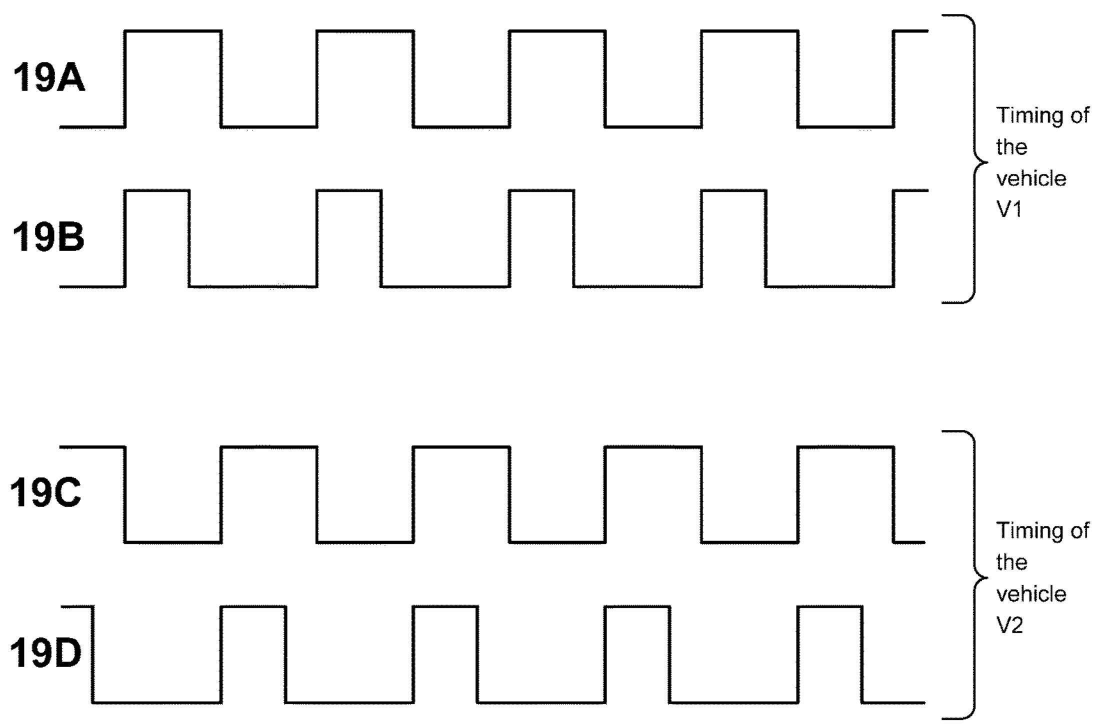
Figures 19A – 19D

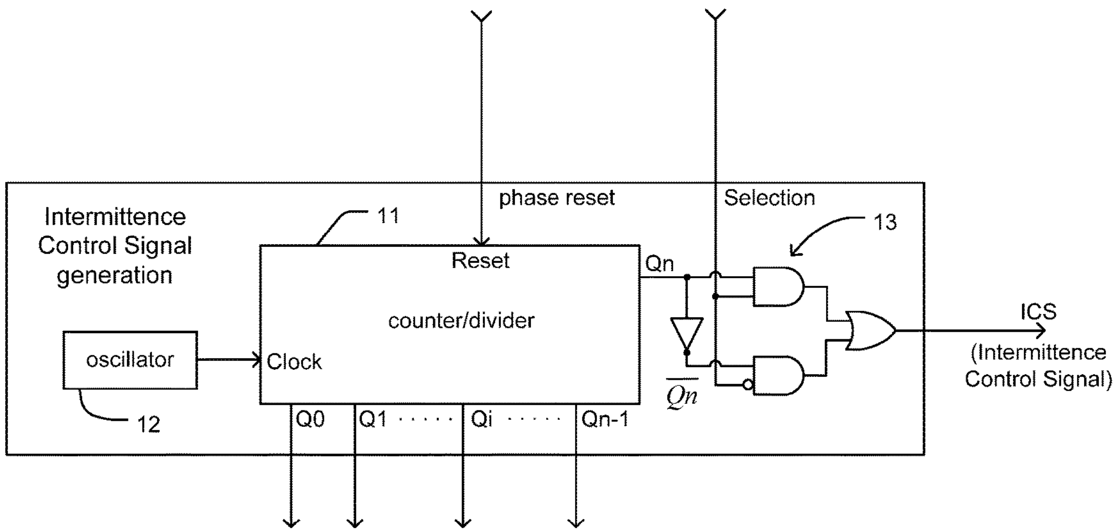
Figure 20
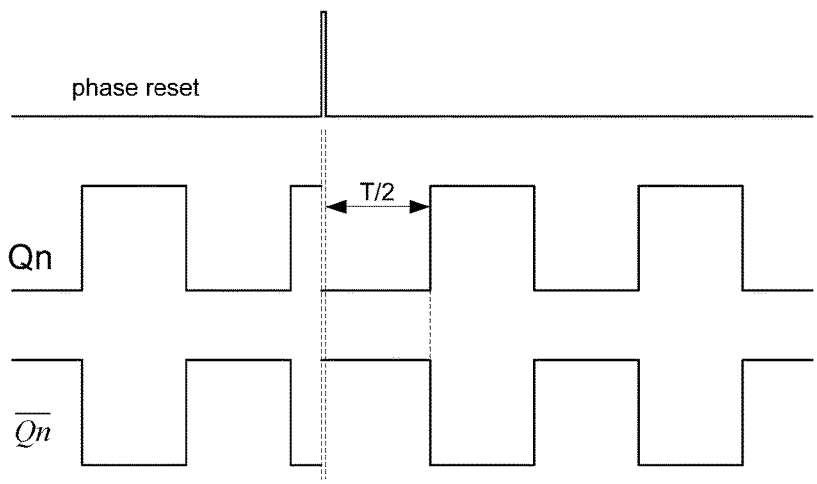
Figure 21
Figure 22
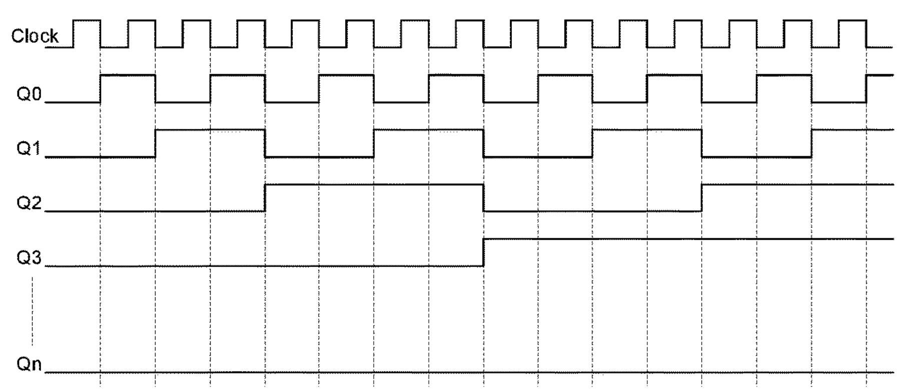

| Time base signal taken from the n stage counter/divider 11 | Number of time intervals in one period T | Output signals to be used for the time measurement |
|---|---|---|
| Clock | $2^{n+1}$ | Qn, Qn-1, … ,Q2, Q1, Q0 |
| Q0 | $2^{n}$ | Qn, Qn-1, … ,Q2, Q1 |
| Q1 | $2^{n-1}$ | Qn, Qn-1, … ,Q2 |
| . . . . | . . . . | . . . . |
| Qi | $2^{n-i-1}$ | Qn, Qn-1, … ,Qi+1 |

Figure 24

| Time base signal taken from the n stage counter/divider 11 | Number of time intervals in one period T | Output signals to be used for the time measurement |
|---|---|---|
| Clock | $2^{n+1}$ | ICS, Qn-1, … ,Q2, Q1, Q0 |
| Q0 | $2^{n}$ | ICS, Qn-1, … ,Q2, Q1 |
| Q1 | $2^{n-1}$ | ICS, Qn-1, … ,Q2 |
| . . . . | . . . . | . . . . |
| Qi | $2^{n-i-1}$ | ICS, Qn-1, … ,Qi+1 |

Figure 25

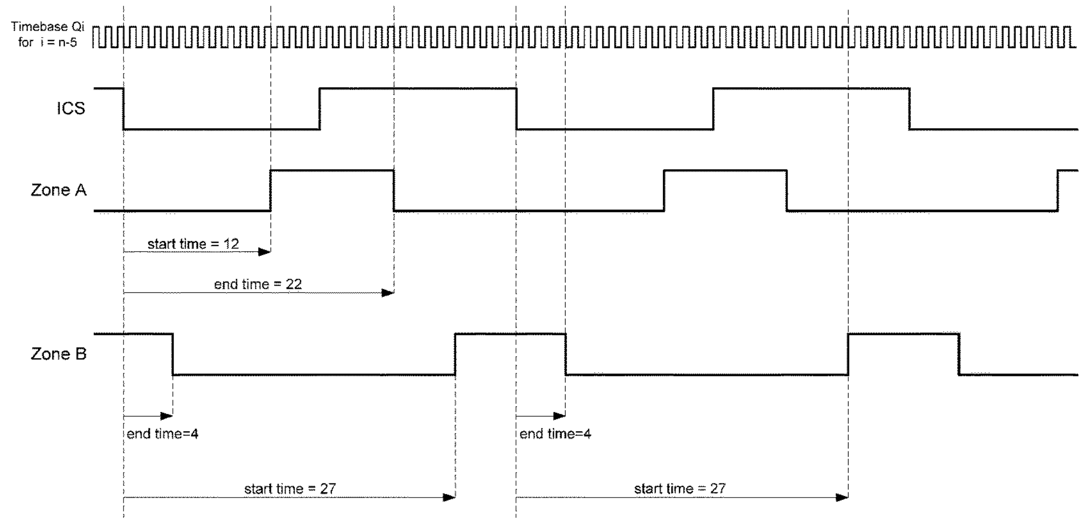
Figure 26
Figure 27
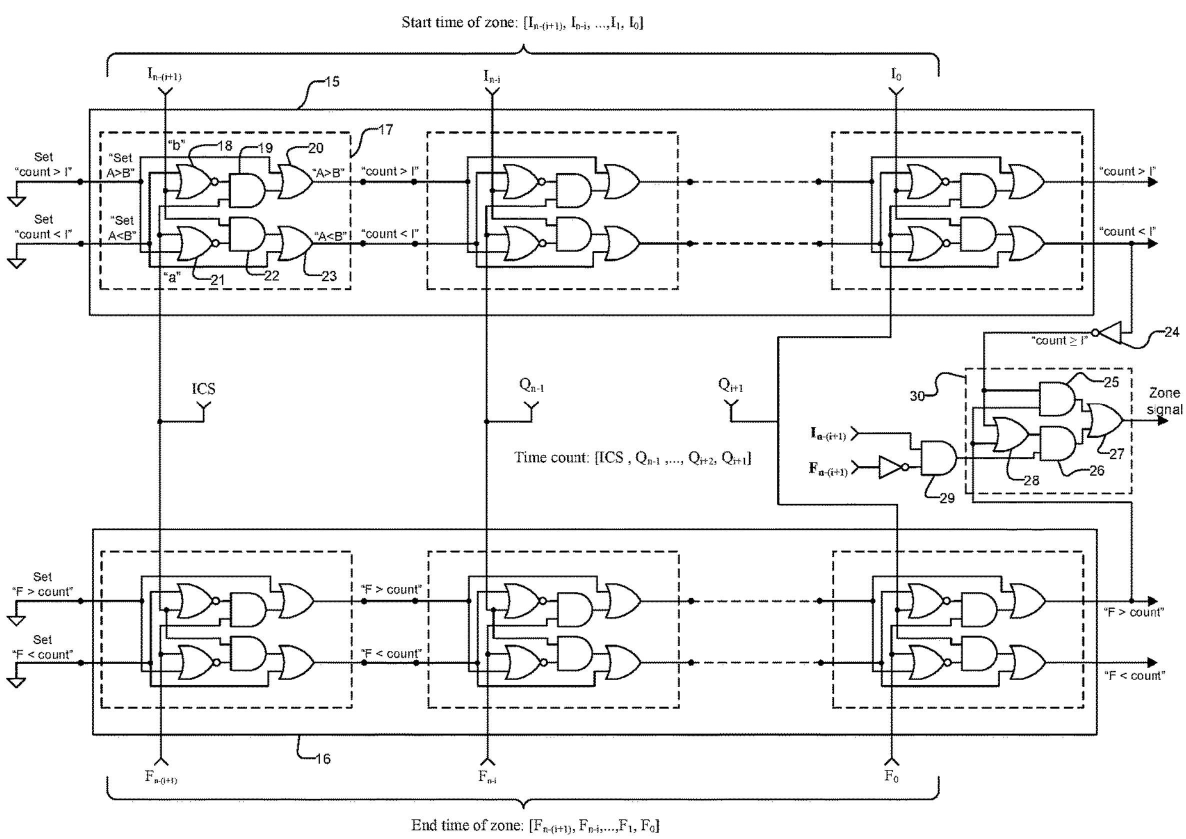

Figure 50
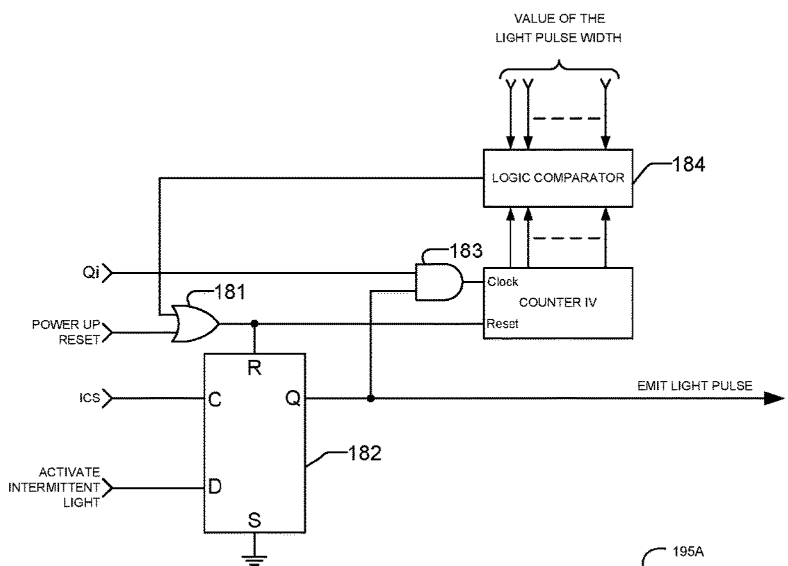
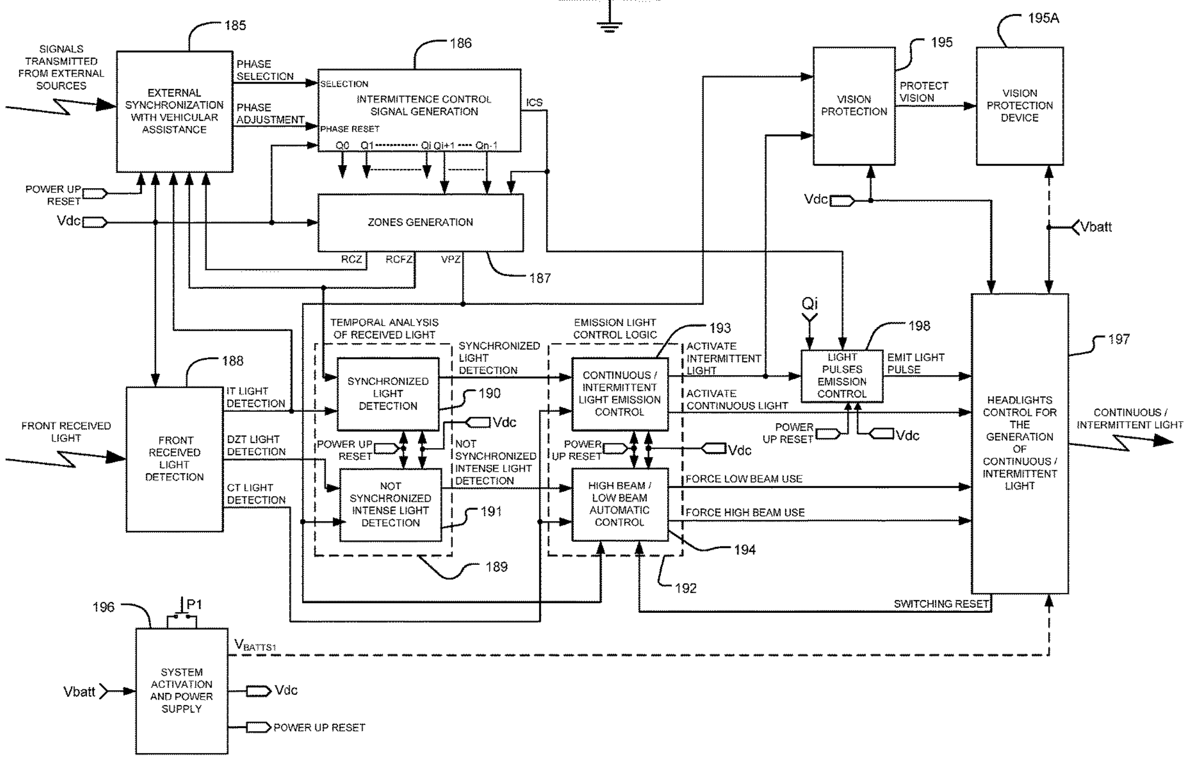
Figure 51

In this phase arrangement
Neither V1 nor V2 need to correct
its phase

In this phase arrangement
Neither V1 nor V2 need to correct
its phase

In this phase arrangement neither V1 nor V2 need to correct its phase.

Figure 74G
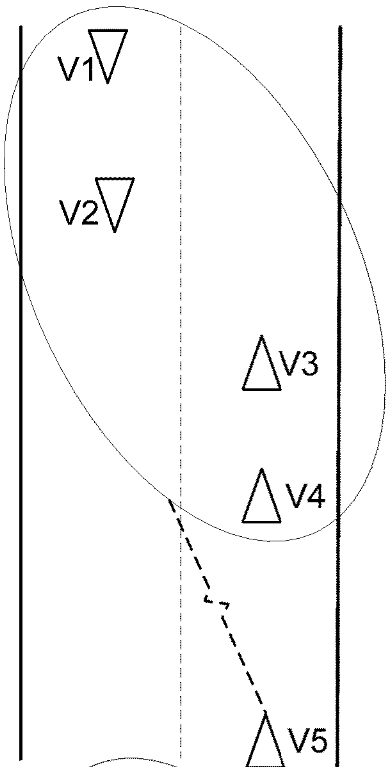
Figure 74H
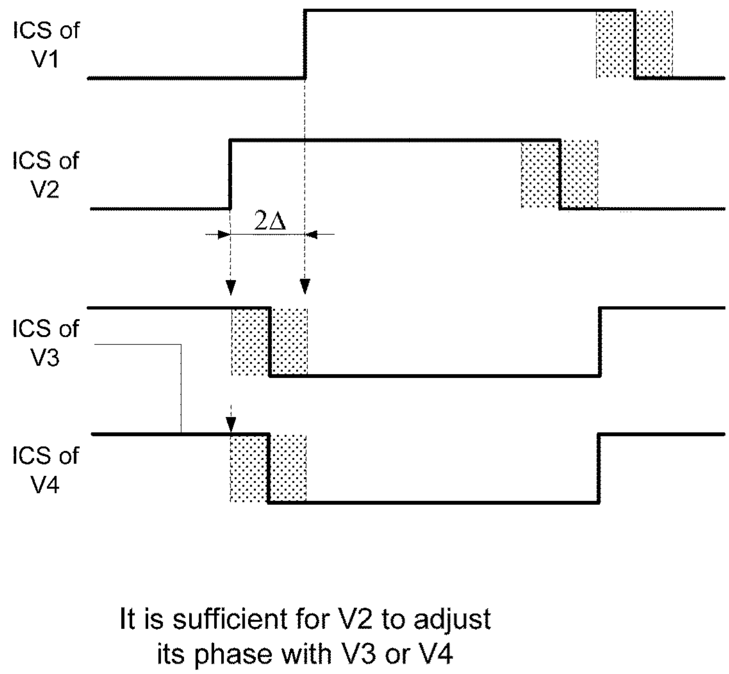
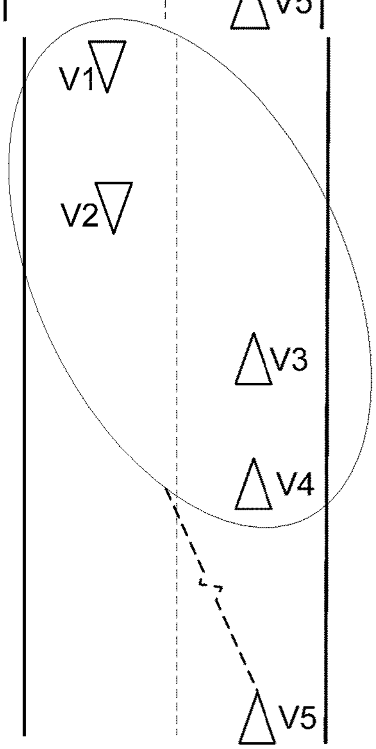
Figure 74I
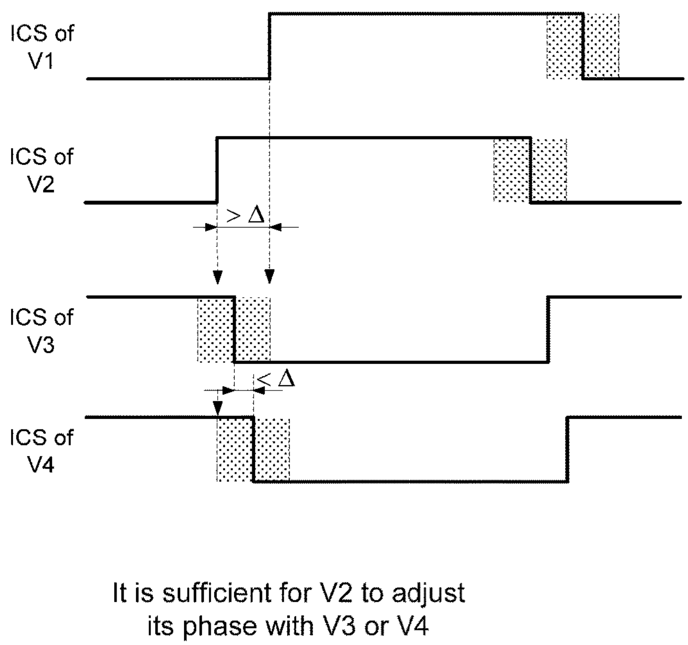
Figure 74J

APPARATUS, SYSTEM AND METHOD TO AVOID GLARE WHILE DRIVING, USING INTERMITTENT LIGHT PULSE EMISSION DURING NIGHT VISION ENCOUNTERS

CROSS-REFERENCE TO RELATED APPLICATIONS

This application claims priority to U.S. Provisional patent application Ser. No. 62/419,667 titled "Métodos y Sistemas para evitar el Problema del Encandilamiento Nocturno en Ruta", filed on Nov. 9, 2016 and to application Ser. No. 62/442,096 titled "Métodos y Sistemas para evitar el Problema del Encandilamiento Nocturno en Ruta", filed on Jan. 4, 2017 the disclosure of which is herein incorporated by reference in their entirety, and in each case have for which accurate English translations have been made available.

PATENTS CITED

The following documents and references are incorporated by reference in their entirety, Fleury (U.S. Pat. No. 9,079, 532), Badewitz (U.S. Pat. No. 4,859,047), Stam (US Pat. Pub. No. 2003/0107323) and Wolff (U.S. Pat. No. 4,286, 308).

FIELD OF THE INVENTION

The present invention relates in general to an apparatus, method and system to reduce night-time vehicle operation vision dazzling, and specifically to an optoelectronic apparatus, method and system to avoid driver's vision glare from the lights of vehicles traveling on both oncoming and same direction of travel.

DESCRIPTION OF THE RELATED ART

As is well known, people driving vehicles on roads are subjected to greater stress at night, because the lack of natural light adds to the glare, dazzling or temporary blindness caused by the light coming from the headlamps of vehicles moving in both the same and opposite direction of travel. In every encounter with another vehicle, the driver's field of vision is reduced significantly by that glare, causing insecurity in driving as well as fatigue, increasing the risk of accidents.

The problem of vision glare or dazzling has yet to be completely solved. Solutions tested to date include those dependent on road infrastructure, e.g. expressway lanes separated by a living enclosure, which are costly both from the point of view of their implementation and maintenance, and are not feasible for all roads due to topographic, climatic, economic factors, and others. Other solutions tested are, for example, devices that provide indirect vision on a screen that the driver can use at such moments of reduced vision, with the limitation of having to give up the natural perception of distance and depth conferred by direct vision. Other partial solutions include the use of pixel headlights based on the Digital Micromirror Devices (DMD) technology which allows the system to direct the light through micro-mirrors.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

One of the objects of this invention is to provide an apparatus, system and method for avoiding the dazzle experienced by vehicle drivers at night time which is caused by the intense light coming from the front headlamps of vehicles moving in the opposite direction, as well as those going in the same direction.

In the present invention, the term "Night Vehicle Encounter" (NVE) will be used to refer to a group of two or more vehicles that are near each other during the night or similar low light condition, having approached each other sufficiently to be involved in a scenario that begins when one or more of these vehicles receives light coming from the front headlamps (or similar light source) of one or more other vehicles, with said light having enough intensity/nearness to disturb the driver's vision.

The basic principles and ideas to solve the glare or light dazzling problem are described below. First, it is well known that the retina of the human eye is capable of maintaining an image for a short time after light stimulus has ceased. This retention time is in the order of milliseconds, so that when the eye is stimulated with flashing light whose space between pulses is less than the retention time of the retina, continuous images are formed on it. Thus, an environment illuminated with this type of light will be perceived by an observer as if it were permanently illuminated.

To illustrate this, perform the following experiment: two observers are placed in a dark room and a first intermittent light source, of the above-mentioned characteristics, is located next to them. Obviously, the atmosphere will now be alternately illuminated and dark, so that the observers, according to what has been said, will not notice. Then, if by some means or device, the eyes of one of the observers are covered at the moments in which this first light source is turned off and uncovered at the times in which the same light remains on, that observer will perceive the light as constantly on. Obviously for both observers the result remains exactly the same, since only the eyes of the observer in question were covered in the moments in which there was no light to them.

Now a second source of flashing light is placed in the room in front of the observers, but with the condition that this source emits light only in the times when the first one does not and vice versa, and interrogates both observers about what they see. The observer with the vision protection device, will say that this second source of flashing light they see is permanently off, since their vision is protected at times when it emits light. On the contrary, the other observer will say that the lights is permanently on. By increasing the intensity of this second light source, there will come a time when the observer who does not have said vision protection device will appear dazzled or blinded, while the other will continue to hold that said light source remains off and perceives the environment as before.

Keeping the location of the light sources flashing, the experiment is repeated but relocating the observer who has no vision protection device next to the second light source and also equipping it with a vision protection device that ads as that of the other observer but relative to this second source of light. With this, both observers face each other as well as the intermittent light sources at their side and their vision protection devices synchronized so that when one of the observers has their eyes covered, the other will have them uncovered and vice versa.

The intermittent light sources, located and synchronized as already indicated, are now operated and interrogators are again interrogated. Both will say that they see the environment perfectly illuminated by the light source that they have at their side, and that the one in front of them does not cause them any discomfort because they perceive it turned off. Ultimately, the light is placed next to an observer while his vision protection device allows him to see. When this happens, the light source located next to the other observer stays off and the corresponding vision protection device activated to protect the latter from the light in front.

This experience produces on both observers two effects: perception of the environment as if it were permanently illuminated, and the sensation that only the source of light that has at its side illuminates the environment. In accordance with the experience described and transferring it to the field of application of the present invention, said method for avoiding the dazzling of vehicle drivers during night hours, which we call "Anti-dazzling Method", comprises:

A) Emission of pulses of intermittent light by vehicles of the area on the road that each one of them needs to illuminate in the moments that the dazzling must be avoided. The intermittent illumination on said area of the road is achieved by the use in the vehicles of front headlamps where the light generated by said headlamps is suspended or significantly attenuated or deviated from said area of the road during the appropriate time intervals, i.e. the space between said pulses of flashing light.

Such intermittent light pulse emission must be periodic, of adjustable phase, and must have a gap between pulses less than the retention time of the retina of the human eye, plus a duration for said pulses of light less or at most equal to said space between pulses.

(B) Synchronization of intermittent pulses of vehicles passing through the same road by adjusting in each vehicle the phase of said intermittent pulses of light to ensure that, at times when glare is to be avoided, all those vehicles which circulate in the same direction with respect to the road exhibit, within a predetermined tolerance range, the same phase of emission of pulses of intermittent light and that all those vehicles which run in opposite directions with respect to the road exhibit, within said predetermined tolerance range, intermittent phases of intermittent light pulses.

(C) protection of the vision of the driver of a vehicle by preventing or significantly attenuating, at regular intervals of time, the arrival of light into the eyes of that driver, coming from the front headlamps of vehicles approaching in the opposite direction with respect to the road. Said vision protection takes place within each interspacing space corresponding to the intermittent pulses of light emitted by said vehicle for a period of time whose location and extent is such that it includes intermittent light pulses received from the already synchronized vehicles which they circulate in the opposite direction with respect to the road.

Another object of this invention is to provide a method for avoiding the dazzle experienced by vehicle drivers during night hours caused by the intense light reaching their eyes, either directly or reflected in the rear-view mirror(s) (including both the central one as well as any side mirrors) of their respective vehicles, coming from the headlights of one or more vehicle(s) that circulate in the same direction as the driver's vehicle. Said method, which will be called "Anti-dazzling method with rear-view protection", comprises the same steps (a), (b) and (c) (above) of the anti-dazzling method above further comprising:

(D) protecting the vision of the driver of a vehicle from the intense light coming from the front headlamps of vehicles driving behind it on the way to avoid the dazzle that these lights cause when reflected in the rear-view mirrors of said vehicle. Such vision protection, referred to as rear-view protection, consists in attenuating or preventing the arrival of reflected light in the eyes of said driver at regular intervals of time encompassing pulses of intermittent light received from vehicles already synchronized to circulate in the same direction and behind said vehicle.

Another aim of this invention is to provide a method for establishing synchronization required by the first and second target methods. In this procedure, which is referred to as an "external synchronization procedure," vehicles, which transit the same path, receive signals transmitted by sources external to them, using predetermined communication means/mechanisms, from which said vehicles acquire a phase signal for intermittent pulses of light that has been pre-assigned to its direction of circulation on the road. The phase pre-assigned to a direction of traffic on the road will be 180° out of phase with respect to the pre-assigned phase to the opposite direction of traffic on the road, so vehicles that transit the road in opposite directions will acquire opposite phases of emission of pulses of intermittent light and obviously, vehicles that circulate in the same direction with respect to the road will acquire a same phase of emission of pulses of intermittent light. In this procedure, alternatives will be presented to transmit these signals using both Omni-directional and directional external sources. The communication medium to be employed for transmitting said signals is included among those based on the transmission/reception of electronic, magnetic, optical, acoustic signals or a combination thereof.

Another object of this invention is to provide a different method for establishing synchronization that that required by the first and second target methods. This procedure, which is referred to as "vehicle-assisted external synchronization procedure", is a variant of the external synchronization procedure which introduces some improvements thereto. These improvements are manifested when, within an NVE, the case of a vehicle that does not possess the corresponding phase of emission of pulses of intermittent light transmitted by external sources is presented. This may happen in particular situations which will be described and solved by having the vehicle acquire the correct phase of intermittent light pulse emission from a synchronization signal transmitted by the first vehicle which it is on the road if it possesses the correct phase for the emission of intermittent pulses of light. The communication medium to be employed by a vehicle for transmitting the synchronization signal to another vehicle may be from the own emission of pulses of intermittent light to those based on the transmission/reception of electronic, magnetic, optical, acoustic signals or a combination of them.

Another object of this invention is to provide another method for establishing the synchronization required by the first and second target methods. In this method, which is referred to as an "inter-vehicular synchronization procedure with external assistance", the vehicles receive a "phase adjust signal" transmitted by sources external to them, using a predetermined communication means/mechanism, so that from said signal of phase adjustment, the possible phases of emission of pulses of intermittent light of said vehicles are reduced to two alternatives: a certain phase and its counterphase. Unlike the "external synchronization" and "external synchronization with vehicular assistance" procedures (above), the two alternative phases are not pre-assigned to a given direction of vehicle travel with respect to the road.

This allocation is resolved for each non-synchronized NVE through the exchange of information between the vehicles belonging to said meeting.

During said information exchange each of said vehicles, using a predetermined algorithm, competes with the other vehicles of said NVE for the right to transmit a synchronization signal to indicate to them which phase of emission of intermittent light pulses to take. When a vehicle has not yet participated in any NVE it will initially adopt, according to a predetermined criterion, one of said two alternative phases for the emission of pulses of intermittent light. The winning vehicle of said competition transmits said synchronization signal to impose its intermittent light pulse emission phase on all the participating vehicles of that competition that cross the road in the same direction as this winning vehicle, and the corresponding counter-phase to the emission of intermittent pulses of light to all those vehicles participating in that competition that cross the road in the opposite direction to said winning vehicle.

The exchange of information between vehicles and therefore the transmission of synchronization signals is performed using a predetermined communication means. The means of communication to be employed in this procedure are included among those based on the transmission/reception of electronic, magnetic, optical, acoustic signals or a combination thereof.

As for the exchange of information between vehicles facing each other, the same emission of pulses of light from each vehicle, if properly controlled, provides the most natural and economical means of communication for performing such an exchange.

Another object of this invention is to provide another method for establishing the synchronization required by the first and second target methods. In this procedure, which is called the "inter-vehicular synchronization procedure", no transmission sources external to the vehicles are used, hence the phase of intermittent light pulses initially acquired by a vehicle, that is when it has not yet participated in any NVE, is generated by the vehicle itself in pseudorandom form. When vehicles participate in a single NVE, if they are not properly synchronized with each other, they exchange information so that each one, using a predetermined algorithm, competes with the others for the right to transmit a synchronization signal to the rest of the vehicles. Said NVE indicates which phase of intermittent light pulses to emit. The winning vehicle of this competition imposes its intermittent light pulse emission phase on all vehicles participating in that NVE which cross the road in the same direction as this winning vehicle, and the corresponding counter-phase to all vehicles participating in said NVE that cross the road in the opposite direction to said winning vehicle.

The exchange of information between vehicles and therefore the transmission of synchronization signals is performed using a predetermined communication means which is included among those based on the transmission/reception of electronic, magnetic, optical, acoustic signals or a combination thereof. From the indicated means of communication, the use of the same emission of pulses of light of each vehicle, if properly controlled, provides the most natural and economic means of communication to realize said exchange. An anti-dazzling system that applies this synchronization procedure will be autonomous, as it will not depend on any type of infrastructure in the road or devices external to the vehicles.

Another object of this invention is to provide two systems for avoiding dazzling based on the methods "Anti-dazzling Method" and "Anti-dazzling Method with Retraction Protection" respectively, and using both systems for the "External Synchronization Procedure". Another object of this invention is to provide two other systems for avoiding dazzling based on the methods "Anti-dazzling Method" and "Anti-dazzling Method with Retraction Protection" respectively, and using both systems in the "External Synchronization Procedure with Vehicle Assistance".

Other features and advantages of the present invention will become apparent upon examining the following detailed description of an embodiment thereof, taken in conjunction with the attached drawings.

BRIEF DESCRIPTION OF THE DRAWINGS

FIG. 13E is an example scheme of an unsynchronized NVE generated by the incorporation of V4 to the synchronized NVE in which V1, V2 and V3 are participating, according to an exemplary embodiment of the invention.

FIG. 13F is an example scheme of an unsynchronized NVE resulting from two synchronized NVEs (Encounters E1, E2), according to an exemplary embodiment of the invention.

FIG. 13G is an example scheme of an unsynchronized NVE resulting from two synchronized NVEs (Encounters E1, E2) integrated by vehicles that may be involved in the NVE both from a frontal and rear aspects, according to an exemplary embodiment of the invention.

FIG. 13H is an example scheme of the phase distribution A and the corresponding distribution of phases B. in both pre-determined distributions, a high hierarchy has been assigned to the NW and SE quadrants, according to an exemplary embodiment of the invention.

FIG. 18 shows a schematic diagram for a light sensing circuit, according to an exemplary embodiment of the invention.

FIGS. 19A-19D show the Intermittence Control Signal (ICS) and EPIL waveforms corresponding to two "perfectly" synchronized V1 and V2 circulating in opposite directions, according to an exemplary embodiment of the invention FIG. 20 shows a circuit for the generation of the ICS signal, according to an exemplary embodiment of the invention.

FIG. 21 shows the behavior of the outputs $Q_n$ from the circuit of FIG. 20 when a pulse is present at the "phase reset" input, according to an exemplary embodiment of the invention.

FIG. 22 shows the timing of the outputs of the counter/divider 11 of FIG. 20 and of the clock signal which supplies it, according to an exemplary embodiment of the invention.

FIG. 24 is a table showing the extension of period T as a function of the different outputs $Q_n$, $Q_{n-1}$, . . . , $Q_1$, $Q_0$ of the counter/divider 11 and its clock signal, according to an exemplary embodiment of the invention.

FIG. 25 is a table showing the extension of the period T according to the different outputs ICS, $Q_{n-1}$, . . . , $Q_1$, $Q_0$ and its clock signal for the generation of the ICS of FIG. 20, according to an exemplary embodiment of the invention.

FIG. 26 shows two hypothetical zones A and B whose start and end times have been defined using the time period $Q_i$ of counter/divider 11 for a value of $i=n-5$ as the time base, according to an exemplary embodiment of the invention.

FIG. 27 shows the simplified diagram of a circuit that for any time base $Q_i$ generates the zone signals to be used in the different systems, according to an exemplary embodiment of the invention.

FIG. 50 shows a circuit to implement the block "Control of emission of pulses of light" of FIG. 34, according to an exemplary embodiment of the invention.

FIG. 51 Displays the block diagram of the "Externally Synchronized Anti-Dazzling System with Vehicle Assistance", according to an exemplary embodiment of the invention.

Figure 1:
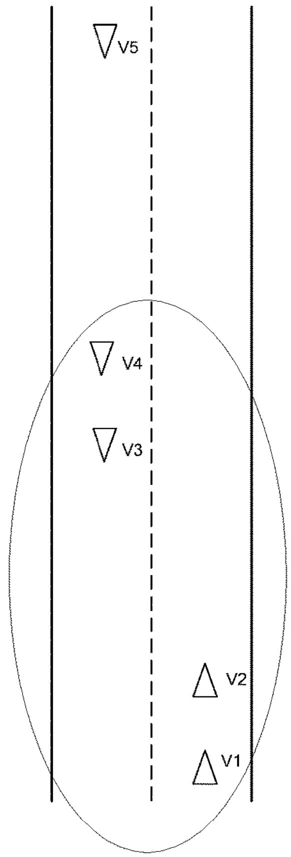
FIG. 1 shows an illustration of vehicles travelling on the same road in different directions, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although several prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The present invention comprises: two main methods for avoiding the glare or dazzling of vehicle drivers in the evening hours, referred to as: "Anti-dazzling method" and "Anti-dazzling method with Rear-View Protection". Within these, we have established Four different procedures for establishing the synchronization required by both anti-dazzling methods, referred to as: "External Synchronization Procedure", "External Synchronization Procedure with Vehicular Assistance", "Inter-vehicular Synchronization Procedure with External Assistance" and "Inter-vehicular Synchronization Procedure".

There are two anti-dazzle systems based respectively on the methods: "Anti-dazzling method" and "Anti-dazzling Method with Rear-View Protection", and using both systems the "External Synchronization Procedure" as well as the "External Synchronization Procedure with Vehicle Assistance", the "Inter-vehicular synchronization procedure with external assistance" and the "Inter-vehicular Synchronization Procedure".

Before proceeding with a detailed description of the preferred formulations of the present invention, we will give some concepts, examples and definitions relating thereto.

Persistence of the retina: The human eye retains an image for a fraction of a second after being visualized. This property, on which all technologies of visual screens are based, is called persistence of vision. The persistence of the vision is of the order of 1/10 of a second, for that reason the films of cinema originally ran at a rate of 16 frames per second. This was then found to be unacceptable and the exposure frequency increased to 24 frames per second. But the greater the brightness or luminous intensity of the image that is observed the less is the persistence of vision. For this reason, large film projectors avoid the problem of image flicker by projecting three times each frame to achieve an exposure frequency of 72 times per second. Computer monitors also prevent this flicker with an exposure frequency of 75 times per second. Another example is given by many of the lights we commonly use in our homes.

Since they are powered by alternating current, many of these lights, which appear to be continuous, actually flash at twice the line frequency of 50 Hz, i.e. 100 times per second (or 120 times/second for 60 Hz systems). Note that between the pulses of light there is nothing, that is darkness, but the persistence of vision allows us to see light continuously. This property of the retina is also basic to our invention since the use of intermittent illumination is one of the basic requirements of such anti-dazzling methods.

Definition of Night Vehicle Encounter: In the present invention we will use the term "night vehicular encounter" (NVE) to refer to a group of two or more vehicles that, having been traveling overnight in the same road, path, roadway, highway or similar route have approached each other sufficiently to be involved in a situation that begins when one or more of these vehicles receive light from another vehicle or vehicles of that group with an intensity close to that which can disturb the human vision. Thus, an NVE may be started when there is one or more vehicles receiving such light intensity from the front of the vehicles, as well as when the "anti-dazzling method with rear-view protection" is applied when there is one or more vehicles receiving that light intensity from behind. An NVE will come to an end when the dynamics of vehicular traffic put an end to the situation posed.

Accordingly, we focus not only on vehicles that are receiving a certain intensity of light, which could affect the vision of their drivers, but also those vehicles from which such a light will emerge will form part of an NVE. Although the following will be discussed in detail later, we can see that vehicles must interact with each other, exchanging some kind of signal(s), to engage each other in an NVE. Obviously the most natural means or mechanism for a vehicle to transmit a signal to other vehicles by the front aspect of the vehicle, is given using the vehicle's own headlights. However, for a vehicle to be able to engage an NVE with another vehicle or other vehicles coming behind it (which will be necessary for the anti-dazzling method with rear-view protection), said vehicle must have the appropriate means to transmit a signal backwards, which may require the ability to emit any back light not visible to trailing drivers.

Referring to FIG. 1 we see a diagram showing a plurality of vehicles transiting the same path or roadway. In this figure, as in the rest of the present detailed description, each vehicle is represented by an isosceles triangle whose apex most acute corresponds to the front of the vehicle. The encircling of FIG. 1 shows a group of vehicles (V1 through V5) participating in the same NVE. In this NVE, if a solution to the dazzle problem were not met, the conventional lights of vehicles V1 and V2 would start to cause discomfort to the vision of the drivers of vehicles V3 and V4 and vice versa. On the other hand, the front lights of V1 would cause discomfort to the vision of the driver of V2 as reflected in the rearview mirrors of V2. Likewise, the front lights of V4 would cause discomfort to the vision of the driver of V3 as reflected in the rearview mirrors of V3. The V5 vehicle does not participate in this NVE because it is at a distance such that its lights cannot affect the vision of the drivers of NVE vehicles and vice versa (the circling of FIG. 1 shows only one example of the multiple configurations that can become NVEs).

Figure 2:
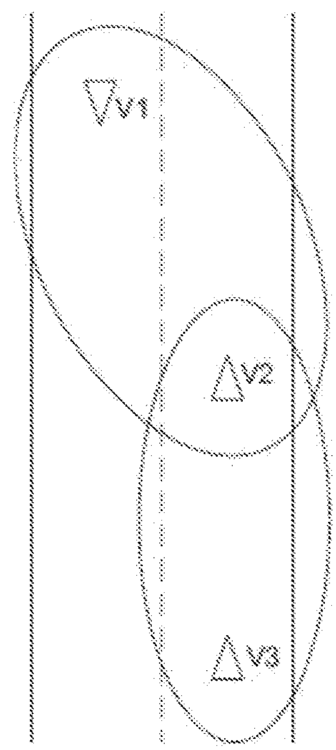
FIG. 2 shows an illustration of how when applying the Anti-Dazzling with rear view protection scheme, a vehicle (V2) may be involved in both Night Vision Encounters (NVE) at the same time, according to an exemplary embodiment of the invention.

It is to be noted that when applying the anti-dazzling method with rear-view protection, a vehicle may be involved in two NVEs at the same time. As can be seen in FIG. 2, V2 is "involved in" in an NVE with V1, and in turn is "engaged from behind" in another NVE with V3. This is because in this example it has been assumed that vehicles V1 and V3 do not participate in the same NVE because they are at such a distance that their lights cannot affect the vision of their respective drivers. Otherwise the vehicles V1, V2 and V3 would be involved in the same NVE.

Formulation of the Anti-Dazzling Method: A method for avoiding a vehicle driver's glare or dazzling is described below for times when driver's eyes receive light directly from the headlights of one or more other vehicles that are involved next to it in the same NVE. Said method comprises:

(a) Emission of pulses of intermittent light performed by said vehicles on the area of the road which each of them needs to illuminate, replacing the conventional continuous illumination produced by the headlamps of said vehicles on said area of the roadway, at least in the moments in which the glare or dazzling must be avoided.

(b) Synchronization of said intermittent light pulse emissions.

(c) Protection of the vision of said driver of said vehicle.

Figure 3:
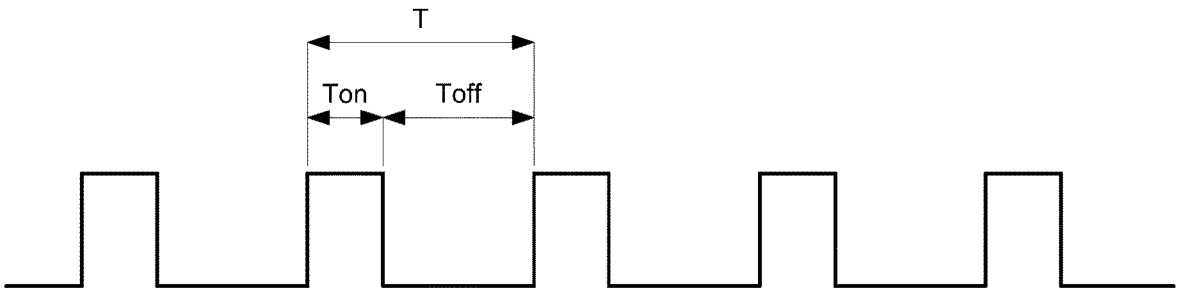
FIG. 3 shows an illustration of the Emission of Pulses of Intermittent Light (EPIL) wave for a single vehicle, according to an exemplary embodiment of the invention.

The aspects above will be described in connection with FIGS. 3-6. The Emission of Pulses of Intermittent Light (EPIL), is carried out with the frequency and phase of a periodic signal that we will call "Intermittent Control Signal" (ICS), whose frequency must have a standard value common in all vehicles and whose phase must be adjustable. FIG. 3 shows the waveform of said EPIL, which must be periodic, have an adjustable phase, and must have a space between pulses of light, referred to as "$T_{off}$", which must be less than the retention time of the retina of the human eye, and a duration of the pulses of light, which we refer to as "$T_{on}$", which should be less or at most equal to the "$T_{off}$" time. We refer to the period of said emission as "T", where $T=T_{on}+T_{off}$. These "$T_{on}$" and "$T_{off}$" times must have values chosen in such a way that the flickering of the lamps is minimized in the eyes of the drivers.

This intermittent illumination can be obtained by using in the vehicles front headlamps in which the light generated by said headlamps is suspended or significantly attenuated or deviated from said area of the road during the time intervals "$T_{off}$" corresponding to the space between said pulses of flashing light. Some of the techniques that can be used to generate the EPIL required by this method include:

1. Using LED headlamps, or gaseous discharge lamps or the like, operated by means of a control circuit which fixes the width and frequency of the light pulses.

2. Completely or partially blocking the continuous light beam of conventional lamps used in vehicles, at the rate of the intermittency that is desired. This can be done by optoelectronic or electromechanical means.

3. Employing pixel headlights based on DMD (digital micromirrors device) technology that allows directing light through micro-mirrors. These micro-mirrors can be electronically controlled at the frequency of the intermittency to be achieved to divert the continuous light out of the area of the road that the vehicle must illuminate intermittently.

If a vehicle transits at night on a deserted road using intermittent illumination of the characteristics already mentioned, two assertions can be made. first, the driver will perceive the road as if it were illuminated by continuous light due to the characteristics of the human retina and second the vision of the driver obviously will not be disturbed since being alone on the road the light that reaches his eyes is the light emitted by his own vehicle.

The objective of the driver's vision protection, mentioned in point (c) above, is to ensure that the second of these claims is fulfilled even when the vehicle is on a fully-traveled road. In order to do this, the arrival in the eyes of said driver of the light emitted in the form of pulses by vehicles driving in the opposite direction with respect to the road within a same NVE must be prevented or significantly attenuated. Note that for the first assertion to continue to be fulfilled this vision protection should not be applied to the driver at the times when his own vehicle illuminates the road, that is during the "$T_{on}$" times of the EPIL of his own vehicle.

From the foregoing, it is concluded that the overlapping of intermittent light pulses emitted by vehicles driving in opposite directions to the road within an NVE should be avoided. To achieve this, it is required that the duration of each "$T_{on}$" light pulse be less than or equal to the space between "$T_{off}$" pulses, and that an ordering or synchronization of the EPILs of the vehicles within said NVE. Adjusting in each vehicle the phase of said EPIL to cause those vehicles that circulate in the same direction with respect to the road to exhibit, within a predetermined tolerance range, a same EPIL phase and that vehicles moving in opposite directions with respect to the road, exhibit, within said predetermined tolerance range, opposite phases of EPIL. This synchronization then consists in causing the vehicles of said NVE that circulate in a direction with respect to the road to emit their pulses of intermittent light centered, with a certain margin of tolerance, within the space between pulses "$T_{off}$" of the vehicles circulating in the opposite direction with respect to the road. Therefore, the vision protection of the driver of a vehicle (for an NVE) of the already synchronized EPILs from the front headlamps of other vehicle(s) that run in the direction opposite to the vehicle of said driver with respect to the road, is carried out by significantly inhibiting or attenuating at regular intervals of time the arrival of said light into the eyes of said driver within each space between "$T_{off}$" pulses corresponding to the EPIL of your vehicle, during a time-of-vision protection ("$T_p$") interval whose location and extent within "$T_{off}$" is such as to include pulses of flashing received from said vehicles that circulate in the opposite direction.

Accordingly, we will call "synchronized vehicles" two or more vehicles which, when traveling a road in the same direction, exhibit within a predetermined tolerance range, the same EPIL phase. We will also call "synchronized vehicles" those that, when traveling in opposite directions, exhibit, within said predetermined tolerance range, opposite phases of EPIL. Similarly, we will call "NVE synchronized" an NVE in which all the vehicles are synchronized to each other and therefore "NVE not synchronized" those NVEs in which the previous condition is not fulfilled.

Figure 4:
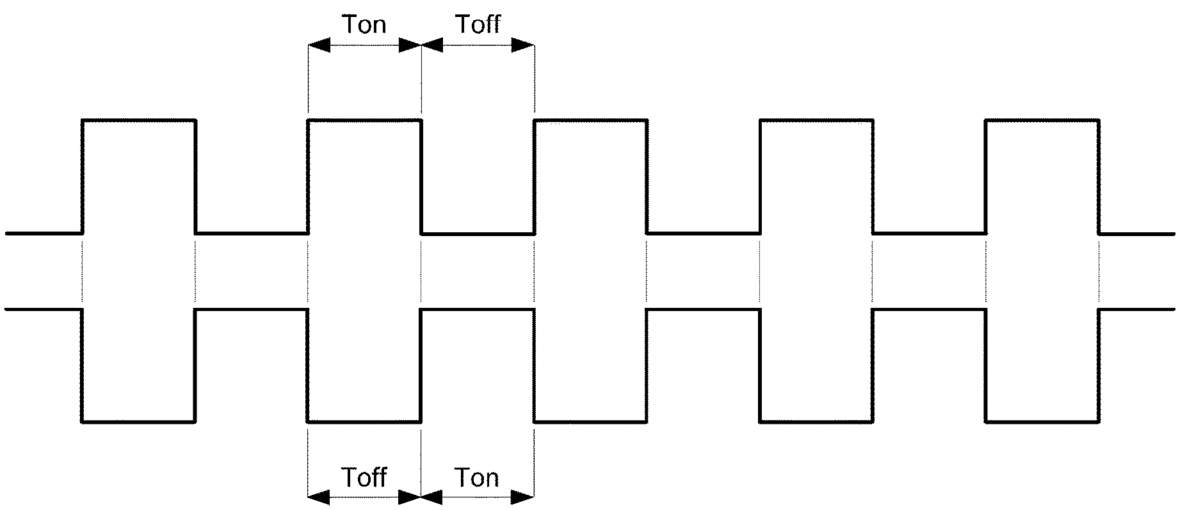
FIG. 4 shows an illustration of the EPIL wave for two vehicles travelling in opposite directions, according to an exemplary embodiment of the invention.

FIG. 4 shows the timing corresponding to EPILs of two synchronized vehicles circulating in opposite directions. For this example, a waveform has been chosen for the EPIL in which $T_{on}=T_{off}$. Since there should be no overlap between the light pulses of vehicles traveling in opposite directions, in this particular example, the tolerance range that can be applied to the synchronization of these EPILs becomes zero and the vision protection in each vehicle must be extended to the entire "$T_{off}$" time interval to be able to cover the width of the pulses of light emitted by the other vehicle.

Figure 5:
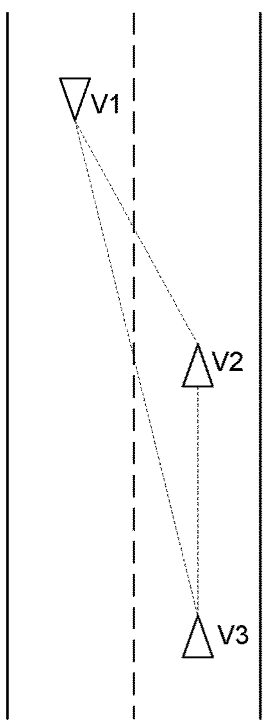
FIG. 5 shows an illustration of a NVE in which three vehicles (V1, V2, V3) are synchronized, according to an exemplary embodiment of the invention.
Figures 6A, 6B, 6C, 6D, 6E, 6F:
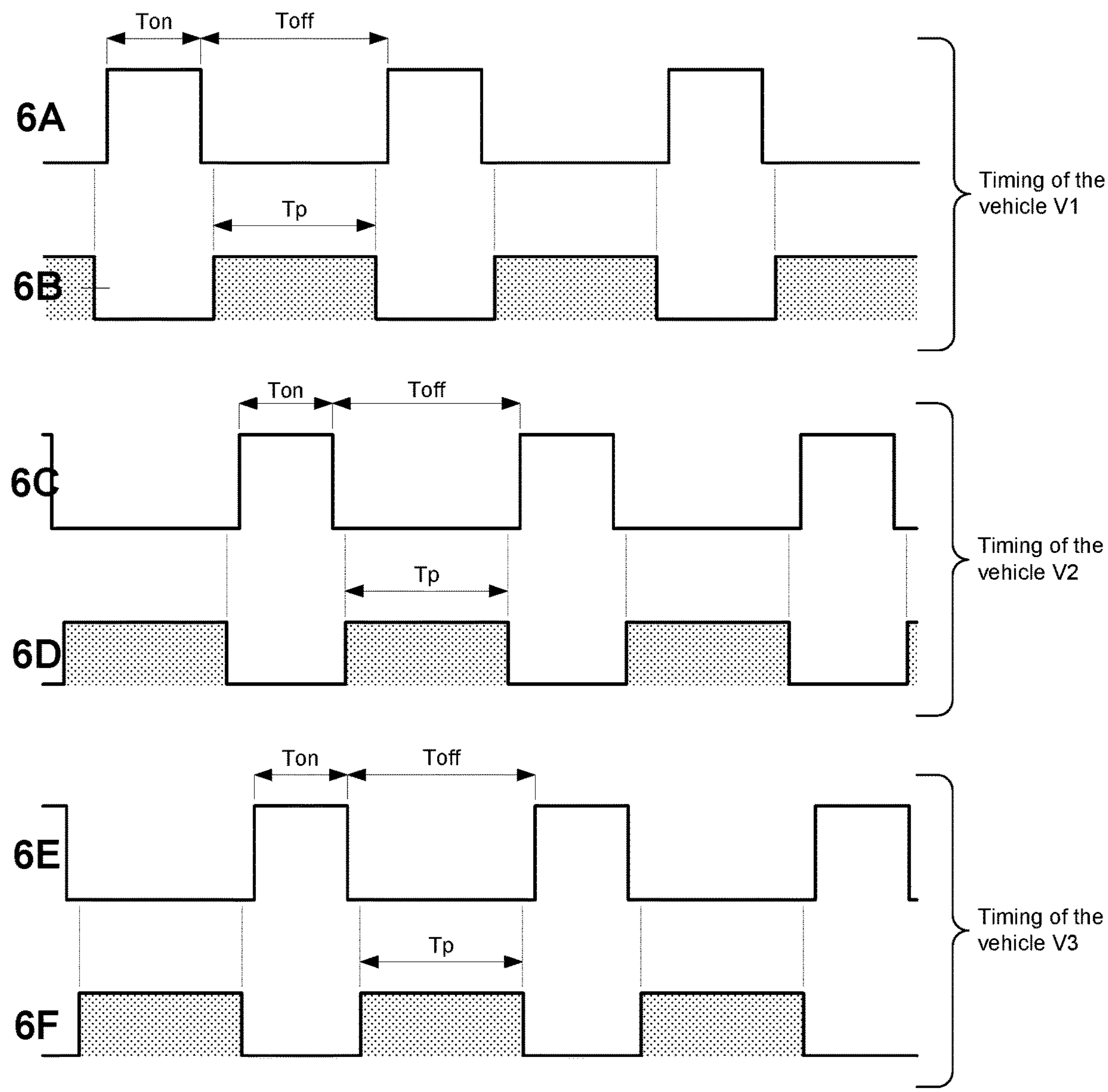
FIGS. 6A-6F show illustrations of the EPIL wave for vehicles V1, V2, V3 (from FIG. 5), according to exemplary embodiments of the invention.

If this tolerance is to be increased, the $T_{on}/T_{off}$ ratio must be decreased and a vision protection whose duration is greater than or equal to the sum of the "$T_{on}$" time and the time corresponding to the tolerance range chosen should be set. With the aid of FIGS. 5-6, an example of NVE integrated by vehicles whose EPILs have a $T_{on}/T_{off}$ ratio smaller than one and whose tolerance range for synchronization is greater than zero is shown. FIG. 5 shows a diagram of an NVE in which three vehicles (V1, V2, V3) participate whose EPILs are already synchronized, which is represented in the figure by means of straight lines that link each vehicle with the rest of the vehicles of said NVE that are within reach of its lights. FIGS. 6A-6F show the timing corresponding to the EPILs of the vehicles of FIG. 5 and the timing of the protection of the vision of their respective drivers. FIGS. 6B, 6D and 6F show the time intervals during which the protection of the vision of the drivers of V1, V2, and V3, respectively, said viewing protection time slots "$T_p$" are located within the "$T_{off}$" time intervals of the EPILs of FIGS. 6A, 6C and 6E respectively. Thus, the vision protection does not prevent the driver from continuing to perceive as continuous light the intermittent lighting provided by his vehicle, as during "$T_{on}$" times the vision protection remains inactive.

In the above example, the choice of a tolerance range greater than zero for synchronization is reflected in the admission of a shift between EPIL phases of V2 and V3, shown in FIGS. 6C and 6E respectively. However, as seen in FIG. 6, the pulses of light emitted by V2 and V3 fall within the vision protection range of the driver of V1 and vice versa, as corresponds to synchronized vehicles.

Some other alternatives to carry out the protection of the vision of the driver of a vehicle include:

Using optical materials which are electronically controlled to block or allow the passage of light, i.e. either allow the passage of light or attenuate it significantly. An example of such materials is given by the liquid crystal shutters currently employed in Liquid Crystal Shutter Glasses used in stereoscopic viewing. Such optical materials may be used to implement such vision protection in special spectacles for the driver, or to implement said vision protection on the vehicle windshield or part thereof, or to implement said vision protection in a kind of Sun visor for the driver. Additionally, using electromechanical light shutters in, for example, special eyeglasses for the driver or some special type of sun visor.

It should be noted that the vision protection will cause the driver of a vehicle participating in a synchronized NVE to perceive vehicles coming in front of and participating in said synchronized NVE with their front lights significantly attenuated or off, spending on the alternative chosen to implement such vision protection, but that the position lights on said vehicles do not flash.

Anti-Dazzling Method Formulation with Retro-View Protection:

The following is a method for avoiding the glare or dazzle that can affect the driver of a vehicle when the eyes receive intense light, either directly or reflected by the mirrors of his vehicle, from the headlights of other or other vehicles involved next to the first in an NVE. Said method comprises steps (a), (b), and (c) of the anti-dazzling method described above, further comprising shielding the vision of said driver from the intense light coming from the front headlamps of another vehicle on the road, to avoid the dazzle that said lights would cause when reflected in the rear-view mirrors (both central and/or side mirrors) of said vehicle. This protection of vision, which we call "protection of rear-view vision", consists in attenuating or preventing the arrival of said reflected light in the eyes of said driver at regular intervals of time "$T_p$" that cover the "$T_{on}$" of EPILs received from the already synchronized vehicles that circulate in the same direction and behind said driver's vehicle.

Figures 7A, 7B:
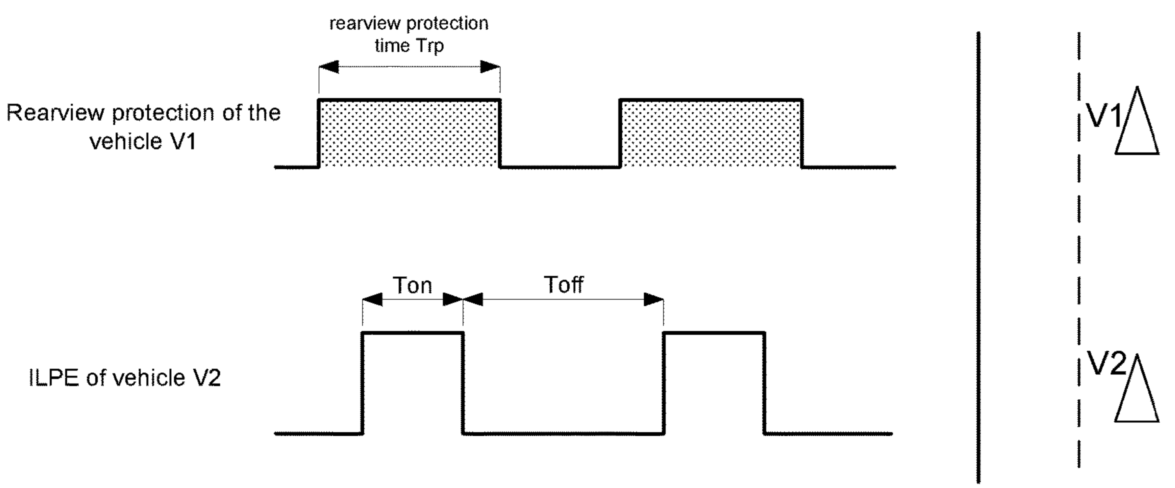
FIGS. 7A-7B show an illustration of an NVE for vehicles V1, V2, including their respective EPIL waves, according to an exemplary embodiment of the invention.
Figures 8A, 8B, 8C, 8D, 8E, 8F, 8G:
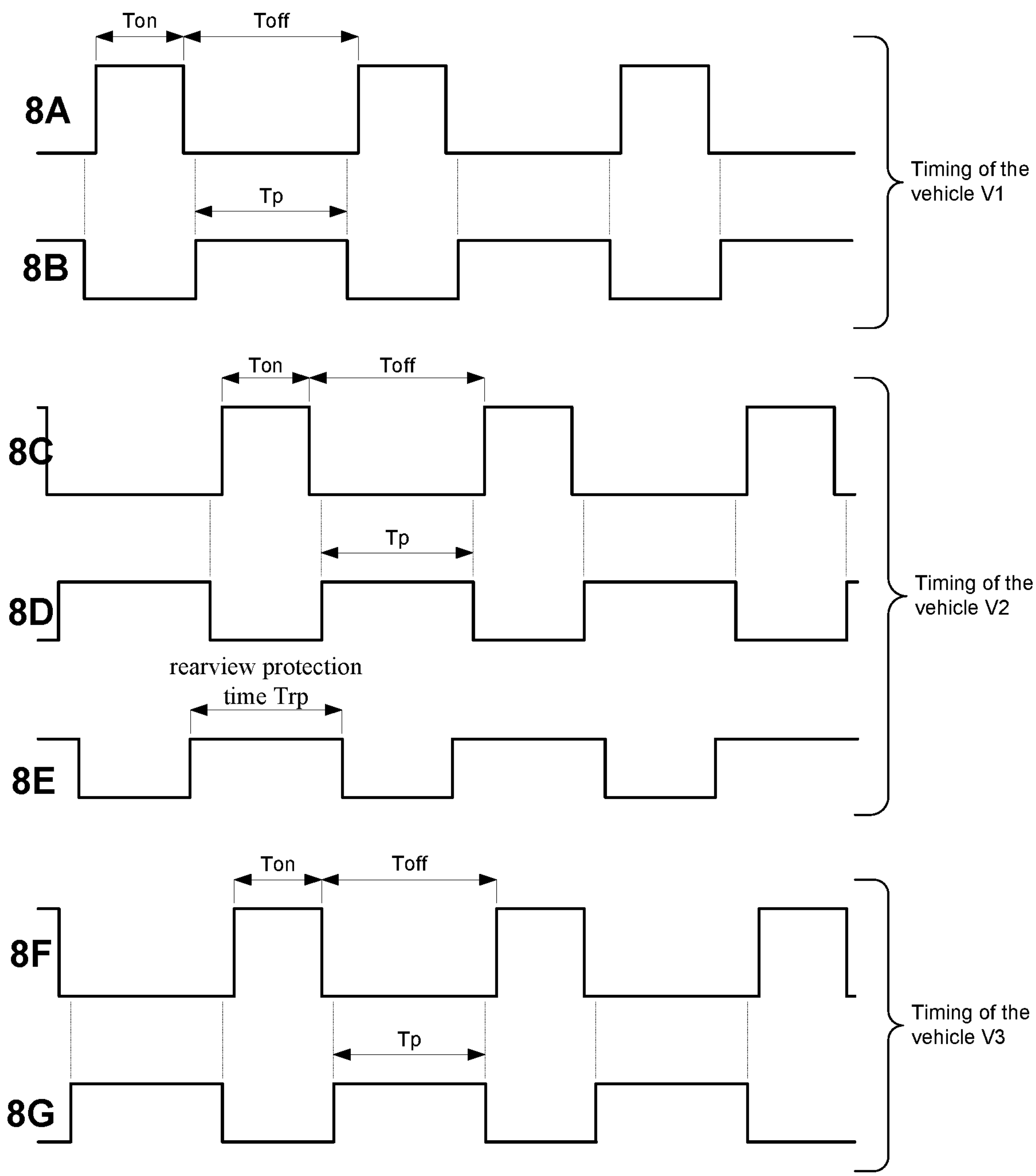
FIG. 8A-8G show illustrations of the EPIL wave for three vehicles, according to an exemplary embodiment of the invention.

The scheme of FIG. 7A is an example of an NVE in which two synchronized vehicles V1 and V2 that circulate in the same direction participate. The timing corresponding to the rear-view protection of V1 and the timing corresponding to the EPIL of V2 is shown in FIG. 7B. If the application of the anti-dazzling method with rear-view protection to V1, V2 and V3 involved in the NVE schematically in FIG. 5 is analyzed, the driver of V2 is the only one that needs, in addition to the vision protection, rear-view protection to protect against intense light from V3. In FIG. 8, the timing of FIG. 6 is then repeated, so that the waveform of the rear-view protection corresponding to V2 is added. Note that if there is another synchronized vehicle in the NVE behind V3, the driver of V3 would also need rear-view protection.

The rear-view protection will cause the driver of a vehicle participating in a synchronized NVE to perceive, through the rear-view mirrors, the vehicles coming behind and participating in that NVE, with its front lights significantly attenuated or Off, depending on the alternative that is chosen to implement such rear-view protection, but with the position lights on as these lights visible as they do not flash.

Here are some alternatives for carrying out such rear-view protection:

Using electronically controlled optical materials, whether they permit the passage of light, or significantly attenuates it. Such optical materials could be used to implement such rear-view protection in the following ways.

Using them in the rear-view mirrors to attenuate or prevent the emission of reflected light during the time intervals in which the rear-view protection acts.

In the front windows of the vehicle to attenuate or prevent the entry of the light reflected by the side-view mirrors into the vehicle and therefore into the eyes of the driver during the time intervals in which the rear-view protection acts.

In special glasses for the driver. It should be mentioned that before being able to opt for this alternative will find it necessary to consider that such eyeglasses should provide not only protection of rear view but also protection of vision, therefore said eyeglasses will have to be, for example, of the type which envelopes the eyes, with its central part or electronically controlled front to provide vision protection, and with its electronically controlled side parts to provide rear-view protection.

Formulation of the External Synchronization Procedure:

A procedure for establishing the synchronization required by the anti-dazzling methods already described is described below. This procedure, which is called the "external synchronization procedure", is based on the reception and processing by the vehicles passing the same path of signals transmitted by transmission sources external to them, using a predetermined communication means, so that such vehicles obtain:

1. A "phase adjustment" signal so that in said vehicles, by said phase adjustment signal, the possible EPIL phases are reduced to two alternatives, a certain phase and its counterphase. Each of these two alternative phases will be pre-assigned to a given direction of circulation with respect to the path or roadway. Once a vehicle has acquired these alternative phases, the phase adjustment signal will serve to readjust these phases, since for technological reasons a vehicle could not maintain indefinitely a certain phase without it suffering from run-overs that over time would cause the loss of synchronization between the EPILs of the different vehicles that circulate along the way.

Figures 9A, 9B, 9C:
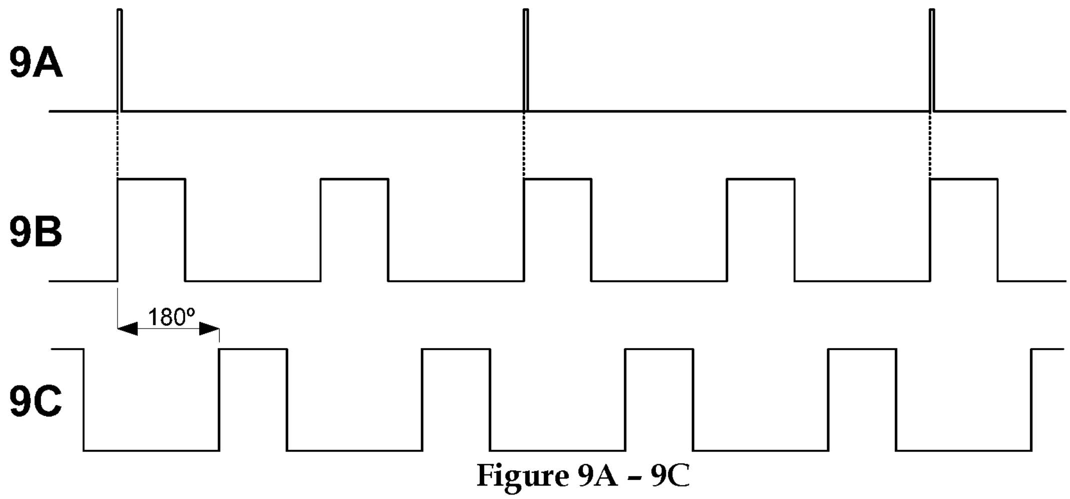
FIG. 9A shows a phase adjustment waveform which has (for example) been given double the period of the EPIL wave, according to an exemplary embodiment of the invention.
FIG. 9B shows a EPIL wave whose phase is pre-assigned to one of the directions of travel on the road, according to an exemplary embodiment of the invention.
FIG. 9C shows a EPIL wave whose phase is pre-assigned to the opposite direction of travel to that of FIG. 9B on the same road, according to an exemplary embodiment of the invention.

It is desirable that the phase adjust signal be a periodic signal of narrow pulses whose frequency is an exact submultiple of the frequency predicted for the EPIL. FIG. 9A shows the waveform of a phase adjustment signal to which, for example, a period corresponding to twice the EPIL period has been given. FIG. 9B shows the waveform of an EPIL whose phase is pre-assigned to one of the directions of circulation in the path. FIG. 9C shows the waveform of an EPIL whose phase is pre-assigned to the other direction of circulation with respect to the path. By way of reference we will say that one of the two alternative phases for the EPIL is extracted in a "direct form" from the phase adjust signal by causing each positive edge of said phase adjust signal to signal the start of a positive edge of the EPIL that is performed with said alternative phase (see FIGS. 9A-9B). The EPIL performed with the other alternative phase will be offset 180° from the previous one (see FIGS. 9B-9C).

2. A "phase selection" signal, which will adopt, in each of said vehicles, one of two possible values so that by means of said phase selection signal, and said phase adjustment signal, each one of said vehicles may adopt, for EPIL, the pre-assigned alternative phase corresponding to its direction of movement with respect to the road. Thus, all vehicles having the same direction of movement relative to the road will adopt the same EPIL phase and all vehicles having opposite directions of movement relative to the road will adopt opposite phases of EPIL.

The communication medium to be employed by said transmission sources external to the vehicles is included among those based on the transmission/reception of electronic, magnetic, optical, acoustic signals or a combination thereof. Some alternatives for causing the vehicles to obtain the phase adjust signal and the phase select signal from the signals transmitted by said external transmission sources. alternatives that to some extent depend on the media used.

Alternative A:

The phase adjustment signal will be transmitted using one or more Omni-directional transmission sources attempting to provide coverage all the way, so that the vehicles can readjust their EPIL phase at regular intervals of time given by the period of the Phase adjustment signal. The value of this period should be less if a vehicle is able to maintain the correct phase for the EPIL, which will be related to the stability of the oscillators used in the vehicles to control the EPIL since the lower the stability of these lower oscillators will be the time elapsed before the EPIL phase undergoes a shift that exceeds the allowed tolerance range. However, it should be noted that the stability of such oscillators should be adequate so that a vehicle can maintain the correct phase of EPIL while driving through some areas of the road where it is difficult to receive the phase adjust signal. For example, when crossing a tunnel. If more than one Omni-directional transmission source is used, they must be synchronized with each other to transmit a same phase adjustment signal. Such synchronization could be performed, for example, by a satellite signal. Alternatively, a single source of Omni-directional transmission could be used to the extent that it provides adequate coverage. An example of this can be the satellite transmission of the phase adjustment signal to vehicles.

On the other hand, the phase selection signal will be obtained in each vehicle according to its direction of movement with respect to the road from the reception of a "bearing signal" transmitted by directional transmission sources located in certain "Key points" along the way. Therefore, the vehicles must have means for receiving the phase adjust signal and means for the directional reception of said heading signal. The latter means will be arranged in such a way that it is possible to discern whether the received course signal is from the left or from the right with respect to the direction of movement of the vehicle. At a given instant the heading signal will be received only from one side of the vehicle (the one exposed to the directional transmission source), which allows to determine the direction of movement of the vehicle with respect to the road and therefore give a value to the phase selection signal.

If all sources of directional transmission are to transmit the same heading signal, then said directional transmission sources shall be located on the same side of the road, so that if a vehicle receives said heading signal from the left assumes that it has a certain direction of circulation with respect to the road and if it receives said heading signal from the right assumes that it has the opposite direction of circulation. In case of having to install one of these directional transmission sources on a winding road, this installation must be done in such a way that every time a vehicle receives the heading signal from that source it always does it on the same side of the vehicle (if it maintains its direction of movement with respect to the road). This is achieved by causing the signal emitted by said directional transmission source to go through the path only once. To distribute the directional transmission sources on both sides of the road, two different heading signals must be transmitted depending on the side of the road from which each of these signals is transmitted. Thus, all sources of transmission located on one side of the road will transmit a signal of course to which we will call, for example, "heading signal A" and all sources of transmission located on the other side of the road will transmit a signal to which we will call, for example, "heading signal B".

Figure 10:
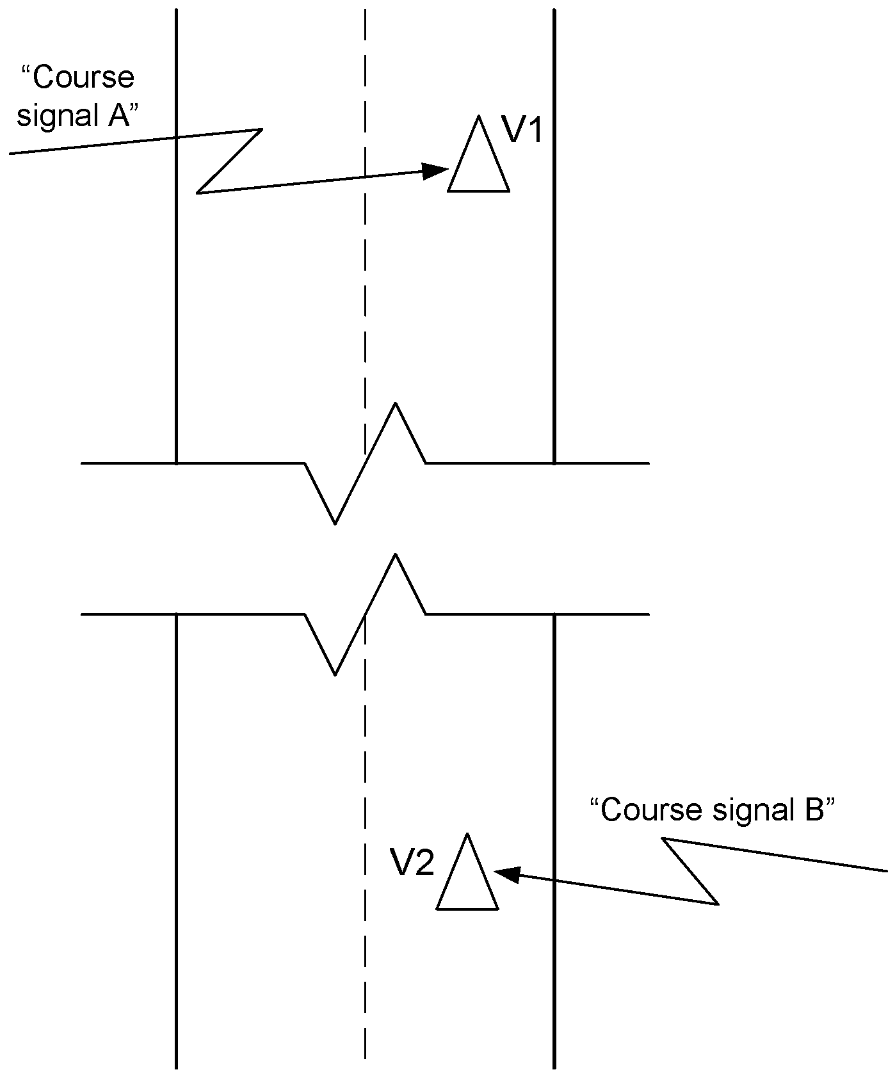
FIG. 10 shows vehicle V1 receiving the "route A signal", while at a different location of the same road and while travelling in the same direction, vehicle V2 receives the "route B signal", according to an exemplary embodiment of the invention.

In this case, the vehicle will assume that it has a certain direction of movement with respect to the road whether it has received the "A-bearing signal" from the left or if it received the "B-bearing signal" from the right. Similarly, the vehicle will assume that it has the direction of movement opposite to the previous one whether it received the "heading signal A" from the right or if it has received the "heading signal B" from the left. In the scheme of FIG. 10, for example, V1 is shown receiving the "heading signal A" from the left and, at another point in the way, to V2 that circulates in the same direction as the one above, receiving the "heading signal B" from the right. Accordingly, both vehicles will assume that they have the same direction of travel with respect to the road and therefore give the same value to the phase selection signal. Thus, having to install a source of directional transmission at a certain point in the way will have the freedom to do so on either side of it. The key points in which the sources of directional transmission will be located must include at least the points of entry to the road and those points of the road in which a vehicle can reverse its direction of movement with respect to it, thus as a vehicle, you can update your phase selection signal when necessary. It should be mentioned that if a vehicle which has changed its direction of movement with respect to the road has no means for updating its phase selection signal, will maintain an incorrect phase for the EPIL until it passes through the next directional transmission source.

Alternative B:

Another alternative for the vehicle to obtain the phase adjust signal and the phase selection signal may be: Distributing along the road or path directional transmission sources which transmit to the vehicles a phase adjust signal, so that from said phase adjustment signal in each vehicle, in addition to the two alternative phases of EPIL, the phase selection signal is obtained allowing the EPIL phase to be adopted which corresponds to its direction of movement with respect to the path.

If said directional transmission sources are all located on the same side of the road, the value of the phase selection signal that a vehicle obtains will depend on its direction of movement with respect to said road. Each vehicle shall have means for the directional reception of the phase adjustment signal transmitted by the directional transmission source whose coverage area is traversing said vehicle. These receiving means will be arranged in such a way that it will be possible to discern whether the phase adjustment signal is from the left or from the right with respect to the direction of movement of the vehicle. This allows a value to be assigned to the phase selection signal, since the phase adjustment signal will be received only by one side of the vehicle (that which is exposed to said transmission source).

In this way, the vehicle can adopt the EPIL phase that corresponds to its direction of travel with respect to the road. A convention will then be established for the vehicles to adopt for an EPIL the alternative phase which is directly obtained from the phase adjust signal when said phase adjustment signal is received by a certain side of the vehicle (for example, the side left). And to adopt the opposite alternative phase for the EPIL if said phase adjustment signal is received by the other side of the vehicle (for example, the right side). In this way vehicles that circulate in opposite directions will be automatically synchronized. In case of having to install one of said directional transmission sources in a sinuous way, said installation must be done in such a way that each time a vehicle receives the phase adjustment signal from said source it remains on the same side of the vehicle (if it maintains its direction of movement with respect to the road). This is achieved using the signal emitted by said directional transmission source to traverse the road only once.

If said directional transmission sources are located on both sides of the road, different phase adjustment signals transmitted from opposite sides of the road are necessary, so that phases alternatives may be extracted (in a direct form). It is then necessary for the phase-adjusting signal to be transmitted from one side of the path to be phase-shifted by 180° with respect to the phase adjust signal transmitted from the opposite side, and further that the phase adjust signal have a period which is an odd multiple of the EPIL period. A convention will then be established for the vehicles to adopt one of two possible values for said phase selection signal when said phase adjustment signal is received by a certain side of the vehicle (for example, the left side), and to adopt the other of said possible values for the phase selection signal when said phase adjustment signal is received by the other side of the vehicle (for example, the right side).

Thus, since when the vehicle receives the phase adjustment signal on one of its sides it will adopt either the phase directly obtained from said phase adjustment signal or the opposite phase depending on the side of the vehicle (Left or Right), it is necessary that, from opposite sides of the road, phase shift signals be transmitted out of phase by 180 degrees so that, from each of said phase adjustment signals, a vehicle that advances in a certain direction of movement with respect to the road obtains the same EPIL phase regardless of the side of the vehicle by which it receives said phase adjustment signal.

Figures 11A, 11B, 11C, 11D:
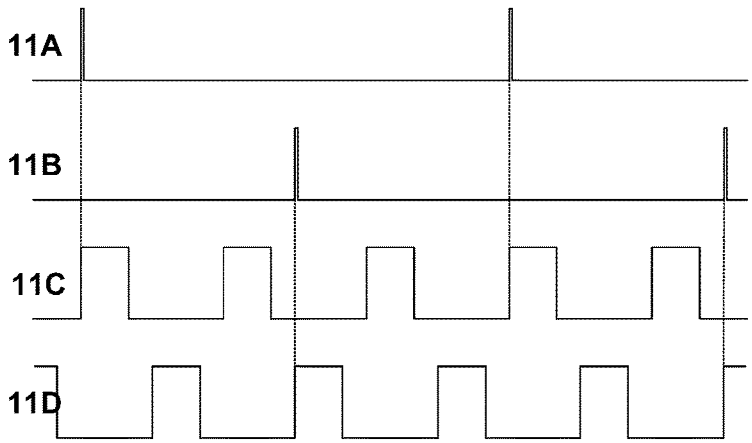
FIGS. 11A-11B show two phase adjustment signals at 180° phase-shift whose periods (as an example) correspond to 3× (as an odd multiple) of the period of the EPIL wave, according to an exemplary embodiment of the invention.
FIG. 11C shows waveform for the EPIL wave whose phase corresponds to the alternate phase which may be directly derived from the phase adjustment to FIG. 11A, according to an exemplary embodiment of the invention.
FIG. 11D shows waveform for the EPIL wave whose phase corresponds to the alternate phase which may be directly derived from the phase adjustment to FIG. 11B, according to an exemplary embodiment of the invention.

In FIGS. 11A-11B two 180° phased phase adjustment signals are shown, the periods of which, by way of example only, correspond to the triple (odd-numbered) period of the EPIL. FIG. 11C shows the waveform for the EPIL whose phase corresponds to the "alternative phase" which is obtained directly from the phase adjust signal of FIG. 11A. FIG. 11D shows the waveform for the EPIL whose phase corresponds to the "alternative phase" which is obtained directly from the phase adjust signal of FIG. 11B. Obviously, all directional transmission sources located on the same side of the road must be synchronized with each other to transmit the same phase adjustment signal. Such synchronization could be performed, for example, by a satellite signal. The greater the stability of the oscillators used in vehicles to control the EPIL, the longer the time elapses before a vehicle needs to readjust the phase of said emission so that it does not suffer a shift greater than a tolerated margin of tolerance. This time must be longer than the time it takes for a vehicle, traveling at a reasonable minimum speed, to traverse the distance separating two consecutive directional transmission sources, from which it follows that the separation between said transmission sources should be uniform. Thus, by adjusting the separation distance between said directional transmission sources as a function of the stability of said oscillators, we obtain the possibility that non-synchronized NVEs may occur along the path due to the EPIL phase shift of the vehicles. However, there may be very particular cases in which a vehicle may have an incorrect phase for EPIL. These cases are as follows:

1. When a vehicle has stopped moving for an extended period of time, as it may happen that when it has resumed its EPIL phase it has suffered a greater than permissible shift.

2. When a vehicle changes its direction of movement with respect to the road. The occurrence of these cases can be reduced by installing directional transmission sources in the vicinity of those places where the driver of a vehicle is more likely to be able to make a stop or reverse the direction of movement of his vehicle with respect to the road.

In the anti-dazzling methods already described above, it has been established that the vehicles must interact with one another to engage each other in an NVE. Vehicles must therefore be able to directionally transmit signals both at the front and at the rear of their chassis if they have the capability to provide vision and rear-view protection, and only at the front if the vehicles provide only vision protection. To explain the characteristics that vehicle interaction must have if vehicles provide vision and rearview protection, we will consider the front and rear of vehicles as separate entities. The front of a vehicle can interact with the front or rear of another vehicle, while the rear of a vehicle does not interact with the back of another vehicle (vehicles that have already crossed the road do not interact with each other). Thus, the vehicle must have means for receiving on the front both the signals that a vehicle can transmit by the front as well as those that another can transmit by the rear, as well as means in said vehicle rear for the reception of signals that a vehicle can transmit by the front. Making a vehicle interact with other vehicles backwards makes it possible to rearrange protection even in a synchronized NVE integrated by vehicles that all circulate in the same direction with respect to the road.

Concepts, Definitions and General Characteristics Common to Anti-Dazzling Systems.

Communication Between Vehicles

In those systems which require the vehicle to transmit signals to other vehicles forward, it has been chosen to use as the transmission medium the same vehicle EPIL which, when necessary, will be suitably controlled for this purpose. In those systems that require the vehicle to transmit signals to other vehicles backwards, it has been chosen to do so also by the emission of pulses of light. But for such a light not to affect the vision of the drivers of other vehicles, light will be used in the non-visible spectrum or pulses of visible light while the vehicle remains within a synchronized NVE.

Formation of an NVE

In one embodiment, the vehicles will have one or more light sensors arranged in such a way as to detect the light emitted by other vehicles arriving at them from the front. By analyzing the signals from these sensors, the system will determine when the vehicle has been involved in an NVE (and later, for systems with rearview protection, how a vehicle is involved from behind in an NVE). Prior to being involved in an NVE, vehicles will have activated their conventional continuous lighting. When the intensity of the light received by the front of a vehicle exceeds a certain threshold that we will call "continuous light threshold", then the system assumes that the vehicle has entered an NVE and therefore activates the EPIL. This EPIL, upon being detected by a vehicle that still has its conventional continuous illumination active, will be interpreted by the system of said vehicle as a "warning" that its lights are close to disrupting the driver's vision of the vehicle(s) from which the EPIL comes from. Therefore, when said vehicle receives intermittent pulses of light with an intensity such that it exceeds a certain threshold that we will call "intermittent light threshold", then that vehicle will join the NVE and will also activate its EPIL. The continuous light threshold corresponds to a light intensity lower than that which can disturb the vision of a driver. The intermittent light threshold will be assigned a value lower than the continuous light threshold for two reasons: first to accelerate the formation of the NVE and, second, so that in systems that do not have rear-view protection, the NVE is incorporated into nearby vehicles.

Figure 14:
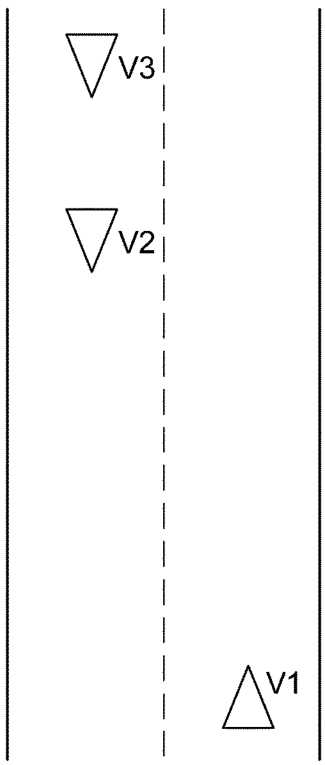
FIG. 14 is a diagram showing three vehicles V1, V2 and V3 that do not have rear-view protection and whose intermittent lights do not exceed in intensity and reach their conventional lights, according to an exemplary embodiment of the invention.

FIG. 14 shows the diagram corresponding to three vehicles V1, V2 and V3 that do not have rear-view protection and whose flashing lights do not exceed in intensity and reach their conventional lights. It is assumed that such vehicles are about to become involved in an NVE and, according to what has already been said, these vehicles will have active their conventional continuous illumination. For the example, it has been assumed that the light sensor of V1 is the one which is detecting continuous light with greater intensity, therefore V1 will be the first to detect light above the threshold of continuous light and consequently the first in switching to intermittent lights. However, if we chose to have the flashing light threshold have the same value as the continuous light threshold, V2 would not detect the flashing light of V1 until both vehicles were closer together, which would result in delaying the formation of NVE. This delay can be avoided by making the threshold for intermittent light detection less than the threshold used for continuous light detection. In addition, as the threshold of the flashing light is lower than the continuous light threshold, it also achieves that V3 enters the NVE—upon detecting the flashing light coming from V1 earlier than it would if those thresholds had the same value.

It should be noted that the delay mentioned in the above example could also be avoided by causing the flashing light to exceed in intensity and reach the level of the conventional lights of the vehicle. It should also be noted that if the vehicles in the previous example had rear-view protection, V3 would already be using intermittent light to enable rear-view protection on V2. Systems providing rear-view protection require the vehicle to have, in addition to sensors for the detection of light arriving from the front, one or more sensors arranged in such a way as to enable the vehicle to detect the light it receives from behind. By analyzing the signals delivered by these sensors, the system can determine when the vehicle has been involved in an NVE from the rear. When the intensity of the light detected exceeds a certain threshold that we call "continuous light threshold received from behind" then the system will assume that the vehicle has entered an NVE and must issue a signal backwards so that the vehicle or vehicles that follow it also enter said NVE, and activate their intermittent illumination.

Figure 15:
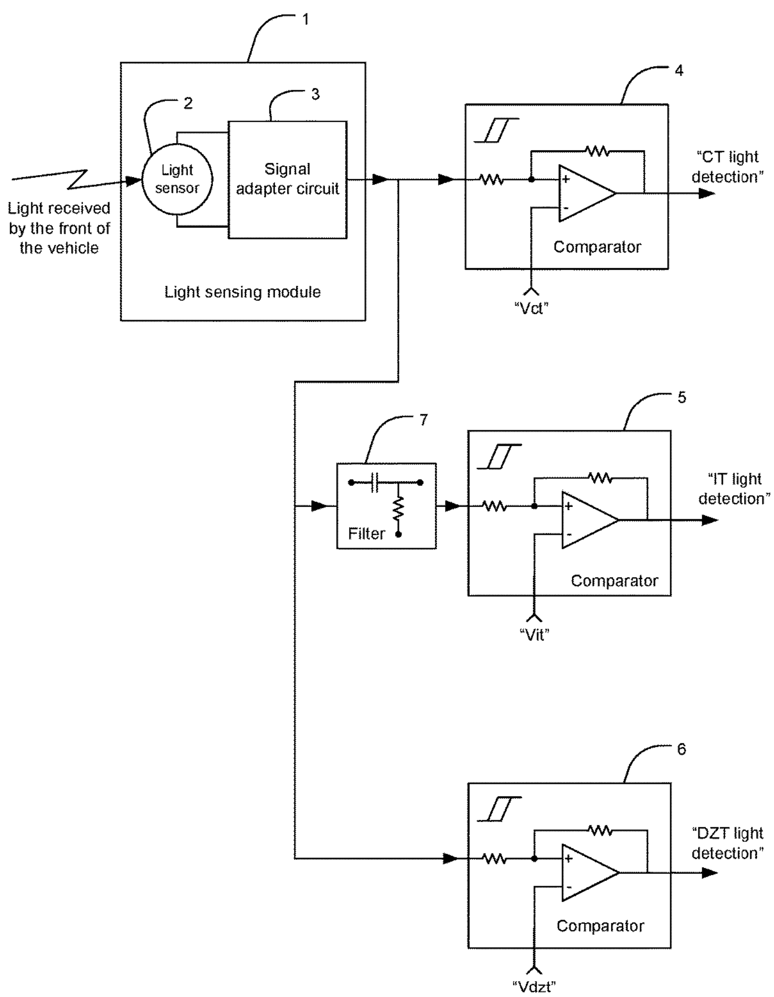
FIG. 15 shows a schematic diagram of how to perform the detection and analysis of the received light by the front of the vehicle, according to an exemplary embodiment of the invention.

A schematic diagram of how the detection and analysis of the light received by the front of the vehicle is shown in FIG. 15. The output of the light sensing module 1, which is composed of a light sensor 2 and a signal adapter circuit 3, enters a comparator 4 whose reference voltage (Vuc) corresponds to the "continuous light threshold" and its output signal, which will be called "CT Light Detection", is activated (raised) when the signal from the light sensing module 1 is located above said reference (i.e. when the light detected by the sensor is located above the continuous light threshold). To avoid undesirable transitions at the output of the comparator 4 and the outputs of the comparators 5 and 6 to be described below, said comparators have a hysteresis cycle centered on their respective references. Thus, the output of each of said comparators will be activated (high level) when the signal present at the comparator input reaches a certain level that is above its reference voltage. The output of each of said comparator will be deactivated (low level) when the signal present on its input falls to a certain level which lies below the corresponding reference voltage. The difference between the voltage present at the comparator input when its output switches to high level and the voltage present at the input of said comparator when its output switches low is called "hysteresis width" (h). The output signal of the light sensing module 1 also enters, through the filter 7, another comparator 5 whose reference voltage (Vui) corresponds to the "flashing light threshold". So that the output of said comparator 5, which we will call "light detection IT", is presented in the form of a pulse in correspondence with each pulse of flashing light received by the light sensor 2 with an intensity exceeding the flashing light threshold, said filter 7 must be capable of eliminating a possible component that is still present in the output signal of the light sensing module 1.

In addition, by adjusting the time constant of said filter 7 and the hysteresis of the comparator 5 it is possible to form the width of the pulses at the output of said comparator 5. To justify the use of such a filter 7 we turn to the same example of FIG. 14, but now if V2 is the first to detect light above the threshold of continuous light and hence the first to use intermittent light. As we have assumed that the vehicles do not have rear-view protection, V3 will not yet be intermixed, therefore the light sensor of V1 will be detecting the flashing light coming from V2 mounted on the continuous light coming from V3. In the absence of such a filter, the "light detection IT" output of vehicle comparator 5 would only present the waveform corresponding to the flashing light from V2, when the continuous light component from V3 did not exceed the threshold flashing light. Otherwise, i.e. if the continuous light coming from V3 exceeds the flashing light threshold, V1 could not determine, without the use of said filter, that it is receiving flashing light. This is so because the output of comparator 5 would remain at high value and the system could not determine, based on a time analysis of the same, whether the vehicle is receiving intermittent light or not.

Figure 16:
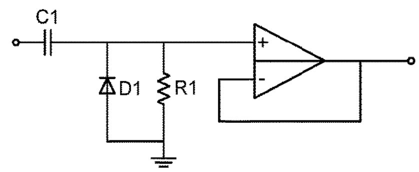
FIG. 16 shows a possible circuit for the filter 7 of FIG. 15, according to an exemplary embodiment of the invention.
Figure 17A:
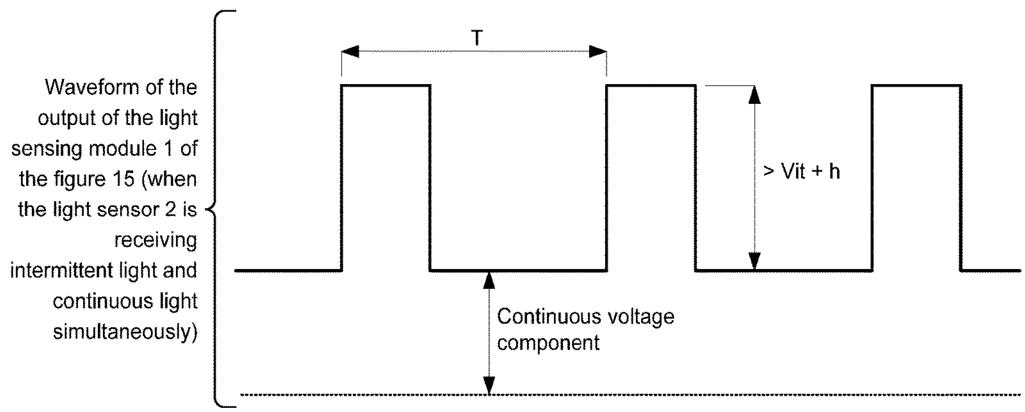
FIGS. 17A-17C show the FIG. 16 filter 7 response to inputs with the characteristics corresponding intermittent lights, according to an exemplary embodiment of the invention
Figure 17B:
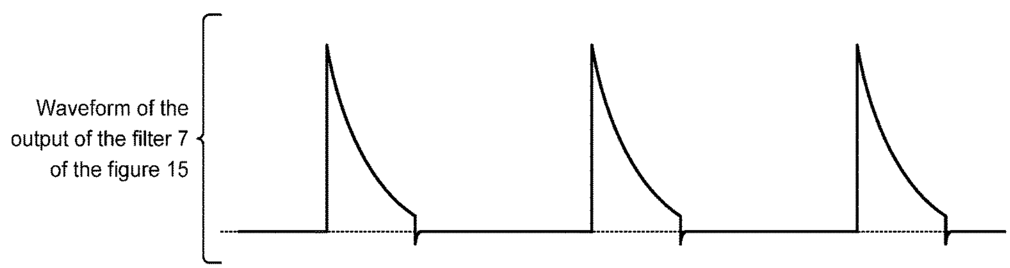
Figure 17C:
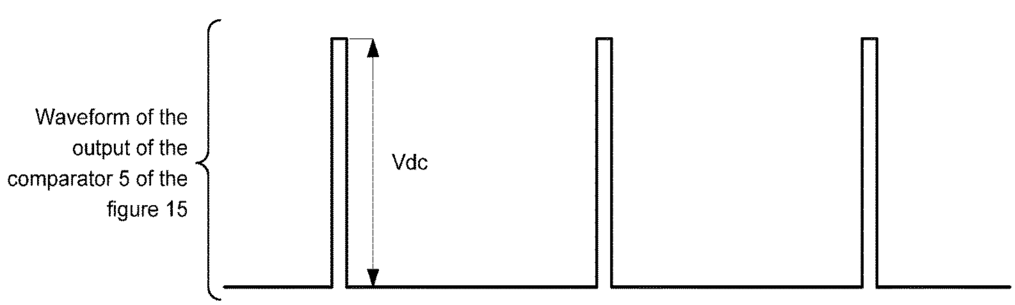

Consequently, without the use of the filter 7, the entry of V1 into the NVE would be delayed until the light detected by its light sensor 2 exceeds the threshold of continuous light, since when this latter happens the system will assume. No type of temporal analysis on the signal "CT light detection", that the vehicle has entered an NVE. However, when it is required to determine whether a vehicle is receiving conventional continuous light, it will be necessary to analyze the temporal behavior of the "CT light detection" signal. FIG. 16 shows, by way of illustration only, the simplified scheme of a possible circuit for the filter 7 of FIG. 15, to explain how said filter 7 must respond to pulses whose characteristics correspond to the flashing light. If the circuit diagrammed in FIG. 16 is adopted for the filter 7 of FIG. 15, when a pulse is present at the input of said filter 7, the capacitor C1 is charged through the resistor R1 and for this reason said pulse appears at the output of the filter 7 showing a reduction of amplitude in correspondence with the charge of said capacitor C1 (see FIGS. 17A-17C). Therefore, the time constant T1=R1·C1 can be set, and the hysteresis of the Comparator 5 of FIG. 15, either for the comparator 5 to switch low before the flashing light pulse is extinguished, or to preserve the width of said pulse at the output of the comparator 5 if so desired.

However, for some of the systems to be described below, it would be desirable for the pulses obtained at the output of said comparator 5 to be narrow. It is also convenient that, upon the extinction of a pulse at the input of the filter 7, the capacitor C1 is immediately discharged, which is done through the diode D1. The output of the light sensing module 1 also enters a comparator 6 whose reference voltage (Vue) corresponds to a threshold of light intensity which we will call a "dazzling threshold" which will obviously be greater than the "continuous light threshold". The output of said comparator 6, which we call "DZT light detection", is activated when the light detected by the light sensor 2 exceeds the dazzle threshold. When this happens, the system will analyze the temporal behavior of this output to determine if the vehicle driver is receiving said light on the dazzle threshold outside the viewing protection range $T_p$. If this situation occurs the system will cause the vehicle to temporarily use the low beam pending similar action by the other vehicles involved. It should be mentioned that this case would only occur between vehicles that, for some reason, did not have their lights synchronized.

FIG. 18 shows a schematic diagram of a possible light sensing circuit, which comprises a photodiode 8 (as a light sensor) connected directly to the inputs of an operational amplifier 9 which, negatively feedback through a resistor 10, fulfills the signal adapter circuit function. The output of said operational amplifier 9 will be proportional to the current generated by the photodiode 8, which will be operated in its most stable mode, i.e. in the "short-circuit" mode. It is to be noted that the response curve of a conventional photodiode includes both the visible light region and the infrared light region. In those systems, whose implementation makes it possible to detect light coming from other vehicles working only in the infrared region (i.e. filtering the visible light), the possibility that lights strange to those produced by the vehicles will be detected by the system (For example, light from luminous signs). Said light sensor 2 will preferably be mounted on places where the light intensity received by the driver is like that perceived by the driver of the vehicle (e.g. behind the windshield).

Transitions in the Type of Light Detected by a Vehicle

On a regular basis, vehicles will experience transitions, between the types of light detected by a vehicle. The most frequent situations of such transitions could occur and the response to the system in each case (for the sake of simplicity, think of vehicles that do not have rear-view protection, i.e., vehicles that can be involved in an NVE only in the forward direction) include (Transition//Situation//System Response [T//S//SR]).

Transition: from not detecting light (neither continuous nor intermittent) to continuous light detection. Situation: The vehicle in question, which is not involved in an NVE, is the first to detect another or other approaching vehicles that are not involved in an NVE. System response: activate the EPIL.

Transition: from not detecting light (neither continuous nor intermittent) to intermittent light detection. Situation: The vehicle in question, which is not involved in an NVE, detects another or other approaching vehicles already involved in an NVE. System Response: activate the EPIL.

Transition: from detecting conventional continuous light to intermittent light detection. Situation: The vehicle in question, which is already flashing because it is detecting continuous light from another or other approaching vehicles, receives the EPIL from one or more of those vehicles in response to its EPIL. System Response: If these intermittent light pulse emissions are properly synchronized, the system keeps the EPIL active. Otherwise the answer will depend on each system and will be dealt with later.

Transition: from detecting intermittent light to non-detecting light. Situation: the vehicle in question just left an NVE. System Response: The system activates conventional continuous illumination.

Using "High Beam" Versus "Low Beam"

The conventional way of "attenuating" the problem of dazzling is to make use of the low beams in the vehicles. However, since with the use of anti-dazzling systems and methods developed in the present invention, the driver of a vehicle participating in a synchronized NVE is protected from the intense light coming from other vehicles. The intermittent or flashing light employed by the vehicles may have greater intensity and reach than conventional continuous low light or low beam and even could have greater intensity and scope than "conventional continuous high beam", (this applies especially to systems that provide rear-vision protection). However, in some situations, the intensity of light employed by a vehicle could cause problems within a non-synchronized NVE. Some of the cases in which this may occur include:

When the driver of a vehicle participating in an NVE has deactivated the anti-dazzling system (vehicles will have a manual means to deactivate the anti-dazzling system, in which case the vehicle may only use its conventional lighting) or when a vehicle, which participates in an NVE, is not equipped with an anti-dazzling system.

Since in any of these cases a vehicle will use conventional continuous light, the drivers of vehicles traveling in the opposite direction will receive light outside the $T_p$ vision protection time interval. When a vehicle receives light outside said interval $T_p$ with an intensity such that it exceeds the "dazzle threshold" the system will activate for a short time a signal that we will call "force high beam use" and immediately after activate another signal that we will call "force low beam use". As their names indicate, these signals force the use of high and low beams respectively, regardless of the position of the manual switch of vehicle lights. These actions of the system, which will then be explained in more detail, are done to avoid causing inconvenience to the driver of the vehicle that does not have anti-dazzling system and, in turn, to ask you to lower your vehicle's beams. Obviously, the driver of a vehicle that has the system can also request a change of lights manually using the pushbutton that temporarily forces the activation of the high beams of your vehicle. It should be mentioned that if the light of said vehicle is intermittent the change of light will go unnoticed for the drivers of those vehicles whose intermittent light is synchronized with the previous one.

Intermittent Control Signal (ICS)

In the anti-dazzling systems to be described, the ICS is a square wave signal of a predetermined frequency that will be generated in the vehicles in such a way that their phase is adjustable. In such systems, the EPIL is performed with the frequency and phase of said ICS, which means that when the vehicle is using regular flashing light, each positive edge of the ICS will initiate the emission of a light pulse. The ICS allows a vehicle to maintain the EPIL phase even if the vehicle is not using flashing light, such as when a vehicle leaves an NVE, or when the vehicle stops and turns off its lights. The ICS phase will only be modified if a new synchronization requires it. It should be noted that the ICS of synchronized vehicles that circulate in opposite directions will be, within a certain tolerance, in counter phase. Therefore, the reception by one vehicle of each pulse of flashing light from another vehicle synchronized with the first one approaching in the opposite direction starts—within a certain tolerance range—from the negative flank of its ICS. FIGS. 19A-19D shows the ICS and EPIL waveforms corresponding to two "perfectly" vehicles V1 and V2 synchronized with each other and traveling in opposite directions. FIGS. 19A and 19C are the waveform of the Intermittence Control Signal of the vehicles V1 and V2, and FIGS. 19B and 19D are the Waveform of the EPIL of the vehicles V1 and V2 respectively.

The ICS will be obtained from a much higher base frequency. This base frequency is generated by an oscillator whose stability determines the time that a vehicle can maintain a certain phase of EPIL without the displacement of that phase exceeds a certain value. The stability requirements of said oscillator are not the same for all systems since these requirements change according to the synchronization procedure employed. FIG. 20 corresponds to a simplified diagram of a circuit for generating the ICS. This circuit has two inputs called "phase reset" and "Selection" or "Select". The "phase reset" input is the reset input of a multi-stage binary counter 11, which will be used as frequency dividers and whose outputs will be identified as Qn, Qn−1, . . . , Q1, Q0, where Qn is the output of the highest order stage (n+1 stages). The base frequency delivered by an oscillator 12 enters the clock input of the counter/divider 11. By acting on the "phase reset" input of said counter/divider 11 the phase of all its outputs is adjusted. The output Qn of said counter/divider 11 enters next to the signal $\overline{Qn}$ into the selector circuit 13 at whose output Qn is obtained when the "select" input of said circuit is at high level and $\overline{Qn}$ when said "select" input remains at low level. The output of this selector circuit constitutes the "ICS". To establish the phase for the EPIL of the vehicle, each system must generate signals to control the "phase reset" and "select" inputs of the ICS generation circuit.

A phase adjustment of the ICS can be presented in the form of the high-level setting of said ICS (by setting the "phase reset" entry to high level and the "selection" input to low level) or in the form of setting low level of said ICS (putting the entry "phase reset" in high level and the entry "selection" in high level). FIG. 21 shows the behavior of the Qn and $\overline{Qn}$ outputs and when a pulse is present at the "phase reset" input. With this form of generating the ICS an accuracy is obtained for the phase adjustment which will be given by the period of the clock signal generated by the oscillator 12, i.e. the inverse of the base frequency. Other outputs corresponding to the intermediate stages of the counter/divider 11, whose frequencies are multiples of the ICS frequency, will be used to delimit certain "zones" within the period T of the ICS, such as the protection time period of $T_p$ vision and other areas that will be defined below. FIG. 22 shows the timing of the outputs of said counter/divider 11 and the clock which supplies it.

Figures 23A, 23B, 23C, 23D, 23E, 23F, 23G:
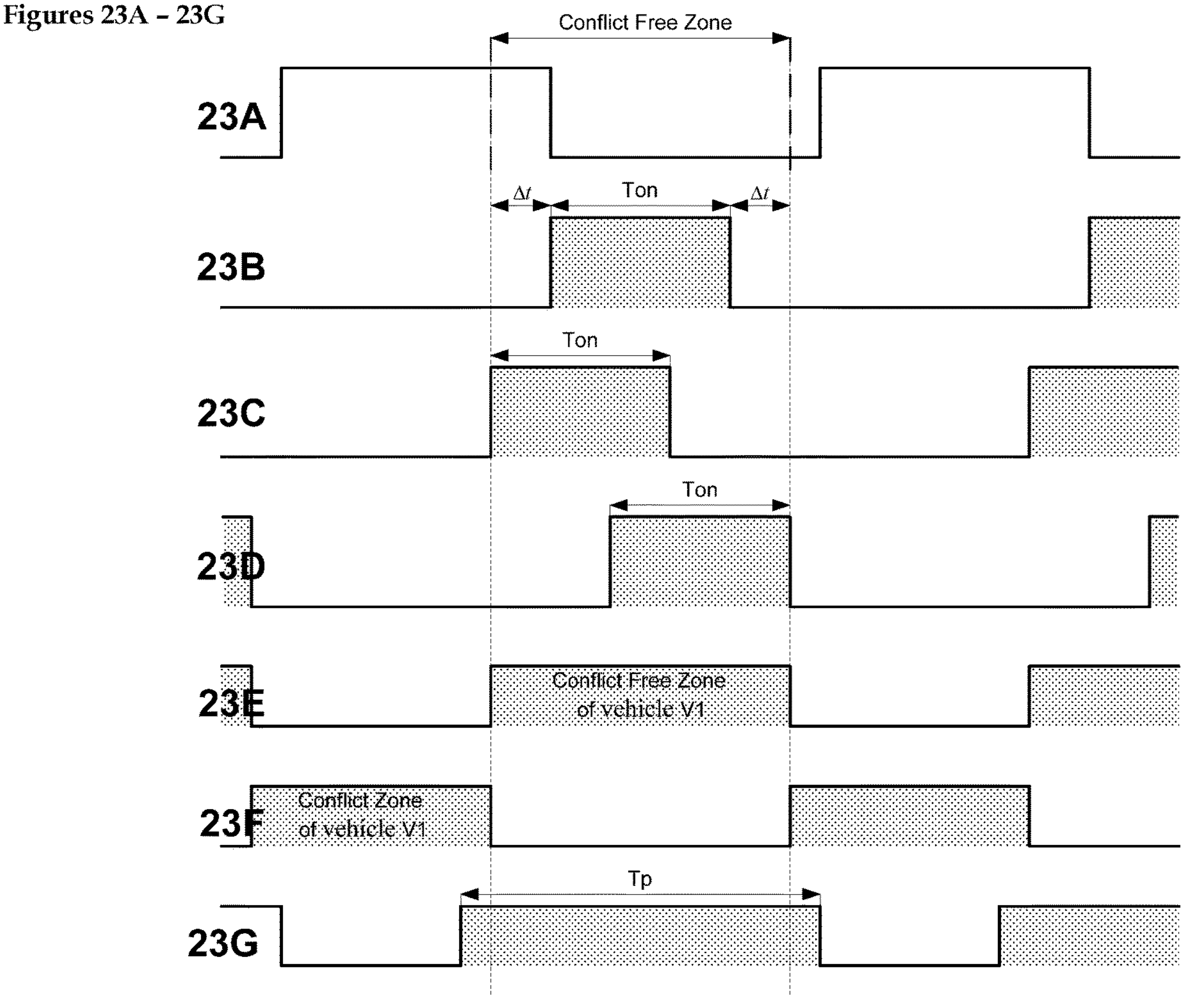
FIG. 23A shows the ICS of V1 on which the conflict-free zone (CFZ) has been indicated, according to an exemplary embodiment of the invention.
FIG. 23B shows the EPIL wave of V2 perfectly synchronized with V1 circulating in the opposite direction to this V2, according to an exemplary embodiment of the invention.
FIGS. 23C-23D show the EPILs of V3 and V4 circulating in the opposite direction of V1 and which represent the extreme cases of vehicles considered synchronized with V1, according to an exemplary embodiment of the invention.
FIG. 23E shows the CFZ waveform of V1, according to an exemplary embodiment of the invention.
FIG. 23F shows the Conflict Zone (CZ) waveform of V1, according to an exemplary embodiment of the invention.
FIG. 23G shows the Vision Protection Zone (VPZ) waveform of V1, according to an exemplary embodiment of the invention.
Figure 28:
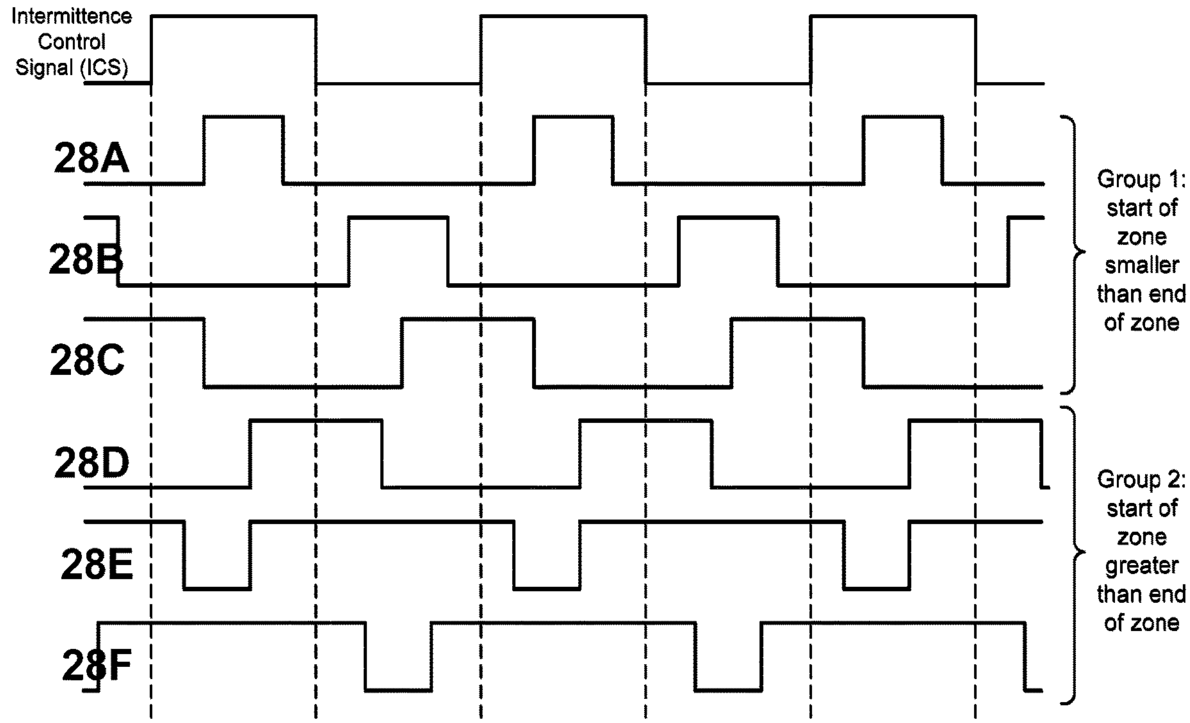
FIGS. 28A-28F show six hypothetical zone signals (A, B, C, D, E, and F) that differ by their location and extent with respect to ICS, according to an exemplary embodiment of the invention.

Definition of zones within the T period of the ICS "Conflict-Free Zone (CFZ)": we shall call the time or zone space within the period T of the ICS of a vehicle in which intermittent pulses of light from other vehicles considered synchronized with the first and which circulate in the opposite direction. We will call "CFZ" a signal that identifies the said zone free of conflict, reason why said signal will have the same frequency that the ICS and will remain active within each zone free of conflict. FIGS. 23A-23G shows the extent and location of the conflict-free zone in relation to the ICS of the vehicle. FIG. 23A shows the ICS of a vehicle V1 on which the CFZ has been indicated. FIG. 23B shows the EPIL of a vehicle V2 perfectly synchronized with V1 that circulates in the opposite direction to it. As can be seen in both figures, the conflict-free zone will have a location and extent such that it encompasses the pulse width of FIG. 23B plus a certain tolerance (Δt) on both sides of said pulse. FIGS. 23C-23D show the EPILs of two vehicles V3 and V4 that circulate in the opposite direction of V1 and which represent the extreme cases of vehicles considered synchronized with V1. FIG. 23E shows the waveform of the CFZ signal of V1.

"Conflict zone" (CZ): we shall call the time space or zone within the period T of the ICS of a vehicle in which pulses of intermittent light from other vehicles not synchronized with the first will be received circulate in the opposite direction. We will call "CZ" a signal that identifies the zone of conflict within each period T of the ICS of a vehicle, so that signal will have the same frequency as the ICS and will remain active within each zone of conflict. FIG. 23F shows the waveform of the signal CZ for V1, said CZ signal is obtained by inverting the CFZ signal.

"Vision protection zone" (VPZ): in anti-dazzling systems, we shall call a vision protection zone the time or zone that coincides with the defined vision protection time interval $T_p$ when describing anti-dazzling methods. We will call "VPZ" a signal that identifies the vision protection zone within each T period of the ICS of a vehicle, so that the signal will have the same frequency as the ICS and will remain active within each protection zone of view. FIG. 23G shows the waveform of the VPZ signal for V1 which, as can be seen, includes the conflict-free zone.

Other zones not used in all systems will be defined for each system. From now on we will use the same acronym to refer to both a zone and the signal that identifies that zone, for example, we will use CFZ to refer to both the conflict-free zone and the signal that identifies that zone.

Zone Signal Generation

To generate a signal that identifies a zone, which has a certain location and extension within the period T of the ICS, it is necessary to define the start and end times of that zone, for which a medium must be available to measure the time within each period T as a function of a chosen time base. If the period of the clock signal entering the clock input of the counter/divider 11 is used as the time base, it can be distinguished within the period T of the ICS which is generated from the output Qn of said counter/divider 11, 2n+1 distinct time intervals. Each of said intervals can be identified by the state of the outputs Qn, Qn−1, . . . , Q1, Q0 of the counter/divider 11, shown in the timing of FIG. 22. Similarly, if used as a time base the period of output Q0 of the counter/divider 11, each period T of the ICS can be divided into 2n time intervals whose extension will be equal to the period of the output Q0. Each of said intervals will now be determined by the state of the outputs Qn, Qn−1, . . . , Q2, Q1 of said counter/divider 11. In the table of FIG. 24 this analysis is extended to a time base given by the period of an intermediate output Qi of the counter/divider 11.

However, since the time will be measured within each period T, from the negative edge of the ICS, and that said ICS is obtained as the selection of Qn or $\overline{Qn}$ (see FIG. 20), we will replace the output Qn in said time measurement by the ICS output of the selector circuit 13. Thus, if the period of any output Qi of the counter/divider 11 is chosen as the time base, the time within the period T of the ICS will be determined by a binary number of (n−i) bits formed by the state of the Departures [ICS, $Q_{n-1}$, . . . , $Q_{i+2}$, $Q_{i+1}$] where $Q_{i+1}$ is the least significant bit. In this way, the start time for the generation of a certain zone signal will be specified by the n−i bits [$I_{n+1}$, $I_{n+2}$, . . . , $I_1$, $I_0$] where $I_0$ is the least significant bit, and the end time of said zone signal will be specified by the (n−i) bits [($F_{n+1}$), $F_{n+2}$, . . . , $F_1$, $F_0$] where $F_0$ is the least significant bit. The signal representing that zone will be set high when the binary number given by the outputs [ICS, $Q_{n-1}$, . . . , $Q_{i+2}$, $Q_{i+1}$] equals the binary number [$I_{n+1}$, $I_{n+2}$, . . . , $I_1$, $I_0$] and will be set to a low value when said binary number [ICS, $Q_{n-1}$ . . . , $Q_{i+2}$, $Q_{i+1}$] equals the binary number [($F_{n+1}$), $F_{n+2}$, . . . , $F_1$, $F_0$]].

FIG. 26 shows, by way of example, two hypothetical zones A and B whose start and end times have been defined using the time period Qi of the counter/divider 11 for a value of I=n−5. With this time base, the start times of said zones will be specified by the following five bits [I4, I3, I2, I1 I0], In and the end times of said zones by the following five bits [F4, F3, F2, F1, F0]. In this example for zone A the start time=011002=12 and the end time=101102=22, and for zone B the start time=110112=27 and the end time=001002=4. For The time base chosen the time within the period T of the ICS will be measured as a binary number given by the outputs [ICS, Qn−1, Qn−2, Qn−3, Qn−4] with Qn−4 being the least bit significant.

FIG. 27 shows the simplified diagram of a circuit that has been designed in generic form for any time base Qi and that allows to generate the zone signals that will be used in the different systems. Before describing the circuit, it is necessary to analyze some characteristics of said zone signals. In FIGS. 28A-28F, six hypothetical zone signals (A, B, C, D, E, and F) are shown that differ by their location and extent with respect to ICS. By measuring the time within the period T from the negative edge of the ICS, zone A, B, and C signals (group 1) have in common that their respective start times are less than their respective end times. The zone signals D, E and F (group 2) have in common that their respective start times are greater than their respective end times. The zone A, B, and C zone signals will be at a high value as long as the zone start time is less than or equal to the time count within the T period of the ICS and that said time count is less than the end time of zone:

$$(I_{n+1},I_{n+2}, \ldots ,I_1,I_0] \leq [\mathrm{ICS},Q_{n-1}, \ldots ,Q_{i+2},Q_{i+1}]$$

AND $$([\mathrm{ICS},Q_{n-1} \ldots ,Q_{i+2},Q_{i+1}] < [F_{n+1},F_{n+2}, \ldots ,F_1,F_0])$$

On the other hand, zone D, E and F zone signals will be at a high value as long as the zone start time is less than or equal to the time count within the T period of the ICS or as long as Said time count is less than the end time of zone:

$$([I_{n+1},I_{n+2}, \ldots ,I_1 I_0] \leq [\text{ICS},Q_{n-1}, \ldots ,Q_{i+2},Q_{i+1}]) \text{ OR}$$

$$([\text{ICS},Q_{n-1}, \ldots ,Q_{i+2},Q_{i+1}] < [F_{n+1},F_{n+2}, \ldots ,F_1,F_0])$$

The zone signals to be used by the systems correspond to those of type A, B, C, and D and can be generated interchangeably by the circuit of FIG. 27. This is because the logic block 30 will behave as a two-input logic gate OR if the zone is of type D and as a two-input AND gate otherwise, thus providing this block 30 the logical AND/OR operators used in the expressions corresponding to the signals of Zone of groups 1 and 2 respectively. Observing FIGS. 28A-28F, we can see that the zone signal D is the only one that has the most significant bit of its start time in high value and in turn the most significant bit of its end time in low value (In−i−1>Fn−i−1). This feature allows the control of the behavior of block 30 by means of the AND gate 29. So, when the zone signal to be generated is of the type D the output of the AND gate 29, which feeds one of the inputs of the AND gate 26, is set to high value allowing the output of the OR gate 28, To the other input of said AND gate 26, to feed to one of the inputs of the OR gate 27 from whose output the zone signal is obtained.

Since the other input of the OR gate 27 is connected to the output of the AND gate 25 and to this gate the same signals as the OR gate 28 are input, the zone signal corresponds to the logical AND operation of said signals always and when said zone is not of type D, that is when the output of the AND gate 29 remains at a low value. The signals entering the gates AND 25 and OR 28 are "count≥I" and "F>count", this last signal is one of the outputs of the comparator of magnitude 16, whereas the signal "count≥I" is obtained by inverting, through the inverter 24, the output "count<I" which is one of the outputs of the comparator of magnitude 15, this comparator 15 compares the start time of the zone to be generated, given by the bits $[I_{n+1}, I_{n+2}, \ldots, I_1, I_0]$, with the count of time given by the Outputs $[\text{ICS}, Q_{n-1}, \ldots, Q_{i+2}, Q_{i+1}]$, while the comparator 16 compares said time count with the end time of the zone to be generated, given by bits [Fn−i−1, Fn−i−2, . . . , F1, F0].

As can be seen in the simplified diagram of FIG. 27, said comparators 15 and 16 are composed of simple two-bit comparators cascaded, the operation of which will be described regarding the simple comparator circuit contained in block 17. Outputs "A>B" and "A<B" of said block 17 are the outputs of the gates OR 20 and OR 23 respectively. When the "A>B" input, which enters one of the inputs of said OR gate 20, input "set A<B", which enters one of the inputs of said OR gate 23, are both in low value, the output state "A>B", will be determined by the output of AND 19 gates, connected to the other input of said OR gate 20, and the output state "A<B" will be determined by the output of the AND gates 22, connected to the other input of said OR gate 23. One of the inputs of the AND gate 19 is fed by the input bit "a" and the other input of said AND gate 19 is fed by the input bit "b" inverted by NOR gate 18, therefore the output of said AND gate 19 will be set high when "a" is in a high value and "b" when in a low value (a>b). One of the inputs of the AND gate 22 is in turn fed by the input bit "a" inverted by the NOR gate 21 and the other input of the AND gate 22 is fed by the input bit "b", so the output of said AND gate 22 will be set to high value when "a" is in low value and "b" in high value (a<b).

Note that the circuit prevents the outputs of the AND 19 and AND 22 from being simultaneously high in value. When the "set A>B" input is high, the "A>B" output will be high regardless of the status of the "a" and "b" inputs, and when the "set A<B" input is in high value, the output "A<B" will be high regardless of the state of inputs "a" and "b". Note that in the simple two-bit comparators of FIG. 27 the inputs "set A>B" and "set A<B" will never be in high value simultaneously. The outputs "A" B "and" A<B "of a stage are connected to the inputs" set A>B "and" set A<B "of the next stage respectively (in the first stage, these inputs" set A>B "and" set A<B" are both set to low). When in a higher order stage the two input bits "a" and "b" of said step determine that the output "A>B" is activated, or that the output "A<B" is activated in all steps. Subsequent departures will adopt the same status as in that higher order stage. The latter is carried out by the OR gates generating the outputs of each step and which in block 17 have been identified with the numbers 20 and 23. The outputs of the comparators 15 and 16 will be the outputs of the last stage of said comparators. It is noted that when a phase readjustment of the ICS occurs, the circuit of FIG. 27 will immediately reset the zone signal. Which would not occur if a circuit was used to update the signal only at the zone start and end zone start times. This is something that should be considered even if other alternatives are used to implement the zone signals, for example those based on the use of microprocessors.

System Activation and Power Supply.

Figure 29:
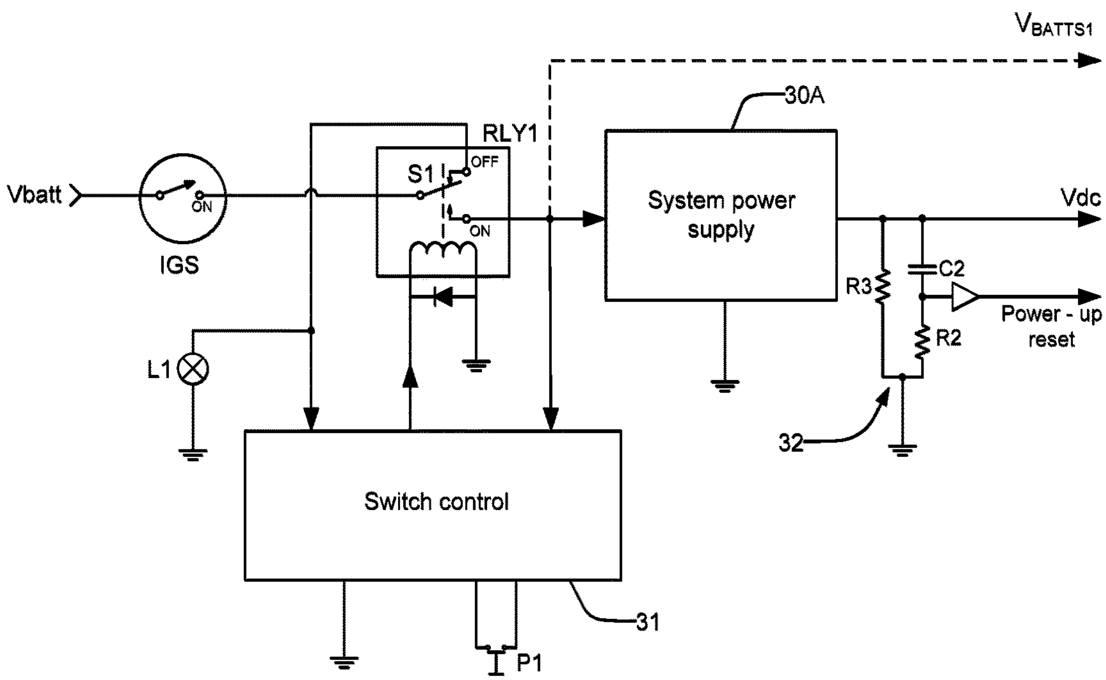
FIG. 29 shows a schematic diagram of the power supply of the system 30A and of the switching circuit which controls the activation/deactivation of said system, according to an exemplary embodiment of the invention.

FIG. 29 shows a schematic diagram of the power source of the power supply system 30A and of the switching circuit that controls the activation/deactivation of said system. We call "Vdc" the regulated voltage provided by said power supply 30A, the value of Vdc will be defined according to the type of circuits with which the system is implemented. System activation occurs when the system is energized with voltage Vdc. This is done when the vehicle ignition key (SC) is closed by depressing the pushbutt$_{on}$ P1 whereby, via the "switch control" circuit 31, the relay coil RLY1 is energized which leads to the switch S1 to the ON position. Thus, the input of the power supply 30A is connected to the positive terminal of the battery via switch S1 (VBATTS1) thus energizing the system. When pushbutton P1 is pressed again switch S1 will return to the OFF position. This action allows the manual deactivation of the system as well as when the ignition key of the vehicle SC is opened. In both cases the input of the power supply 30A will be disconnected from the voltage Vbatt. The circuit 32 of this FIG. 29 composed of the capacitor C2 and the resistors R2 and R3 generate a "power-up reset" pulse for the system at the moment when the switch S1 is switched to the ON position. The L1 light will remain on when the switch S1 is in the OFF position indicating to the driver that the system is deactivated.

Figure 30:
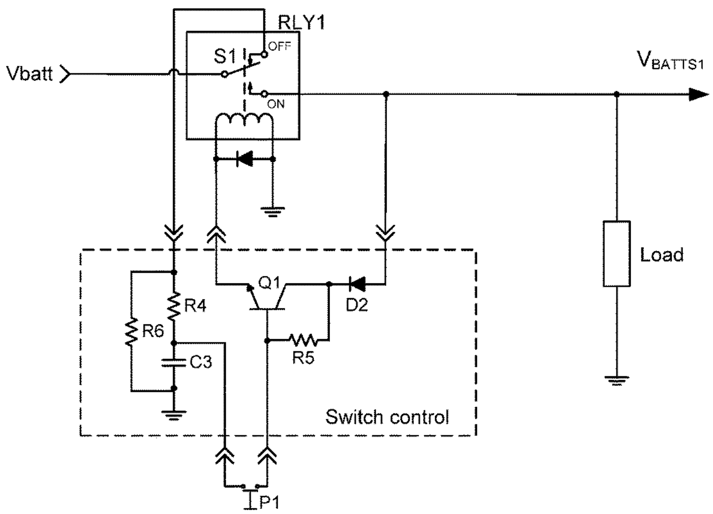
FIG. 30 shows a circuit diagram of the "switch control" circuit corresponding to block 31 of FIG. 29, according to an exemplary embodiment of the invention.

An exemplary simplified diagram of the "switch control" circuit corresponding to block 31 of FIG. 29 is shown in FIG. 30. If switch S1 is in the OFF position, capacitor C3 is charged to through resistor R4 as it remains connected to voltage Vbatt while said switch S1 remains in the OFF position. This capacitor C3 must be of such a value as to store the energy necessary to temporarily energize the coil of the relay RLY1 through the base-emitter diode of the transistor Q1 when the push-button P1 is pressed. This action brings the switch S1 to the ON position whereby the collector of the transistor Q1 is connected through the diode D2 to the voltage Vbatt. This will produce (if the resistor R5 has the appropriate value) the saturation of said transistor Q1, thereby keeping the relay coil RLY1 energized when the pushbutt$_{on}$ P1 has been released.

When the pushbutt$_{on}$ P1 is released the capacitor C3 is discharged through the resistors R4 and R6. When the pushbutt$_{on}$ P1 is pressed again, the voltage at the base of the transistor Q1 will drop abruptly, since the capacitor C3 is discharged, bringing said transistor Q1 into the cut, whereby the relay coil RLY1 is de-energized and the Switch S1 returns to the OFF position, the time constant R4·C3 must be large enough to allow the pushbutt$_{on}$ P1 to be released before the relay coil RLY1 is energized again. The diode D2 prevents the capacitor load C3 (intended to energize the relay coil RLY1 when switch S1 is in the OFF position) to flow, by pressing the pushbutt$_{on}$ P1, through the base-collector diode of transistor Q1 to the load Connected to the output of switch S1.

Figure 31:
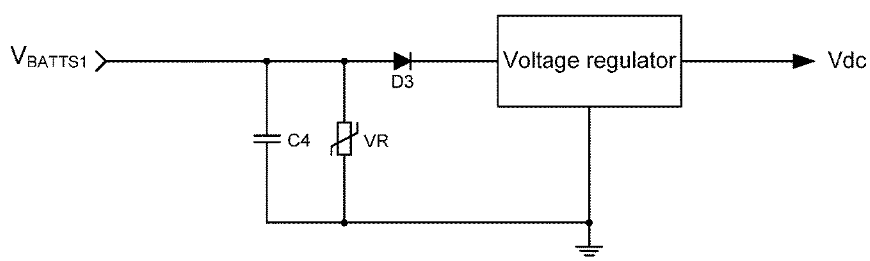
FIG. 31 shows a circuit diagram of the system power supply, according to an exemplary embodiment of the invention.

FIG. 31 shows the simplified circuit diagram of the power supply 30A of the system. The capacitor C4 and the metal oxide varistor VR provide protection to the transient voltage circuits that can be produced by the vehicle's electrical system, while the diode D3 provides protection against reverse voltages.

Control of the Headlamps for the Generation of Continuous/Intermittent Light.

When the anti-dazzling system is deactivated, the control of the headlights of a vehicle is carried out in the conventional manner, i.e. manually. When the system is activated the control of the front lights of a vehicle for the emission of continuous/intermittent light is made from the following signals generated by the system:

"Emitting pulse of light"

"Activate continuous light"

"Force high beam use"

"Force low beam use"

The "Emitting light pulse" and "Continuous light" signals cannot be active at the same time and their functions are indicated by their respective names. The signals "forcing use of high beam" and "force low beam use" will not be active at the same time since, as their names indicate, they force the use of high and low beam respectively independently of the position of the switching switch manual lights.

Here are two alternatives to implement the device that controls the front lights of a vehicle for the generation of continuous/intermittent light, which can be used in any of the anti-dazzling systems. These alternatives are related to the techniques used to generate intermittent pulses of light, mentioned in the formulation of the anti-dazzling method.

Alternative 1:

Alternative 1 is related to the techniques used to generate pulses of intermittent light referred to in points 2 and 3 of the formulation of the anti-dazzling method, i.e. obstructing in total or partial form the continuous light beam of conventional lamps used in vehicles, to the rhythm of the intermittency that is wanted to achieve. This can be done by optoelectronic or electromechanical means.

Using pixel headlights based on the DMD technology (digital micromirrors device) that allow directing the light through micro-mirrors. These micro-mirrors can be driven electronically to the rhythm of the intermittency that is desired to divert the continuous light out of the area of the road that the vehicle must illuminate intermittently.

Figure 32:
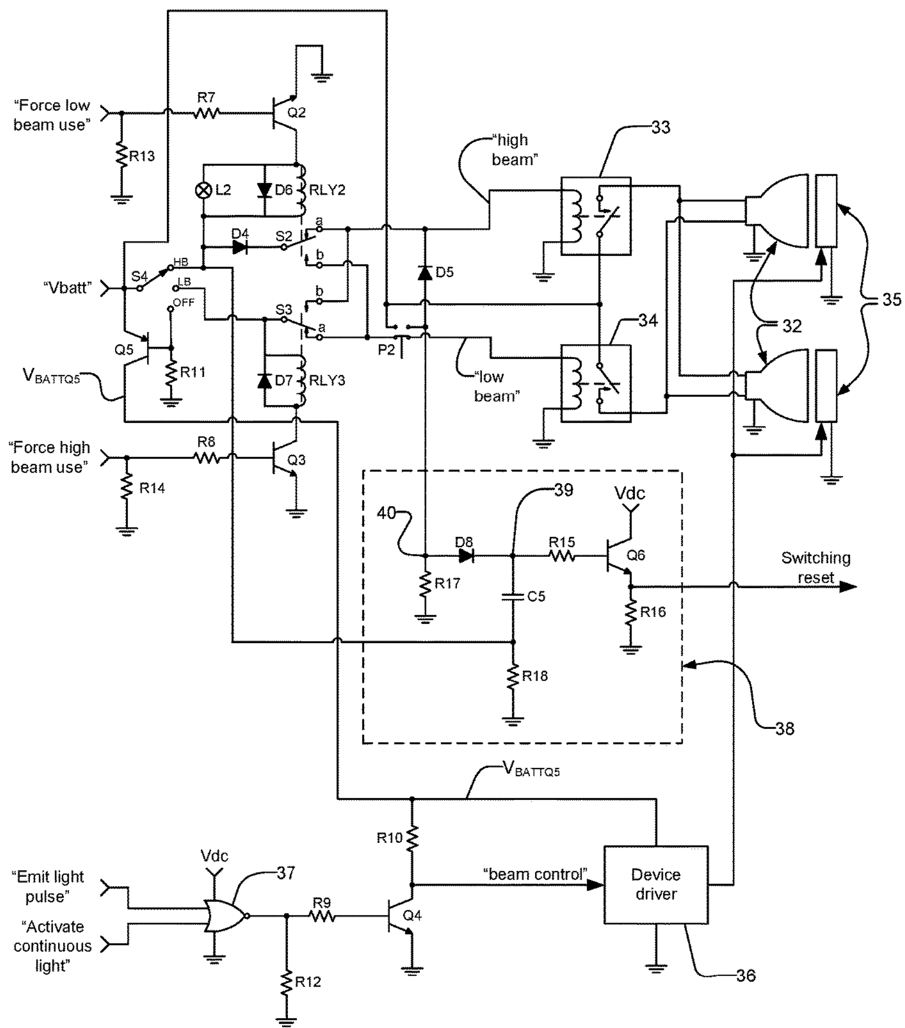
FIG. 32 shows the schematic diagram of a device for generating the continuous/intermittent control signal to the headlights of a vehicle, said light being generated according to alternative 1, according to an exemplary embodiment of the invention.

FIG. 32 shows the schematic diagram of a device for controlling the headlights of a vehicle for the generation of continuous/intermittent light, the flashing light being generated according to said alternative 1. The lamps 32 produce a beam of continuous light and are turned on by relays 33 or 34 whose coils are energized by the "high beam" or "low beam" signals respectively. When the "high beam" signal is activated, the lamps that generate high beam are energized through the relay 33. When the "low beam" signal is activated, the lamps that generate low beam are energized through the relay 34. If the switches S2 and S3 corresponding to the relays RLY2 and RLY3 remain in their normal closed positions "a", and the pushbutt$_{on}$ P2 used in the vehicles to temporarily activate the high beam is not activated, the status of the "high beam" and "low beam" will be determined by the position of the manual switch S4. Thus, when the switch S4 is in the HB position, the line that provides the "high beam" signal will be connected, through the diode D4, to the voltage Vbatt that feeds the input of said switch. Similarly, when switch S4 is in the LB position the line that provides the "low beam" signal will be connected to the voltage Vbatt.

When the "low beam use" signal is activated—which can only happen if the system is activated—a high signal is present at the base of the transistor Q2 through the resistor R7 which leads the said transistor to the conduction. Thus, energizing the relay RLY2, as long as the switch S4 is in the HB position. In this way switch S2 leaves its normal closed position "a" and switches to position "b". This allows the "low beam" signal to be activated when the manual switch S4 is in the HB (high beam) position. Thereby preventing the use of high beam until such signal "force low beam" is deactivated (low level), unless the pushbutt$_{on}$ P2 is operated by temporarily forcing the use of high beam. When the pushbutt$_{on}$ P2 is actuated, regardless of the position of the switches S4 and S2, the "low beam" signal is turned off and the line providing the "high beam" signal is connected to the voltage Vbatt through the diode D5. Said pushbutt$_{on}$ is the one that allows the driver of a vehicle to realize a change of light forcing temporarily the use of high beam. In this case, the high beam will be continuous or intermittent according to the type of light being used by the vehicle at that time.

The L2 light turns on when the transistor Q2 is driving, indicating to the driver that the system is forcing the use of low beam. When the "high beam usage" signal is activated—which can only happen if the system is activated—a high signal is present at the base of the transistor Q3 through the resistor R8, which leads to said transistor to the conduction thus energizing the relay RLY3—if the switch S4 is in the position LB—. In this way switch S3 leaves its normal closed position "a" and switches to position "b". This allows the "high beam" signal to be activated when the manual switch S4 is in the LB (low beam) position, thus forcing the use of high beam.

The continuous light beam produced by the lamps 32 may be clogged or deflected by electromechanical, optoelectronic or similar devices 35 which we shall call "beam shaper devices". These devices are managed by the signal "beam control" through a driver 36. While said "beam control" signal is maintained at a high level, the emission forming devices will not affect the continuous beam of light produced by the lamps 32. The "enable light" and "emit light pulse" input signals enter the NOR gate 37. The output of said NOR gate 37 enters via resistor R9 to the base of transistor Q4 having the emitter connected to ground and the manifold connected to a terminal of resistor R10 whose other terminal is connected to voltage VBATTQ5.

The "beam control" signal is obtained from the collector of said transistor Q4. When One of the signals "activate continuous light" or "emit light pulse" is at high level (for these signals the high level will be given by the voltage Vdc) the output of the NOR 37 gate will be placed in low level making the transistor Q4 does not drive so the beam control signal will be set to high level (for this signal the high level is equal to VBATTQ5). Thus, when the signal "activate continuous light" is at a high value, i.e. when the vehicle must emit continuous light, the "beam control" signal will remain at high level whereby the light beam produced by the lamps 32 will not be obstructed. When the signal "emitting light pulse" is in high value, i.e. when the vehicle must emit a flashing light pulse, the signal "beam control" will be kept high during the time $T_{on}$ corresponding to that pulse of light. When both inputs of the NOR gate 37 are in value under the output of this gate will be set high so that transistor Q4 will go to saturation (for this the resistors R9 and R10 must have the appropriate values, i.e. they must comply with the expression R9/R10<ß·(Vdc−0.7)/VBATTQ5).

Thus, the beam control signal will be set low. This last one corresponds to the moments in which the vehicle does not emit light. The voltage VBATTQ5 is used to power those devices that do not need to be energized when the vehicle is not using its lights (manual switch of the lights in the OFF position). The voltage VBATTQ5 is obtained in the collector of the Darlington PNP Q5 transistor whose emitter is connected to the voltage Vbatt and its base is connected to the OFF position of switch S4 and to one of the terminals of resistor R11 whose other terminal is connected to earth. When switch S4 is not in the OFF position the transistor Q5 will be saturated making VBATTQ5≈Vbatt. On the other hand, with the switch S4 in the OFF position, the transistor Q5 does not drive thus de-energizing the devices that are powered by VBATTQ5. When the system is deactivated the NOR gate 37 will be de-energized because it is powered by the voltage Vdc. When this occurs the base of the transistor Q4 will be maintained at zero volts through the resistors R9 and R12, whereby said transistor will not conduct while the beam control signal remains high.

Thus, with the system deactivated, the vehicle can only emit conventional continuous light. With the system deactivated the relays RLY2 and RLY3 cannot be energized because the signals "force low beam use" and "force high beam" cannot be activated (being kept low by resistors R13 and R14 respectively) and Therefore the switches S2 and S3 remain in their normal closed positions "a". Thus, when the system is deactivated, the front lights of the vehicle can only be operated in the conventional way—for high and low beam emission—by means of the manual switch S4. The function of the diodes D6 and D7 is to protect the transistors Q2 and Q3 respectively from the surges generated by the coils of the corresponding relays RLY2 and RLY3, when said transistors Q2 and Q3 go to the cut.

The circuit 38 generates the signal "switching reset" whose function will be described later. This signal will be set to high level (Vdc) when transistor Q6 is saturated. The resistors R15 and R16 of said circuit 38 are calculated in such a way that said transistor Q6 saturates when at point 39 a voltage near Vbatt is present. The latter will happen both at the time when the manual toggle switch S4 is switched to the HB position and when the $pushbutt_{on}$ P2 is actuated. When S4 is switched to the HB position the "switching reset" signal will take the form of a pulse whose duration will be determined by the value of the capacitor C5 and the value of the resistors R15 and R16 through which said capacitor is charged Capacitor will be discharged through the resistors R17 and R18 when the manual switch S4 leaves the HB position). Diode D8 fulfills the function of differentiating the charging and discharging circuits of said capacitor C5. On the other hand, when the $pushbutt_{on}$ P2 is activated the signal "switching reset" will take high value until the $pushbutt_{on}$ is released. The diode D5 is to ensure that the voltage Vbatt appears at point 40 only when the $pushbutt_{on}$ P2 is actuated. Similarly, the diode D4 ensures that the voltage Vbatt can only be displayed at the terminal HB of the manual switch of the lights S4 when the switch S4 is in the HB position.

Alternative 2:

Alternative 2 is related to the techniques used to generate the pulses of intermittent light referred to in point 1 of the formulation of the anti-dazzling method, i.e. using LED headlamps, or gas discharge lamps or the like, operated by means of a control circuit that sets the width and frequency of the light pulses.

Figure 33:
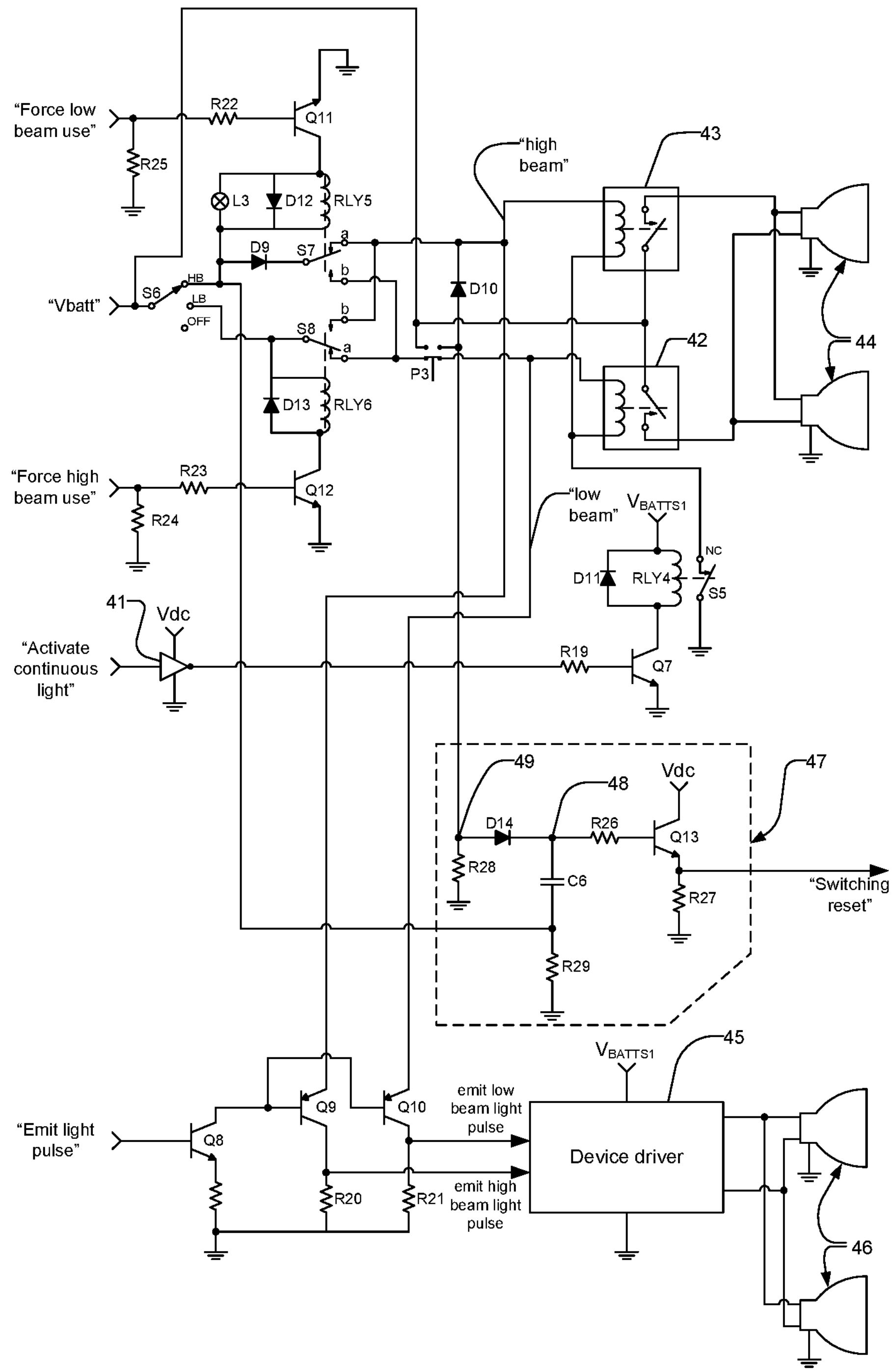
FIG. 33 shows the schematic diagram of a device for generating the continuous/intermittent control signal to the headlights of a vehicle, said light being generated according to alternative 2, according to an exemplary embodiment of the invention.

FIG. 33 shows the schematic diagram of a device for controlling the front lights of a vehicle for the generation of continuous/intermittent light, the flashing light being generated according to this alternative 2. When the signal "activates light Continuous" input to inverter 41 is at high level, transistor Q7 does not conduct, since its base is connected through resistor R19 to the output of said inverter 41, therefore the coil of relay RLY4 will be de-energized and thus the switch S5 of said relay will be maintained in the normal closed position NC and the coils of relays 42 and 43, by which the lamps of the conventional headlamps 44 are turned on, will have one of their ends connected to ground, a condition necessary for these coils can be energized by the signals "high beam" or "low beam" as appropriate. When the "high beam" signal is activated, the lamps that generate high continuous light are energized through the relay 43. When the "low beam" signal is activated, the lamps that generate low continuous light are energized through the relay 42. When the vehicle is going to emit a flashing signal the "enable continuous light" signal will be deactivated (low level), therefore the output of the inverter 41 will be set to high level which causes the transistor Q7 to drive energizing the relay coil RLY4. This causes the switch S5 to leave its normal closed position NC which prevents the coils of the relays 42 and 43 from being energized, preventing the lamps of the conventional headlights 44 from emitting continuous light.

When the "emitting light pulse" signal, which enters the base of transistor Q8, is placed at high level, said transistor Q8, whose manifold is connected to the bases of the PNP transistors Q9 and Q10, goes into the conduction state with So that said transistors Q9 and Q10 also pass to the conduction state. The collectors of the transistors Q9 and Q10 are connected to earth through the resistors R20 and R21 respectively and their emitters are fed by the signals "high beam" and "low beam" respectively. When the signal "high beam" is at high level (Vbatt) and the signal "emit light pulse" goes high (Vdc), transistor Q9 goes to the state of saturation whereby the signal "emits high beam pulse" From the collector of said transistor Q9 will be set to high level (≈Vbatt).

Similarly, when the "low beam" signal is at high level (Vbatt) and the signal "emit light pulse" goes high (Vdc), transistor Q10 goes into the saturation state whereby the signal "emit Low beam pulse" from the collector of said transistor Q10 will be set to high level (≈Vbatt). The "high beam emitting" and "low beam emitting" signals enter the driver 45 whose outputs energize the lamps that are used to generate the flashing light pulses 46. While the S7 and S8 switches corresponding to the RLY5 and RLY6 remain in their normal closed positions "a" and the $pushbutt_{on}$ P3, used in vehicles to temporarily activate high beam, is not actuated, the state of the "high beam" and "low beam" signals will be determined by the position of the switch manual switching S6. In this case, the line providing the "high beam" signal will be connected via the diode D9 to the voltage Vbatt only when switch S6 is in the HB position since the input of said switch is connected to the voltage Vbatt. Similarly, the line providing the "low beam" signal will be connected to the voltage Vbatt only when the switch S6 is in the LB position since the input of the switch is connected to the voltage Vbatt.

When the "force low beam use" signal is activated—which can only happen if the system is activated—a high signal is present at the base of the transistor Q11 through the resistor R22 which leads the transistor to the conduction. Thus energizing the relay RLY5, if the switch S6 is in the HB position. Thus the switch S7 switches to position "b". This allows the "low beam" signal to be activated when the S6 switch is in the HB position as if the switch S6 were in the LB position. This will prevent the use of high beam until the signal "force low beam" is deactivated (low level), unless the pushbutt$_{on}$ P3 is operated by temporarily forcing the use of high beam. When the pushbutt$_{on}$ P3 is activated, regardless of the position of the switches S6 and S7, the "low beam" signal is deactivated and the line from which the "high beam" signal is obtained is connected to the voltage Vbatt through the diode D10.

Said pushbutt$_{on}$ P3 is the one that allows the driver of a vehicle to realize a change of light by temporarily forcing the use of high beam. In this case, the high beam will be continuous or intermittent according to the type of light being used by the vehicle at that time. The L3 light turns on when the transistor Q11 is driving, indicating to the driver that, although the manual switching switch S6 is in the HB position, the system is forcing the use of low beam. When the "high beam use" signal is activated—which can only happen if the system is activated—a high signal is present at the base of the transistor Q12 through the resistor R23 which brings the said transistor Q12 to the Conduction thus energizing the relay RLY6, if the switch S6 is in the LB position. Thus switch S8 switches to position "b". This means that if the manual switch S6 is in the LB position, the "high beam" signal is activated—as if the switch S6 were in the HB position—thus forcing the use of high beam.

The driver 45 is supplied with voltage Vbatt via switch S1 in its ON position (see VBATTS1 in FIG. 29. In this way when the system is deactivated said driver 45 will be de-energized preventing the lamps 46 from flashing. Similarly, with the system deactivated, the relay coil RLY4 is de-energized, the switch S5 remaining in the NC position, whereby the coils of relays 42 and 43 are left with one of their ends connected to ground allowing the coils of said relays can be energized by "high beam" or "low beam" signals to produce continuous high beam or low continuous beam light respectively. In addition, with the system deactivated, the coils of relays RLY5 and RLY6 cannot be energized because the signals "forcing use of high beam" and "forcing use of low beam" cannot be activated (being kept low by resistors R24 and R25 Respectively) so that switches S7 and S8 remain in their normal closed positions "a".

Thus, when the system is deactivated, the front lights of the vehicle can only be operated in the conventional way, for the emission of high and low beam, by means of the manual switch S6. The function of the diodes D11, D12 and D13 is to protect the transistors Q7, Q11 and Q12 respectively from the over-voltages generated by the coils of the relays RLY4, RLY5 and RLY6 respectively when said transistors go to the cut. Circuit 47 generates the "switching reset" signal, which will be set to high level (Vdc) when transistor Q13 is saturated. The resistors R26 and R27 of said circuit are calculated in such a way that said transistor Q13 saturates when a voltage near Vbatt is present at the point 48. The latter will happen both at the time when the manual toggle switch S6 is switched to the HB position and when the pushbutt$_{on}$ P3 is actuated. In the first case, the "switching reset" signal will have the form of a pulse whose duration will be determined by the value of capacitor C6 and resistors R26 and R27 through which said capacitor is charged (said capacitor will be discharged through Resistors R28 and R29 when the manual switch S6 leaves position HB). Diode D14 fulfills the function of differentiating the charging and discharging circuits of said capacitor C6.

On the other hand, when the pushbutt$_{on}$ P3 is activated the signal "switching reset" will take high value until the pushbutt$_{on}$ is released. The diode D10 is to ensure that the voltage Vbatt appears at point 49 only when the pushbutt$_{on}$ P3 is actuated. Similarly, the diode D9 ensures that only the voltage Vbatt can be displayed at the terminal HB of the manual switch of the lights S6 when the switch S6 is in the HB position. It should be mentioned that if the headlight lamps 44 and 46 are of the LED type, said headlamps 44 and 46 could be the same.

Externally Synchronized Anti-Dazzling System

Figure 34:
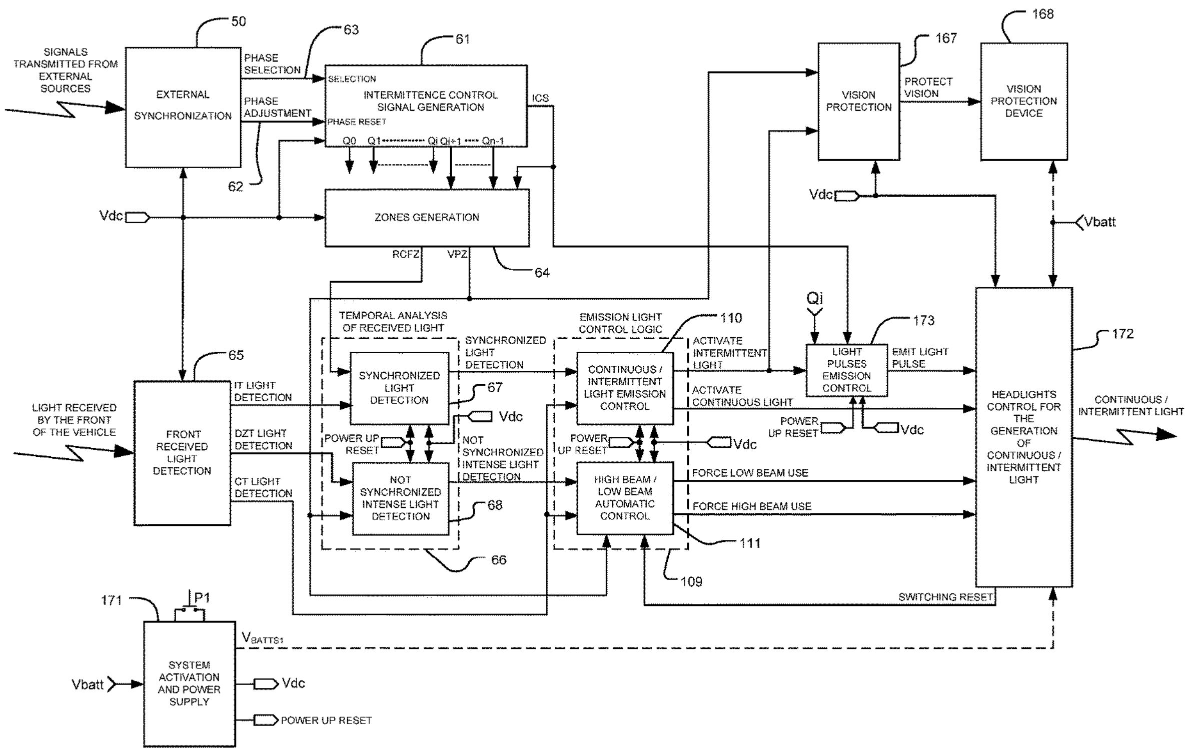
FIG. 34 shows the block diagram of the externally synchronized anti-dazzling system, according to an exemplary embodiment of the invention.
Figure 35:
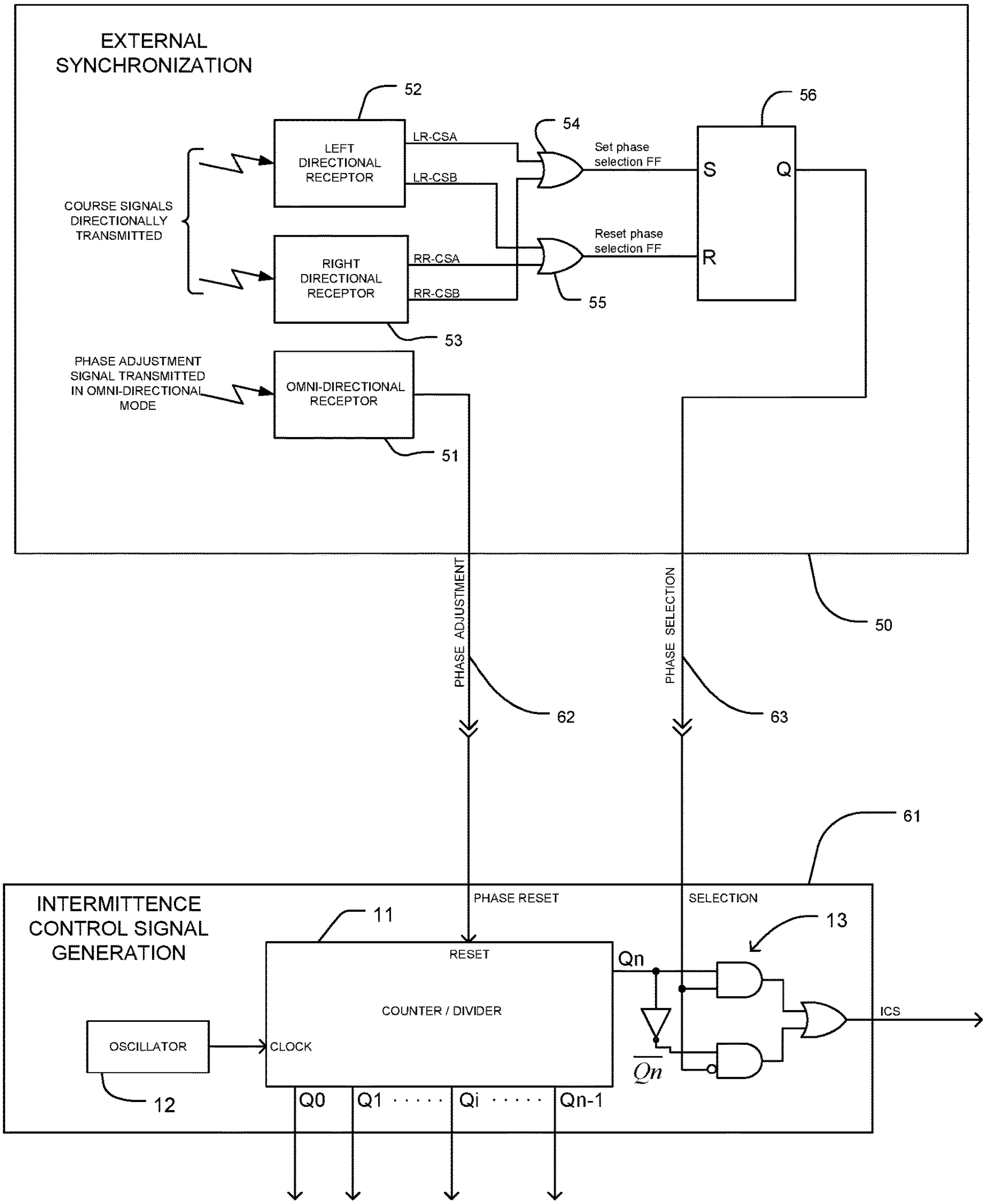
FIG. 35 shows a schematic for the External Synchronization block of FIG. 34 according to "alternative A" described in the external synchronization procedure, according to an exemplary embodiment of the invention.

FIG. 34 shows the block diagram of the externally synchronized anti-dazzling system. This system is based on the anti-dazzling method already described and makes use of the external synchronization procedure. The function of the "External Synchronization" block 50 of FIG. 34 is to obtain, from the reception of signals transmitted by external transmission sources to the vehicles, the required "phase adjustment" and "phase selection" signals by the external synchronization procedure. The contents of block 50 are presented in two versions, corresponding to the alternatives A and B raised in said external synchronization procedure for obtaining the phase adjusting and phase selection signals. FIG. 35 shows a simplified diagram of the contents of block 50 of FIG. 34 made according to the "alternative A" described in the external synchronization procedure. To facilitate the description of the operation of this block 50, it has been included in FIG. 35 the contents of the block "Generation of the intermittence control signal" 61 of FIG. 34, the operation of which has already been explained above (See FIG. 20). When describing the characteristics common to all systems (see item "intermittent control signal"). The "phase adjustment" output of the "external synchronization" block 50 enters via line 62 to the "phase reset" input of the "flashing signal generation" block 61 to adjust the two alternative phases given by Qn Y. On the other hand, the "phase select" output of the "external synchronization" block 50 enters via the line 63 to the "select" input of the block 61, selecting as ICS the output Qn when the "phase selection" remains at high level and at the output when the "phase selection" signal remains at low level.

The vehicles receive by air, via an Omni-directional receiver 51, a carrier modulated by the phase adjustment signal. This signal, once demodulated, constitutes one of the outputs of said block 50. The vehicles also receive by air through one of the directional receivers 52 or 53 a carrier modulated by one of two different signals that we have called "heading signal A" and "heading signal B". As already mentioned, directional transmission sources that transmit the same heading signal should all be located on the same side of the road. Therefore, directional transmission sources that are located on opposite sides of the road must transmit different heading signals. These course signals will be used by the system to determine the direction of travel of the vehicle relative to the road and thus be able to select one of the two alternative phases (given by Qn or) as the phase of the ICS. When a vehicle is traversing the coverage area of one of said directional transmission sources only one of the receivers 52 or 53 will be receiving a heading signal. The receiver 52 will receive the heading signal if it is from the left with respect to the direction of movement of the vehicle, whereas the receiver 53 will receive the heading signal if it is from the right with respect to the direction of movement of the vehicle.

If a vehicle is traversing the coverage area of a directional transmission source which transmits the heading signal A and said heading signal is being detected by the receiver 52, then the "SRAI" output of said receiver—To the OR gate 54—will be set to high value (like the output of said OR gate 54) thus indicating that the vehicle has a direction of travel in the road which we will call, for example, "direction of travel 1". On the other hand, if the receiver 53 is receiving the heading signal A, the output "SRAD" of said receiver—which enters the OR 55 gate—is that which is set to high value, which means that the vehicle Is traversing the area of coverage of said directional transmission source in the direction of circulation opposite to the previous one which we will call "direction of circulation 2".

A similar analysis can be performed when the directional transmission source is located on the other side of the road, i.e. when said source transmits the bearing signal B. Thus, if the receiver 53 is receiving the bearing signal B, the "SRBD" output of said receiver—which enters the OR gate 54—is set to high. This means that the vehicle is passing through the coverage area of the corresponding directional transmission source in the direction of circulation which we have called "direction of travel 1". On the other hand, if the receiver 52 is receiving the heading signal B, the "SRBI" output of said receiver which enters the OR 55—gate is that which is set to high value, which means that the vehicle Has the "direction of circulation 2".

As the outputs of the OR 54 and OR 55 gates enter the set and reset inputs respectively of the Flip-Flop RS 56, the output of the Flip-Flop outputs the "phase selection" signal as a function of the traffic direction of the vehicle. In this way, once a value has been set for the "phase selection" output, this value will not change unless the vehicle changes its direction of travel with respect to the road and then traverses the coverage area of a source directional transmission.

Figure 36:
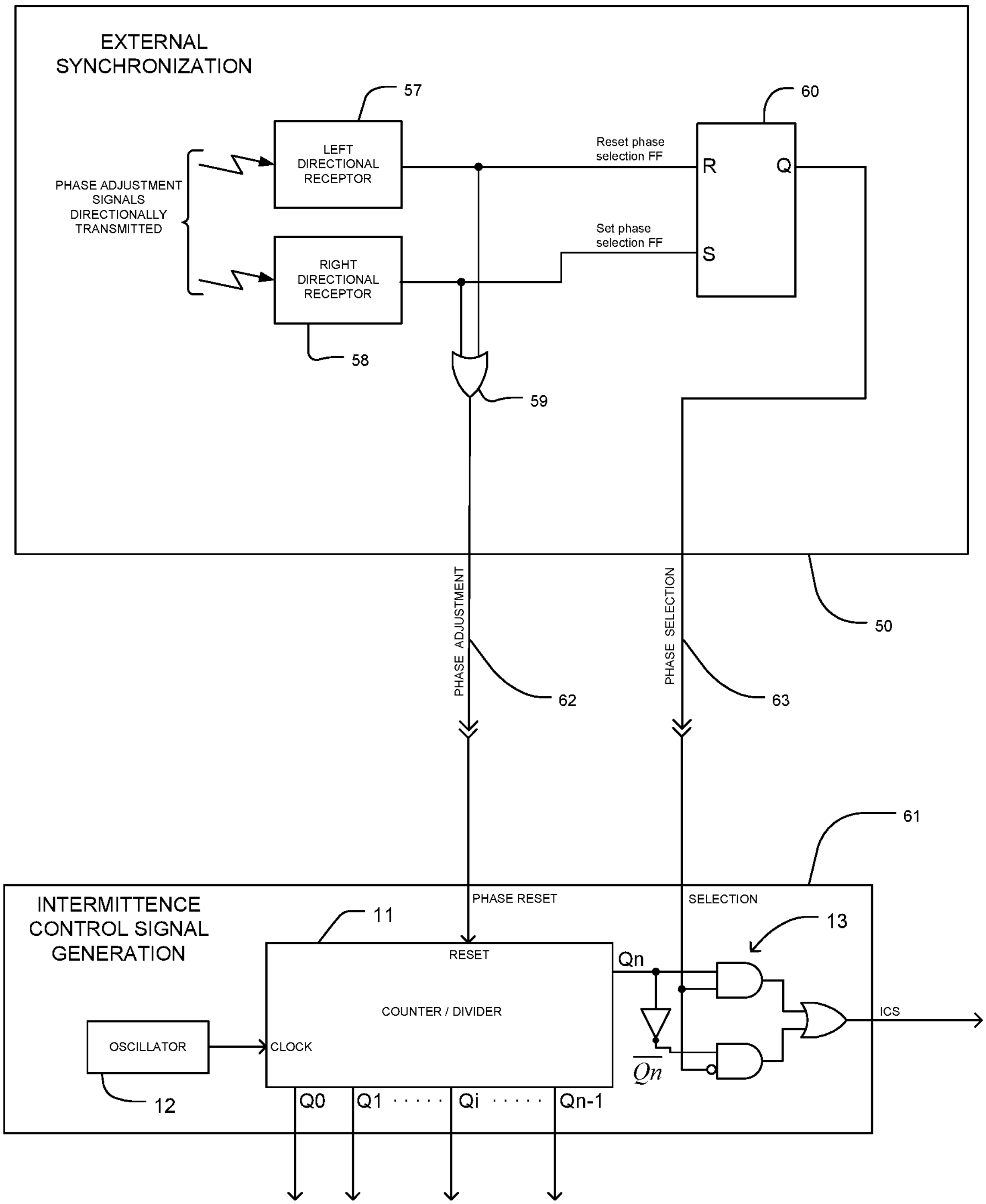
FIG. 36 shows a diagram of the contents of the External Synchronization block of FIG. 34 according to "alternative B" described in the external synchronization procedure, according to an exemplary embodiment of the invention.

FIG. 36 shows a simplified diagram of the contents of block 50 of FIG. 34 made according to "Alternative B" described in the external synchronization procedure. To facilitate the description of this version of block 50, the contents of the block "generation of the intermittence control signal" 61 of FIG. 34 are also included in FIG. 36. The vehicles are received by air via one of the directional receivers 57 or 58 a carrier modulated by one of two phase adjustment signals. As already mentioned, directional transmission sources that transmit the same phase adjustment signal must all be located on the same side of the road. To install directional transmission sources on both sides of the road these sources must transmit phase adjustment signals having a period which is an odd multiple of the period of the EPIL and in addition, directional transmission sources which are located on opposite sides of the path shall transmit phase adjustment signals having a phase shift of 180°. When a vehicle is traversing the coverage area of one of said directional transmission sources, only one of the receivers 57 or 58 will be receiving the corresponding phase adjust signal.

The receiver 57 will receive the directional signal of phase adjustment that comes from the left with respect to the direction of circulation of the vehicle. While the receiver 58 will receive the directional phase adjustment signal from the right with respect to the direction of movement of the vehicle. The output of each of said receivers 57 and 58 is input to OR gate 59 at which output the phase adjustment signal is obtained, while the phase selection signal is obtained at output Q of the Flip-Flop RS 60 to whose reset and set inputs input the outputs of receivers 57 and 58 respectively.

To explain the behavior of the "phase adjustment" and "phase selection" outputs, in one embodiment of block 50, the following example is used: a vehicle is taken as reference and all sources of Directional transmission have been located on the left side of the road with respect to the direction of movement maintained by said vehicle. So that the phase selection signal of said vehicle will remain at a low value since each time the vehicle crosses the coverage area of a directional transmission source, the Flip-Flop 60 will receive the pulses of the phase adjustment signal at your reset input. If, on the other hand, it is assumed that all sources of directional transmission have been located on the right-hand side of the road, with respect to the direction of movement maintained by said vehicle, in said vehicle the phase selection signal will be maintained at high value since each once the vehicle passes through the coverage area of a transmission source, the Flip-Flop 60 will receive the pulses of the phase adjustment signal at its set input. Although in the two cases described the phase selection signal takes a different value, it must also be considered that in both situations the phase adjustment signal received by the vehicle will be different (remember that the phase adjust signal transmitted from opposite sides of the road will have a phase shift of 180° from one another).

In this case, the vehicle will adopt the same phase for the intermittent pulses, which in one case will be obtained from the output Qn (when the "phase selection" signal is high) and Another case of the output (when the signal "phase selection" is in low value). The fact that the phase adjustment signals corresponding to the two cases described have a phase shift of 180° between each other is what allows that vehicle to obtain over Qn in one case and on the other case, a same phase for the Intermittent pulses of light. The latter can be checked by analyzing the effect of the "phase adjustment" and "phase selection" outputs on the intermittent control signal generation circuit whose function has already been explained, in correspondence with FIG. 20, when describing the characteristics common to all systems. The operation of this block 50 for the case where the directional transmission sources are distributed on both sides of the path is apparent from the above.

The "Zone Generation" block 64 of FIG. 34 has as outputs the "CFZR" signal and the VPZ signal. This last VPZ signal has already been defined under the heading "Defining zones within the Period T of the ICS" when describing the characteristics common to all systems. Another signal that has already been defined is CFZ which, based on the beginning and extension of a pulse of light received by the vehicle, determines whether said light pulse can be considered synchronized or not. In contrast the CFZR signal, which identifies an area to be called a "restricted free zone", is designed to determine whether said light pulse can be considered synchronized or not, considering only the starting flank of said light pulse. Therefore, the CFZR is narrower than the CFZ.

Both signals are activated at the same time but the width of the CFZR is the width of the CFZ minus the width set for the flashing light pulses. This block 64 enters the ICS signal and, by choosing as the time base for the generation of said zone signals to an output Qi of the counter/divider 11 contained in the block "Generation of the flashing control signal" 61, also enters to this block 64 the outputs Qn−1, Qn−2, . . . , Qi+2, Qi+1 of said counter/divider 11. The CFZR and VPZ outputs are generated as described under the heading "Generating Zone Signals" and each One of said zone signals can be implemented using a circuit as shown in FIG. 27, which must be preset to generate the CFZR signal with the following start and end times:

Start time=$2^{n-i}$−Δ

End time=Δ where:2n−i:

where $2^{n-i}$ is the duration of the period T of the ICS measured at periods of an output Qi of the counter/divider 11 (FIG. 20), and the period of said output Qi being the time base chosen to define said start and end times.

Δ is the margin of tolerance described in defining the conflict-free zone, under the heading "Definition of zones within the period T of the ICS", measured in periods of said output Qi of the counter/divisor 11 (see Δt in FIG. 23).

The circuit corresponding to the "vision protection zone" VPZ must be preset with the following start and end times:

Start time=$2^{n-i}$−Δ−δ

End time=PW+Δ+δ where δ: is a term that allows to extend the vision protection zone beyond the conflict-free zone and on both sides thereof by a value given by δ, measured at periods of said output Qi of the counter/divider 11. When implemented the system could chose for δ=0 in which case the vision protection zone would coincide with the conflict-free zone.

PW: is the width set for pulses of flashing light measured in periods of said output Qi of the counter/divider 11.

Figure 37:
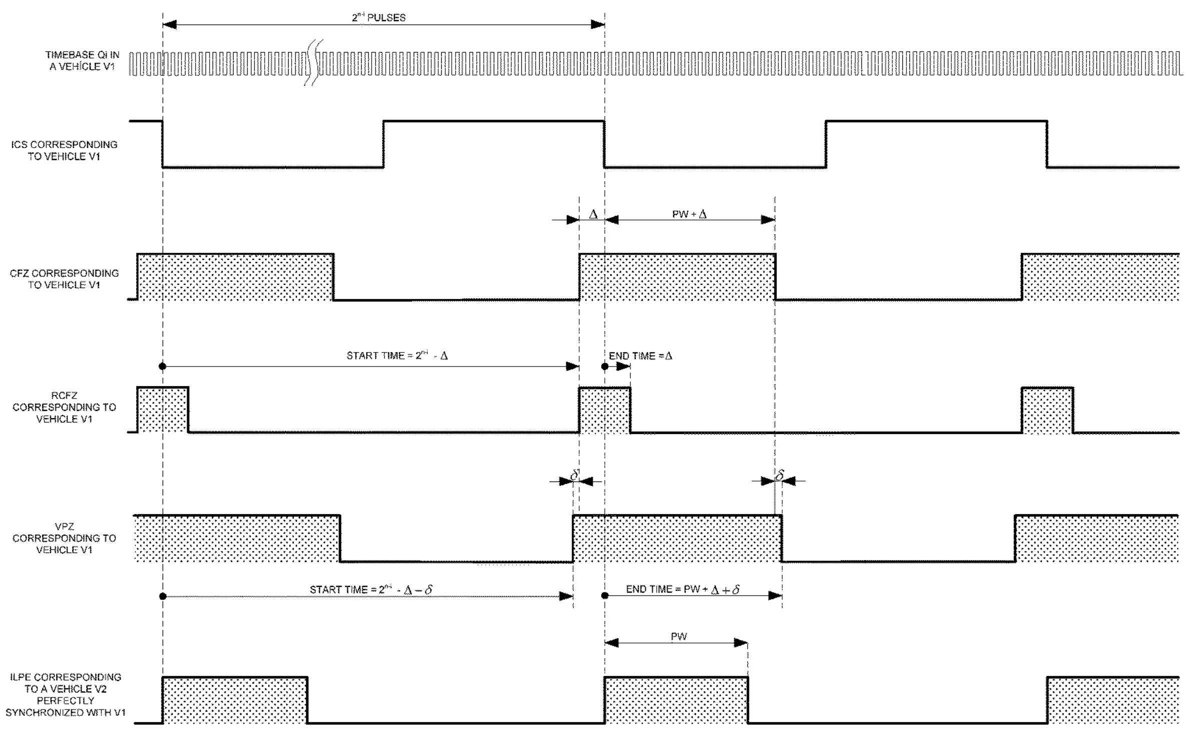
FIG. 37 shows the timing of the Conflict Free Zone (CFZ), Restricted-Conflict Free Zone (RCFZ) and VPZ signals corresponding to a V1 in relation to its ICS and the time base $Q_i$, in addition, figure also shows the EPIL waveform corresponding to V2 perfectly synchronized with said V1 and running in the opposite direction thereto, according to an exemplary embodiment of the invention.

FIG. 37 shows a timing of the CFZ, CFZR and VPZ signals corresponding to a vehicle V1 in relation to its ICS and the time base Qi. In this figure, the times corresponding to the terms that appear in the expressions of each zone (2n−i. PW. Δ. δ) have been indicated. To facilitate the understanding of this timing the wave form of the intermittent light pulse emission corresponding to a vehicle V2 perfectly synchronized with V1 and which circulates in the opposite direction thereof has been included.

The inputs, outputs and contents of the block "Light detection received by the front" 65 of FIG. 34 are shown in FIG. 15 and their operation, which has already been explained under the heading "Formation of an NVE", is summarized below. In FIG. 15 the output of the light sensing module 1 enters a comparator 4 whose reference voltage (Vuc) corresponds to the "continuous light threshold" and its output, which we will call "CT light detection", is activated when the Light received by the light sensor 2 exceeds said continuous light threshold. The output of the light sensing module 1 also enters, through the filter 7, capable of removing the DC component of said output, to another comparator 5 whose reference voltage (Vui) corresponds to the "flashing light threshold" and its output, which we will call "UI light detection", is activated when the flashing light received by the light sensor 2 exceeds said flashing light threshold. The output of the light sensing module 1 also enters a comparator 6 whose reference voltage (Vue) corresponds to a threshold of light intensity which we will call a "dazzle threshold" (DZT) which will be greater than the "continuous light threshold".

The output of said comparator 6, which we call "DZT light detection", is activated when the light received by said light sensor 2 exceeds said dazzle threshold. When this occurs, the system will analyze the temporal behavior of said light detection output UE to determine whether the vehicle driver is receiving light outside the $T_p$ vision protection range.

The block "Temporal analysis of the received light" 66 is composed in turn of the blocks "Synchronized light detection" 67 and "Not-Synchronized Intense light intensity detection" 68. The first one has as inputs the "IT Light Detection" from block 65, signal CFZR from block 64 and the "power up reset" signal from block 171 as output the signal "synchronized light detection". The "Not Synchronized Light Detection" block 68 has the following inputs: "UE light detection" from block 65, "VPZ" from block 64 and the "power up reset" signal. And outputs the "non-synchronized intense light detection" signal.

The function of the "Synchronized light detection" block 67 is to determine when a vehicle is receiving flashing light within the conflict-free zone from another vehicle or vehicles. This is done by the temporary analysis of the signal "detection of light UI" in relation to the signal "RCFZ". The algorithm for determining whether the vehicle is receiving flashing light within the conflict-free zone is based on verifying, during a time interval we will call "t2", whether the signal "light detection IT" is giving, with some regularity, flanks when the RCFZ signal is active. Said time "t2" will have a duration of several periods T, and will be measured using a counter, which we will call "counter II", which, after reaching the value equivalent to the time "t2", will trigger the detection Synchronized light". It should be noted that if no pulses of light fall within the conflict-free zone with a certain regularity of the flashing light, said "counter II" cannot reach the value equivalent to the time "t2". This is since said counter II will be reset if a time interval passes, which we will call "t1", without the signal "light detection IT" having a positive edge with the signal RCFZ being active. To measure this time "t1" another counter will be used, which we will call "counter I", which, in case of reaching the value equivalent to said time "t1", will cause the "synchronized light detection".

If the system detects pulses of light synchronized with a certain regularity (conditioned by the choice of time "t1") the counter I will be reset before reaching the value equivalent to said "t1" and consequently counter II will evolve freely. If this situation is maintained until said counter II reaches the value equivalent to the time "t2" the output "synchronized light detection" will be activated. It should be noted that "t1" should obviously be less than "t2". Such a time "t1" should be at least equal to the period T, however, assigning a higher value (e.g. 2T) to "t1" would give the system greater tolerance when evaluating an interruption in the reception of pulses of intermittent light. Even the value of "t1" could be increased after the "synchronized light detection" output has been activated, thus increasing the time that said output would take off.

Figure 38:
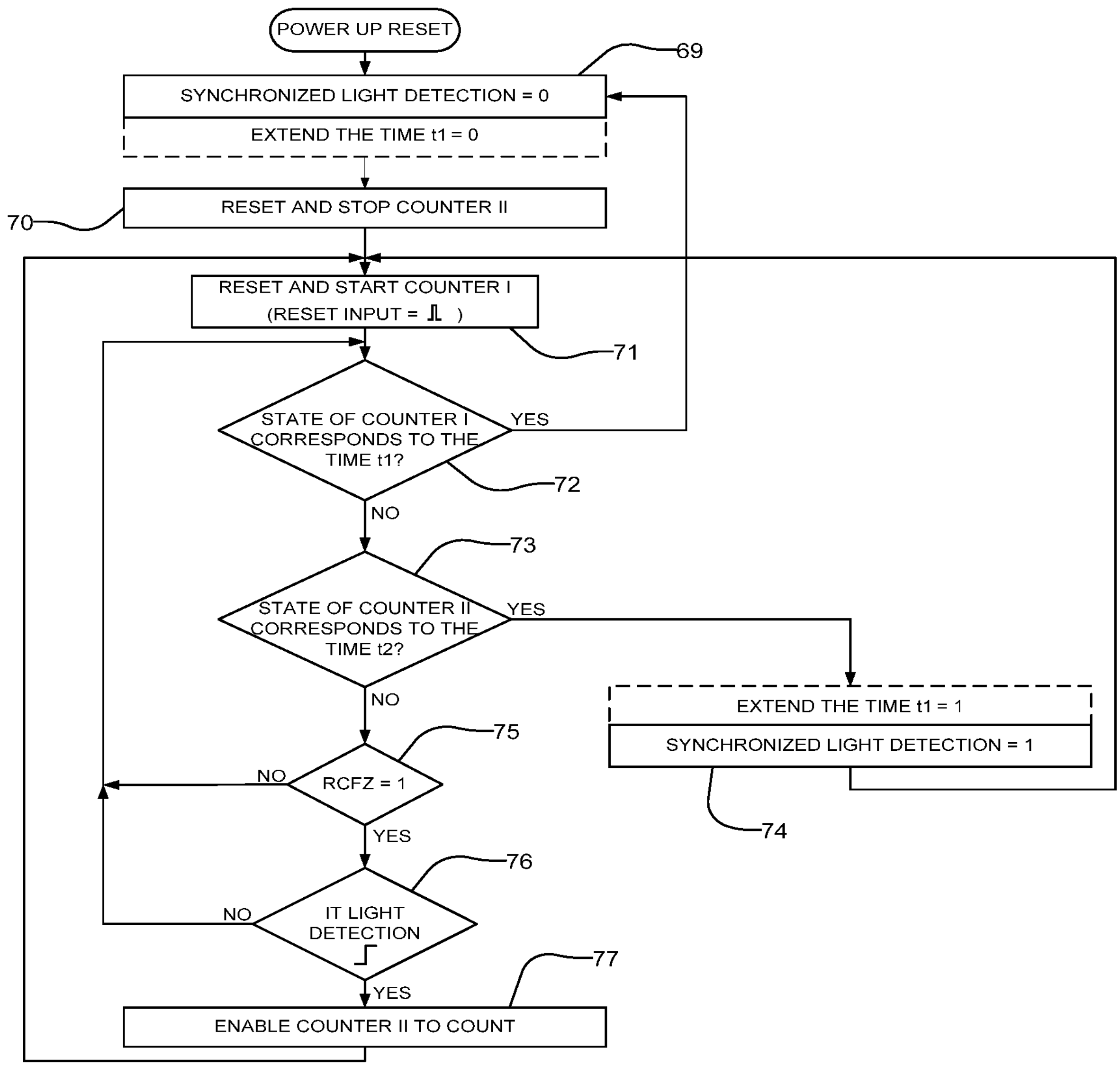
FIG. 38 shows the operation diagram corresponding to the Synchronized Light Detection block of FIG. 34, according to an exemplary embodiment of the invention.

The operating diagram corresponding to block 67 is shown in FIG. 38. The appearance of a power-up reset pulse, because of the system activation, causes the (low level) Output "in step 69, resetting and stopping the counter II in step 70 and resetting and starting the counter I in step 71. The counter II is enabled to start counting after detecting A synchronized light pulse, which corresponds to the sequence given by steps 75, 76 and 77. Then the sequence returns to step 71 returning to zero the counter I. While receiving pulses of synchronized light with a certain regularity (conditioned by the time "t1") the counter I cannot reach the value equivalent to the time "t1" and consequently the counter II will evolve freely (avoiding the sequence given by steps 72, 69, 70).

If this situation is maintained enough time for said counter II to reach the value equivalent to the time "t2" the output "synchronized light detection" will be activated—see steps 73 and 74—and the counter I set to zero in step 71. If no synchronized light pulses are received or are not received under the described conditions, the counter I will reach the value equivalent to the time "t1" whereby the sequence will return to step 69 in which the "Light is off". As t2>t1 has already been said since "t2" is the time during which "light" synchronized pulses of "t1" regularity are "verified". If it is desired to increase the time it takes to deactivate the "synchronized light detection" output, the command "extend time t1=1" should be included in step 74 and in step 69 the command "extend time t1=0".

Figure 39:
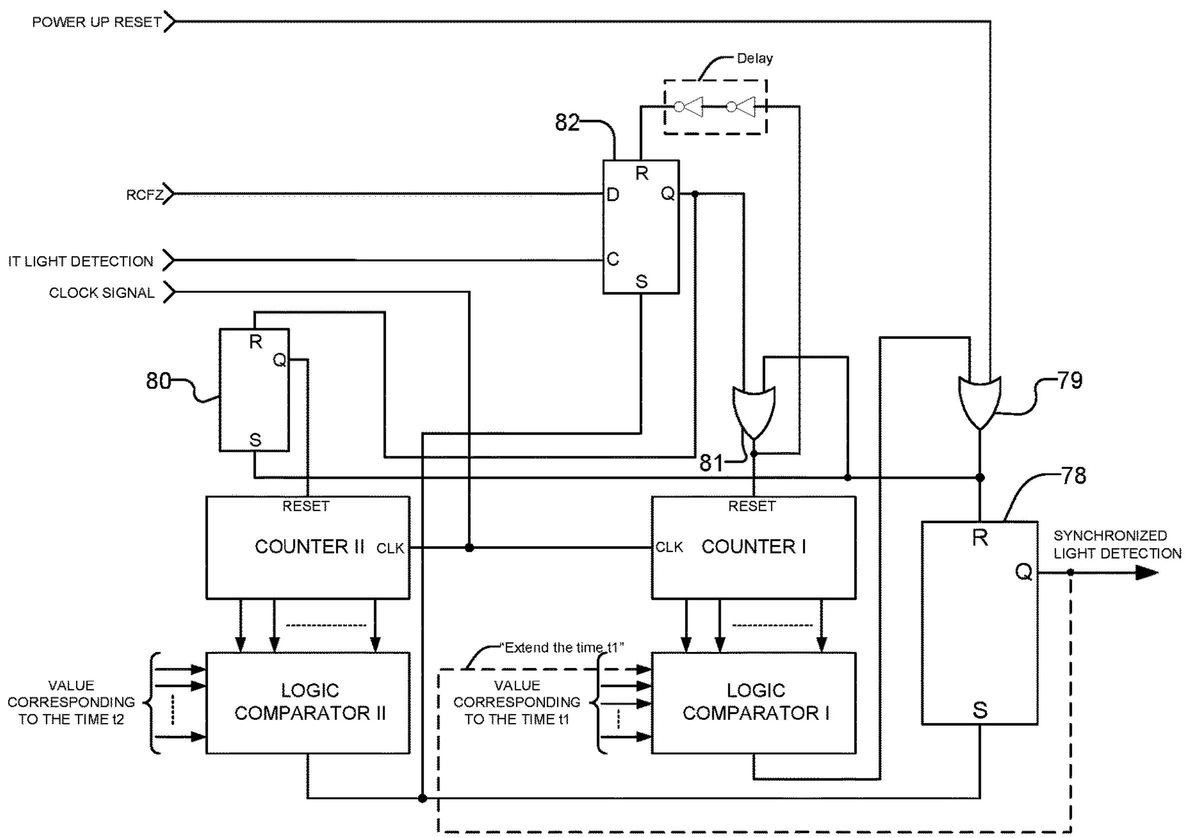
FIG. 39 shows the circuit to implement the Synchronized Light Detection block of FIG. 34, according to an exemplary embodiment of the invention.

FIG. 39 shows the simplified scheme of a possible circuit for implementing block 67 of FIG. 34. The output "synchronized light detection" is obtained as output Q of the Flip-Flop RS 78. The "Power-up reset" input via the OR gate 79 to the reset input of the Flip-Flop 78 and the set input of the Flip-Flop RS 80. This signal "power-up reset" also enters, through the gates OR 79 and OR 81, to the input of "reset" of the counter I. Thus, when a "power-up reset" pulse is given, the circuit initiates the sequence given by the steps 69, 70, 71, . . . of the operation diagram of FIG. 38. To the other gate input OR 79 also inputs the output of logic comparator I which, when set to high value, produces the same effect as the power-up reset signal. The output of said logic comparator I will be set to high value whenever the counter I has reached the value equivalent to the time "t1". The counter II will start counting when the "light detection IT" signal—which feeds the clock input of the Flip-Flop D 82—switches to a high value while the RCFZ signal is also high. This is so since the Flip-Flop 80 output whose Q output controls the "reset" input of said counter II is reset to the value Q of said Flip-Flop 82. This corresponds to the sequence given by steps 75, 76, and 77 of the operation diagram of FIG. 38.

The "synchronized light detection" output is set high when the Flip-Flop 78 receives a pulse at its input "Set", which will occur when the output of logic comparator II is set to high value as a result of counter II having reached the value corresponding to time "t2". The output of the logic comparator II also enters the "set" input of the Flip-Flop 82 whose output Q, through the OR gate 81, causes the resetting of the counter I to zero. In this way, the circuit performs the given sequence by means of the steps 73, 74, 71, . . . of the operation diagram of FIG. 38 (until the output of the logic comparator II switches to a low value, the Flip-Flop D 82 simultaneously has its set and of reset but this does not affect the behavior of the raised logic). The dashed connection between the Q output of the Flip-Flop 78 and the logic comparator I represents the possibility of extending the time "t1" (for example using said output as one of the bits of the value corresponding to the time "t1") to thereby increase the time it takes to deactivate the "synchronized light detection" output. It should be noted that the frequency of the "clock signal" entering the meters is a multiple of the frequency of the ICS. Therefore, one of the outputs of the counter/divider 11 of FIG. 20 (used in the generation of the ICS), can provide said clock signal.

The function of the "Not Synchronized or Non-synchronous intense light detection" block 68 of FIG. 34 is to analyze the temporal behavior of the "UE light detection" signal to determine whether the driver of a vehicle is receiving intense light outside the range of vision protection $T_p$ which will be indicated by the status of the "non-synchronized intense light detection" output of said block 68 (remember that this could only happen between vehicles that for some reason do not have their lights synchronized). Although to determine whether the driver of a vehicle is receiving intense light outside the $T_p$ viewing protection range it would be sufficient to analyze whether the "DZT light detection" signal is activated (high value) while the "VPZ" signal remains at low value, It would be convenient to check this situation for a longer time than a period T, since when the output "detection of intense non-synchronized light" is activated the system will activate the light for a short time and then immediately switch to low beam See what is described under the title: Use of "high beam" versus "low beam"). Thus, extending this analysis to a time greater than a period T, which we will identify as "n·T", reduces the possibility of a vehicle making unnecessary changes in the intensity of its lights. For the same reason, it is convenient to check the cessation of the reception of intense light outside the viewing protection interval $T_p$, for a time greater than that of a period T, which time we will identify as "m·T".

These time periods "n·T" and "m·T" will be measured using a counter that we will call "counter III." Therefore, when the counter III achieves the value equivalent to the time n·T, the "unsynchronized intense light detection" output will be activated and said counter III will be reset. This can only occur if in each of the "n" periods T intense light is detected outside the vision protection interval $T_p$. Otherwise, i.e. if in any of said periods T no intense light is detected outside the viewing protection interval $T_p$, the counter III will be restarted while the "non-synchronized intense light detection" output is deactivated. When this output has been activated, it will be deactivated when the counter III reaches the value equivalent to the time m·T. This can only occur if no intense light is detected outside the protection interval $T_p$ during "m" periods T. It will suffice to detect intense light outside the viewing protection interval $T_p$ in one of said periods T to restart the counter III thus keeping the "non-synchronized intense light detection" output active. The greater the value of "n" the longer the time during which the system will confirm the receipt of intense light outside the protection range $T_p$ before making a change in the intensity of the lights. The higher the value of "m" the greater the tolerance with which the system evaluates if the vehicle has stopped receiving intense light outside the protection range $T_p$.

Figure 40:
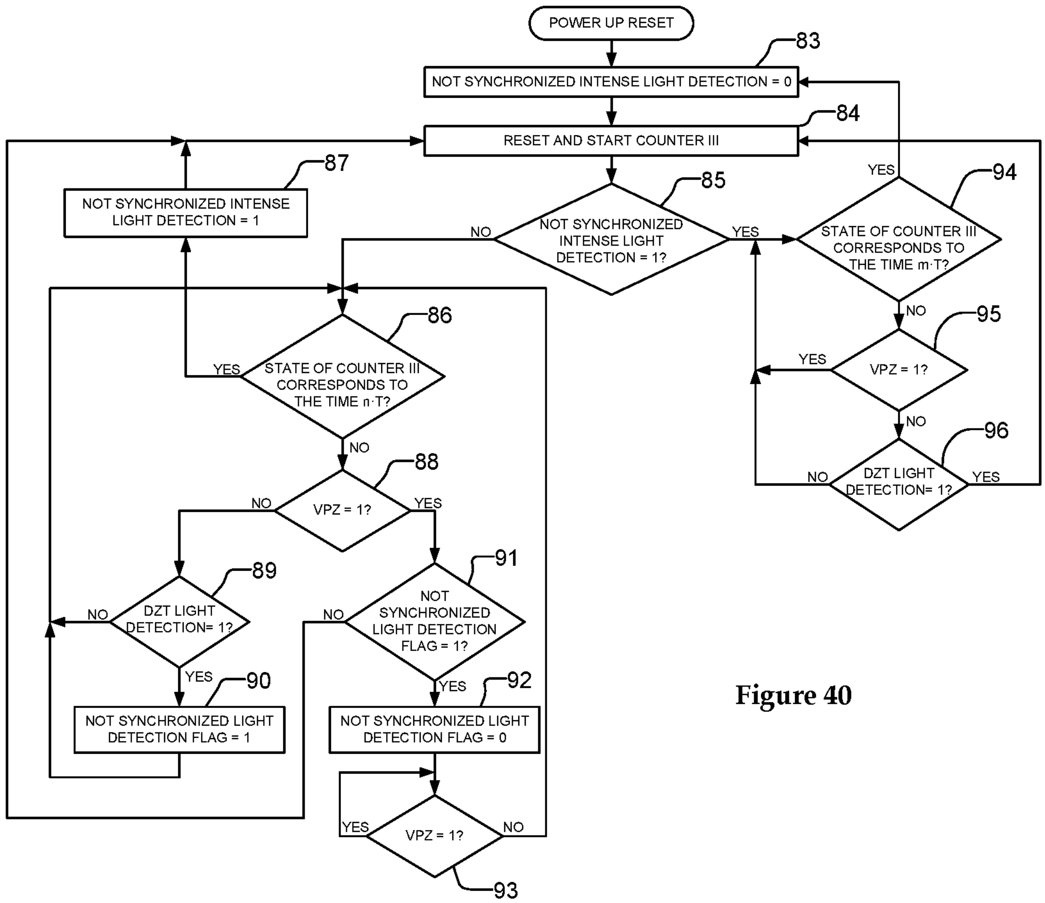
FIG. 40 shows the operation diagram corresponding to the Not Synchronized Intensive Light Detection block of FIG. 34, according to an exemplary embodiment of the invention.

The operation diagram corresponding to this block 68 is shown in FIG. 40. The appearance of a "power up reset" pulse will cause the low intensity detection of the "non-synchronized intense light detection" output in step 83, and the resetting and subsequent starting of the counter III in step 84. At decision point 85 the actions to be taken by the system are determined depending on whether or not the "non-synchronized intense light detection" output is active. So, if this output is at low level will run the part of the algorithm that determines whether to activate said output. On the other hand, if that output is already active, the part of the algorithm will be executed that determines whether to disable said output.

Therefore, the part of the algorithm that determines whether to activate the "unsynchronized intense light detection" output begins at the decision point 86, where the status of the counter III is inquired. If said counter III has succeeded in reaching the value corresponding to the time n·T, the output "unsynchronized intense light detection" will be activated in step 87, the sequence returning to step 84. Otherwise the sequence passes to the decision point 88, from which if the signal "VPZ" is in value under the sequence it passes to the decision point 89 and if the signal "DZT light detection" is at high value, the "flag" Is set to high value in step 90, returning the sequence to the decision point 86. Otherwise the sequence returns to the decision point 86 without changing the state of said flag. Thus, if during a period, T light has been detected above the dazzle threshold outside the protection range $T_p$, it will be indicated in the "non-synchronized light detection flag", a situation which must occur during n periods T for that the "non-synchronized intense light detection" output is activated.

Therefore, when the "VPZ" signal returns to high value the sequence will pass from the decision point 88 to the decision point 91 where it is asked for the status of the "non-synchronized light detection flag", and if said flag does not Is in high value the counter III is reset in step 84 (thus restarting the evolution of said counter to the value corresponding to time n·T). On the other hand, if at the decision point 91 the "non-synchronized light detection flag" is at a high value then in step 92 the flag is reset and then at decision point 93 it is expected that the Signal "VPZ" returns to low value (end of the vision protection zone), returning the sequence to decision point 86 to ask if counter III has already reached the value corresponding to time n·T. The reset of said flag in step 92 is performed tocheck during the next period T if light is still detected above the dazzle threshold outside the viewing protection range $T_p$.

That part of the algorithm that determines whether to disable the "non-synchronized intense light detection" output starts at decision point 94 where the status of counter III is asked. If said counter III has been able to reach the value corresponding to the time m·T the sequence will go to step 83 by deactivating said "non-synchronized intense light detection" output. Otherwise, at the decision points 95 and 96 it is analyzed whether there is light detection on the dazzle threshold outside the vision protection zone $T_p$, in which case the counter III is reset in step 84 (thus restarting the evolution of said counter to the value corresponding to time m·T). Otherwise, i.e. if no light is being detected on the dazzle threshold outside the vision protection zone $T_p$, it is returned to the decision point 94 to ask again for the status of said counter III.

Figure 41:
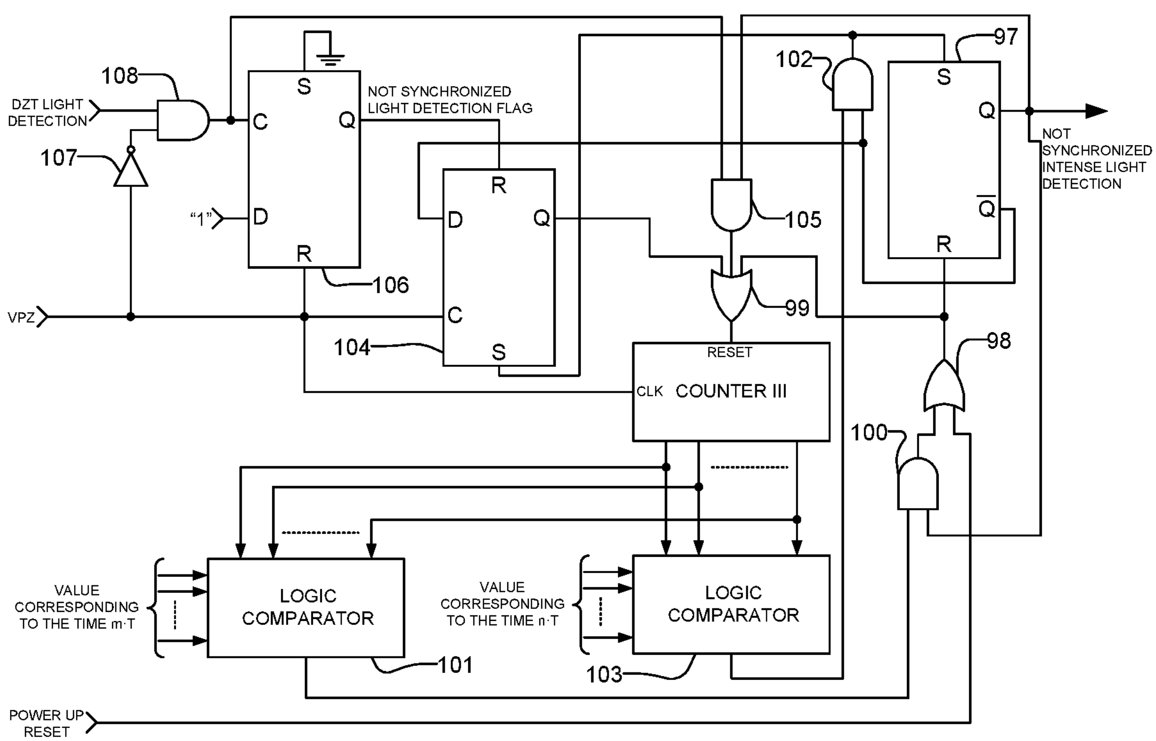
FIG. 41 shows the circuit to implement the Not Synchronized Intense Light Detection block of FIG. 34, according to an exemplary embodiment of the invention.

FIG. 41 shows the simplified scheme of a possible circuit for implementing block 68 of FIG. 34. The "non-synchronized intense light detection" output is obtained as the output Q of Flip-Flop 97. The signal "Power up reset" is entered via the OR 98 gate, the reset input of the Flip-Flop 97 and, through the OR 98 and OR 99 gates, to the "reset" input of the counter III, thus initiating the Sequence given by the steps 83, 84, . . . of the operation diagram of FIG. 40. Note that if the "non-synchronized intense light detection" output remains low, the AND gate 100, to one of whose inputs it enters said output prevents the output of logic comparator 101 from acting on the reset input of Flip Flop 97 through the other input of said AND gate 100. This is because the logic comparator 101—whose function is to indicate when the counter III reaches the value corresponding to the time m–T—should only ad on the reset input of the Flip-Flop 97 when the output "high beam detection not synchronized" Is activated (see the sequence given by steps 85, 94 and 83 of the operating diagram of FIG. 40).

On the other hand, when the "non-synchronized intense light detection" output remains high, the AND gate 102 to one of the inputs enters the output of the Flip-Flop 97, prevents the output of the logic comparator 103 from acting on the "Set" input of said Flip-Flop 97 through the other input of said AND gate 102. This is because the logic comparator 103—whose function is to indicate when the counter III reaches the value corresponding to the time n–T—should only act on the "set" input of Flip-Flop 97 when the "Synchronized" is disabled (see the sequence given by steps 85, 86 and 87 of the operation diagram of FIG. 40). This ensures that the set-up and reset inputs of the Flip-Flop 97 will not be acted on simultaneously. As a clock input for counter III, the "VPZ" signal has been selected (this was done because the signal is available in the Circuit and has the same period T as the "ICS." As will be apparent from the above, the "non-synchronized intense light detection" output will be activated when the logic comparator 103 indicates that the counter has reached the value "n", this is done through AND gate 102, the output of which enters the "set" input of Flip-Flop 97. The output of said AND gate 102 also enters the "set" input of Flip-Flop 104 whose output, acting through OR gate 99, restarts counter III (note that the output of said AND gate 102 is activated in the form of a narrow pulse since the output of said AND gate 102 is connected to the set input of the Flip-Flop 97 whose output $\overline{Q}$ enters one of the inputs of said AND gate 102). The above described corresponds to the sequence given by the steps 86, 87 and 84 of the operation diagram of FIG. 40. As long as the output "low-light detection not synchronized" is at a low value, the only way to interrupt the advance of the counter III to the value "n" is by means of the "one" of the output Q of the Flip-Flop 104 which, via the OR gate 99, acts on the "reset" input of the counter III, since the Gates AND 100 and AND 105 cause the other two inputs of said OR gate 99 to remain at a low value while the "unsynchronized intense light detection" output is at a low value. Said Q output of Flip-Flop 104 will be set to high when the "VPZ" signal, which enters the clock input of Flip-Flop 104, switches high while the output $\overline{Q}$ of Flip-Flop 97, which enters the Flip-Flop 104 data input is at high level and as long as the "non-synchronized light detection flag" signal, which enters the reset input of Flip-Flop 104, is at a low value (the above is matched With the sequence given by the decision points 88, 91, and the step 84 of the operation diagram of FIG. 40).

When the "VPZ" signal is set to low, the output of the inverting gate 107, which enters one of the inputs of the AND gate 108, is set to high value and if the signal "DZT light detection", Which enters the other input of said AND gate 108, is also set to high value, then a positive edge appears at the clock input of Flip-Flop 106 whereby the-"non-synchronized light detection flag", corresponding to the output Q of said Flip-Flop 106, is set to high value (what previously described corresponds to the sequence given by the decision points 88, 89, and the step 90 of the operation diagram of FIG. 40). If the Q output of Flip-Flop 106, which enters the reset input of Flip-Flop 104, and corresponds to the "non-synchronized light detection flag" signal, is high when the "VPZ" signal—Which enters the reset input of said Flip-Flop 106—switches to high value, said Flip-Flop reset input 104 will be set to low. But because the positive edge of the "VPZ" signal, which acts on the clock input of the Flip-Flop 104, is presented before said reset input of the Flip-Flop 104 is set to low value, the Q output of said Flip-Flop will remain at a low value and counter III will not be reset (what previously described corresponds to the sequence given by decision points 88, 91, and step 92 of the operation diagram of FIG. 40).

If the "unsynchronized intense light detection" output is at a high value, the only way to interrupt the advance of counter III to the value "m" is by the occurrence of a high value at the output of the gate AND 105 which, via OR gate 99, acts on the "reset" input of counter III. This is so since the Q output of the Flip-Flop 104, which enters another input of the OR gate 99, is kept low because the input "D" and the set input of said Flip-Flop 104 are Maintain low value when the "non-synchronized intense light detection" output is high and on the other hand the remaining input of the OR gate 99 is also kept low until, as already mentioned, the counter III reaches the value "m". In these conditions, the output of the AND gate 105 will be set to high value by resetting the counter III when the output of the AND gate 108 is set to high value, that is, whenever light is detected on the dazzle threshold outside the vision protection zone (what previously described corresponds to the sequence given by the decision points 85, 94, 95, 96 and the step 84 of the operating diagram of FIG. 40).

The "Light Control Logic" block 109 of FIG. 34 is composed in turn of the blocks "Control for continuous/blinking light emission" 110 and "Automatic low/high beam control" 111. Block "Control for the emission of continuous/flashing light" 110 has as inputs the signals: "power-up reset", "CT light detection" from block 65, and "synchronized light detection", from block 67. And as outputs the signals: "activate continuous light" and "activate flashing light". "Power-up reset", "switching reset" from block 172, "non-synchronous high beam detection", from block 68, "VPZ", is entered into the "Automatic low/high beam control" block 111. From block 64 and "CT light detection", from block 65. The outputs of this block are the signals: "force low beam use" and "force high beam use".

Figure 42:
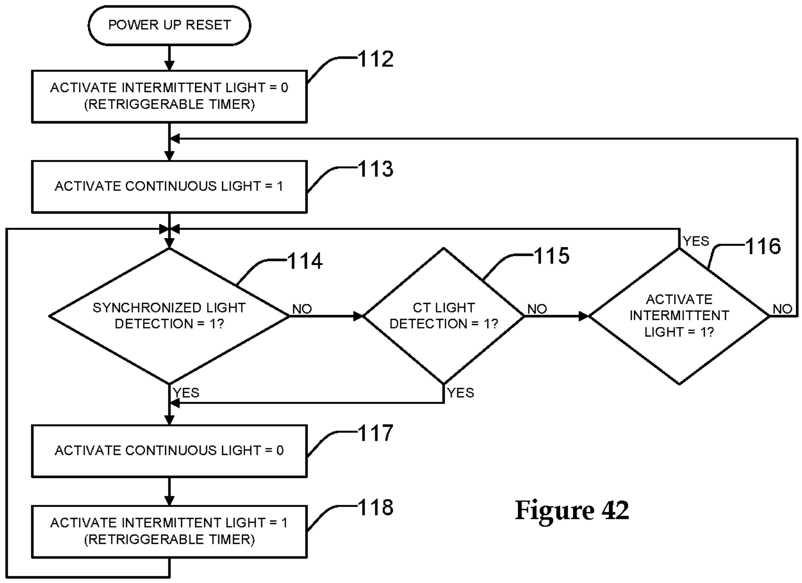
FIG. 42 shows the operating diagram corresponding to the block "Control for continuous/intermittent light emission" in FIG. 34.

The function of the "Control for continuous/flashing light" block 110, as the name implies, is to determine when the vehicle must use continuous light or flashing light. The operation of this block will be explained by making use of a simplified functional diagram of the same—shown in FIG. 42—which will then be extended to its final version. In this simplified version, a vehicle participating in an NVE will use intermittent lighting not only when it detects intermittent light within the conflict-free zone, but also when it detects non-synchronized light, i.e. when it receives continuous light or when pulses of light flash That is detected outside the conflict-free zone (in the latter two cases the detected light must exceed the continuous light threshold). Referring to FIG. 42, it is noted that upon a power-up reset pulse the "turn on flashing" signal, which is the output of a re-displayable timer with the same name, is set low in step 112 and the "enable continuous light" output signal is set high in step 113. At decision points 114 and 115 it is noted that if the vehicle detects flashing light within the conflict-free zone ("light detection Synchronized"=1) or detects light on the continuous light threshold ("CT light detection"=1), then the system lowers the "enable continuous light" output signal in step 117 and triggers the "Turn on flashing" in step 118, returning the sequence to the decision point 114. While this situation is maintained, the vehicle will keep its flashing light on and the corresponding timer will be continuously retriggered. When at the decision point 114 the "synchronized light detection" signal is at a low value (indicating that no synchronized flashing light is being detected) and when at the decision point 115 the "CT light sensing" signal is at a low value (Indicating that no light is being detected on the continuous light threshold), then the sequence will pass to decision point 116 in which the state of the "turn on flashing" timer is asked. When this timer is depleted the sequence returns to step 113 whereby the system activates the conventional continuous light again. One of the objectives of the "turn on flashing" timer is to make the vehicle keep its intermittent lighting active a short time after the vehicle has left the NVE.

Figure 43:
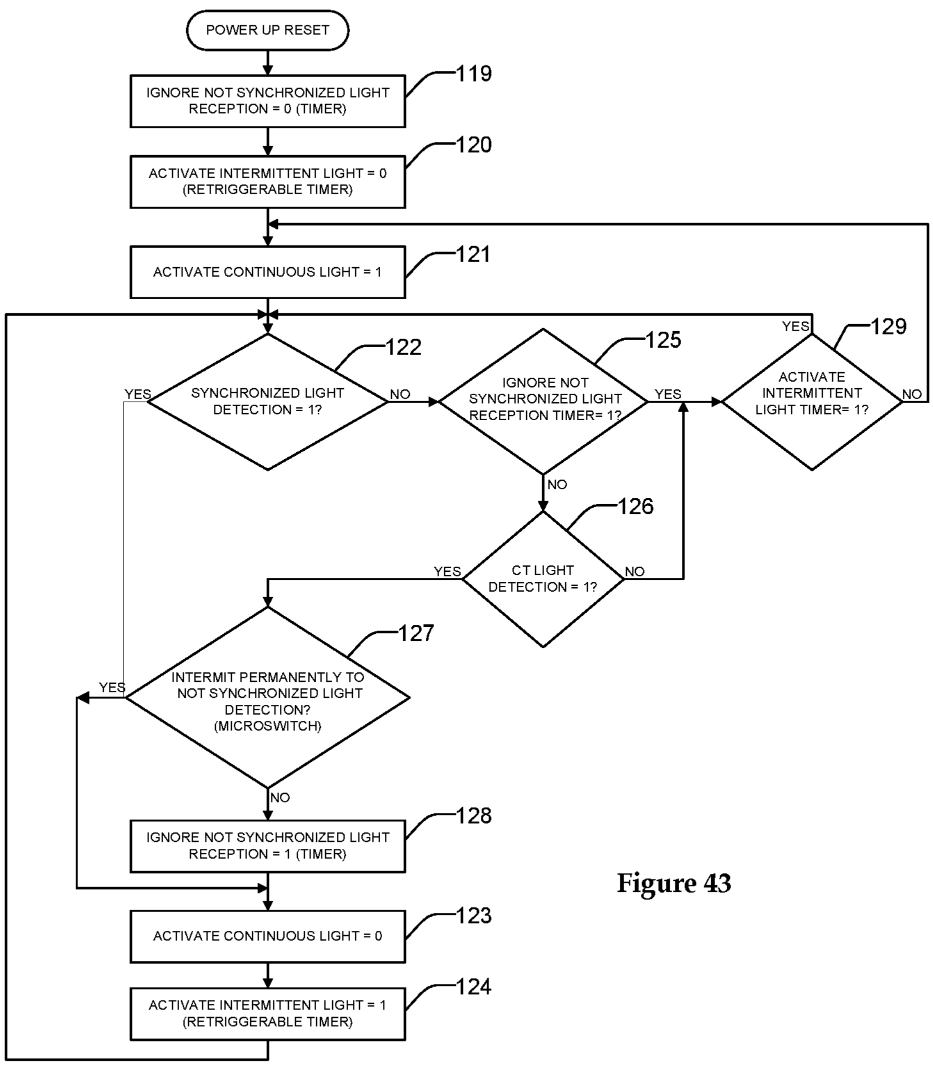
FIG. 43 shows the expanded operation diagram of the block "Control for continuous/blinking light emission" in FIG. 34, according to an exemplary embodiment of the invention.

FIG. 43 shows the expanded version of the operation diagram of the block "Control for continuous/blinking light emission" 110 which allows to configure (for example by means of a micro switch) how the lights of a vehicle will respond within a NVE. One way of configuring the behavior of the lights corresponds to that described in the operating diagram of FIG. 42. Another way to configure the behavior of the lights of a vehicle within an NVE is that the vehicle only makes use of Its intermittent illumination in a sustained manner if it is receiving synchronized intermittent light from a vehicle of said NVE. The vehicle will not detect synchronized light within an NVE if received light pulses fall outside the conflict-free zone or also, obviously, if the vehicle is receiving only conventional continuous light. The latter may occur, for example, in an NVE between two vehicles when one of these vehicles maintains the conventional continuous illumination active because it still does not detect the intermittent light emitted by the other, or possibly when one of the vehicles has its system deactivated. In these cases, the vehicle that is detecting conventional continuous light will activate the flashing light for a short time waiting to receive the flashing light of the other vehicle in response. Said time interval will be given by the "turn on flashing" timer already described. If after said time interval the vehicle continues to receive only continuous light, it will then activate the conventional continuous light for another time interval, significantly greater than the previous one, before using flashing or intermittent light again. This second interval of time will be given by a timer that we will call "ignore reception of light not synchronized". Making the "ignore non-synchronized light reception" timer significantly larger than the "turn on flashing" timer is to mean that, if the vehicle is receiving only continuous light, the vehicle's lights behave practically as if emitting conventional continuous light. For this reason, in the operating diagram of FIG. 43, it has not been differentiated whether the detection of light on the continuous light threshold (decision point 126) is due to the reception of conventional continuous light or the reception of intermittent light not synchronized.

The most likely cause that within a NVE a vehicle could emit pulses of intermittent light not synchronized with those of another vehicle is that some of those vehicles have stopped detecting the phase adjustment signal for a while Sufficiently extensive that its ICS has suffered a phase shift greater than the tolerated by the system. The operation diagram of FIG. 43 is then described. When a "power-up reset" pulse is made, the "ignore non-synchronized light reception" timers are reset at step 119 and "activate Flashing light" in step 120. Then in step 121 the "enable continuous light" signal is set high. If at the decision point 122 the "synchronized light detection" signal is at high value then the system lowers the "enable continuous light" output signal at step 123 and triggers the "turn on flashing" timer at step 124, returning the sequence to decision point 122.

If this situation is maintained, i.e. while the vehicle is detecting flashing light within the conflict-free zone, the "turn on flashing" timer will remain on, Vehicle will keep its intermittent lighting active. If at the decision point 122 the "synchronized light detection" signal is not active and at decision point 125 the "ignore light receiving not synchronized" timer is not at high value, the sequence reaches the decision point 126 at which is consulted for the status of the "CT light detection" signal. If this signal is in high value, the system will assume that the vehicle is receiving non-synchronized light and the sequence reaches the decision point 127. If the system has been configured by setting the signal "to be permanently intermitted against the reception of non-synchronized light" in high value (for example by a micro switch), then the sequence will continue in step 123, thus omitting step 128 with the "ignore unwanted light reception" signal will never be activated. With this configuration, the behavior of the vehicle's lights will be identical to that described in the simplified operation diagram of FIG. 42. On the other hand, if the system has been configured by placing the signal "permanently intermitted against the light reception" Synchronized "in low value, the sequence will always include step 128 in which the "ignore non-synchronized light reception" timer is triggered. Then, in step 123, the "enable continuous light" signal is set to value and in step 124 the flashing light is activated by the corresponding timer by returning the sequence to the decision point 122. If the signal "synchronized light detection" Is kept low, the sequence will return to the same decision point 122, through decision points 125 and 129, until the "turn on flashing" timer is depleted (this last timer will be the first timer to run out because the timer "ignore light reception not synchronized" is longer duration and both have been triggered at the same time). When said "turn on flashing" timer is exhausted, the sequence continues at step 121 in which the vehicle reactivates the conventional continuous light, because it has not received flashing light within the conflict-free zone.

If this situation continues, i.e. if at the decision point 122 the "synchronized light detection" signal continues at low value, the vehicle will maintain conventional continuous illumination until the timer "ignores non-synchronized light reception" is exhausted—see Step 125—in which case, if the vehicle continues to detect non-synchronized light and before the possibility of continuous light, the vehicle will re-activate the flashing light for a short time. The sequences remaining to be described are: that given by steps 122, 125, 126, 129, 122 and that given by steps 122, 125, 126, 129, 121, 122. The first one occurs when a vehicle leaves an NVE (therefore it is not detecting intermittent light or continuous light) and the "turn on flashing" timer has not yet been exhausted. The second sequence corresponds to a vehicle that is not participating in an NVE and therefore has its conventional continuous illumination active.

Figure 44:
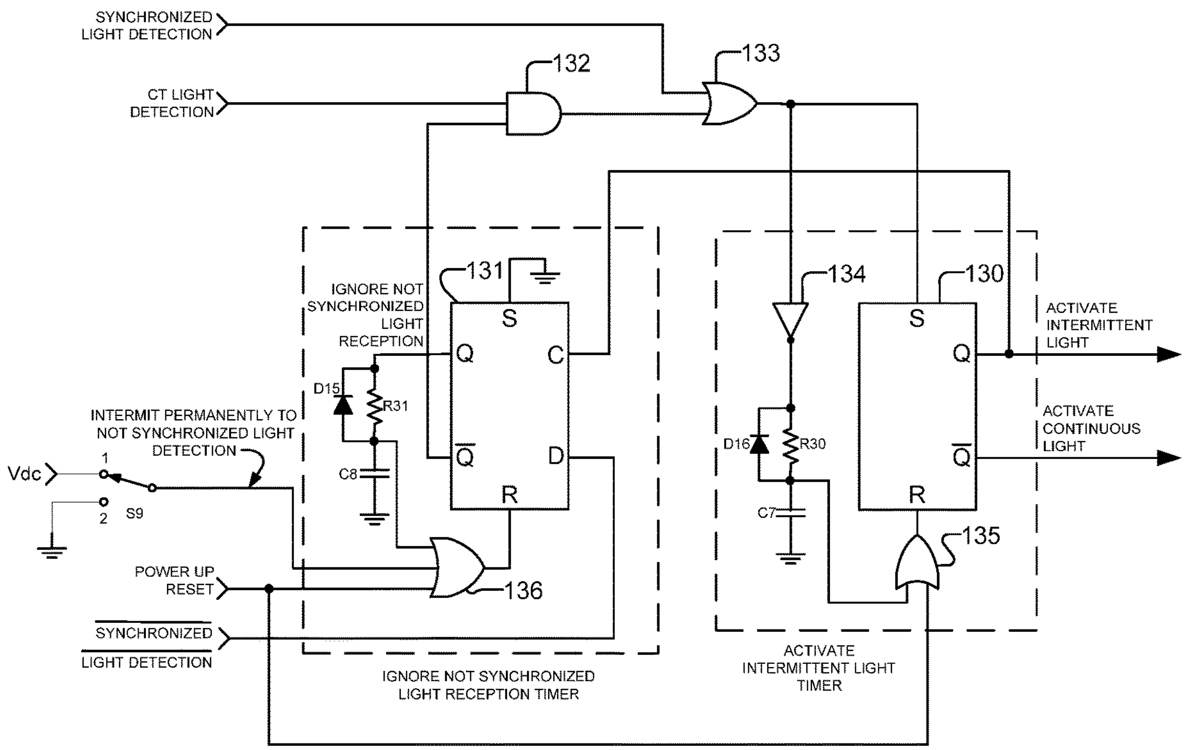
FIG. 44 shows a circuit to implement the block "Control for continuous/intermittent light emission" of FIG. 34, according to an exemplary embodiment of the invention.

FIG. 44 shows the simplified scheme of a possible circuit for implementing the block "Control for continuous/intermittent light emission" 110. The switch S9 establishes the state of the signal "to receiving non-synchronized light". This signal is set to high value with switch S9 in position 1, and in low value with switch S9 in position 2. The timers "activate flashing" and "ignore reception of non-synchronized light" are obtained by the Flip-Flops 130 and 131 respectively. The "power-up reset" signal enters the reset input of said Flip-Flops 131 and 130 through the OR gates 136 and 135 respectively. With a pulse of the "power-up reset" signal the "ignore non-synchronized light reception" and "turn on flashing" timers are set to zero, in correspondence with steps 119 and 120 of the operation diagram of FIG. 43.

A power-up reset pulse also causes the signal to "activate continuous light" in high value, as it is obtained at the output $\overline{Q}$ of said Flip-Flop 130, which corresponds to step 121 of the operation diagram of FIG. 43. The signal "synchronized light detection" enters, via the OR gate 133, to the set input of the Flip-Flop 130, so that when said signal is activated it is set to value under the " " and the "turn on flashing" timer is triggered, which corresponds to the sequence given by steps 122, 123, 124 and 122 of the operation diagram of said FIG. 43.

We will now analyze the behavior of the circuit for each Position of the switch S9 while the signal "synchronized light detection" is low. With switch S9 set to position 1 the Flip-Flop 131 will remain reset through the OR 136 gate, whereby the timer "ignore light reception not synchronized" will remain inactive, therefore the input of the AND gate 132 that is connected to the output $\overline{Q}$ of said Flip Flop 131 remains at high value and consequently the "CT light detection" signal, which enters the other input of said AND gate 132, will be present at the output of said gate AND 132. If said "CT light Detection" signal is in high value the Flip-Flop 130 will remain set through the OR gate 133 as the output of said OR gate 133 also enters the Inverter gate 134 whose output will remain in value Low impeding that the capacitor C7 is charged and therefore, through the OR gate 135, a high value also appears at the reset input of said Flip-Flop 130. The described corresponds to the sequence given by the steps 122, 125, 126, 127, 123, 124 and 122 of the operation diagram of FIG. 43. When the signal "synchronized light detection" is low, when the "CT light detection" signal is also set low, the output of the OR gate 133 is set low so that the output of the inverter gate 134 is set high allowing the capacitor C7 to be charged through the resistor R30 for a time proportional to the product of R30·C7. During that time, the "turn on flashing" signal will be kept active, which corresponds to the sequence given by the steps 122, 125, 126, 129 and 122 of the operation diagram of FIG. 43. Once said time proportional to the product has elapsed of R30·C7, the flip-flop 130 is reset via the OR 135 gate, whereby the "turn on flashing" signal is set to low value and the "enable continuous light" signal is set to high. This corresponds to the sequence given by steps 122, 125, 126, 129, 121 and 122.

On the other hand, with switch S9 set to position 2, Flip-Flop 131 will not be permanently reset. As long as the "ignore non-synchronized light reception" timer is off (as is the "turn on flashing" timer), the AND gate 132 that is connected to the output $\overline{Q}$ of said Flip-Flop 131 will be high and Consequently when the "CT light detection" signal entering the other input of said AND gate 132 is set to high value, the output of said AND gate 132 will be set to high value by setting Flip-Flop 130 through the Gate OR 133, which in turn results in activation of the timer "ignore reception of non-synchronized light", through the clock input of said Flip-Flop 131. With this, the output of said AND gate 132 is again set to low value, and since for this analysis it has been assumed that the signal "synchronized light detection" is at a low value, Flip-Flop 130 is no longer set and "turn on flashing" timer starts running. This corresponds to the sequence given by steps 122, 125, 126, 127, 128, 123, 124 and 122, followed by the sequence 122, 125, 129 and 122 of the operation diagram of FIG. 43. This last sequence will be repeated while both timers remain active. When the "turn on flashing" timer is extinguished, the "activate continuous light" signal is activated. This corresponds to the sequence given by the steps 122, 125, 129, 121 and 122 of the operation diagram of FIG. 43, which sequence will be repeated until the timing of the "ignore non-synchronized light reception" timer expires. The "turn on flashing" timer has a duration proportional to the product R30·C7, while the duration of the timer "ignore non-synchronized light reception" is given by the charging time of the capacitor C8. Once this timer has been triggered, the capacitor C8 is charged through the resistor R31 and will produce the reset of the flip-flop 131, and therefore of said timer, through the OR 136 gate. The diode D15 ensures the immediate discharge of the capacitor C8 once the timer "ignore reception of non-synchronized light" has been reset. Diode D16 ensures immediate discharge of capacitor C7 at the time the set input of Flip-Flop 130 is set to high.

Further consideration will be given to the thresholds used for the detection of light. It has already been said that the threshold of flashing light is assigned a value lower than the threshold of continuous light to accelerate the formation of an NVE. For this same reason, we add that it is desirable for the intermittent light threshold to be such that the distance at which the continuous high beam from one vehicle V1 is detected by another vehicle V2 is like the distance at which the blinking light falls from V2 is detected by V1. This is intended for the case where a meeting occurs, for example, between V1 that has been making use of high beam and V2 that has been making use of low beam. Obviously, V2 will be the first to detect light above the threshold of continuous light and consequently the first to use intermittent light. But since the latter vehicle will use low flashing light, if consideration is not considered, formation of the corresponding NVE would be delayed until such flashing light is detected by V1.

The "Automatic low/high beam control" block 111 of FIG. 34 has as inputs the "non-synchronized intense light detection" signals from block 68, "VPZ" from block 64, "detection of Light UC" from block 65, "switching reset" from block 172 and "power up reset" from block 171, and generates outputs: "force low beam use" and "force high beam use". The main function of this block 111 is to make, regardless of the position of the manual switch of the lights, a vehicle to temporarily use the low beam in order not to cause major inconvenience to other drivers when in that vehicle, the signal is activated "Non-synchronized intense light detection". This action will be performed by activating the output "force low beam use". To obtain the same response from the other vehicles, prior to forcing the use of low beam the system will force for a short time the use of high beam, to ensure that said other vehicles also receive intense light outside the range of protection of vision $T_p$, and consequently that also lower the intensity of its lights. This action is carried out by activating the "force high beam use" output which will always be activated for a short and determined time span, unlike the "force low beam use" output whose activation can be extended while the situation described.

It is worth mentioning that if the signal "intense non-synchronous light detection" is activated in a vehicle due to the intensity of the light coming from a vehicle whose anti-fade system is not working (vehicle that will only have continuous light), the sequence given by the actions "force high beam use" followed by "force low beam use" will also be useful, as it will be interpreted by the driver of the vehicle without system as an order to manually lower the intensity of the lights. It should also be mentioned that this sequence given by the actions of "forcing use of high beam" followed by "forcing use of low beam" fulfills its purpose whether the vehicle was making use of the low beam as if it was making use of the high beam.

Figure 45:
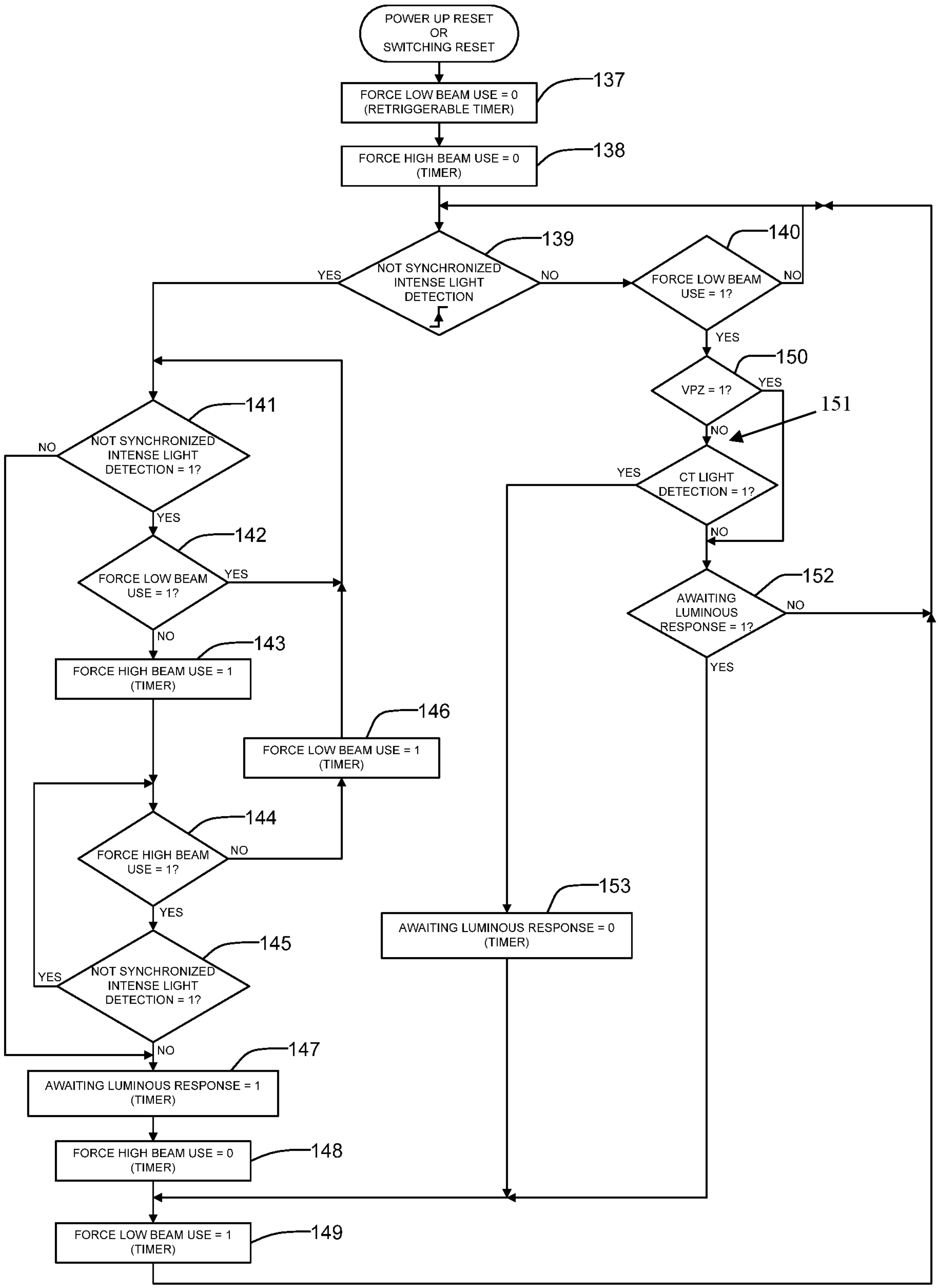
FIG. 45 shows the operation diagram corresponding to the block "Automatic control of low/high beam" of FIG. 34, according to an exemplary embodiment of the invention.

The operation diagram corresponding to said block 111 is shown in FIG. 45. The appearance of a pulse of the "power up reset" signal or the "switching reset" signal results in resetting of the resettable timer "force use of low beam" in step 137 and zeroing of the "force high beam" timer at step 138 (the "low beam use" output is generated by a resettable timer to be able to extend the time during the which output will remain active). When the "low beam use" timer is set to zero, and if the "non-synchronized high beam detection" signal does not switch to high value, the sequence will be restricted to the cycle given by the decision points 139 and 140. Thus, the outputs of this block will remain inactive if there are no encounters with non-synchronized vehicles, and the driver will have full control over the intensity of the lights of his vehicle by means of the manual switch of the lights. When the signal "strong light detection not synchronized" is switched to high value in step 139, the actions of "force high beam" followed by "force low beam" are repeated in sequence to ask any vehicles which comes from said non-synchronized light to reduce the intensity of its lights. The part of the operation diagram that performs these actions is described below.

When the "non-synchronized intense light detection" signal is set to high, the timer generating the "high beam use" output will be triggered as long as the timer generating the "low beam use" output is inactive. This corresponds to the s Sequence given by steps 141, 142, and 143 of the operation diagram. If the "non-synchronized intense light detection" input is still held high for when the "high beam" forced timer has been extinguished (see decision points 144 and 145) then the timer generating the "Forcing low beam use" in step 146. Similarly, if the "non-synchronized intense light detection" input is still held high for when the "low beam use" timer has been extinguished (see decisions 141 and 142) then the "force high beam" timer will be triggered at step 143, to re-request vehicles from which such non-synchronized light comes to lower the intensity of their lights. It is desirable that the time during which the "force low beam use" signal is kept active is significantly longer than the time during which the "force high beam" signal is kept active so as not to cause major inconvenience to the drivers of non-synchronized vehicles. When the "non-synchronized intense light detection" signal is set low at the decision point 141 or at the decision point 145, the sequence proceeds to step 147 where the timer that is called "waiting for a light response" is triggered, to Then the "force high beam" timer is set to low in step 148 and then the "force low beam" timer is triggered (or restarted) in step 149, returning the sequence to the decision point 139.

In this way, the system forces the use of low beam assuming that it is in front of another vehicle that has lowered the intensity of its lights. Before explaining the function of the timer "waiting light response" it is necessary to analyze the cases in which a vehicle can stop detecting intense non-synchronized light. Obviously the most common case is that which occurs when the vehicle from which the intense non-synchronized light comes, lowers the intensity of its lights. Another case is the one that occurs when a vehicle stops detecting intense non-synchronized light because the vehicle from which the intense non-synchronized light came has already crossed the route (this could happen, for example, when the latter vehicle has its system deactivated and its high beam activated). Other less frequent cases could be those caused by vehicles that stop at the side of the road and turn off their lights or simply deviate from the road. As can be seen, the first of these cases, i.e. the one that occurs when the vehicle from which the intense non-synchronized light comes, lowers the intensity of its lights, is the only one that requires the system to keep the use of low beam Until crossed with the vehicle not synchronized. The function of the timer "waiting for light response" is then to give the system time to determine if it is in front of a non-synchronized vehicle that has decreased the intensity of its lights or if it is one of the other cases described. This is because the light detection of a vehicle could be interrupted when that vehicle lowers the intensity of its lights. To facilitate light detection of a vehicle that has lowered the intensity of its lights, it is necessary to use a threshold of light that is less than the dazzle threshold, and possibly wait until the vehicle approaches sufficiently to be detected again with this new threshold.

As already said, this wait will be regulated by the timer "waiting for light response". On the other hand, since the continuous light threshold complies with the condition being less than the dazzle threshold, it can be used as said new light threshold. In short, if the light detection of a non-synchronized vehicle is interrupted when the vehicle lowers the intensity of its lights (i.e. if the received light intensity is below the continuous light threshold), the system will keep the timer "Forcing low beam use" for a time set by the "waiting for light response" timer to detect light on said continuous light threshold outside the range of Vision Protection $T_p$. If the latter happens, then the "waiting for light response" timer is deactivated (set to low value) and the "low beam use" timer will be retried for the duration of the light detection, i.e. until the Vehicle not synchronized. Once the timers "waiting for light response" and "force low beam" have been extinguished, the system will assume that the detection of non-synchronized light has already been completed and will consequently allow the intensity of the vehicle's lights to be selected again by the switch for manual switching of the lights.

After this analysis, we return to the description of the functional diagram of FIG. 45 from the return to decision point 139 (a return occurring when the "non-synchronized intense light detection" signal is set low at the decision point 141 or at decision point 145). Since the detection of non-synchronized intense light has ceased, the sequence passes from the decision point 139 to the decision point 140 and then, if the "low beam use" timer is active, it is passed to the decision point 150, In which the status of the signal "VPZ" is analyzed. When the "VPZ" signal is at a low value, the status of the "CT light detection" signal at the decision point 151 is analyzed, which is equivalent to asking if light is detected outside the protection range $T_p$ above the Continuous light threshold. If this does not happen, the sequence arrives at the decision point 152 from which, if the timer "waiting for light response" still remains active, the sequence goes to step 149 in which the "force low beam use" timer is redisplayed, Closing cycle again at decision point 139. Conversely, if at the decision point 152 the timer "waiting for light response" is depleted the sequence returns directly to decision point 139 without retriggering the timer "force use of light low". If this last timer runs out without the "CT light detection" signal being activated outside the vision protection zone, the system will assume that there is no vehicle not synchronized in front of it and therefore the intensity of the lights will be set by the switch for manual switching of the lights.

When at the decision point 151 the "CT light detection" signal is active, the system assumes that it is sensing the non-synchronized vehicle that has lowered the intensity of its lights, therefore lowers the timer "waiting for light response" In step 153 and resets the "force low beam" timer in step 149, then returning the sequence to step 139. Thus, if the "low beam use" timer is active, each time light is detected on the threshold of continuous light—at the decision point 151—said timer will be redisplayed, thus responding to the vehicle which keeps the intensity of its lights low. When no light is detected again at the decision point 151 for a time such as to allow the timer to "force low beam use" to be depleted, the intensity of the lights will again be that fixed by the manual switch of the lights as it will be assumed that the crossing occurred with the vehicle not synchronized. When a vehicle detects non-synchronized intense light (decision point 139), regardless of the status of the timers "waiting for light response" and "force low beam use", the system will re-execute the sequence that starts in the decision point 141 and has already been described.

The reason why at decision point 139 is asked about the appearance of a positive edge in the signal "intense non-synchronous light detection" is to allow the driver, in the presence of a non-synchronized vehicle that for some reason does not Lowers the intensity of its lights, can interrupt the repetition of the sequence given by the actions of "force high beam use" followed by "force low beam use" and regain manual control of the lights. For it will suffice that said driver will take the switch of manual switching of the lights to the HB position or press the button that forces Temporarily activating the high beam of your vehicle. This will trigger the "switching reset" signal from the block 172 of FIG. 34, whereby the "low beam use" and "high beam use" outputs are set to value in steps 137 and 138 respectively, the sequence then being restricted to the cycle given by decision points 139 and 140 until a positive edge is present in the "non-synchronized intense light detection" signal. This will keep the outputs of this block inactive until the other non-synchronized vehicle responds by making a change of lights. A case in which a non-synchronized vehicle might not lower the intensity of its lights occurs, for example, if the non-synchronized vehicle does not have its anti-dazzling system activated and its driver does not respond to orders to manually lower the intensity of its lights.

Figure 46:
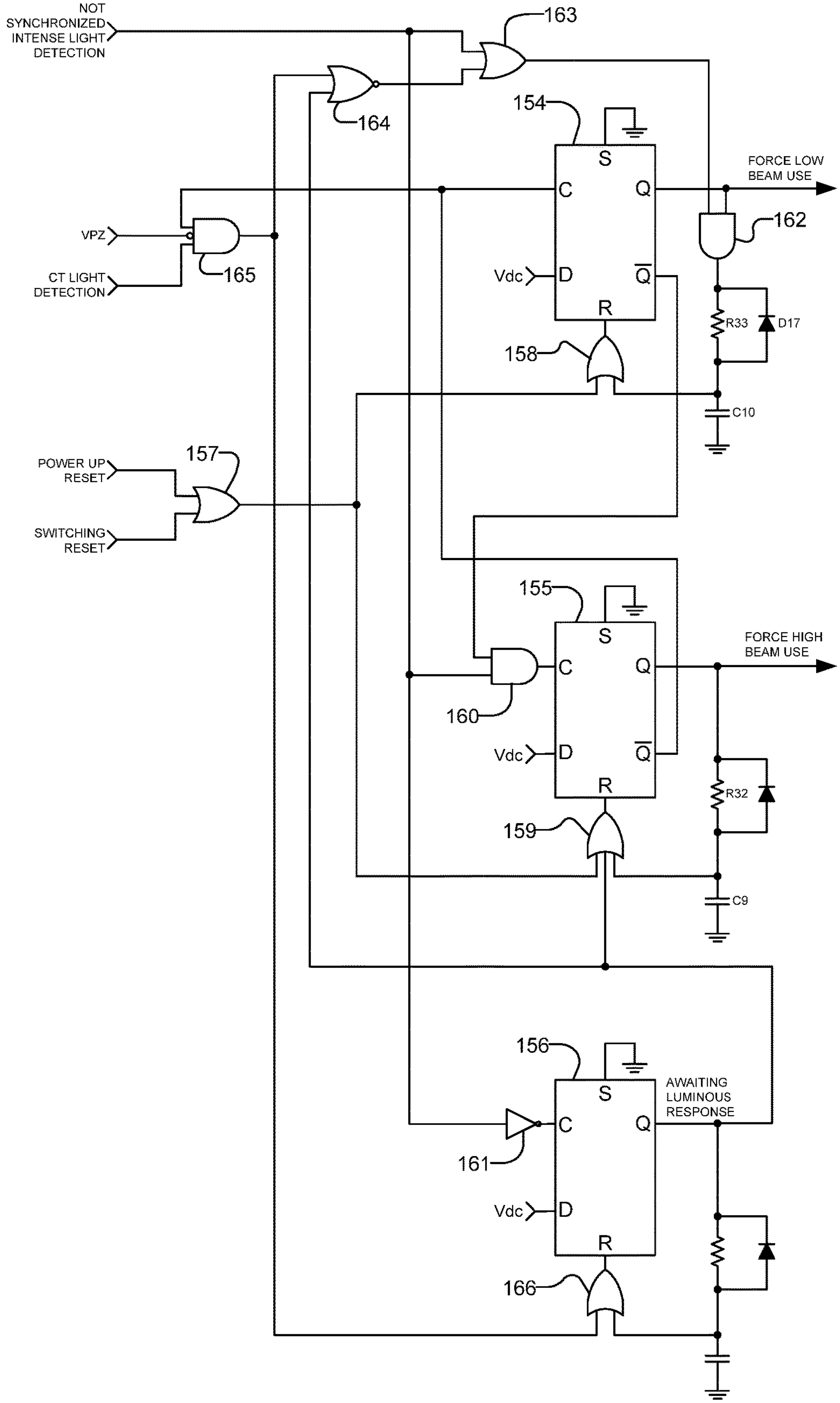
FIG. 46 shows a circuit to implement the "Low/High Automatic Light Control" block of FIG. 34, according to an exemplary embodiment of the invention.

FIG. 46 shows the simplified scheme of a possible circuit for implementing the block "Automatic low/high beam control" 111. The timers "force low beam use", "force high beam use" and "Waiting for light response" are obtained by Flip-Flops D 154, 155 and 156 respectively. The "power up reset" and "switching reset" inputs enter the OR gate 157 whose output enters, through the OR gate 158, the reset input of the Flip-Flop 154 and, through the OR 159 gate, to the reset input of Flip-Flop 155. Thus, when one of the inputs of the OR gate 157 is set to high value, the outputs "force low beam use" and "force high beam use" are set low in correspondence with steps 137 and 138 of the diagram of operation of FIG. 45. Both outputs will remain inactive (low value) until there is no high-value transition in the "non-synchronous intense light detection" signal (in the functional diagram this corresponds to the cycle given between decision points 139 and 140). When the "low beam use" output is low, the output $\overline{Q}$ of the Flip-Flop 154, which enters one of the inputs of the AND 160 gate, is high, thus, when a high value transition occurs in the "unsynchronized intense light detection" signal entering the other input of the AND 160 gate, a rising edge will occur on the clock input of the Flip-Flop 155, thereby triggering the "High beam" timer whose duration will be given by the time it takes the capacitor C9 to charge through the resistor R32 to the voltage value necessary to cause the resetting of the Flip-Flop 155 through the OR 159 gate (See steps 139, 141, 142 and 143 of the operating diagram). When said "high beam usage" timer is extinguished, the output $\overline{Q}$ of Flip-Flop 155, which is connected to the clock input of Flip-Flop 154, will be set to high value thus triggering the timer "force low beam usage". This trigger can be triggered either by the self-extinguishment of the timer "forced high beam use"

(see steps 144 and 146 of the functional diagram), or by the forced extinction of said timer "to force high beam use" (see steps 148 and 149 of the operating diagram). Such forced extinguishing occurs when the "non-synchronized intense light detection" signal is set to low value, triggering, through the inverting gate 161, the timer "waiting for light response" which in turn, through the gate OR 159, ads on the reset input $\overline{Q}$ of the Flip-Flop 155 causing said forced extinguishing (this corresponds to the sequence given by steps 145, 147, 148 and 149 of the operating diagram).

To ensure that while the "force high beam" timer is active, it will remain in value under the reset input of the Flip-Flop 156, the output $\overline{Q}$ of the Flip-Flop 155 will be input to one of the inputs of the AND 165 gate and That the output of said AND gate 165 ads on the reset input of said Flip-Flop 156 through the OR gate 166. This is done to ensure that the timer "waiting for light response" is always triggered when the "Intense non-synchronized light "switches to low value, since the timer" forced high beam "timer is forced to go out through the OR 159 gate from the timer" waiting for light response". From the above, That the "high beam use" timer can only self-extinguish to the extent that the "non-synchronous intense light detection" signal is held high (see cycle between decision points 145 and 144). As it was said, when said timer "force high beam use" self-extinguishes the timer "forced low beam use" is triggered (see step 146). The $\overline{Q}$ output of Flip-Flop 154, with which the "force low beam use" timer is implemented, enters one of the inputs of the AND 162 gate. When the timer "forced low beam, usage is triggered it will evolve freely to the extent that the other input of the AND gate 162 is in high value, since when the output of said AND gate 162 is set high the capacitor C10 is charged through the resistor R33, until resetting the Flip-Flop 154 through the OR gate 158.

When the timer "forced low beam" is triggered, if the output of the OR 163 gate—which enters the Gate AND 162 is set to low value, the output of the low force forced light timer will remain in high value as the output of said AND gate 162 is set to low value as capacitor C10 is abruptly discharged through diode D17. Thus, said capacitor C10 can only be recharged when both inputs of the AND gate 162 are again high. Thus, if the signal "strong light detection not synchronized"—that enters the AND gate 162 through the gate OR 163 is maintained at high value, the timer "force low beam use", once triggered, will freely evolve towards its self-extinction because both inputs of the AND gate 162 are high (see cycle between steps 141 and 142 of the operating diagram). When the "low beam use" timer self-extinguishes, a positive flank appears at the output of Flip-Flop 154 entering one of the AND gate inputs 160 and because the other input of said AND 160 gate enters the signal "strong light detection not synchronized" when this signal is in high value said positive edge will enter the clock input of Flip-Flop 155 triggering again the timer "force high beam use" (step 143 of the operating diagram). On the other hand, the "low beam use" timer will not become extinct if the "non-synchronized intense light detection" signal is set to low value as it is triggered, through the inverting gate 161, The timer "waiting for a light response", which in turn—through the gate NOR 164 lowers to one of the inputs of the gate OR 163 whose other input is also in low value since it enters the Signal "non-synchronized intense light detection". Thus, the output of said OR gate 163 lowers one of the inputs of the AND gate 162 and with this, as already said, the discharge of the capacitor C10 occurs, keeping the timer "forced to use" Low beam" (see the sequence given by steps 141, 147, 148 and 149 of the operating diagram).

If the "waiting for light response" timer has been triggered it will remain active until its self-extinguishment or until the output of AND gate 165 is set to high value, whereupon said timer will be reset through the OR 166 gate. If the "unsynchronized strong light detection" signal is kept low and the "waiting for light response" timer is active, the "force low beam" timer will remain on. In this state, the system will be waiting to detect lightly the vehicle that lowered the intensity of its lights. This is Corresponds to the cycle given by steps 149, 139, 140, 150, 151, 152 and 149. As long as the signal "strong light detection not synchronized" is kept low and from the moment the timer "waiting for light response" Has been reset by the high setting of the output of the AND 165 gate (in correspondence with the light detection of a non-synchronized vehicle that lowered the intensity of its lights), the "low beam use" timer will be redisplayed each time the output of the gate AND 165 goes to high value since through the gate NOR 164 is placed in value under one of the inputs of the gate OR 163 whose other input is also in low value (since to this one enters the signal "detection of intense non-synchronized light"), thus one of the inputs of the AND gate 162 is set low and with this the discharge of the capacitor C10 is redirected to said timer "to force low beam use".

For the output of said AND gate 165 to be set to high value, the signal "CT light detection", which enters one of the inputs of said AND gate 165, must be activated when the "VPZ" signal is low and the output of Flip-Flop 155 in high value, since said "VPZ" signal and the output of Flip-Flop 155 also enter said AND gate 165. The above corresponds to the cycle given by steps 149, 139, 140, 150, 151, 153 and 149 of the operating diagram. When the pulses stop at the output of gate AND 165, the "low beam use" timer evolves freely into self-extinguishment in correspondence with the cycle given by steps 139, 140, 150, 151, 152 and 139. If this Timer is extinguished before a pulse returns to the output of gate AND 165, the system assumes that the crossing with the vehicle has not synchronized, so that the intensity of the lights returns to the one fixed by the Manual switching of lights (see cycle between decision points 139 and 140).

Figure 47:
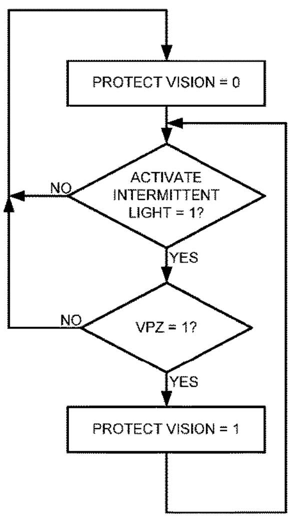
FIG. 47 shows the operation diagram corresponding to the block "Vision protection" in FIG. 34, according to an exemplary embodiment of the invention.

The function of the "Vision Protection" block 167 of FIG. 34 is to generate the signals necessary to control the device in charge of providing the vision protection of the driver of a vehicle. Said block 167 generates the "protect vision" output signal from the "VPZ" input signals from block 64 and "activate blinking" from the block 110. FIG. 47 shows the operation diagram of said block 167. As can be seen, said operating diagram corresponds to the simple AND logic function between the "enable flashing" and "VPZ" input signals. In this way, the system will protect the driver's vision ("protect vision"=1) within the "VPZ" vision protection zone when the vehicle is using intermittent lighting, i.e. when the vehicle is participating in an NVE, whether synchronized or not. The latter is so because although vision protection will only be fully effective within a synchronized NVE, it may also be useful within a non-synchronized NVE where there are synchronized vehicles.

Figure 48:
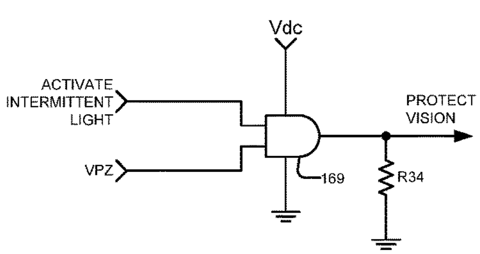
FIG. 48 shows a diagram of the circuit corresponding to the block "Vision protection" in FIG. 34, according to an exemplary embodiment of the invention.

FIG. 48 shows the simplified scheme of the circuit corresponding to block 167 of said FIG. 34. While the "protect vision" output signal is kept at high value the "Vision protection device" 168 of said FIG. 34 shall prevent or attenuate the light passage. The signal "protect vision" is obtained at the output of gate AND 169 whose inputs enter the "activate flashing" and "VPZ" signals. The gate AND 169 is powered by the voltage Vdc which disappears when the system is deactivated. Thus, when the system is deactivated, the output of AND gate 169, which is grounded through resistor R34, will remain low. Regarding the design of the "Vision Protection Device" 168, it will be conditioned by the techniques used to implement vision protection, some of which have been mentioned together with the formulation of the anti-dazzling method. The Vbatt voltage could be used to power the "Vision Protection Device" 168, if it should remain active when the system is deactivated.

The contents of the "System Activation and Power Supply" block 171 of FIG. 34 are shown in FIGS. 29, 30 and 31 and their operation has been explained in describing the characteristics common to all systems.

The function of the block "Control of the headlamps for the generation of continuous/flashing light" 172 of FIG. 34 is indicated by its own name. This block 172 has as inputs the signals "emit light pulse" from block 173, "activate continuous light" from block 110 and "force high beam" and "force low beam use" from block 111. In addition to controlling the front lights of the vehicle (type of light to be used and its intensity), this block 172 also generates the "switching reset" output signal. The implementation of said block 172 depends on the techniques to be employed to generate the flashing light, and its contents have already been shown in describing the characteristics common to all the systems in FIG. 32-33

Figure 49:
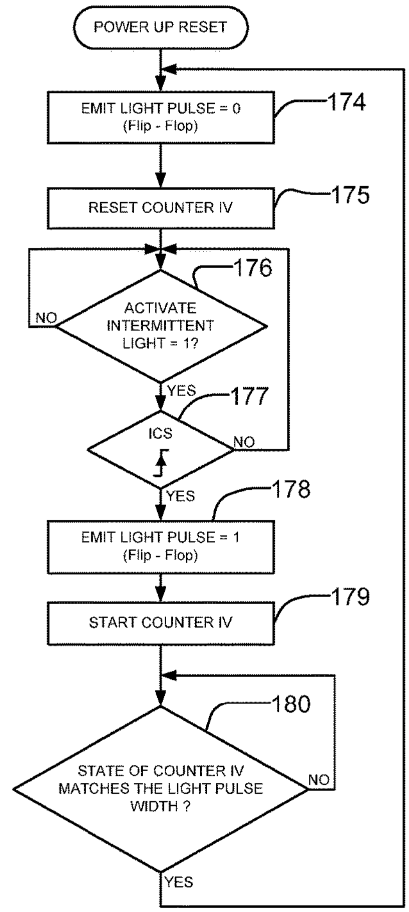
FIG. 49 shows the operation diagram corresponding to the block "Control of emission of light pulses" of FIG. 34, according to an exemplary embodiment of the invention.

The function of the "Light pulse emission control" block 173 of FIG. 34 is to handle the intermittent pulses of the vehicle. This block 173 has as inputs the "turn on flashing" signals from the block 110, "power-up reset" from the block 171, the "ICS" signal from the block 61 and a clock signal which will be formed by the output Qi of the counter/divider 11 which provides the time base for measuring the width of the light pulses. The output of said block 173 is the signal "emit pulse of light", which enters the block "Control of the headlamps for the generation of continuous/flashing light" 172. In FIG. 49 is shown the diagram of operation of said block 173. When a "power up reset" pulse occurs, the output "pulse light" is set to low value in step 174, in step 175, a counter is reset which we will call "counter IV", then while the signal "Enable flashing" is in value under the sequence will be maintained at decision point 176. When the "turn on flashing" signal is set to high value the sequence advances to decision point 177 from which it will return to decision point 176 while the "ICS" signal does not switch to high value. When the "ICS" signal switches to high value, the "emitting light pulse" output is set high in step 178 and the counter IV is started in step 179. As can be seen, with the signal "turn on". In high value, the emission of each pulse of light begins with the positive flank of the ICS. The counter IV is used to determine the time at which the output "emitting light pulse" should be set to low value, thereby limiting the width of the light pulses. Thus, at the decision point 180 when the counter IV reaches the value equivalent to the width of the light pulse, the sequence will restart in step 174 again.

FIG. 50 shows the simplified scheme of a circuit for implementing the block "Control of emission of light pulses" 173. The signal "power up reset" enters, through the gate OR 181, to the entrance of reset of the Flip-Flop D 182 in whose output Q the output "emitting pulse of light" is obtained. The output of said OR gate 181 also enters the "reset" input of counter IV whose clock input is powered by the output of gate AND 183. One of the inputs of said AND gate 183 is connected to the Q output of the Flip-Flop 182 and the other input is fed by a clock signal which, as already said, will be formed by the output Qi of the counter/divider 11 which provides the time base for measuring the width of the light pulse. When a "power up reset" pulse occurs, the Flip-Flop 182 and the IV counter will be reset by setting the "emitting pulse of light" low and preventing, by means of AND gate 183, the input of the clock signal to said counter IV so that it will remain at zero. The "turn on flashing" signal enters the Flip-Flop 182 data input and the "ICS" signal enters the clock input of said Flip-Flop 182. When the "ICS" signal switches high, Signal "to activate flashing light" in high value, the output "pulse light" is set to high value, enabling the input of the clock signal to the counter IV. When the counter IV reaches the value corresponding to the width of the fixed light pulse (PW), the output of the logic comparator 184, which enters the OR gate 181, will be set to high level by resetting the Flip-Flop 182 and the counter IV. When the latter occurs, the output of logic comparator 184 will no longer be high so that Flip-Flop 182 and counter IV will no longer be reset. In this way, when the counter IV reaches the value corresponding to the width of the desired light pulse, the output "emit pulse of light" returns to a low value.

Concepts and Characteristics Common to Anti-Dazzling Systems with Rear-View Protection.

Before proceeding with the description of the anti-dazzling systems that provide vision protection as well as rear-vision protection we will review some concepts regarding the interaction between vehicles applicable to such systems. The vehicular interaction capability of anti-dazzling systems that do not provide rear-view protection should be extended so that vehicles can provide, in addition to vision protection, rear-view protection.

Vehicles may interact forward with the front or rear of another vehicle, and may interact backwards only with the front of another vehicle (vehicles that have already crossed the road do not interact with each other). Obviously, to enable such interaction, the vehicle must have means for receiving on the front both the signals that a vehicle can transmit to the front and those that another vehicle can transmit backwards, and means for the reception behind the signals which a vehicle can transmit to the front. With respect to vehicle interaction, both ends of the vehicle will have the ability to act independently, so that the rear part of a vehicle will act within an NVE similarly to the front of a moving vehicle in the opposite direction with respect to the road.

Following these concepts, we can see that a simple way to conceive systems that provide vision protection and rear-vision protection emerges from treating each end of the vehicle as a separate entity. Thus, anti-dazzling systems with rear-view protection will be configured as two subsystems that we will call "Front Subsystem" and "Rear Subsystem". Based on the above, we will apply to each of these subsystems a design similar to that used in anti-dazzling systems that do not provide rear-view protection, to obtain corresponding anti-dazzling systems that provide rear-view protection. Anti-dazzling systems that provide rear-view protection will be described assuming that when a vehicle has to interact backwards with other vehicles it will do so by the emission of light pulses in the non-visible spectrum, or, in certain circumstances that will be described later, by means of the emission of pulses of visible light.

Detection of Light Received by the Front of the Vehicle

Systems providing vision and rear-view protection require the vehicle to detect on the front not only visible light but also the type of light vehicles use to interact with other vehicles backwards. The contents of the "Front Light Detection" block 65 of FIG. 34, schematically shown in FIG. 15, may be used in the front subsystem of the systems providing vision and rear-view protection, as long as the type of light used by the vehicles to interact backwards can also be detected by the light sensor 2 of said FIG. 15. Now, if in a system we want, for reasons to be discussed below, to discriminate whether the light receiving a light vehicle on the front includes visible light or not, then the front subsystem of said system shall use an enlarged version of said block 65 which includes the modifications shown in FIG. 76 and described below. The content of the "Light sensing module" 1 is the same as in FIG. 15, except that in this case the light sensor 2 must respond to visible light but should not respond to the type of light employed by the vehicles to interact towards behind. The function of the "Non-visible light sensing module" 1A is similar to that of the light sensing module 1 already described, the difference lies in the light sensor 2A, which must respond to the type of light used by vehicles for Interact backwards. The output signal of said module 1A enters through the filter 7A, which behaves like the filter 7 of FIG. 15, to the comparator 5A, whose reference voltage (Vrit) corresponds to a threshold, equivalent to the flashing light threshold and Described, which we will call the "threshold of backsliding".

Figure 76:
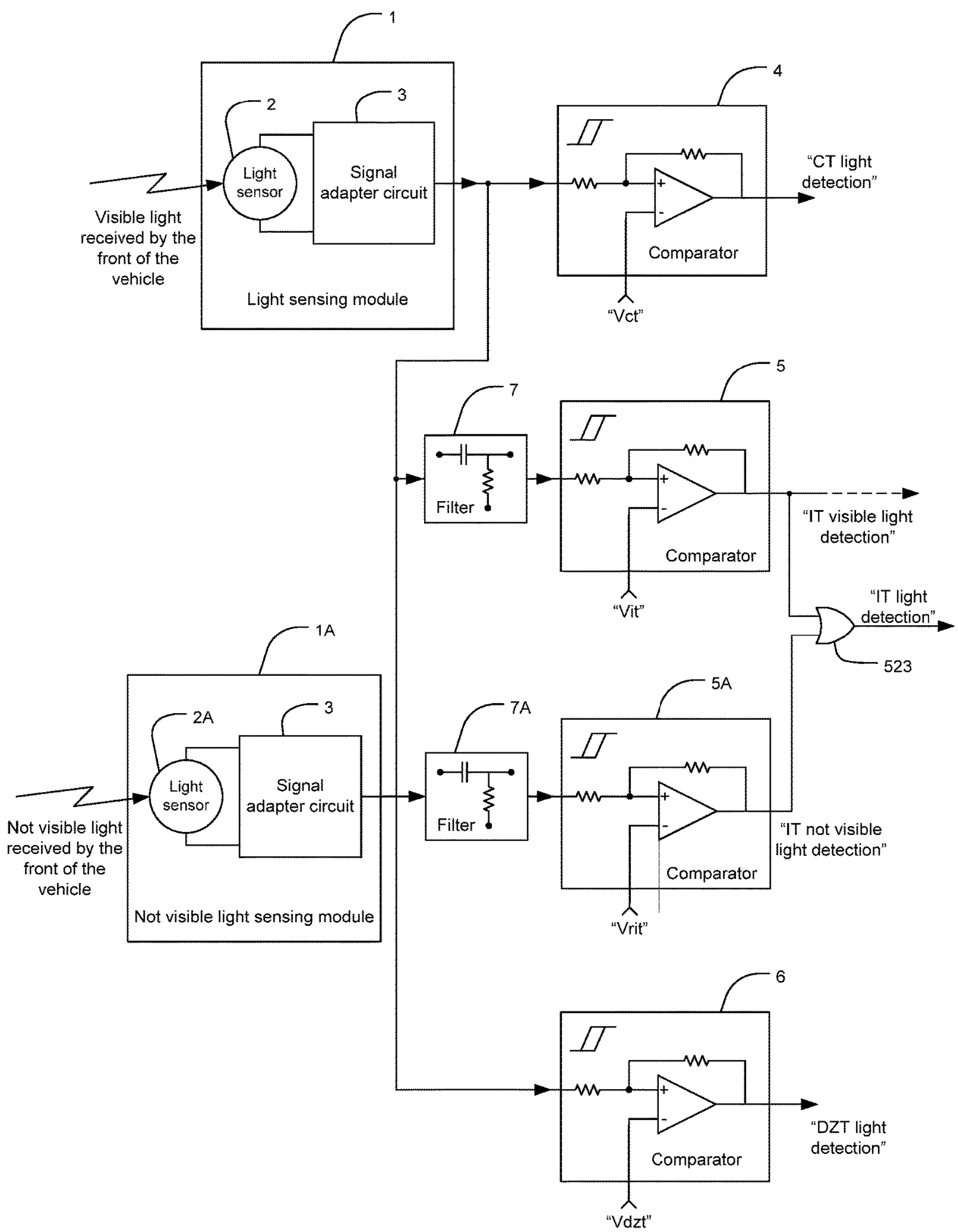
FIG. 76 shows the block diagram detecting both visible and invisible light received by the front of the vehicle, according to an exemplary embodiment of the invention.

The output of said comparator 5A, which we will call "non-visible light detection IT", will be presented in the form of a pulse in correspondence with each pulse of flashing light received by the light sensor 2A having an intensity higher than said threshold Retrofitting. Said output "non-visible light detection IT" enters one of the inputs of the OR gate 523. The comparator 5 is the same as in FIG. 15, only that its output has been renamed as "visible light detection IT" and enters to the other input of said OR 523 gate. The "light detection IT" signal is now obtained as the output of said OR gate 523. The comparator 4, the filter 7 and the comparator 6 of FIG. 76 are the same and perform the same function as those of FIG. 15. We must mention that in those systems where the EPIL phases that a vehicle can adopt are not restricted to two predetermined alternative phases it would be desirable to make the pulses entering the OR 523 gate sufficiently narrow to be able to distinguish, said gate, the pulses of light that said vehicle could receive offset and overlapping.

Detection of Light Received by the Tail of the Vehicle

Figure 77:
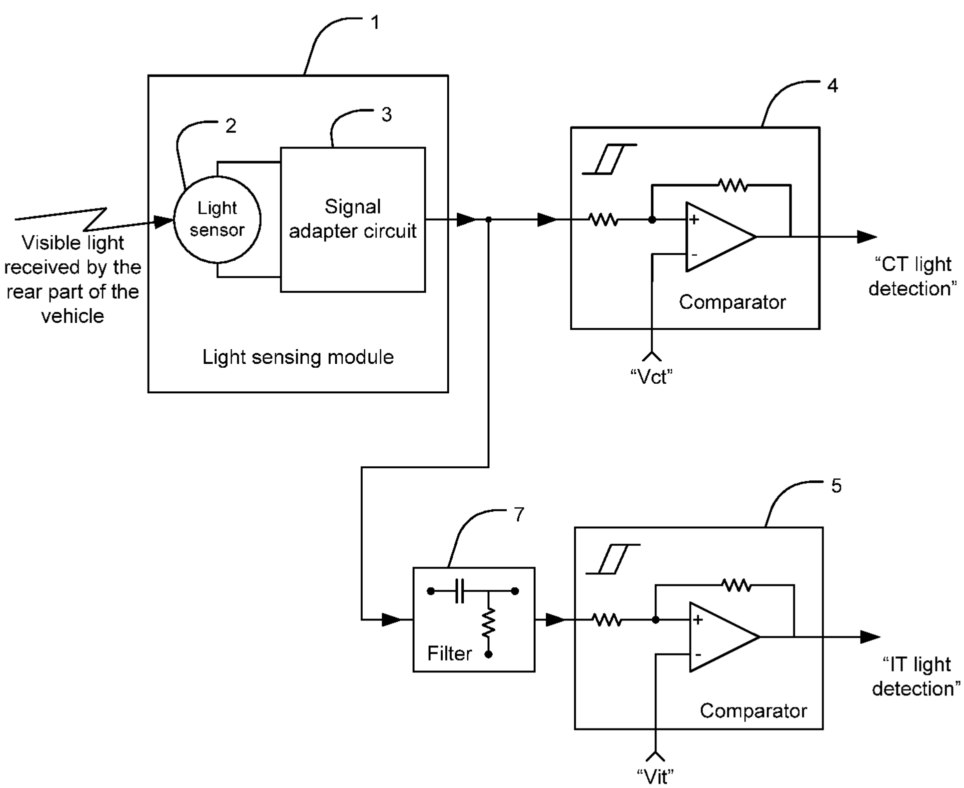
FIG. 77 shows the block diagram detecting visible light received by the rear of the vehicle, according to an exemplary embodiment of the invention.

Systems providing rear-view protection require the vehicle to detect not only the front but also the visible light emitted by other vehicles. The latter will be performed by the "Rear Subsystem" block called "Back Light Detection". The contents of this block may be equal to the contents of the block "Front light-receiving detection" shown in FIG. 15, however, because in some systems this block is not required to generate the " ", FIG. 77 Shows the contents of a simplified version in which the comparator 6 has been removed. In this block "Light detection received from behind", whether its content corresponds to that shown in FIG. 15 or to that shown in FIG. 77, the sensor of light 2 must respond only to visible light if you want to prevent vehicles that have just crossed the road from interacting with each other.

Externally Synchronized Anti-Dazzling System with Rear-View Protection

Figure 78A:
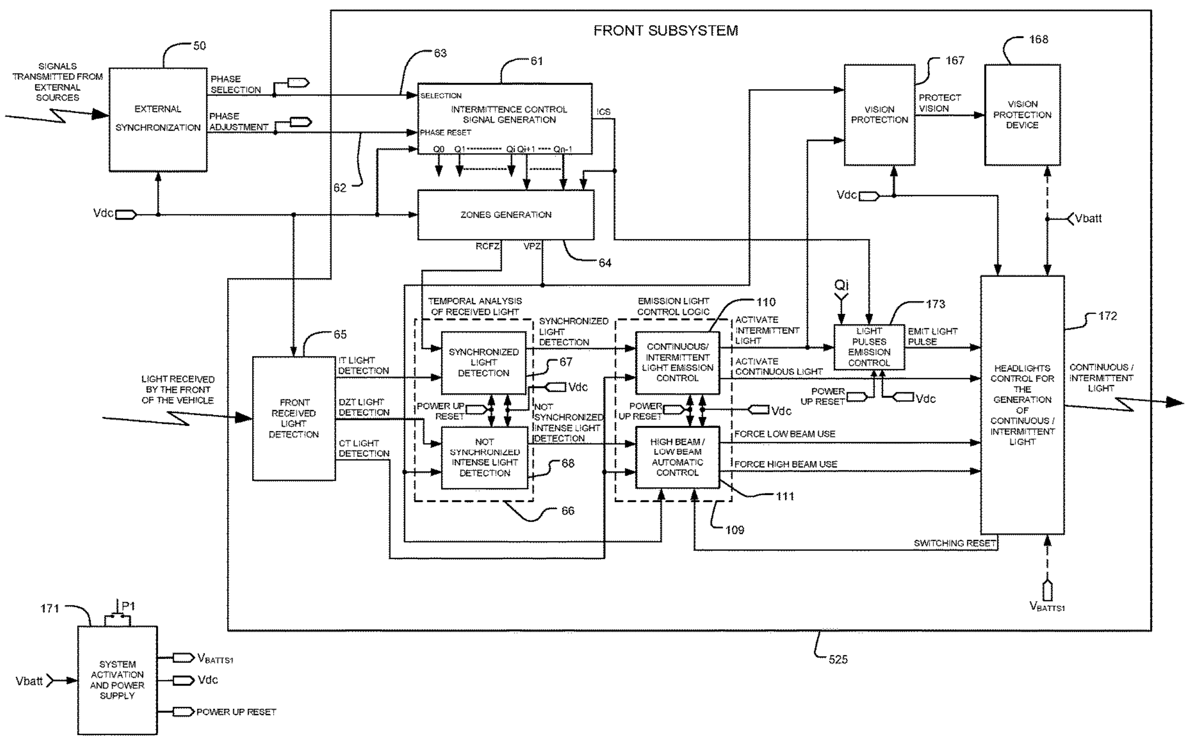
FIGS. 78A, 79A and 80A show block diagrams of the front subsystem for detecting signals transmitted from external sources, according to an exemplary embodiment of the invention.
Figure 78B:
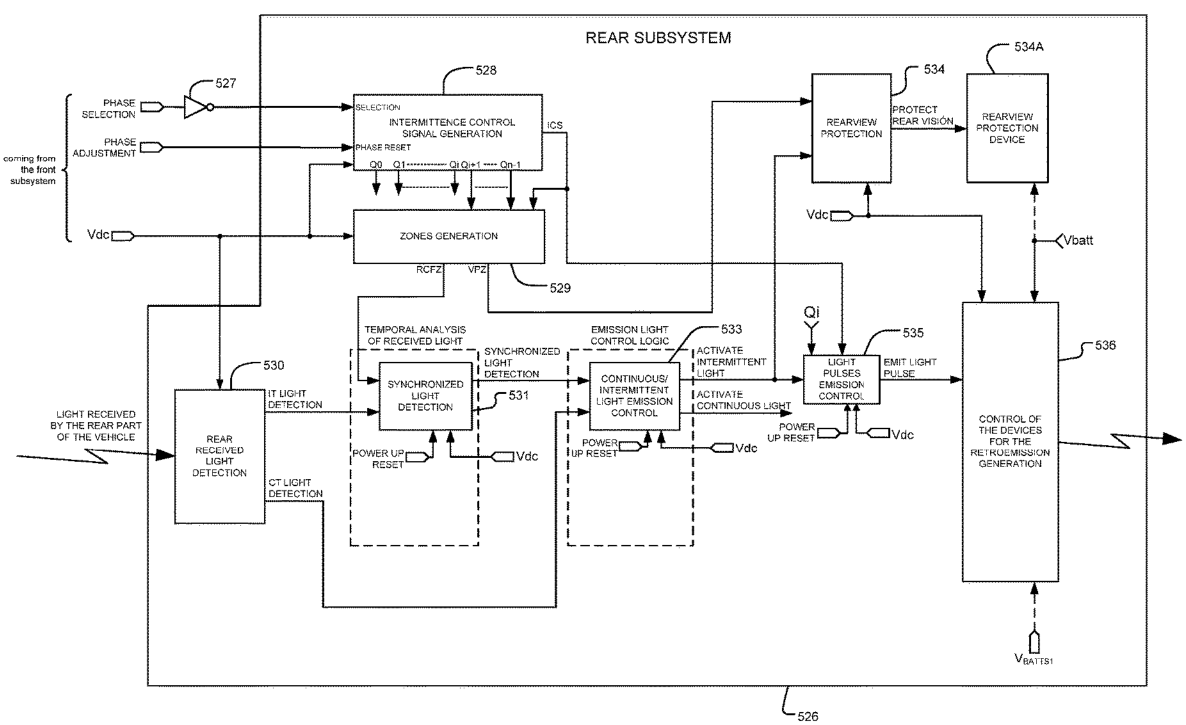
FIGS. 78B, 79B and 80B show the block diagram of the rear subsystem for detecting signals transmitted from external sources, according to an exemplary embodiment of the invention.

This system is based on the "Anti-dazzling method with rear-view protection" and makes use of the "External synchronization procedure". As previously announced, this system will be configured as two subsystems which we will call "Front Subsystem" and "Rear Subsystem", to treat each end of the vehicle as a separate entity when the front and/or tail of a vehicle participate in a NVE. FIG. 78 shows the block diagram of a first version of the Externally Synchronized Anti-dazzle system with rear-view protection. The blocks composing the composite block 525, which corresponds to the "Front Subsystem", and the "External Synchronization" blocks 50 and "System Activation and Power Supply" 171 are the same as those already shown in FIG. 34, and described Under the heading "Externally synchronized anti-dazzling system". In one embodiment of the system the "Front-Received Light Detection" block 65 has the contents schematically shown in FIG. 15, with a light sensor 2 capable of detecting both visible light and the type of light employed by the vehicles to interact backwards, as described under the heading "Concepts and Characteristics Common to Anti-Dazzling Systems with rear-vision Protection".

The contents of the composite block 526, which corresponds to the "Rear Subsystem", appears as a simplification of the "Front Subsystem" whose reaches will be dealt with below: the "Phase Selection" output of block 50 enters the rear subsystem through of an inverter 527 in order to cause the ICS generated in said rear subsystem, which we will call "back ICS", to have the opposite phase to the ICS generated in the front subsystem. In this way, the tail of the vehicle will use the same phase for the EPIL as the pre-assigned one in front of the vehicles that circulate in the opposite direction with respect to the road. The rear subsystem blocks 528, 529, 531, 533 and 535 are the same in name and content to the front subsystem blocks 61, 64, 67, 110 and 173 respectively, with the proviso that in this first version of the system, the output "Enable continuous light" of block 533 is not used. The contents of the rear-view mirror block 534 of the rear subsystem is equal to the contents of the front view subsystem "Vision protection" block 167. As long as the "backstop protection" output of said block 534 is maintained at high value the "Backstop Protection Device" 534A shall prevent or attenuate the light path. The design of this 534A device will be conditioned by the techniques used to implement the rear-view protection, some of which have been mentioned together with the formulation of the anti-dazzling method with rear-view protection.

In one embodiment of the system, the contents of the block "Light detection received from behind" 530 corresponds to that shown diagrammatically in FIG. 77, and described under the heading "Concepts and characteristics common to Anti-dazzling systems with rear-view protection". The "Control of Devices for the Generation of Retro-emission" block 536 has the sole function of generating the light emission that the vehicle will use to interact with other vehicles backwards, to this block it only enters the signal "emit pulse of light", so that it is of less complexity than its counterpart, the block 172 of the front subsystem. The implementation of said block 536 depends on the techniques to be employed to generate this "retro-emission".

Figure 79A:
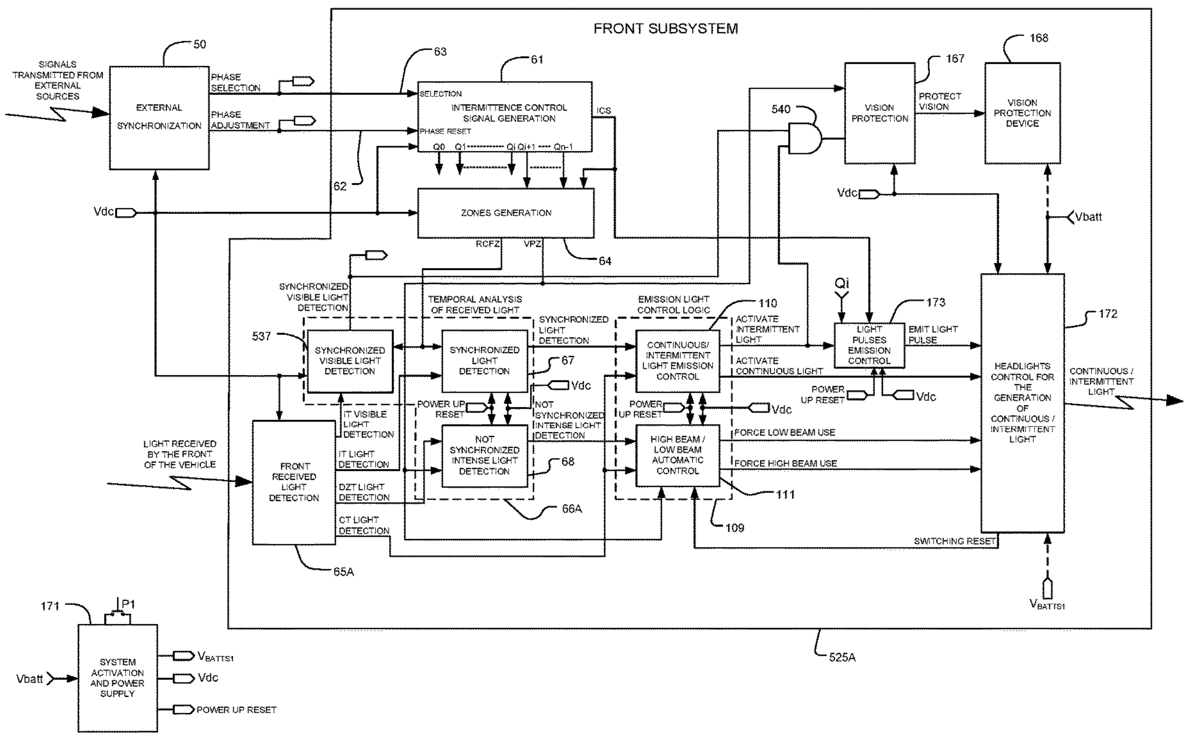
Figure 79B:
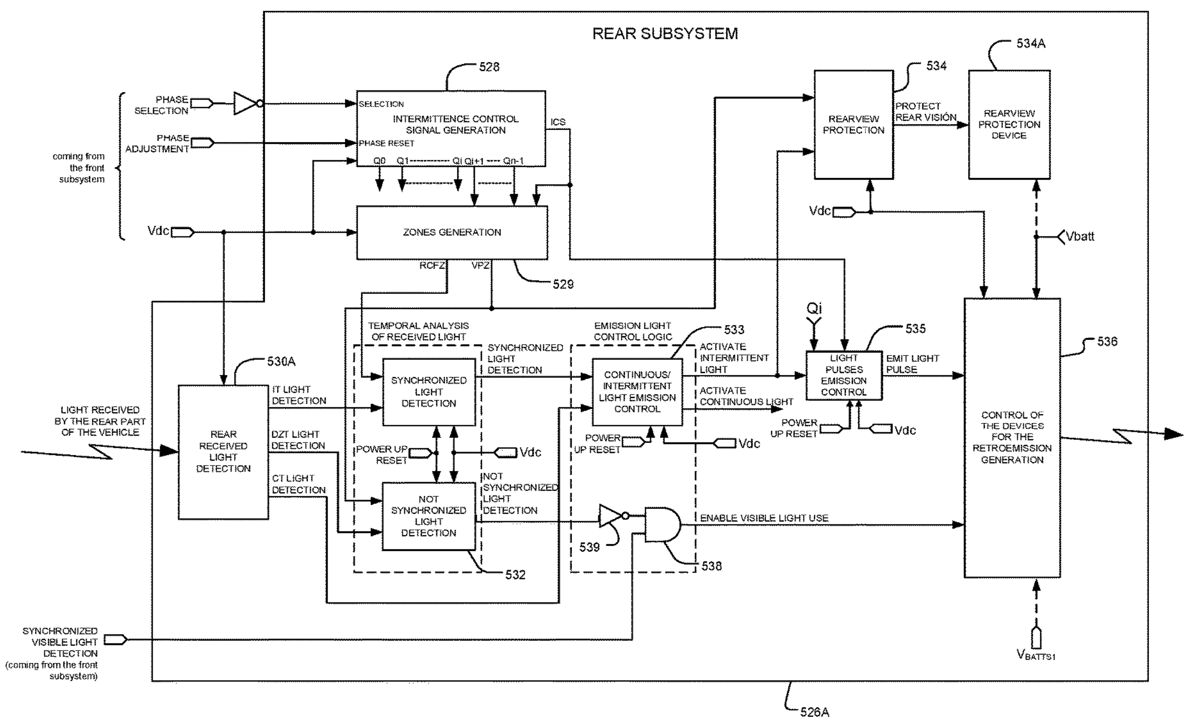

FIG. 79 shows the block diagram of a second version of the Externally Synchronized Anti-dazzle system with rear-view protection, which introduces two improvements to the first version of said system. The first improvement is to prevent the vehicle from activating the vision protection when that vehicle is detecting from front pulses of invisible light (only), i.e. those coming from the tail of another vehicle or other, as would for example in an NVE integrated by vehicles who advance in a single file. A second improvement has the purpose of allowing, under certain conditions, a vehicle to be able to emit pulses of visible light backwards, in order to cooperate with the vehicles that circulate in the opposite direction extending the area of the road that these vehicles can illuminate. The conditions for a vehicle to be able to emit pulses of visible light backward using the frequency and phase of the rear ICS are:

Condition No. 1: that the vehicle that is to emit pulses of visible light backwards faces other vehicles approaching in the opposite direction, so that there are drivers that can benefit from this additional illumination.

Condition No. 2: that the vehicle which is to emit pulses of visible light backwards does not have behind it on the road to unsynchronized vehicles whose drivers could be harmed by the light emitted backwards by the vehicle ahead.

From the block diagram of FIG. 79 only those blocks differing from those shown in FIG. 78 will be described. The composite block 525A of FIG. 79, corresponding to the front subsystem, presents the following modifications with respect to block 525 of FIG. 78: Block 65 is an enlarged version of block 65 of FIG. 78. The contents of this block 65 are shown in FIG. 76 and have already been described under the heading "Concepts and Characteristics Common to Anti-dazzling systems with rear-vision protection". The composite block 66A has the same content as the composite block 66 of FIG. 78 plus the addition of the block "Synchronized visible light detection" 537. The contents of this block 537 are equal to the contents of the block 67 already described and its operation diagram corresponds to that shown in FIG. 38, with the proviso that the entry "Light Detection IT" changes to "Detection of visible light UI" and that the "Synchronized Light Detection" output changes to "Synchronized Visible Light Detection". Said block 537 has the "Signal Light Detection IT" signal coming from the block 65 and the "CFZR" signal from the block 64 as inputs and outputs the "Synchronized Visible Light Detection" signal, which output will remain in high value while the vehicle is receiving pulses of synchronized visible light from the front. On the "Vision protection" block 167 of FIG. 79, as in FIG. 78, the "Turn on flashing" signal ads, with the difference that it does so through the AND gate 540 when the signal "Detection of Visible light synchronized", which also enters said gate AND 540, is in high value.

The composite block 526A of FIG. 79, corresponding to the rear subsystem, has the following modifications with respect to block 526 of FIG. 78: The contents of the block "Light detection received from behind" 530A corresponds to that shown schematically in FIG. 15, wherein the light sensor 2 of said FIG. 15 must respond only to visible light if we want to avoid vehicles that have just crossed the road from interacting with each other. The "Non-synchronized light detection" block 532 (which does not have its equivalent in the rear subsystem of FIG. 78) has the same content as the front subsystem block 68. The AND gate 538 and the inverter 539 represent another extension present in the rear subsystem of FIG. 79.

The way the modifications described affect the behavior of this system is described below. The "Visible Light Detection IT" output of block 65 makes it possible to determine whether the light being received by a vehicle from the front includes visible light or not, this output enters the "Synchronized Visible Light Detection" block 537 whose output determines whether the light vehicle is receiving pulses of synchronized visible light. To implement the enhancement No. 1, the "Synchronized visible light detection" signals from block 537 and "Turn on flashing light" from block 110, enter the AND gate 540 inputs, whose output, when high, allows through the "Vision Protection" block 167, the "protect vision" output is activated within the VPZ zone. In this way, the vision protection will only be activated when the vehicle is using its flashing light, but in front of vehicles that are also emitting pulses of visible light. This will prevent the vehicle from activating the vision protection when the vehicle is detecting from the front only pulses of invisible light coming from the tail of another vehicle, as would be the case, for example, in an NVE composed of moving vehicles in a single line.

The implementation of improvement No. 2 is described below. The output of block 5 FIG. 37 "Synchronized visible light detection" enters one of the inputs of the AND gate 538, while the output of the block 532 "Unsynchronized light detection" enters, inverted by the inverter 539, to the other input of said AND gate 538. In this way, the output of said AND gate 538, which we will call "Enable use of visible light" and entering the block "Control of the devices for generation of the retro-emission" 536, will be set to high value when the vehicle can emit visible light backwards. This is because the signal "Synchronized visible light detection" in high value indicates that it fulfills condition No. 1, while the signal "Detection of light not synchronized" in low value indicates that condition No. 2 is fulfilled, so that the output of the AND gate 538 in high value indicates that both conditions are fulfilled. It is to be noted that at block 530A it is convenient to adapt the activation threshold of the "DZT light detection" signal, which signal enters the block 532, to ensure that when a vehicle has behind it on the road to non-synchronized vehicles, the Signal "will be set to high value before the drivers of said non-synchronized vehicles could be harmed by the visible light emitted backwards by the vehicle ahead.

Formulation of the External Synchronization Procedure with Vehicle Assistance

A further procedure for establishing the synchronization required by the anti-dazzling methods already described is described below. This procedure referred to as "vehicle assisted external synchronization procedure" comprises the external synchronization procedure already described and further comprises the reception and processing of a "synchronization signal" by vehicles participating in an NVE without owning the phase of EPIL corresponding to its direction of movement with respect to the road, for said vehicles to obtain said EPIL phase from said synchronization signal, which will be transmitted, using a predetermined communication means, by another or other vehicles participating in Said NVE and that they do have the EPIL phase corresponding to their direction of movement with respect to the road.

This procedure is an extension of the external synchronization procedure which introduces some improvements thereto. These improvements are manifested when the particular case of a vehicle that does not have the correct EPIL phase is presented due, for example, to one of the following causes:

When a vehicle reverses its direction of movement with respect to the road, at a point thereof in which there are no transmission sources that allow it to update its phase selection signal.

When the EPIL phase of a vehicle has suffered a shift greater than the allowable because it has not received the phase adjustment signal for a longer time than that vehicle is capable of maintaining the correct EPIL phase. In this case, in which the vehicle does not have the correct EPIL phase, said vehicle can obtain said phase in the first NVE which integrates with another vehicle or vehicles that do have the correct phase. Thus, eliminating the problem that the presence of vehicles that do not have the correct phase within an NVE represents in the external synchronization procedure.

The means of communication to be employed in this method are included among those based on the transmission/ reception of electronic, magnetic, optical, acoustic signals or a combination thereof. It should be noted that the most natural and economical means of transmitting a synchronization signal from one vehicle to another at the front is provided by the EPIL itself of each vehicle.

The following are some alternatives for carrying out the reception and processing of the synchronization signal by those vehicles that do not have the correct EPIL phase and how that signal is transmitted by the vehicles that do have that phase and That integrate a same NVE with the first ones.

(a) When the anti-dazzling method is applied (without rear-view protection), vehicles shall be capable of directional forwarding of a synchronization signal which may be captured by vehicles traveling in the opposite direction. The vehicles must therefore have means for receiving said signal arranged in such a way as to enable them to receive said synchronization signal from the front. The phase contained in the synchronization signal transmitted by a vehicle will be the phase corresponding to the EPIL of said vehicle. The vehicles of said NVE which do not possess the EPIL phase corresponding to their direction of movement with respect to the road extract the phase contained in the received synchronization signal and from there elaborate and adopt the corresponding counter-phase for the EPIL. In this way, all NVE vehicles will be synchronized. If it is chosen to make the synchronization signal transmitted by a vehicle EPIL itself, the reception of said synchronization signal will be based on the use of optical sensors.

(b) When anti-dazzle method with rear-view protection is applied, vehicles shall be capable of directional transmission of forward and backward synchronization signals in the road. The phase contained in the synchronization signal that a vehicle transmits directional forwardly will be the phase corresponding to the EPIL of said vehicle and the phase contained in the synchronization signal that a vehicle transmits directionally backwards will correspond to the counter phase of the EPIL of said vehicle.

The vehicles must have means for capturing the synchronization signals transmitted by other vehicles, means which will be arranged in such a way as to allow a discernible whether a synchronization signal is received by or behind the front of the vehicle. The vehicles of said NVE that receive the synchronization signal from the front and do not possess the EPIL phase corresponding to their direction of movement with respect to the path, extract the phase contained in said synchronization signal and from it develop and adopt the Counterpart for EPIL. On the other hand, vehicles of said NVE which receive the synchronization signal from behind and do not possess the EPIL phase corresponding to their direction of movement with respect to the path simply adopt the EPIL phase contained in the received synchronization signal.

The reason for making a vehicle transmit back a synchronization signal is to enable the application of this procedure in an NVE composed of vehicles that all circulate in the same direction. This synchronization signal transmitted back by a vehicle contains the phase opposite to that used by said vehicle for the EPIL. This is done thus to transmit to the vehicles that circulate behind a signal of synchronization equivalent to the one that would receive of another or other vehicles that turn in the opposite direction. If it is chosen to cause the vehicles to transmit the forward sync signal using the EPIL itself, then it would be desirable for those vehicles to transmit the synchronization signal backwards by emitting back a non-visible light signal (e.g. infrared light) equivalent to the EPIL of the vehicle with respect to being able to pass phase information to the vehicles that come behind but in counter phase with said EPIL, that we will call "EPIL back", where the frequency and phase of said EPIL back will be controlled by a signal equivalent to the ICS already described, which we will call "back ICS". Within an already synchronized NVE, such rear EPIL could be performed using visible light for an additional purpose: that vehicles driving in a certain direction with respect to the road can cooperate with those traveling in the opposite direction, extending the area of the road that the Vehicles can illuminate. It should be noted that in this case the pulses of visible light of said rear EPIL will not disturb the drivers of the vehicles circulating behind as these drivers will have the vision protected when said pulses of light become present. If it is chosen to cause the vehicles to transmit the synchronization signals using pulses of light, the means for receiving said synchronization signals will obviously be based on the use of optical sensors.

The signal that a vehicle transmits backwards, while it has no other utility than that of transmitting information, could have a frequency lower than the one corresponding to the EPIL, as long as a vehicle can extract from it the correct phase for the EPIL. To this end, the synchronization signal that a vehicle transmits back should have a frequency that is an odd exact sub-multiple of the frequency corresponding to the EPIL.

We will say that two pulsating signals of different frequencies, one of said frequencies being precisely multiple of the other, are in phase if each time the lower frequency signal has a positive edge, the higher frequency also has a positive edge. By way of example, note that the signals A and B of FIG. 9 are in phase.

We will also say that two pulsating signals of different frequencies, one of said frequencies being an exact odd of the other, are in counter phase if each time the lower frequency signal has a positive edge, the counter phase of the higher frequency signal Also has a positive edge. As an example, note in FIG. 11 that the signals A and D are in counter phase, since the signal A is in phase with the signal C, the latter being the counter phase of the signal D. Note also that the signals B and C are also in COUNTERPHASE.

Externally Synchronized Anti-Dazzling System with Vehicle Assistance

FIG. 51 shows the block diagram of the "Externally Synchronized Anti-Dazzling System with Vehicular Assistance". This system is based on the anti-dazzle method already described and makes use of the external synchronization procedure with vehicular assistance and will be implemented from the "Externally Synchronized Anti-Dazzling System" previously described, adding to the latter system the improvements announced in said external synchronization procedure with vehicular assistance. For the above reasons, the blocks and signals of FIG. 51 coincide in name, function and description with the blocks and signals of FIG. 34, except for the block "External synchronization with vehicular assistance" 185 and the Restricted Conflict Zone (RCZ) signal which only enters the said block 185 and is provided by the block "Generation of zones" 187. Thus, the contents of the blocks 186, 188, 189, 190, 191, 192, 193, 194, 195, 195A, 196, 197 and 198 of FIG. 51 correspond to the contents of the blocks 61, 65, 66, 67, 68, 109, 110, 111, 167, 168, 171, 172 and 173 of FIG. 34, respectively.

Figure 52:
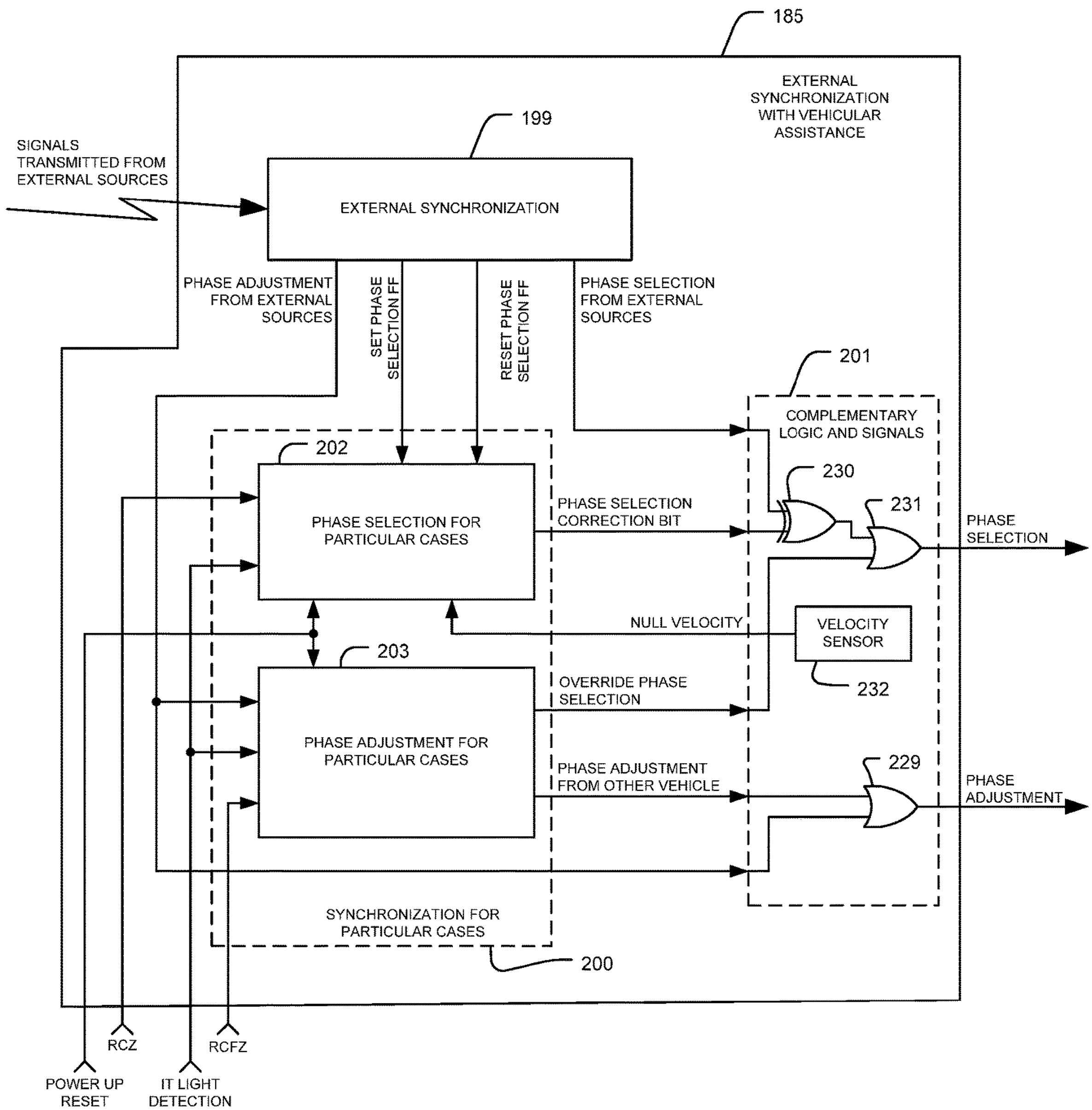
FIG. 52 shows a diagram of the contents of the "External synchronization with vehicular assistance" block in FIG. 51, according to an exemplary embodiment of the invention.

FIG. 52 shows a simplified diagram of the contents of the "External Synchronization with vehicular assistance" block 185 of FIG. 51, which is composed of the "External Synchronization" blocks 199, "Synchronization for particular cases" 200 and "Logic and complementary signals" 201. The contents of the block "Logic and complementary signals" 201 comprises the gates OR 231 and OR 229, the exclusive OR gate 230 and the speed sensor 232. The speed sensor 232 produces the "minimum or zero speed" signal which will be activated when the vehicle reduces its speed to a minimum permissible or stops, thus indicating that there is a possibility that said vehicle has reversed its direction of movement with respect to path.

The "External Synchronization" block 199 has the same function and description as the homonymous block 50 of FIG. 34 which is described by FIG. 35-36, except that the "Phase Selection" and "Adjustment Phase selection" of said block 50 have been renamed in said block 199 as "Phase selection obtained from external sources" and "Phase adjustment obtained from external sources" respectively and in addition, "Phase select FF" and "Reset phase select FF", which are internal signals in said block 50 (see FIG. 35-36), are now outputs from block 199. The function of the "Synchronization for Particular Cases" 200 block is that the vehicle can obtain from another vehicle the correct phase for the EPIL when for some reason said phase is not provided by the "External Synchronization" block 199. This block 200 is in turn integrated by the blocks "Phase selection for particular cases" 202 and "Phase adjustment for particular cases" 203.

The "Phase Adjustment for Particular Cases" block 203 has the function of adjusting the phase of the vehicle's ICS when the "External Synchronization" block 199 fails to provide the "phase adjustment obtained from external sources" signal during a longer than the permissible time, as long as the vehicle is receiving intermittent non-synchronized light. This phase adjustment of the vehicle ICS will be carried out through the outputs of said block 203 "Phase adjustment obtained from another vehicle", which acts on the OR 229 gate, and "Block phase selection at high value", which acts on the OR gate 231, as detailed below. The signals that enter this lock 203 are: "phase adjustment obtained from external sources", "light detection IT", "RCFZ" and "power up reset".

The "Phase Selection for Particular Cases" block 202 will reverse the vehicle's ICS phase when said vehicle is receiving flashing light with the opposite phase than it would receive in a synchronized NVE, provided that the "minimum speed or zero" from the sensor 232 is in high value indicating that the vehicle has reduced its speed to the limit of the allowable, which allows to assume that said vehicle is the one that has inverted its direction of movement with respect to the road. This phase reversal of the vehicle ICS is carried out by setting the output of said block 202 called the "phase selection correction bit", which ads on the exclusive OR gate 230 by reversing the state of the "Phase selection obtained from external sources" at the output of said exclusive OR gate 230. The signals entering this block 202 are: "set FF of phase selection" and "reset of phase selection FF" from block 199, "Light detection IT" from block 188 of FIG. 51, "RCZ" from block 187 of FIG. 51, "minimum or zero speed" from the speed sensor 232, and "power up reset".

Before describing in detail the contents of blocks 202 and 203 it is necessary to explain the function of the "RCZ" signal. We will call "RCZ" a signal that identifies the time space or zone, within the period T of the ICS, that we will call "Restricted Conflict Zone". From now on, the "zones" defined within the T period of the ICS and the signals that identify those zones will be indicated by the same acronym, for example, we will use RCZ to refer to both the restricted zone and the signal which identifies said zone. A vehicle shall detect within the RCZ the positive side of the intermittent pulses of light coming from another vehicle coming in the opposite direction and having the opposite phase to that corresponding to a vehicle synchronized with the first one (when we say, "positive edge of a light pulse" we refer to the "positive edge generated by the corresponding detector"). Thus, if one of these two vehicles reverses the phase of their ICS, the positive edge of the pulses of light received by those vehicles will now fall into the RCFZ of such vehicles, therefore, generating the RCZ for an ICS is equivalent to generating the RCFZ for the (see timing of FIG. 53) For example, where there is a possibility that the vehicle has reversed its direction of movement in The route ("minimum or zero speed" signal=1) the system will analyze, by block 202, whether pulses of intermittent light are received whose positive flanks fall into the RCZ and if so inverted The phase selection will be activated by activating the "phase select correction bit" output, as explained below. FIG. 54 shows the operation diagram of the block "Phase selection for particular cases" 202. The "phase selection correction bit" output is set low in step 204 when a pulse appears on one of the "set phase FF set" or "phase select FF reset" signals from the block "External Synchronization" 199 of FIG. 52, and said output will be kept low while at the decision point 205 the "minimum or zero velocity" signal remains at a low value. Thus, as long as the "phase selection correction bit" output is inactive, the phase selection will be handled by the "Phase selection obtained from external sources" output of block 199. When the "minimum or zero speed" is activated or when a "power up reset" pulse is received, block 202 will correct, if necessary, phase selection. For this it must be determined if the vehicle is receiving intermittent light whose positive flanks fall into the RCZ. This is done by the temporal analysis of the signal "detection of light UI" in relation to the signal RCZ.

The algorithm used, hereafter referred to as the "tolerant verification" algorithm, is basically the same as described in the "externally synchronized anti-dazzle system" to generate the "synchronized light detection" signal (see block 67 of the FIG. 34) and which is reproduced below adapted for this case. The algorithm is based on verifying during a time interval that we will call "$t_6$" if the signal "detection of light UI" is giving positive flanks inside the RCZ with certain regularity own of the flashing light. Said time "$t_6$" will have a duration of several periods T and will be controlled by the "counter VI" which, after reaching the value corresponding to said time "$t_5$", will cause the "phase selection correction bit" change status on the other hand, the regularity of the flashing light will be controlled by another counter that we will call "counter V", which will be reset every time the "light detection IT" signal has a positive edge inside the RCZ. So that if said counter V reaches the value corresponding to the time "$t_5$", the reception of flashing light is discarded because it does not present the required regularity and the counter VI is reset, thus avoiding reaching the value corresponding to the time "$t_6$". Obviously, the minimum value that can be given to "$t_5$" is T. Assigning a higher value (for example 2T or greater) makes this algorithm "tolerant". Now we return to the description of the operation diagram assuming that the signal "power up reset" or the signal "minimum or zero speed" has been activated. In step 206 the counter VI is reset and stops and in step 207 the counter V is reset and started, so that the sequence will advance, through the decision points 208 and 209, to the decision point 210. Here, when the signal "light detection IT" has a positive edge with the signal RCZ being active the sequence will include the steps . . . 210, 211, 212, 207, . . . leaving the counter VI enabled to count in step 212, and zeroing the counter V in step 207. If this sequence is repeated, without the counter V reaching the value corresponding to the time "$t_5$", when the counter VI reaches the value corresponding to the time "$t_6$"—in step 209—the output "correction bit of the selection of Phase" will change state in step 213 and then the counter VI will be reset and stopped in step 206, and the counter V will be reset (and started) in step 207. On the other hand, when the vehicle stops detecting pulses of Light whose positive flanks fall into the RCZ the counter V will reach the value corresponding to the time "$t_5$" and the sequence will pass from the decision point 208 to the step 206 to reset the VI counter, and then reset and start the counter V on step 207. It is important to note that, in step 213 instead of setting the "phase selection correction bit" high value, the state of said signal is changed so that, until the phase selection returns to be controlled by the "Yes" block. External timing "199, said signal may be changed back to suit any particular situation that may arise on the route.

Figure 55:
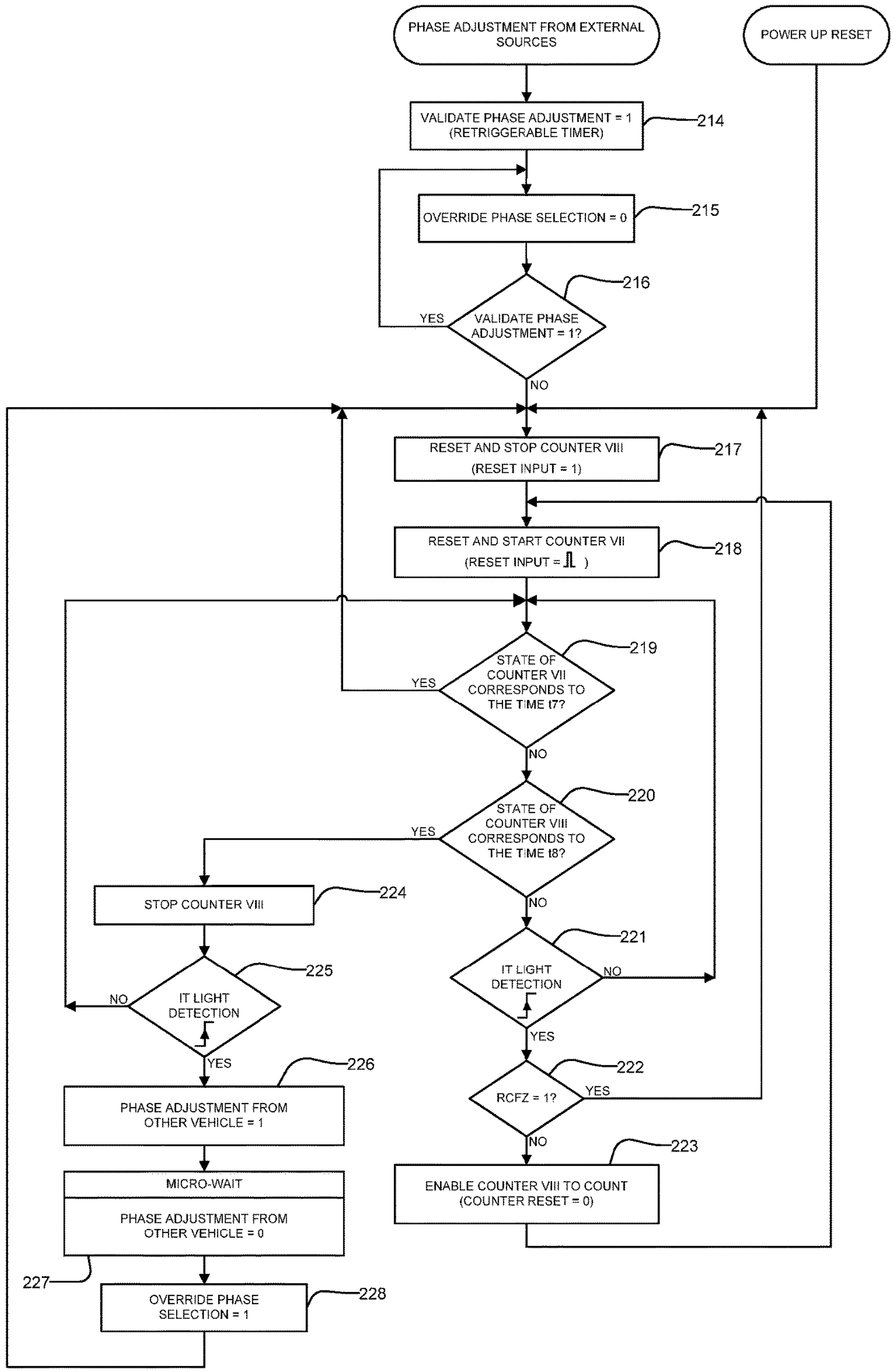
FIG. 55 shows the operation diagram of the block "Phase adjustment for particular cases" in FIG. 52, according to an exemplary embodiment of the invention.

FIG. 55 shows the operation diagram of the "Phase adjustment for particular cases" block 203. Each time a pulse appears in the signal "phase adjustment obtained from external sources" the timer resettable "validate adjustment of Phase" is triggered (or redisplayed) in step 214. While said timer is active the "block phase selection at high value" signal will be kept low, see sequence given by steps 214, 215, 216, 215. If for some reason the "phase adjustment obtained from external sources" signal stops pulsating, allowing the timer to "validate phase adjustment" is extinguished, then the sequence advances to step 217. The same occurs when a pulse of "Power up reset". From step 217, when the vehicle participates in an NVE and does not receive synchronized light pulses, i.e. when it is receiving only light Intermittent not synchronized, this block 203 will adjust the phase of the ICS of the vehicle. For this purpose, the temporal analysis of the signal "detection of light UI" in relation to the signal "RCFZ" will be carried out by means of a "tolerant verification" algorithm as described for block 202. Thus, if the counter VIII achieves the value Corresponding to the time "$t_8$", in step 220, it is confirmed that the vehicle is receiving only non-synchronized blinking light. On the other hand, the regularity of the flashing light will be controlled by another counter which we will call "counter VII", which will be reset each time the "light detection IT" signal has a positive edge. So that if said counter VII reaches the value corresponding to the time "t7", the reception of intermittent light is discarded because it does not present the required regularity and the counter VIII is reset, thus avoiding reaching the value corresponding to the time "$t_8$". That said, we can see that the sequence that includes steps . . . 221, 222, 223, 218 . . . corresponds to the situation that keeps the counter VIII enabled to count. The return path from step 221 to step 219 corresponds to waiting for the next unsynchronized light pulse. The sequence . . . 222, 217, 218, . . . occurs when the vehicle has received a synchronized light pulse which calls into question that said vehicle must readjust its phase and therefore both meters VIII and VII in steps 217 and 218 respectively. The sequence 219, 217 and 218 occurs when the vehicle is not receiving flashing light and thereby zeroes both counters VIII and VII. When the counter VIII reaches the value corresponding to the time "$t_8$" the sequence passes from the decision point 220 to the step 224 in which said counter is stopped but not reset. This is done to enable the sequence 225, 219, 220, 224, 225 corresponding to the wait of the first light pulse after confirming reception of non-synchronized flashing light. When said first light pulse is presented, the sequence goes to steps 226 and 227 in which the "phase adjustment obtained from another vehicle" signal is activated in the form of a narrow pulse. Said "phase adjustment obtained from another vehicle" signal enters, through the OR gate 229, the "reset" input of the counter/divider 11 used in the "Generation of the flashing control signal" block 186 of the FIG. 51 (see FIG. 20). Thus, the output Qn of said counter/divider 11 (like all its other outputs) is set to low value at the time the ICS of the vehicle emitting said first light pulse was set to high. Therefore Qn must be selected as the ICS of the vehicle "receiver" of said first pulse of light to achieve the synchronization of its lights. To achieve this in step 228 the "block phase selection at high value" signal is activated. This signal, through OR gate 231, sets a high value at the "select" input of said block 186 of FIG. 51, which sets Qn as the ICS of the vehicle (see FIG. 20). The sequence then returns to step 217 whereby the phase adjustment will continue to be carried out by the "Phase adjustment for particular cases" block 203 until the "phase adjustment obtained from external sources" signal is again received.

We will now expand the description of the block "Logic and complementary signals" 201 of said FIG. 52, which will be done, given the simplicity of this block, based on the logical scheme drawn therein. The "phase adjustment" output is obtained by the logic OR operation between the "phase adjustment obtained from external sources" and "phase adjustment obtained from another vehicle" signals. Said logic operation is represented in FIG. 52 by the OR gate 229. The "phase selection" output is obtained as the logical sum, represented by the OR gate 231, between the "block phase selection in high value" signal from the Block 203 and the result of the exclusive OR, represented by the exclusive OR gate 230, between the "phase selection correction bit" signal from the block 202 and the "phase selection obtained from external sources" signal from the block 199 As can be seen, when the "block phase selection at high value" signal is set to high value, the "phase selection" output will be set high regardless of what value the signals entering said exclusive OR gate 230.

On the other hand, when the signal "block phase selection at high value" is at low value (inactive) the value of the "phase selection" output will have the same value as the "phase selection obtained from external sources" signal if the "phase selection correction bit" signal is set to low value and will have the counter value if the "phase selection correction bit" signal is high, as set by the exclusive OR logic operation. As already mentioned, the speed sensor 232 produces the "minimum or zero speed" signal which must be activated when the vehicle reduces its speed to the minimum permissible or stops.

The "Zone Generation" block 187 of this system generates the same signals as the "Zone Generation" block 64 of the Externally Synchronized Anti-Dazzle System, and further generates the RCZ signal, as described in the above-mentioned manner. To delimit this RCZ zone we use:

$$\text{start\_time} = \frac{2^{n-i}}{2} - \Delta$$

$$\text{stop\_time} = \frac{2^{n-i}}{2} + \Delta$$

where, as already said:

$2^{n-i}$: Is the duration of the period T of the ICS measured in periods of an output Qi of the counter/divider 11 (see FIG. 20). The period of said output Qi being the time base chosen to define said start and end times.

Δ: Is the same margin of tolerance as defined in the conflict-free zone (Δt see FIGS. 23A-G) measured in periods of said output Qi of the counter/divider 11 chosen as the time base.

Figure 53:
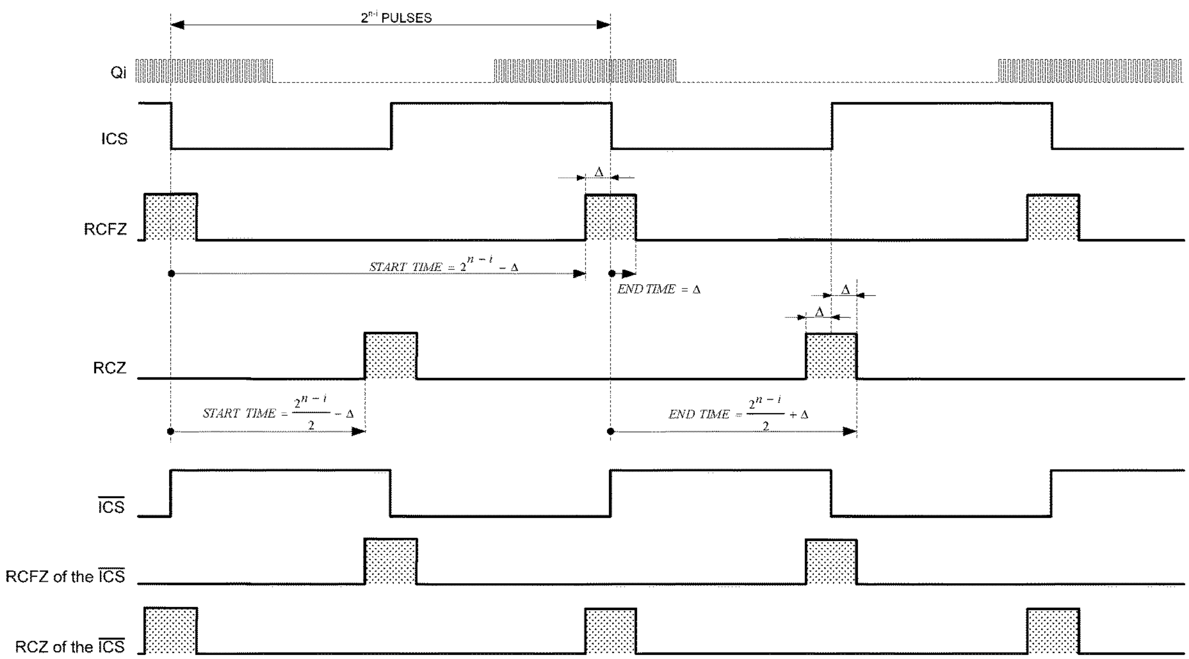
FIG. 53 shows the timing of the signals $Q_i$, ICS, RCFZ, RCZ, $\overline{ICS}$, RCFZ and RCZ corresponding to the $\overline{SCI}$, of a vehicle, according to an exemplary embodiment of the invention.
Figure 54:
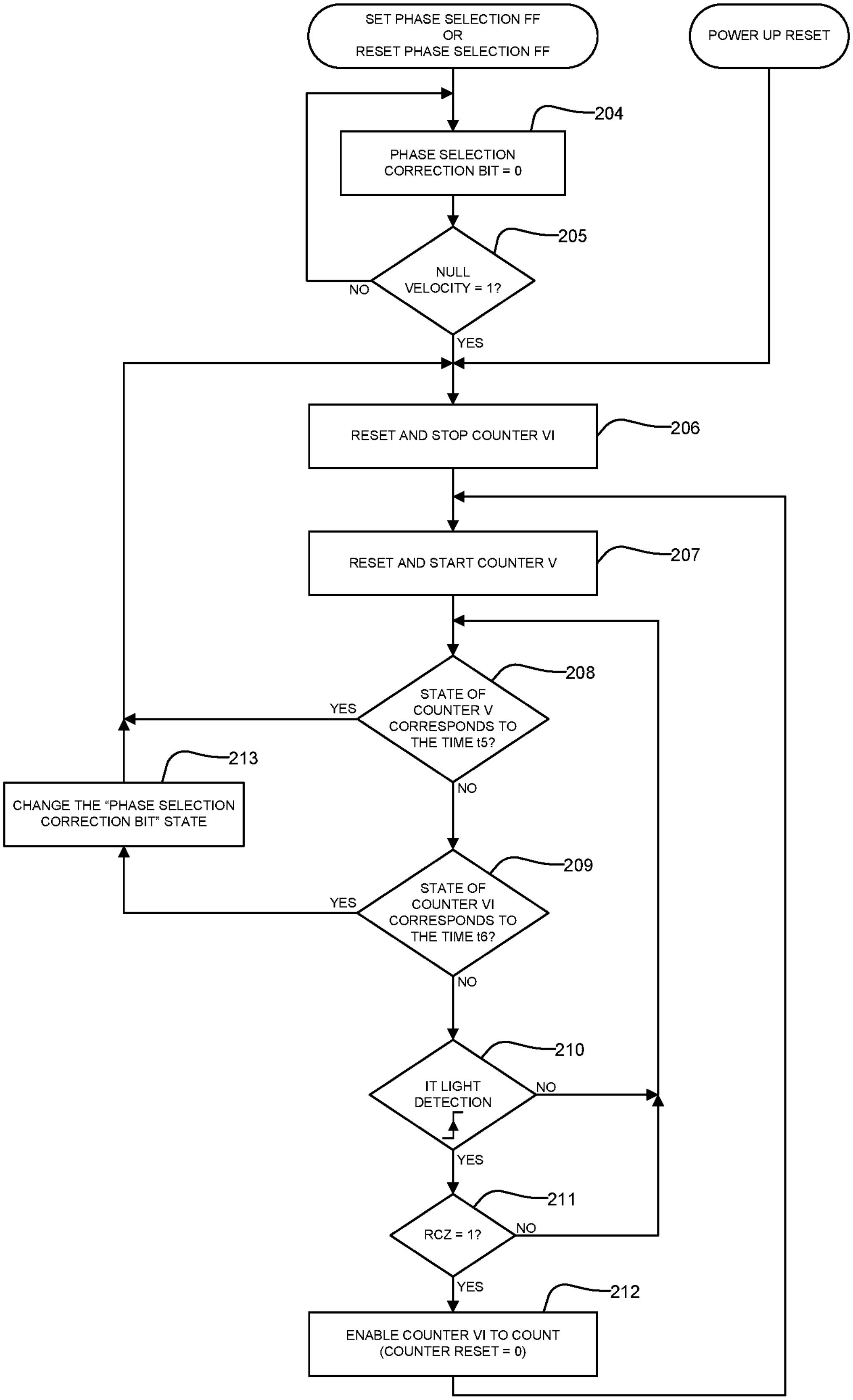
FIG. 54 shows the operation diagram of the block "Phase selection for particular cases" in FIG. 52, according to an exemplary embodiment of the invention.

In order that the start and end times of the RCZ can be easily visualized, they have been indicated in FIG. 53 along with the times corresponding to the RCFZ.

If the "Continuous/Blinking Light Emission Control" block 193 of FIG. 51 is configured so that the vehicle does not use permanently flashing light unless it is receiving synchronized light (see description of FIG. 43), then it must be taken into account that the "turn on flashing" timer should be longer than the time required by the "Synchronization for particular cases" block 200 to synchronize the vehicle lights. Said time will be determined by the times "$t_6$" or "$t_8$" depending on whether the block 202 has been "activated" in block 202 or 203 respectively (note that the times "$t_6$" and "$t_8$" could have the same value). Beyond the configuration that is chosen for the block "Control for the emission of continuous/flashing light" 193, it is own of the operation of the system that the timer "to activate flashing light" has more duration than the time that requires the block "Synchronization for particular cases" 200 to synchronize vehicle lights, since "$t_6$" and "$t_8$" times being used to qualify as "flashing" the received light, these times can be as small as, for example, 10T or 20T, i.e. on the order of the tenth of a second, while the "turn on flashing" timer, which determines how long a vehicle will continue to use flashing light that has stopped receiving synchronized light, will have a duration that can be measured in seconds.

For this system, circuit diagrams are not attached to the operating diagrams of each block, because such circuit diagrams are not fundamental to describe the operation of the system since other alternatives of implementation could be chosen, such as those based on the use of microprocessors.

Figure 80A:
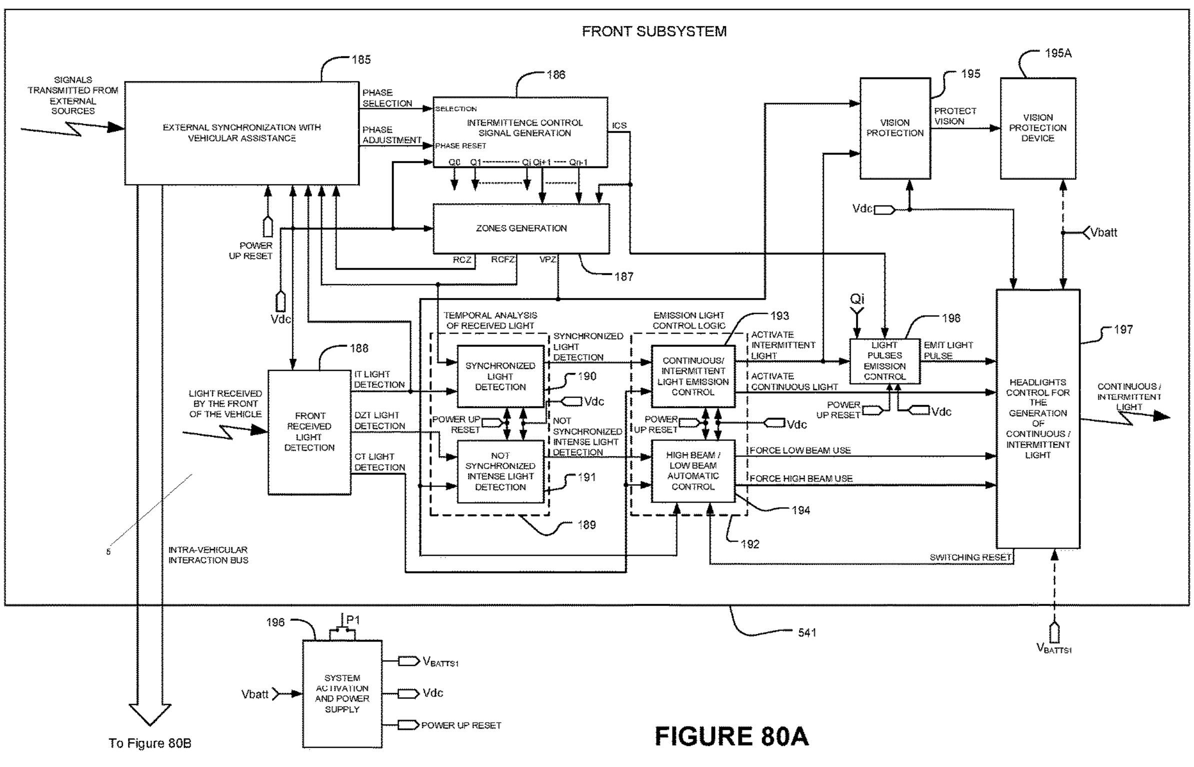
Figure 80B:
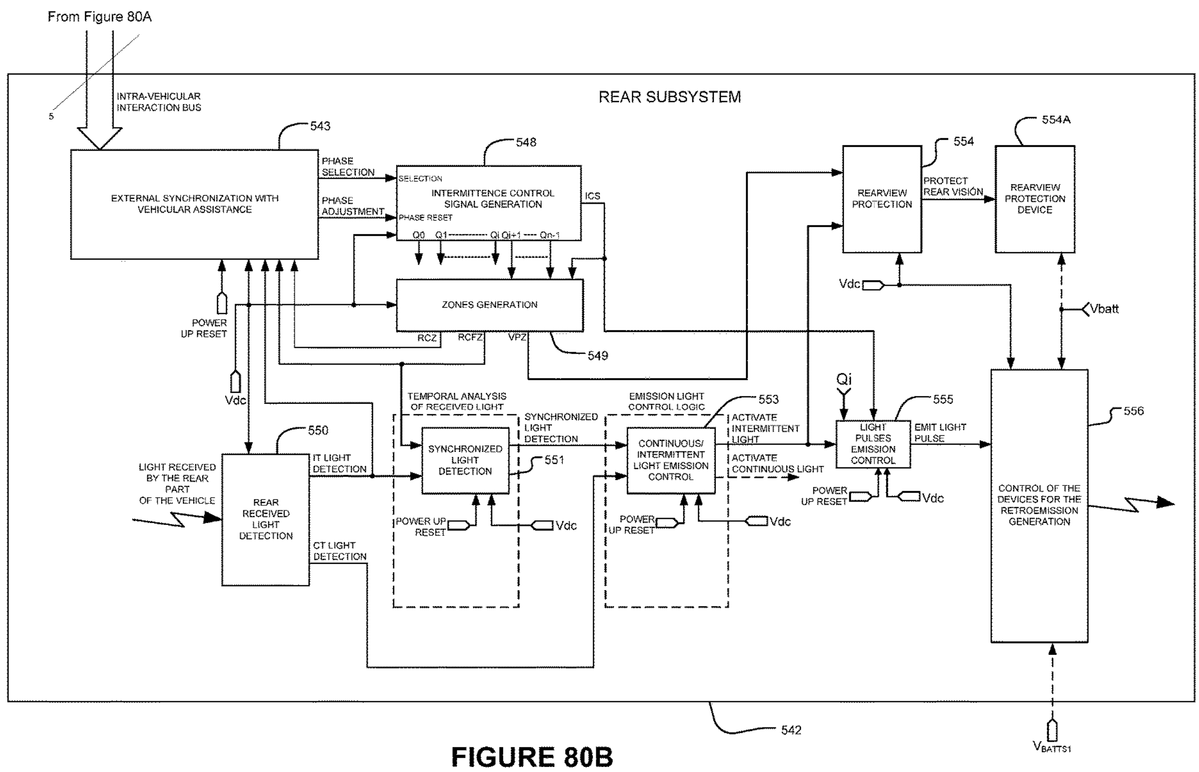

Externally Synchronized Anti-Dazzle System with Vehicle Assistance and Rear-View Protection This system is based on the "anti-dazzling method with rear-view protection" and makes use of the "External synchronization procedure with vehicular assistance". As previously announced, this system will be configured as two subsystems which we will call "Front Subsystem" and "Rear Subsystem", to treat each end of the vehicle as a separate entity when the front and/or tail of a vehicle participate in a NVE. FIG. 80 shows the block diagram of a first version of the Externally Synchronized Anti-Dazzle System with Vehicle Assistance and Rear-View Protection. In FIG. 80, the blocks composing the composite block 541 corresponding to the "Front Subsystem" and the contents of the "System Activation and Power Supply" block 196 are the same as those already shown in FIG. 51, and Described under the heading "Externally synchronized anti-dazzling system with vehicular assistance".

Figure 81:
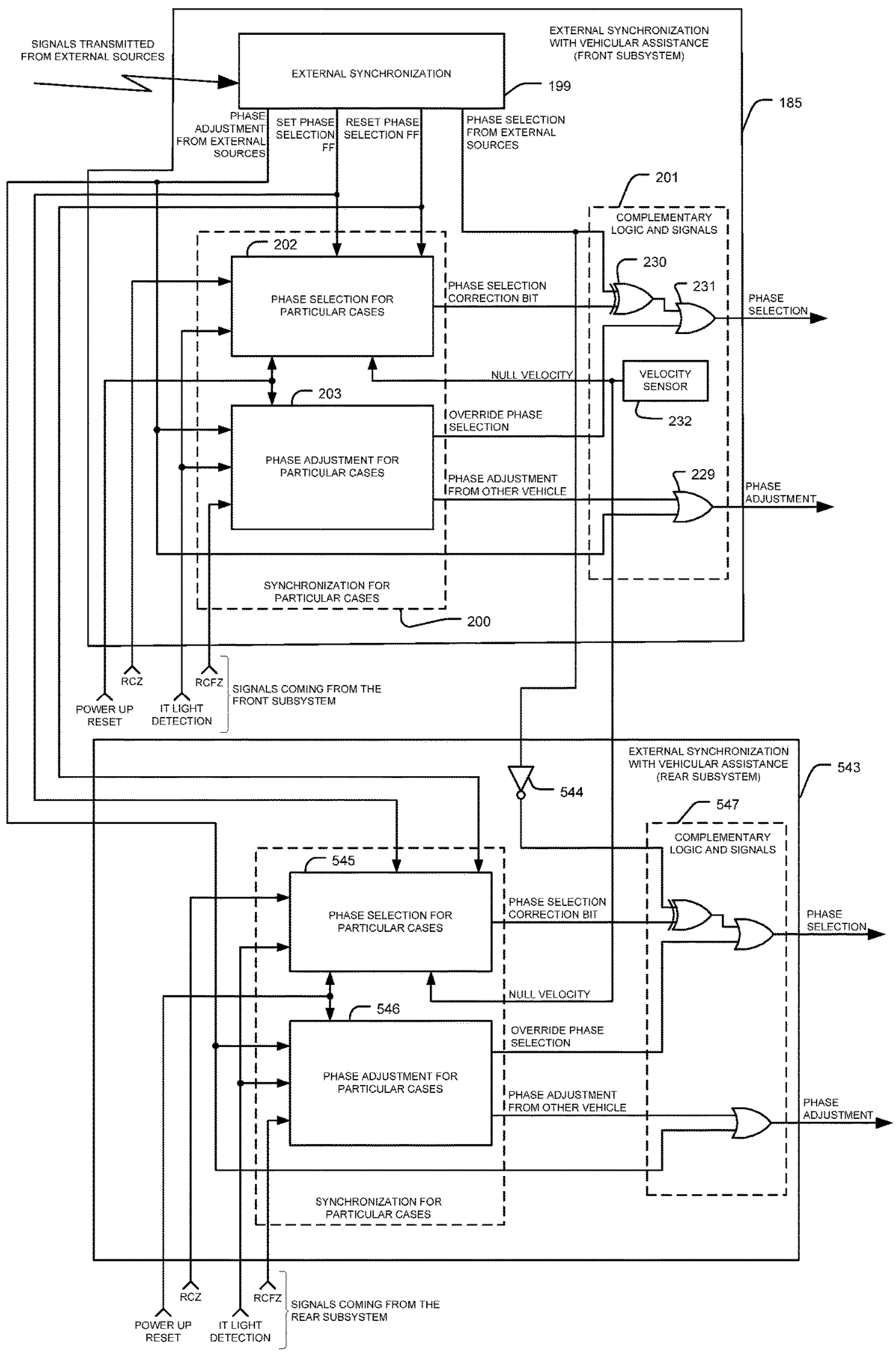
FIG. 81 shows the block diagram for external synchronization with vehicular assistance (front subsystem), according to an exemplary embodiment of the invention.

The contents of the composite block 542, which corresponds to the "Rear Subsystem", appears as a simplification of the "Front Subsystem" whose ranges will be discussed below. In this system, the signals generated from the information that the vehicles receive from the transmission sources external to them, are used in both the front subsystem and the rear subsystem. Said signals will then be generated in the front subsystem by the block "External synchronization with vehicular assistance" 185, and used in the homonymous block 543 of the rear subsystem as shown in detail in FIG. 81. These signals are: "Phase adjustment Obtained from external sources", "Selection of phase obtained from external sources", "Set Flip Flop of phase selection", "Reset Flip Flop of phase selection" and "Minimum or no velocity". The sharing of these signals by both subsystems allows the "External Synchronization" 199 and "Speed Sensor" blocks 232 to be present only in the front subsystem, within the "External Synchronization with vehicular assistance" block 185, as shown in FIG. 81. In FIG. 81, the "Phase Selection obtained from external sources" output of block 185 enters the block 543 belonging to the back subsystem where it is inverted by the inverter 544 in order to cause the ICS generated in said back subsystem, which we will call "rear ICS", has the opposite phase to the ICS generated in the front subsystem. In this way, the tail of the vehicle will use the same phase for the EPIL as the pre-assigned one in front of the vehicles that circulate in the opposite direction with respect to the road. The "Phase selection for particular cases" blocks 545, "Phase adjustment for particular cases" 546 and "Logic and complementary signals" 547, of the rear subsystem composite block 543, have the same function as their homonyms of composite block 185 of Subsystem, and also have identical content, except for the absence in block 547 of the speed sensor.

We refer again to FIG. 80. Blocks 548, 549, 551, 553 and 555 of the rear subsystem are the same in name and content to blocks 186, 187, 190, 193 and 198 of the front subsystem respectively, with the proviso that in one embodiment of the system the "continuous light" output of block 553 is not used. The contents of the rear-view mirror block 554 of the rear subsystem is equal to the contents of the front view subsystem block "Vision protection" 195. While the "backstop protection" output of said block 554 is held high, the "Backstop Protection Device" 554A should prevent or attenuate the light path. The design of this 554A device will be conditioned by the techniques used to implement the rearview protection, some of which have been mentioned together with the formulation of the anti-dazzle method with rear-view protection.

In one embodiment of the system, the contents of the block "Light detection received from behind" 550 corresponds to that shown schematically in FIG. 77, and described under the heading "Concepts and characteristics common to anti-dazzling systems with rear-view protection". The "Control of Devices for Generating Retro-emission" block 556 has the sole function of generating the light emission that the vehicle will use to interact with other vehicles backwards, to this block it only enters the signal "emit pulse of light" so that it is of less complexity than its counterpart, the block 197 of the front subsystem. The implementation of said block 556 depends on the techniques to be employed to generate this "retro-emission".

Figure 82A:
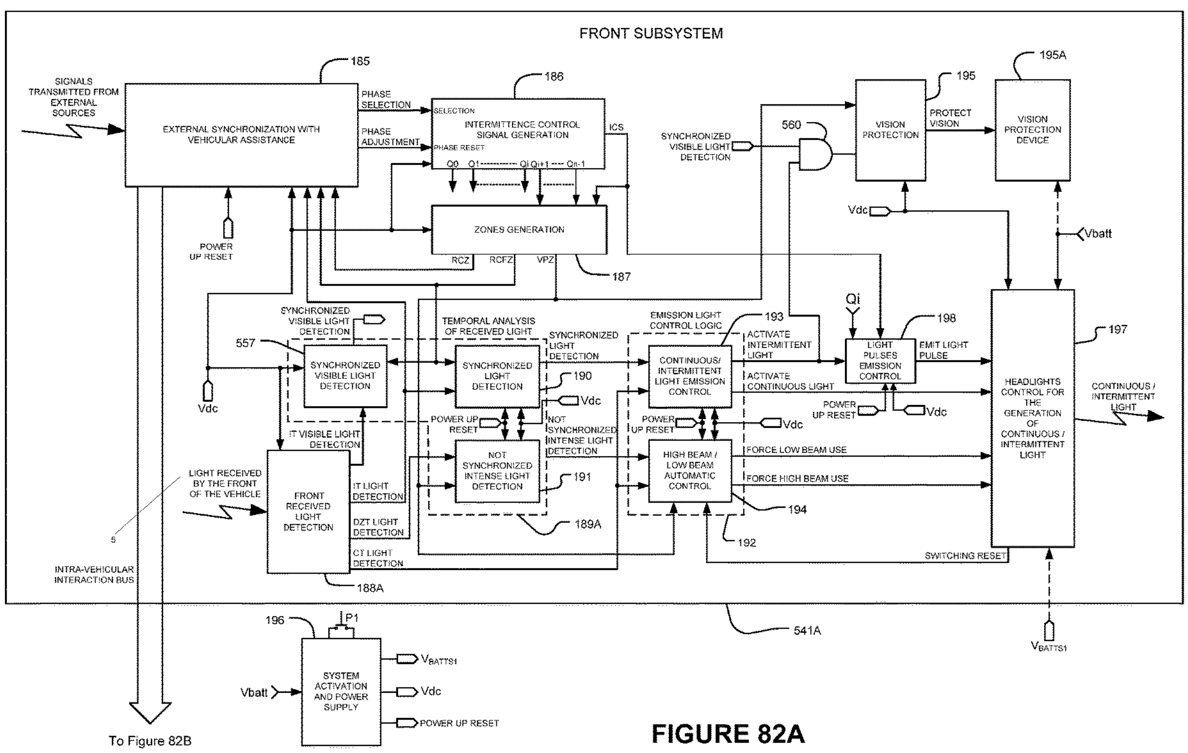
FIGS. 82A, 83A, 84A, 85A, 86A, 87A and 88A show system block diagrams of the front subsystem, according to an exemplary embodiment of the invention.
Figure 82B:
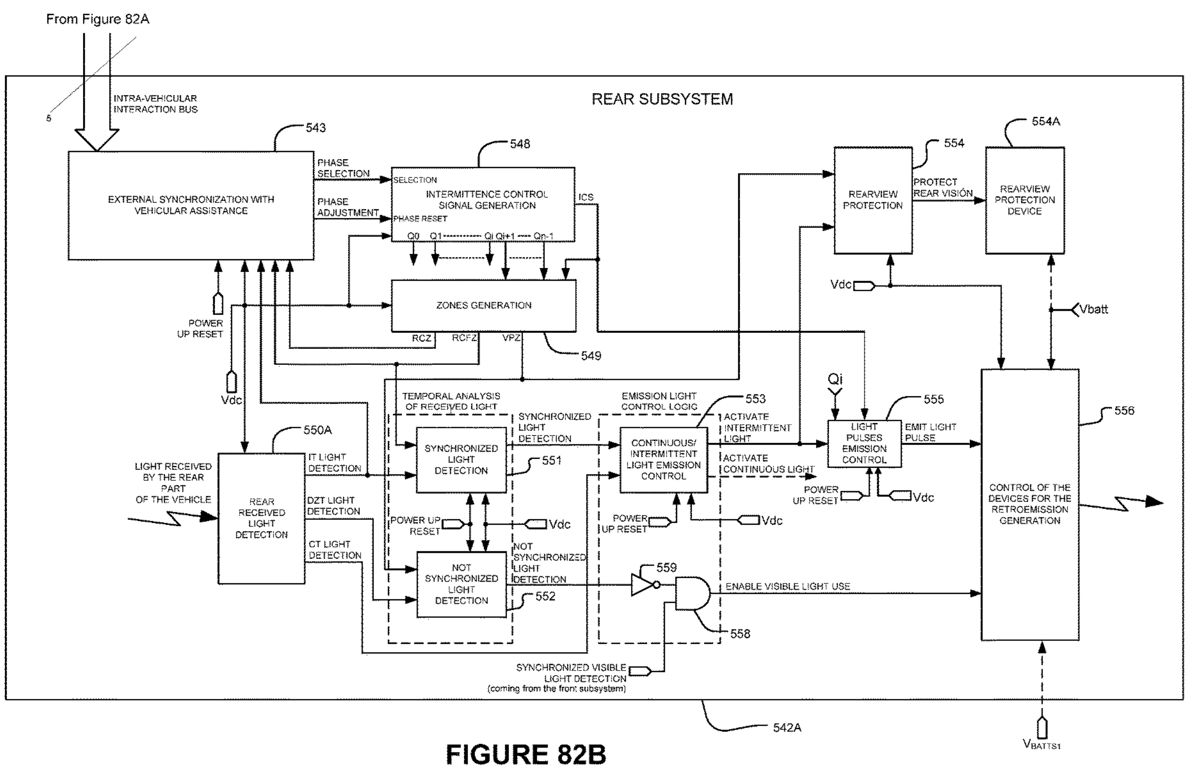
FIGS. 82B, 83B, 84B, 85B, 86B, 87B and 88B show block diagrams of the rear subsystems, according to an exemplary embodiment of the invention.

FIG. 82 shows the block diagram of a second version of the Externally Synchronized Anti-dazzling system with vehicular assistance and Rear-View Protection, which introduces two improvements to the first version of said system. The improvement #1 is to prevent the vehicle from activating the vision protection when that vehicle is detecting from the front only pulses of invisible light coming from the tail of another vehicle or other, as would for example in an NVE integrated by vehicles Who advance in Single line. Improvement No. 2 has the purpose of allowing, under certain conditions, a vehicle to be able to emit pulses of visible light backwards, in order to cooperate with the vehicles that circulate in the opposite direction extending the area of the road that these vehicles can illuminate. The conditions for a vehicle to be able to emit pulses of visible light backward using the frequency and phase of the rear ICS are:

Condition No. 1: that the vehicle which is to emit pulses of visible light backwards faces other vehicles approaching in the opposite direction, so that there are drivers that can benefit from this additional illumination.

Condition No. 2: that the vehicle which is to emit pulses of visible light backwards does not have behind it on the road to non-synchronized vehicles whose drivers could be harmed by the light emitted back by the vehicle ahead.

From the block diagram of FIG. 82 only those blocks differing from those shown in FIG. 80 will be described. The composite block 541A of FIG. 82, corresponding to the front subsystem, presents the following modifications with respect to block 541 of FIG. 80. Block 188A is an enlarged version of block 188 of FIG. 80. The contents of this block 188A are shown in FIG. 76 and have already been described under the heading "Concepts and Characteristics Common to Anti-Dazzling Systems with rear-vision protection". The composite block 189A has the same content as the composite block 189 of FIG. 80 plus the addition of the block "Synchronized Visible Light Detection" 557. The contents of this block 557 are equal to the contents of block 190, and its operation diagram corresponds to the one shown in FIG. 38, except that the entry "Light Detection IT" changes to "Detection of visible light UI", and that the output "Detection of light synchronized" changes to "Detection of visible light synchronized". Said block 557 has the "Signal Light Detection IT" signal coming from the block 188A and the "RCFZ" signal from the block 187 as inputs and outputs the "Synchronized Visible Light Detection" signal, which output will remain in high value while the vehicle is receiving pulses of synchronized visible light from the front. On the "Vision protection" block 195 of FIG. 82 acts, as in FIG. 80, the "Turn on flashing" signal, with the difference that it does so through the AND gate 560 when the signal "Visible light synchronized", which also enters said gate AND 560, is in high value.

The composite block 542A of FIG. 82, corresponding to the rear subsystem, has the following modifications with respect to block 542 of FIG. 80: the contents of the block "Light detection received from behind" 550A corresponds to that shown schematically in FIG. 15, wherein the light sensor 2 of said FIG. 15 must respond only to visible light if it is desired to prevent vehicles which have just crossed the road from interacting with each other. The "Non-synchronized light detection" block 552 (which does not have its equivalent in the rear subsystem of FIG. 80) has the same content as the front subsystem block 191. The AND gate 558 and the inverter 559 represent another extension present in the rear subsystem of FIG. 82. The way the modifications described affect the behavior of this system is described below. The "Visible Light Detection IT" output of block 188A allows you to determine whether the light being received by a vehicle from the front includes visible light or not, this output enters the "Synchronized Visible Light Detection" block 557 whose output determines whether the light vehicle is receiving pulses of synchronized visible light.

In order to implement the enhancement No. 1, the "Synchronized visible light detection" signals from block 557 and "Turn on flashing light" from block 193, enter the inputs of the AND gate 560, the output of which, when high, allows the "protect vision" output to be activated within the VPZ zone through the "Vision Protection" block 195. In this way the vision protection will only be activated when the vehicle is using its flashing light, but in front of vehicles that are also emitting pulses of visible light. This will prevent the vehicle from activating the vision protection when the vehicle is detecting from the front only pulses of invisible light coming from the tail of another vehicle, as would be the case, for example, in an NVE composed of moving vehicles In Single line.

The implementation of improvement #2 is described below. The output of block 557 "Synchronized visible light detection" enters one of the inputs of the AND gate 558, while the output of the block 552 "Unsynchronized light detection" enters, inverted by the denier 559, to the other input of said AND gate 558. Thus, the output of said AND gate 558, which we will call "Enable use of visible light" and entering the "Control of Devices for Generating Retro-emission" block 556, will be set to high value When the vehicle can emit visible light backwards. This is because the signal "Synchronized visible light detection" in high value indicates that the condition No. 1 is fulfilled, while the signal "Detection of light not synchronized" in low value indicates that condition No. 2 is fulfilled, reason why the Output of gate AND 558 in high value indicates that both conditions are fulfilled.

It should be noted that in block 550A it is desirable to adapt the activation threshold of the "DZT light detection" signal, a signal that enters the block 552, to ensure that when a vehicle has behind it on the road to non-Synchronized, the "Non-synchronized light detection" signal shall be set high before the drivers of said non-synchronized vehicles may be adversely affected by the visible light emitted backwards by the front vehicle.

Formulation of Inter-Vehicular Synchronization with External Assistance

Figures 12A, 12B, 12C:
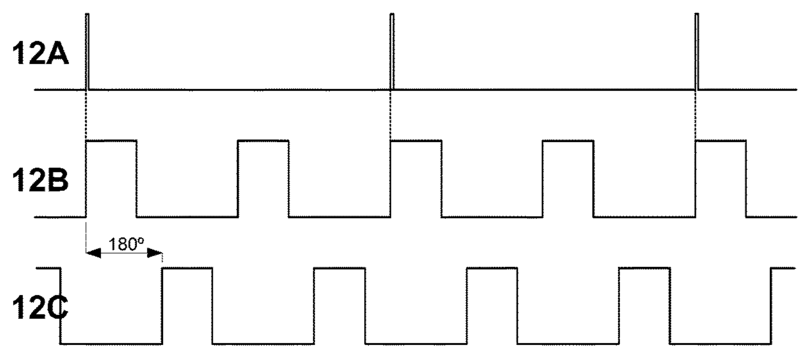
FIG. 12A shows the waveform for the phase adjustment signal (as an example) which has double the period of the EPIL wave, according to an exemplary embodiment of the invention.
FIG. 12B shows the waveform for the EPIL wave whose phase corresponds to the alternative phase which may be directly derived from the phase adjustment to FIG. 12A, according to an exemplary embodiment of the invention.
FIG. 12C shows the waveform for the EPIL wave whose phase corresponds to the other alternative, which is 180° out of phase with respect to the signal in FIG. 12B, according to an exemplary embodiment of the invention.

A further procedure for establishing the synchronization required by the anti-dazzling methods already described is described below. In this method, which is referred to as an "external assistance inter-vehicle synchronization procedure," the vehicles receive a "phase adjustment" signal transmitted by one or more transmission sources external to them, using a predetermined communication means, so that in said vehicles, by means of said phase adjustment signal, the possible EPIL phases are reduced to two alternatives: a certain phase and its counter phase. A vehicle that has not yet participated in an NVE, since it started or restarted its traffic along the way, will initially adopt, according to a predetermined criterion, one of those alternative phases, such as its current phase of EPIL. Once the vehicle has adopted one of these alternative phases as its current phase of EPIL, the phase adjustment signal will serve to readjust this phase, because for technological reasons a vehicle cannot maintain indefinitely a certain phase without it suffering from landslides which over time would cause the loss of synchronization between the EPILs of the different vehicles that circulate along the way. It is desirable that the phase adjust signal be a periodic signal of narrow pulses whose frequency is an exact sub-multiple of the frequency predicted for the EPIL. FIG. 12A shows the waveform of a phase adjust signal which has been given, by way of example only, a period corresponding to twice the period of EPIL. FIGS. 12B-12C show the possible EPIL waveforms of a vehicle corresponding to the already mentioned alternative phases. By way of reference, one of the alternative phases for the EPIL is obtained in "direct form" from the phase adjust signal by causing each positive edge of said phase adjust signal to signal the start of a positive edge of the EPIL which will be carried out with said alternative phase. The EPIL corresponding to the other alternative phase will be offset 180° from the previous one.

The phase adjustment signal will be transmitted using one or more Omni-directional transmission sources attempting to provide coverage all the way so that the vehicles can readjust their EPIL phase at regular intervals of time given by the period of the signal of transmitted phase adjustment. The period value of said phase adjustment signal shall be less than the time that a vehicle can maintain the correct phase for EPIL. This time will be related to the stability of the oscillators used in vehicles to control EPIL since the lower the stability of these oscillators the shorter the time elapsed before the EPIL phase undergoes a shift that exceeds the tolerance range admitted. However, it should be noted that the stability of such oscillators should be adequate so that a vehicle can maintain the correct phase of EPIL while driving through some areas of the road where it is difficult to receive the phase adjust signal, e.g. when crossing a tunnel. If more than one Omni-directional transmission source is used, they must be synchronized with each other to transmit a same phase adjustment signal. Such synchronization could be performed, for example, by a satellite signal. If a single source of Omni-directional transmission is used, it should provide coverage all the way. An example of this can be the satellite transmission of the phase adjustment signal to vehicles.

Unlike the “external synchronization” and “external synchronization with vehicular assistance” procedures, in this procedure the vehicles do not receive a phase selection signal, therefore such alternative phases will not be pre-assigned to a particular direction but the phase allocation is resolved in each non-synchronized NVE by the exchange of information between the vehicles of said non-synchronized NVE. Said exchange of information between vehicles will be carried out, using a predetermined communication means, by the directional transmission/reception of signals by said vehicles. The media to be employed in this procedure are included among those based on the transmission/reception of electronic, magnetic, optical, acoustic signals or a combination thereof. It is to be noted that the most natural and economical means for the exchange of information between vehicles by the front is provided by the own emission of pulses of light of each vehicle, if this emission is properly controlled. Among the vehicles of the same non-synchronized NVE, said information exchange is performed to solve, processing said information by a predetermined algorithm, which we will call “inter-vehicular phase selection algorithm”, which of said vehicles will have to change their current EPIL phase by the opposite phase and which not, to reach the synchronization of said NVE.

Said inter-vehicular phase selection algorithm is based on establishing differences between the non-synchronized vehicles of said NVE to rank them, so that on the basis of said hierarchy said vehicles compete with each other to make their EPIL phase prevail. Where the winning vehicle of this competition, which will be the vehicle of the highest hierarchy, initiates the synchronization of said NVE by imposing the counterpoint of its current phase of EPIL as emission phase for the vehicles that emit in the opposite direction to said winning vehicle, and where The vehicles already synchronized with the winning vehicle collaborate with it by imposing the counter-phase of its current phase of EPIL as the emission phase for the vehicles not yet synchronized that emit in the opposite direction to the already synchronized vehicles, thus completing the synchronization of Said NVE.

The “information” that a vehicle receives from another vehicle or other vehicles within an NVE allows it to determine, among other things, whether or not it is synchronized with those vehicles and therefore whether, eventually, it should change phases to be. In the anti-dazzling methods already described, it has been established that vehicles must interact with one another to get involved in one NVE. In this synchronization procedure, we have added that in the case of a non-synchronized NVE, the vehicles must exchange information to achieve the synchronization of said NVE. So vehicles should be able to directionally transmit signals both at the front and at the rear if they have the capability to provide vision and rear-view protection, and only at the front if vehicles provide only vision protection. In order to explain the characteristics that such exchange of information should have in the event that vehicles provide vision protection and rear-view, we will consider as separate entities the front and rear of the vehicles. The front of a vehicle can interact with the front or rear of another vehicle, while the rear of a vehicle does not interact with the back of another vehicle (vehicles that have already crossed the road do not interact with each other). Thus, the vehicle must have, in addition to means for Omni-directional reception of the phase adjust signal, means for receiving at the front both the signals that a vehicle can transmit by the front and those that another vehicle can transmit from behind and in addition Means for the reception behind the signals that a vehicle can transmit by the front. Making a vehicle exchange information backwards also makes it possible to apply this synchronization procedure to an NVE composed of vehicles that all move in the same direction with respect to the road.

Obviously, the EPIL phase of a vehicle is the basic information that another vehicle, exposed to said EPIL, needs to determine whether or not it is synchronized with the “issuing” vehicle of said EPIL. For this reason, it is necessary that backwards the vehicles emit a periodic adjustable phase signal equivalent to said EPIL with respect to being able to pass phase information to the vehicles that come behind, where that backward emission will be controlled by a signal equivalent to Said ICS (rear end ICS) and will be a non-visible emission (e.g. infrared light), at least as long as said NVE is not synchronized. We will say that both ends of a vehicle are synchronized with each other when the signals that the vehicle can directionally transmit through each end are in counter phase. Thus, when this is met, the phase information that a vehicle will transmit backward will be the same phase information that will forward another vehicle synchronized with it that advances in the opposite direction. From this point of view, we can say that the back of a vehicle behaves like the front of another vehicle coming in the opposite direction.

What we have just said and the statement made under the title “Night Vehicle Encounter”, that when the anti-dazzling method with rear vision protection is applied a vehicle may be involved in an NVE in front and in the other in the rear, allow us to emphasize something that is implicit in what has been said and is that, in relation to vehicle interaction, each end of the vehicle will have the ability to act separately. Much of the following has been written, however, with reference to the vehicle in general and not to any of its particular ends, unless this were necessary, and was written in this way with the intention of facilitating its comprehension and in that it is applicable both To vehicles that can provide rear-view protection as to those that do not have that capacity, since in the latter case, in which vehicles interact only from the front, it does not make sense to specify for each action of the vehicle the end by which said action is carried out. Therefore, in vehicles that provide rear-view protection and in relation to aspects related to vehicle interaction, the actions attributed to the vehicle must be referred to the extreme (s) involved in those actions. By way of example, if we say, “the losing vehicle of the competition will change its current emission phase" it must be interpreted that: if the front end of the vehicle is the one that loses the competition, that front end will change its current phase of EPIL, or if the rear end of the vehicle is losing the competition, that rear end will change the current phase of the signal equivalent to that EPIL, or if both ends of the vehicle are losing the competition, both ends will change phase. Other aspects and characteristics of the vehicle interaction valid for this synchronization procedure will be treated at the end of the description of the same.

The algorithm of phase inter-vehicular selection is described below, which, in an effort to order by hierarchy the vehicles of a non-synchronized NVE to obtain its synchronization, applies two strategies in the following order:

First strategy: when a vehicle determines that it forms part of a non-synchronized NVE it obtains a hierarchy that will be determined by the conformation of the NVE. This means that each vehicle interprets, depending on the information it has and exchanges with another vehicle or other vehicles, what its hierarchy is within that NVE and based on it competes with the other vehicles to determine whether or not to change its phase of Current issue. When the conformation of such NVE is such that it does not allow to establish different hierarchies between the vehicles, a second strategy will be applied in which each non-synchronized vehicle will independently generate a second hierarchy to compete.

Second strategy: If after a certain time interval since the start of the inter-vehicular phase selection algorithm (which interval will be given by the time required by the application of the first strategy) the vehicles are still interacting with non-synchronized vehicles, then they will apply a second strategy to achieve NVE synchronization. This second strategy will require a hierarchy of vehicles that does not depend on how the NVE is formed.

The implementation of the first strategy is sufficient to obtain the synchronization of a non-synchronized NVE when it has been formed from a synchronized NVE by the incorporation of one or more non-synchronized vehicles. In this case the vehicles that will have the highest hierarchy will be those coming from the synchronized NVE and the "information" that they receive and that allows them to identify this situation is given by the synchronized EPIL and/or by the signal equivalent to the synchronized EPIL (if said Information comes from the rear of a vehicle) that said vehicles are detecting since before said non-synchronized NVE was formed. When the vehicles are already hierarchical, they start a competition, seeking to preserve their current emission phase, which is developed as follows: the smaller the hierarchy of a vehicle the less time will be that said vehicle late, within a preset timing, in Change phase against non-synchronized emissions from other vehicles of said NVE. In this way the best hierarchical vehicle within this NVE will not have to change phases to synchronize with the rest and will be the winner of the competition. By making non-synchronized vehicles which do not originate from a synchronized NVE are those that need to change phases, a phase shift between the vehicles that do come from said synchronized NVE is avoided. Possible start times for non-synchronized vehicles to start such competition could be obtained directly from the phase adjust signal. However, it is desirable that said start times be indicated by an internally generated signal in each vehicle which we will call "start signal" and use the phase adjust signal to synchronize said start signal in all vehicles. This start signal should then be periodic, adjustable phase and should have a frequency which, like EPIL frequency, is an exact multiple of the frequency of the phase adjust signal, but obviously, several times less than the frequency of said EPIL.

Figures 13A, 13B, 13C, 13D:
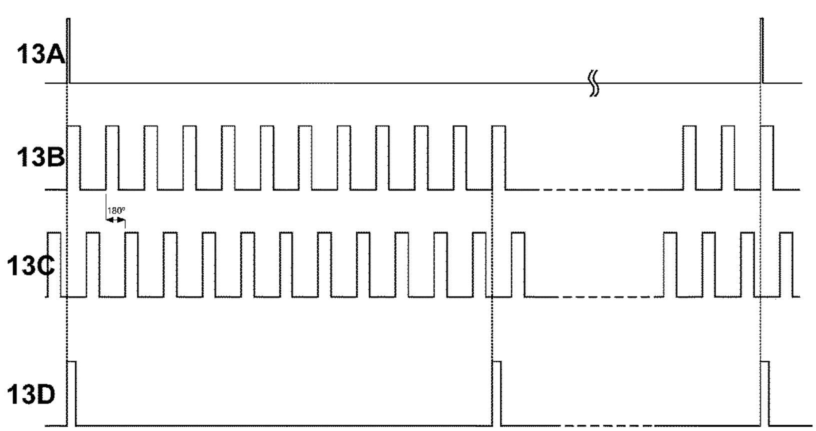
FIG. 13A shows the waveform for a phase adjustment signal whose period is an exact multiple of the EPIL wave period, according to an exemplary embodiment of the invention.
FIG. 13B shows the waveform for the EPIL wave whose phase corresponds to the alternative phase which may be directly derived from the phase adjustment to FIG. 13A, according to an exemplary embodiment of the invention.
FIG. 13C shows the waveform for the EPIL wave whose phase corresponds to the other alternative, which is 180° out of phase with respect to the signal in FIG. 13B, according to an exemplary embodiment of the invention.
FIG. 13D shows the waveform for the starting signal whose period is an exact multiple of the EPIL wave period, according to an exemplary embodiment of the invention.

In the above way, the vehicles will have the possible start times to start the competition, even in those areas of the road where it is difficult to receive the phase adjustment signal. The waveform of a phase adjust signal whose period is an exact multiple of the EPIL period is shown in FIG. 13A. FIG. 13B shows the EPIL waveform whose phase corresponds to that obtained directly from the phase adjust signal. FIG. 13C shows the EPIL waveform whose phase is produced by phase-shifting by 180° the signal of FIG. 13B. FIG. 13D shows the start signal waveform whose period is an exact multiple of the EPIL period. The stability of the oscillators used to generate in the vehicles the start signal will determine the validity time of said signal from the moment a vehicle stops receiving the phase adjust signal. However, before the start signal phase is unsuitable for its purpose, it will be unacceptable the drift which, for the same reason, would have the EPIL phase of said vehicle. In a "particular case" such as this, the inter-vehicular phase selection algorithm will only allow the vehicle to participate in the synchronization of an NVE in a "passive" way, re-adjusting its phase according to the phase with which the other vehicles of said NVE.

In the scheme of FIG. 13E, an unsynchronized NVE generated by the incorporation of V4 into the synchronized NVE formed by vehicles V1, V2 and V3 which are shown encircled in said figure is shown by way of example. in one embodiment, vehicles can only be involved in an NVE by vehicles moving in the opposite direction (for simplicity it has been assumed that these vehicles do not provide rear-vision protection). V4 is interacting directly only with V1. This is because it has been assumed that V4 is "out of reach" of V3 and because V4 cannot interact directly with V2 (since in this case vehicles do not provide rearview protection). The broken line drawn between V4 and V1 indicates that the EPILs of said vehicles are not synchronized. Analyzing this example, we can see that if V1 were to be replaced by the V1 vehicle, this phase change should be propagated to V2 and then through this V2 to V3 so that all the vehicles are synchronized. By avoiding this "chain" propagation the synchronization of the entire NVE can be completed in less time and it is further achieved that the vehicles furthest from each other, represented in the example by V1 and V4, are the only ones to exchange non-synchronized light during the short sync time.

The application of the second strategy is necessary when a non-synchronized NVE has been formed from the encounter of two synchronized NVEs. This non-synchronized NVE will be composed of those non-synchronized vehicles coming from both synchronized NVEs that have been close enough to interact with each other. In the scheme of FIG. 13F is shown an example of a non-synchronized NVE formed from the encounter of two synchronized NVEs E1 and E2, which in the figure appear encircled. It has been assumed, as in the example of FIG. 13E, that vehicles can only be involved in an NVE by vehicles moving in the opposite direction. We will assume that V1 and V5 are two vehicles not synchronized with each other, coming from E1 and E2 respectively, that have approached enough to interact with each other. When this second strategy is applied, the non-synchronized V1 and V5, in the example, will independently generate a second hierarchy to compete that will not depend on how that NVE is formed. Based on this hierarchy, the vehicles will agree on which phase to change and which does not. In this procedure, two alternatives are proposed to carry out this second strategy, which we will call "Synchronization with Pseudorandom Hierarchy" and "Synchronization with Hierarchization by Magnetic Path", alternatives that will be described later. In the type of NVE we are describing, after said non-synchronized V1 and V5 have applied the second strategy and agreed which one or which of them will have to change phase, the propagation of said phase change between the vehicles coming from the same synchronized NVE as that or those vehicles that have resigned their phase should begin. In the propagation of a phase change we will identify as "propagator" the vehicle (s) that just changed its phase and as a "successor" to the vehicle (s) to which the next turn corresponds to change phases.

It should be clarified that the successor vehicles, among which this phase change should be propagated, will receive information from the propagating vehicle (s) which will cause them to adopt a minimum hierarchy and apply the first strategy to synchronize. It is worth mentioning that before a vehicle becomes a "propagator," its "successor" has been receiving synchronized light, or its equivalent signal, so if it does not receive such information from the propagating vehicle (s) it would maintain the "hierarchy" Confers to belong to a synchronized NVE and would not change its phase without using that hierarchy to compete (which could put an end to that propagation). For this reason, it is necessary that the propagating vehicle be identified as such before the successor vehicle, for example, by altering in a preset manner its regular emission of pulses. One way of doing this is to emit, for a short time, the EPIL or its equivalent signal, as appropriate, with a phase shift (for example 90°) that allows the successor to differentiate said emission from either of the two phases alternatives. When the successor vehicle (s) receive such information, they will change phase and become propagators to communicate to their successors, if any, that they must in turn change phase, and so on will propagate the phase change until the synchronization of the NVE. Returning to the example of FIG. 13F, we will show the dynamics of the propagation of a phase change: we will assume that V1, when applying the second strategy, is the one that has changed phase to synchronize with V5. Therefore V1, which is now no longer synchronized with V2, becomes a propagating vehicle so that the successor V2, applying the first strategy, changes phase to synchronize with V1. Done this, V2 now becomes vehicle propagator and V3 in successor vehicle, which when phase change completes the synchronization. As can be seen, with the exception of the synchronization initiating vehicles (V1 and V5 in the example), which apply the second strategy, the rest of the non-synchronized vehicles will change phase when applying the first strategy, since they will do so in function of the information they receive from other vehicles.

In this type of non-synchronized NVEs, drivers of vehicles that propagate a phase change could be exposed to intense non-synchronized light for a brief instant of time. This can be avoided by "extending" the vision/rear-view protection during said instant of time so that said drivers are not affected.

The schematic of FIG. 13G is another example of non-synchronized NVE that has been formed from the encounter of two synchronized NVEs (E1 and E2) but integrated by vehicles that can be involved in an NVE both by the front and behind, as it corresponds to vehicles that provide protection of vision and rear-vision. In this example, it has been assumed that V1 and V4 are non-synchronized vehicles, coming from E1 and E2 respectively, which are close enough to interact with each other. Note that if V4 imposes its phase on V1, the propagation of the phase change between the vehicles of E1 will be initiated by the front of V1, instead if V1 imposes its phase on V4, the propagation of the phase change between E2 vehicles will be initiated by the tail of V4.

The application of the second strategy is also necessary when in a non-synchronized NVE neither of the vehicles are detecting synchronized light, or its equivalent signal, at the moment of starting the execution of the inter-vehicular phase selection algorithm, that is when none of them come from a synchronized NVE (this case has some exceptions that will be explained next as "particular cases").

Particular Cases:

The application of the first strategy is sufficient to cause a vehicle to change phase when said vehicle participates in a non-synchronized NVE in a "passive" form, since it has stopped receiving for a preset maximum time the phase adjustment signal (As this could cause an inadmissible shift in the EPIL phase of said vehicle). Said vehicle assumes that it is the cause that the NVE is not synchronized and readjusts its phase according to the phase with which the other vehicles emit. In this case, the information that the vehicle will use to interpret its situation within said NVE could be given by a timer that is triggered each time that said vehicle receives the signal of phase adjustment and that to reach extinction it would signal That its phase is invalid.

The application of the first strategy is also sufficient to cause a vehicle to change phase when that vehicle participates in a non-synchronized NVE having started or restarted its nocturnal displacement by a certain path, that is to say, when it has not yet synchronized its lights with those of no other vehicle traveling in the opposite direction. When a vehicle in this condition participates in a non-synchronized NVE, it will assume, as long as it is interacting with a vehicle that has a valid phase, that said NVE is formed by vehicles with a higher hierarchy than its own and therefore will change phases. In this case, the information that the vehicle will use is given by: a "flag" that indicates it as a "Beginner" vehicle on the road and by the non-synchronized emission from another vehicle, whose phase must correspond to one of the two phases EPIL alternatives for the "Beginner" vehicle to change its phase. Thereby preventing said vehicle from changing phase in front of a vehicle with an invalid phase. Assigning this "Beginner" condition to vehicles that initiate or restart their nocturnal displacement along the way tends to reach, through successive NVEs, a single-phase assignment for the entire road. The latter is not necessary to avoid dazzling but would gradually reduce the occurrence of non-synchronized NVEs. A vehicle with the status of "Beginner" will initially adopt either of the two alternative phases for the emission of intermittent light. The "Beginner" flag will be deactivated when the vehicle receives a synchronized flashing light from the front.

We have described when and how the implementation of the first strategy can produce the synchronization of an NVE, and when it becomes necessary to implement the second strategy. The following two alternatives are proposed to implement this second strategy:

Synchronization with Pseudorandom Hierarchy

The first step is to have all vehicles applying the second strategy start a time-out before exchanging information. The duration of said waiting time will be given by a value generated in each vehicle in pseudo-random form, which we will call "inverse score". The first vehicle that completes its waiting time will be the one Obtain the highest hierarchy and the one who initiates the exchange of information with the other vehicles by issuing a signal, which we will call a "triumph signal", which will end the competition and which will be immediately replicated by all the vehicles involved in this competition, either Who receive this signal of triumph in a direct or replicated way, so that all of them abandon their respective waiting times next to the "winning" vehicle. The maximum value of inverse score that a vehicle can generate and the waiting time that corresponds to that value must be defined taking into account that the increase in the range for said values of inverse score decreases the probability of "draws and that by reducing the maximum waiting time accelerates the synchronization process. Of course, that both are not incompatible within certain limits. Anyway, if a tie between two or more vehicles is repeated, the competition will be repeated, which includes the generation in each vehicle of a new pseudorandom value and therefore a new waiting time during which the information exchange is interrupted with other vehicles. It should be clarified that the latter would not pose a problem, even if such information exchange between vehicles was performed by altering in a preset way its regular emissions of pulses of light, since these waiting times are very small and also because suspend the exchange of information between vehicles does not necessarily imply suspending in them the regular emission of intermittent light. If the exchange of information between vehicles is altered by altering the regular emission of light pulses, the technique to be used for a vehicle to transmit or retransmit the triumph signal could be the emission of a light pulse whose phase, with respect to the ICS of the vehicle, allow other vehicles to distinguish said pulse of light from a regular pulse of EPIL or equivalent signal. One way to do this is to make the vehicles suspend the counting of these waiting times around the positive and negative flanks of the ICS during the competition (environment that will be defined by the tolerance margins for the synchronization already described), since the vehicles will emit this pulse of light, as a sign of triumph, immediately after the end of their respective waiting times.

The winning vehicle, after transmitting the triumph signal that ends the competition, must transmit additional information allowing the rest of the vehicles to check whether or not they have the correct phase with respect to that of the winning vehicle. In this way each vehicle will be able to determine whether or not to change phase to achieve NVE synchronization.

If it is chosen to perform the exchange of information between vehicles by altering the regular emission of light pulses, the technique to be employed in order for the winning vehicle to be able to transmit said additional information is to make said winning vehicle entitled to be issued for one short time pulses of the EPIL or the equivalent signal, as appropriate, with a predetermined phase shift, for example of 90°. So that vehicles that detect a phase shift equal to the predetermined between the emission of the winning vehicle and the own, must change of phase to synchronize. While those vehicles that between the emission of the winning vehicle and the vehicle detect a phase shift 180° greater than the predetermined one will preserve its phase. It goes without saying that each vehicle that checks that it has the correct phase (whether or not it has had to change phase) will also be enabled to emit with said predetermined phase shift, in order to act as the winning vehicle to cooperate with it in the transmission of Such additional information. It should be noted that we use the term "phase shift enabled" because such phase shift is conditioned upon the vehicle interacting with another vehicle with which it is not yet synchronized. In other words, the phase shift will occur as long as the vehicle is receiving synchronous pulses of light (or equivalent signal pulses). The advantage of applying this technique is that it allows transmitting information using the vehicle's flashing light even when other vehicles are emitting with their regular phase (which will happen, for example, when there are "successor" vehicles or vehicles that are not yet transmitting with phase run).

Synchronization with Magnetic Heading Hierarchy:

We will now describe how to apply the "Synchronization with magnetic heading hierarchy" as the second synchronization strategy. In applying this second strategy, each vehicle will adopt according to the magnetic heading that corresponds to it at that moment one of the two alternative phases as its current phase of EPIL and a hierarchy to "defend" that phase. The 360° of the compass will be divided into four sectors or quadrants and the vehicle must have the ability to determine which quadrant corresponds to it depending on its magnetic direction. The opposing quadrants will be assigned opposite alternate phases and two of these opposing quadrants, for example NW and SE, will be assigned high hierarchy, while the other two will be assigned low hierarchy. Two predefined distributions, which comply with the above, will be used to specify the phase and hierarchy to be assigned to each quadrant. We will call these distributions, "Default distribution of phases A" and "Default distribution of phases B". The default distribution of phases B is obtained from the predetermined distribution of phases A by inverting the phase assignment in the low hierarchy quadrants, while the high hierarchy quadrants have the same phase assignment in both distributions. Each vehicle will initially adopt the hierarchy and the phase corresponding to its quadrant according to the predetermined distribution of phases A. If said predetermined distribution of phases A does not lead to the synchronization of the NVE, then each vehicle will adopt the phase corresponding to its quadrant according to Predetermined distribution of phases B, which will lead to the synchronization of said NVE.

FIG. 13H shows, by way of example, a predetermined distribution of phases A and the corresponding predetermined distribution of phases B. The NW and SE quadrants have been assigned high hierarchies in both default distributions. We will identify as "phase 1" the alternative phase that is obtained in "direct form" of the phase adjustment signal, and as "phase 2" to the opposite alternative phase. As can be seen in said FIG. 13H, in phase distribution A, the "phase 1" has been assigned to the quadrants NW and SW and "phase 2" to the quadrants NE and SE, whereas in the phase distribution B Has assigned "phase 1" to the NW and NE quadrants and "phase 2" to the SW and SE quadrants. Note that in both phase distributions A and B "alternative phases" have been assigned opposite opposing quadrants and further that the predetermined distribution of phases B is obtained from the predetermined distribution of phases A by inverting the assignment of phases in the quadrants NE and SW, while the NW and SE quadrants retain the same phase assignment because they have been assigned high hierarchy.

We will now explain, using the predetermined phase A and B distributions of the example of FIG. 13H, why it is necessary to have two predetermined phase distributions and when vehicles must use both distributions to achieve synchronization. In the predetermined distribution of phases A of FIG. 13H, two cones joined by the apex are drawn with a dashed line representing what we will call "zone of Risk" for the predetermined distribution of phases A in the sense that it is not certain that a group of vehicles having their magnetic addresses there could synchronize with each other using said distribution. For example, within this risk zone there may be some vehicles in the NW quadrant and others in the NE quadrant traveling in the same direction with respect to the road and having opposite phases (when they should have the same phase). Similarly, there could be vehicles in the NW and SW quadrants traveling in opposite directions and having the same phase (when they should have opposite phases). The case presented, which is one of the most unfavorable that can be presented, is solved by making the vehicles with magnetic addresses in the NE and SW quadrants, which are the least hierarchical, change phase adopting the predetermined distribution of phases B and Thus achieving the synchronization of the NVE.

The following is described as a second synchronization strategy: "Synchronization with magnetic heading hierarchy" when it is opted to perform information exchange between vehicles by altering the regular emission of the light pulses. Each vehicle will initially adopt the hierarchy and phase corresponding to its quadrant according to the predetermined distribution of phases A and will be enabled to emit pulses of flashing light (or equivalent signal as appropriate) with a predetermined phase shift 90°, which will take effect provided the vehicle is receiving synchronous pulses of light (or equivalent signal), which will occur if said predetermined distribution of phases A did not lead to the synchronization of the NVE. Thus, if a vehicle receives one or more of said pulses with said phase shift with respect to its own phase and has low hierarchy it will change phase to synchronize with the rest adopting the phase that corresponds to its quadrant according to the predetermined distribution of phases B, which will lead to the synchronization of said NVE.

It should be noted that dividing the 360° of the compass into four sectors is sufficient, since vehicles traveling in opposite directions with respect to the road will only very rarely have magnetic directions within a single quadrant. In the same way, only very rarely do the vehicles traveling in the same direction with respect to the road have magnetic directions in opposite quadrants (both situations could occur in closed curves with an angle of less than 90°, situations in which Drivers would not be daunted), so assigning vehicles a single phase and hierarchy within each quadrant is sufficient.

When a vehicle can interact with others both forward and backward, the phase and hierarchy it will adopt at each of its ends are those corresponding to the magnetic direction in which each of those ends is interacting with other vehicles. Thus, if both extremes were involved in a magnetic course synchronization process both would adopt opposite phases but with the same hierarchy, which is adequate since any of these extremes, to prevail in said synchronization process, would impose the same distribution of Phases on the rest of the vehicles. Of course, it will suffice to provide means for determining the magnetic direction of the vehicle and to assign that direction to the front end of the vehicle and the magnetic direction opposite the rear end thereof.

As we can see the "Synchronization with magnetic heading hierarchy" can be a very efficient alternative to "Synchronization with pseudo-random Hierarchy" to apply in the second synchronization strategy.

The following are examples where vehicles provide rear-view protection, other characteristics and consequences of vehicular interaction that can be inferred from what has already been said:

A vehicle having both ends synchronized with each other may lose this condition when it participates in a non-synchronized NVE having only one of its ends involved in said NVE. In this situation is for example V4 of FIG. 13E which, in this case, must resign the phase of its front end in front of the vehicles that come from the synchronized NVE of the circulation. In the same situation, you will find a vehicle that has both ends involved in different non-synchronized NVEs.

A vehicle that loses the synchronization of its ends could recover it immediately if one of its ends is "free", that is to say not involved in any NVE, since that end can change of phase following the other end (propagation intra-vehicular phase). If the vehicle does not have a free end said synchronization will be delayed until the moment one of the ends of the vehicle is "free". This is done so that one end of the vehicle does not interfere or disturb the NVE in which the other end is involved.

From the foregoing, it follows that when there is conflicting joining of two synchronized NVEs there will be no "intra-vehicular" phase propagation, i.e. a phase change will have to reach from one end to the other of the vehicle indirectly through of another vehicle, using the "propagator/successor" roles. This is done in order not to extend the propagation of a phase change beyond what is necessary.

Usually if a vehicle has both ends synchronized with each other and only one of these ends is involved in a synchronized NVE, when the other end, which is free, is involved in a non-synchronized NVE will participate in it with the same hierarchy with which it would do the first, that is to say with the hierarchy that grants to belong to a synchronized NVE. In this way both ends of the vehicle acquire such hierarchy to try to stay synchronized. Otherwise, even an "isolated" vehicle could prevail in said non-synchronized NVE in front of said free end, which would generate in the "limits" of the synchronized NVE another synchronized but conflicting NVE. Later when both NVEs begin to interact with each other there would be a propagation of a phase change that can be prevented by making said "isolated" vehicle resign its phase and incorporated into a single synchronized NVE. A specific example has not been included for the presented situation, but it can be observed in FIG. 13G making abstraction of V5 and V6, that is to say, considering V4 as if it were an isolated vehicle.

If we chose to cause the vehicles to transmit forward the signals necessary to achieve the synchronization of said NVE using the vehicle's own EPIL, then it would be convenient for the vehicles to emit back the equivalent signal to said EPIL using also pulses of Light, and we will call it "rear EPIL", where said rear EPIL will be controlled by said ICS for the rear end. If the back EPIL is used solely for the purpose of transmitting information, then such emission could be made using light in the non-visible spectrum (e.g., infrared light). An additional utility might be given to the rear EPIL as described below: within a synchronized NVE, vehicles moving in a certain direction with respect to the road could cooperate with those traveling in the opposite direction by extending the area of the road that these Vehicles can illuminate. For this, obviously, said rear EPIL should be performed using visible light. The pulses of visible light of said rear EPIL will not disturb the drivers of vehicles driving behind as these drivers will have the vision protected when said pulses of light become present.

Figure 56:
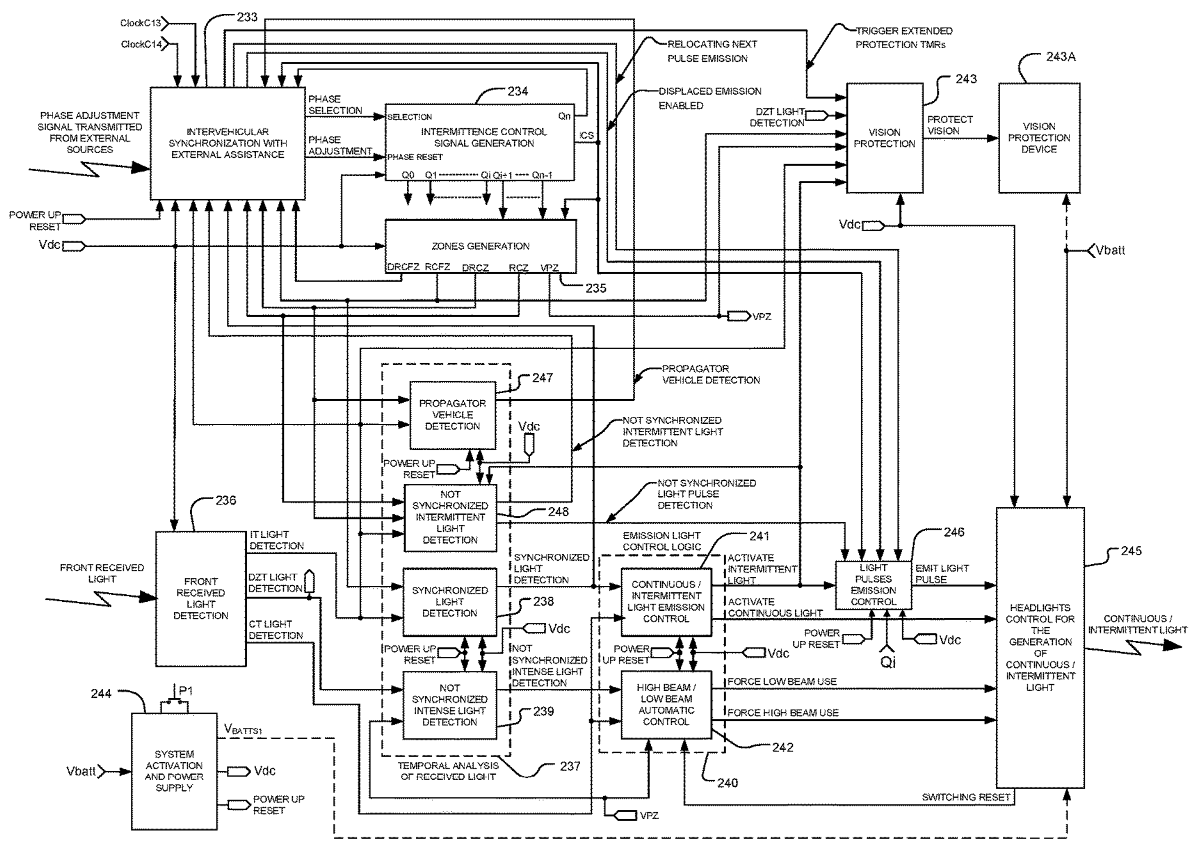
FIG. 56 shows the Block Diagram of the Anti-Dazzling System with Inter-Vehicular Synchronization and External Assistance, according to an exemplary embodiment of the invention.

Anti-Dazzling System with Inter-Vehicular Synchronization and External Assistance FIG. 56 shows the block diagram of the Anti-dazzling System with Inter-vehicular Synchronization and External Assistance, which is based on the Anti-dazzling Method already described and uses the inter-vehicle synchronization procedure with external assistance. The blocks 234, 236,

238, 239, 240, 241, 242, 244 and 245 of said FIG. 56 correspond one by one in name, function and content with the blocks: 186, 188, 190, 191, 192, 193, 194, 196 and 197 of FIG. 51 and thus also with the blocks 61, 65, 67, 68, 109, 110, 111, 171 and 172 of FIG. 34 corresponding to the externally synchronized anti-dazzling system described. To be more specific, it should be noted that the operation of the block "Generation of the intermittent control signal" 234 was explained in describing the characteristics common to all systems (see FIG. 20). The same is true of the block "Light detection received by the front" 236 whose operation was described under the heading "Formation of an NVE" (see FIG. 15). The description of the block "System activation and power supply" 244 is also included within the characteristics common to all systems (see FIG. 29). The same applies to the block "Control of the headlamps for the generation of continuous/intermittent light" 245 (described in relation to FIGS. 32-33). The operation of the "Synchronized Light Detection" blocks 238, "Detection of Intense Light Detection" 239, "Control for Continuous/Intermittent Light Emission" 241 and "Automatic Control of Low/High beam" 242 was Explained in relation to the operating diagrams of FIGS. 38. 40, 43 and 45, respectively.

"Zone generation" blocks 235, "Vision protection" 243 and "Light pulse emission control" 246 have the same function as their homonyms of FIGS. 51 and 34, but their contents are not identical to those, so they will be described later. The "Propagating vehicle detection" blocks 247 and "Non-synchronized flashing light detection" 248 have not been previously described and will be described as sub-blocks of the block "Temporal analysis of received light" 237. Finally, the synchronization block will be described. This system is called "Inter-vehicular synchronization with external assistance" 233. Obviously, those signals indicated in FIG. 56 that do not appear in FIG. 51 are those generated by the added blocks and by the blocks that have variations with respect to the FIG. 51 and will be described, next to said blocks, as follows:

In this system, the Zone Generation block 235 produces two zone signals that have not been previously defined and are: "Displaced Restricted Conflict Zone" (DRCZ) and "Displaced Restricted Conflict Free Zone" (DRCFZ) and produces the RCZ, RCFZ and VPZ signals whose definitions have already been given (see description of the homonymous blocks 187 of FIG. 51 and 64 of FIG. 34). The DRCZ and DRCFZ signals will be used in the vehicle to determine when and under what circumstances another vehicle is transmitting information by applying a certain offset to its regular EPIL. If a vehicle is de-phasing its EPIL, the positive flanks of said EPIL will be detected by another vehicle within the DRCFZ if both vehicles are synchronized with each other, instead, they will be detected within the DRCZ if those vehicles have their ICS in phase not synchronized with each other).

Figure 57:
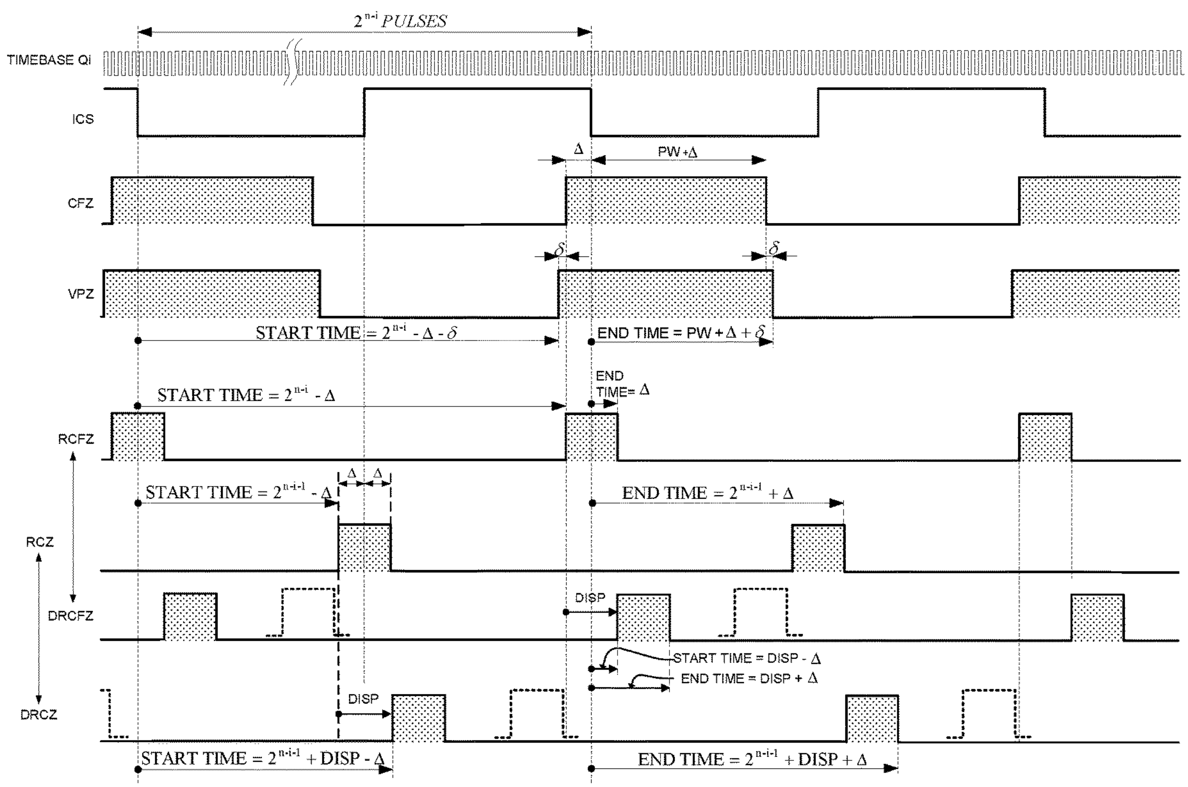
FIG. 57 shows, by way of example, the zone signals DRCFZ and DRCZ together with the other signals produced by the "Zone generation" block, according to an exemplary embodiment of the invention.

Although in the inter-vehicle synchronization procedure with external assistance 90° displacements or slots were mentioned in the EPIL in explaining said information transmission, said offset could be different from 90° insofar as it has a predetermined value that makes it possible to differentiate said offset EPIL in phase from another not displaced. FIG. 57 shows, by way of example, zone signals DRCFZ and DRCZ together with the other signals produced by the "Zone generation" block 235. Both zones have been drawn in two different positions corresponding to the extreme displacements Which could be chosen as predetermined between 0° and 180°. Note that if the displacement in the alternative drawn with a solid line were reduced or if the displacement in the alternative drawn with dashed line was increased, it could not be safely distinguished between pulses received with and without said displacement (since there would be overlaps with the Corresponding non-displaced areas).

The following expressions are used to define the start and end times of the DRCFZ and DRCZ zone signals:

$$\text{Start time of DRCFZ}=\text{DESP}-\Delta$$

$$\text{End time of DRCFZ}=\text{DESP}+\Delta$$

$$\text{Start time of DRCZ}=2^{n+1}-\Delta+\text{DESP}$$

$$\text{End time of DRCZ}=2^{n+1}+\Delta+\text{DESP}$$

where:

$2^{n-i}$: is the duration of the period T of the ICS measured in periods of an output Qi of the counter/divider 11 (see FIG. 20). The period of said output Qi being the time base chosen to define said start and end times.

Δ: is the tolerance range already described when defining the conflict-free zone (see Δt in FIG. 23A-23G) measured at periods of said output Qi of the counter/divider 11.

DESP: it is the displacement or offset that a vehicle will apply to its EPIL, to transmit information to another vehicle, measured in periods of said output Qi (to measure such offset as an angle, it must be taken into account that 2−i periods correspond to Qi To 360°).

Figure 58:
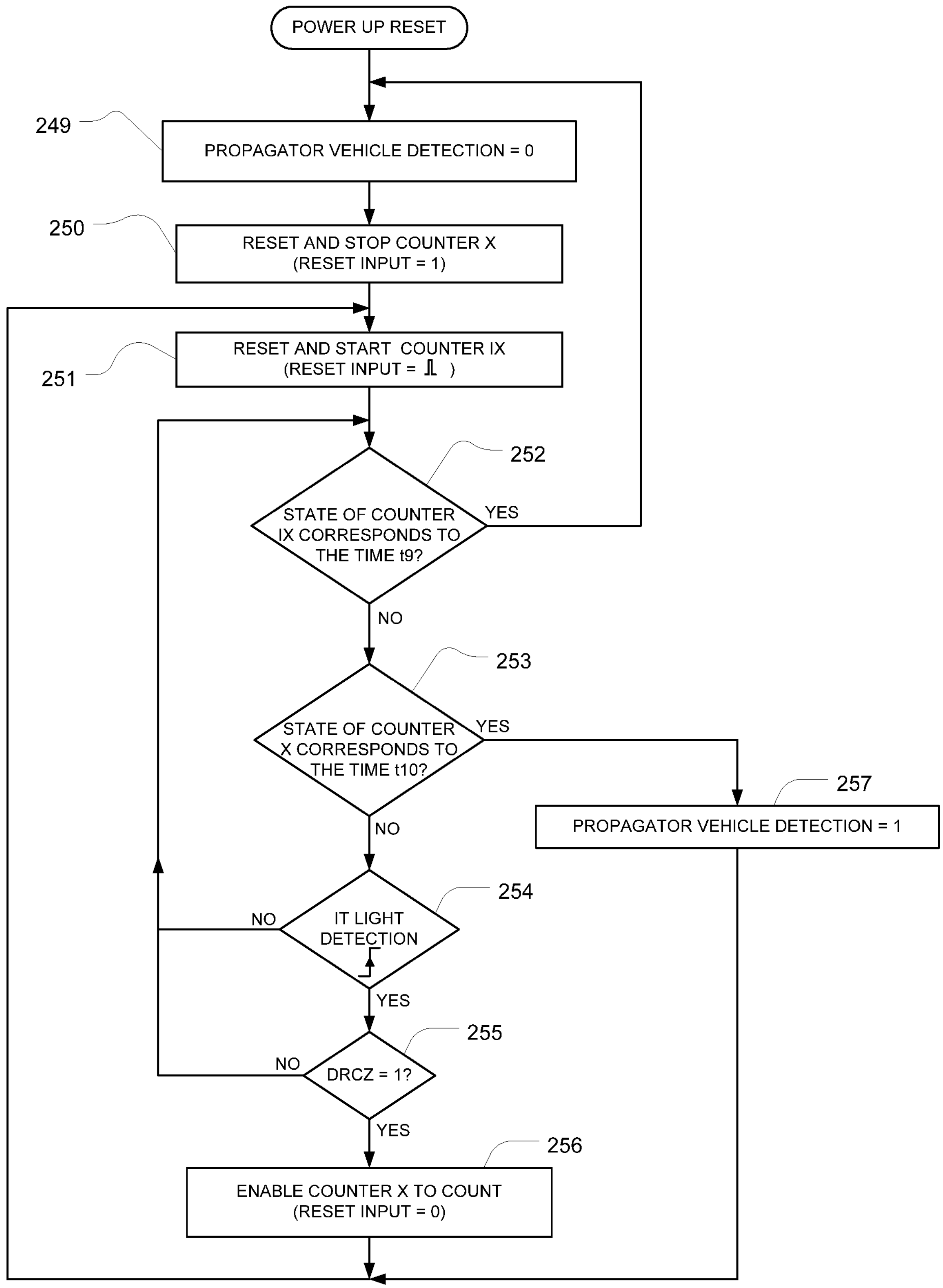
FIG. 58 shows the operation diagram of the block "Propagation vehicle detection" in FIG. 56, according to an exemplary embodiment of the invention.

FIG. 58 shows the operation diagram of the block "Propagation vehicle detection" 247. This block allows determining when the vehicle is "successor" in propagating a phase change (see propagator-successor relation in the Inter-vehicle synchronization procedure with external assistance). When this block 247 determines that the vehicle is detecting pulses of light whose positive flanks fall within the DRCZ it will activate the "vehicle propagation detection" output to indicate to the system synchronization block that it must invert the ICS phase and propagate the change Phase as will be described in due course. Activation of the "propagating vehicle detection" output requires the temporary analysis of the "light detection IT" signal in relation to the DRCZ signal and is performed by the "tolerant verification" algorithm already used in the previously described systems. The algorithm verifies for a time interval that we will call "t10" if the signal "detection of light UI" is giving positive flanks inside the DRCZ with certain regularity own of the flashing light. Said time "t10" will have a duration of several periods T and will be controlled by the "counter X" which, upon reaching the value corresponding to the time "t10", will cause activation of the "propagating vehicle detection" output. On the other hand, such regularity of the flashing light will be controlled by another counter which we will call "counter IX", which will be reset every time the "light detection IT" signal has a positive edge within the DRCZ. If said counter reaches the value corresponding to a time "t9", the counter X will be reset, thus avoiding reaching the value corresponding to the time "t10". Obviously, the minimum value that can be given to "t9" is T. assigning a higher value (e.g. 2T or greater) makes this algorithm "tolerant".

We now return to the description of the operation diagram of FIG. 58. A "power up reset" pulse causes: the zeroing of the "propagating vehicle detection" output at step 249, resetting and stopping the counter X in step 250 and resetting and starting counter IX at step 251. When the signal "light detection IT" has a positive edge within the DRCZ the sequence will include steps 254, 255, 256, 251, . . . leaving the counter X enabled to count in step 256, and zeroing the counter IX in step 251. If said sequence is repeated, without the counter IX reaching the value corresponding to the time "t9", When the counter X reaches the value corresponding to the time "t10", in step 253, the "propagating vehicle detection" output will be activated in step 257 and then the counter IX will be set to zero in step 251. On the other hand, when the vehicle stops detecting pulses of light whose sides fl the count IX will reach the value corresponding to the time "t9" and the sequence will pass from the decision point 252 to step 249 whereby the "propagation vehicle detection" output will be deactivated and counters X and IX treated equal Which when giving a power up reset pulse—steps 250 and 251—. "T10" must be greater than "t9" since "t10" is the time during which "pulses" of light are "verified" to the zone DRCZ with a regularity conditioned by "t9".

Figure 59:
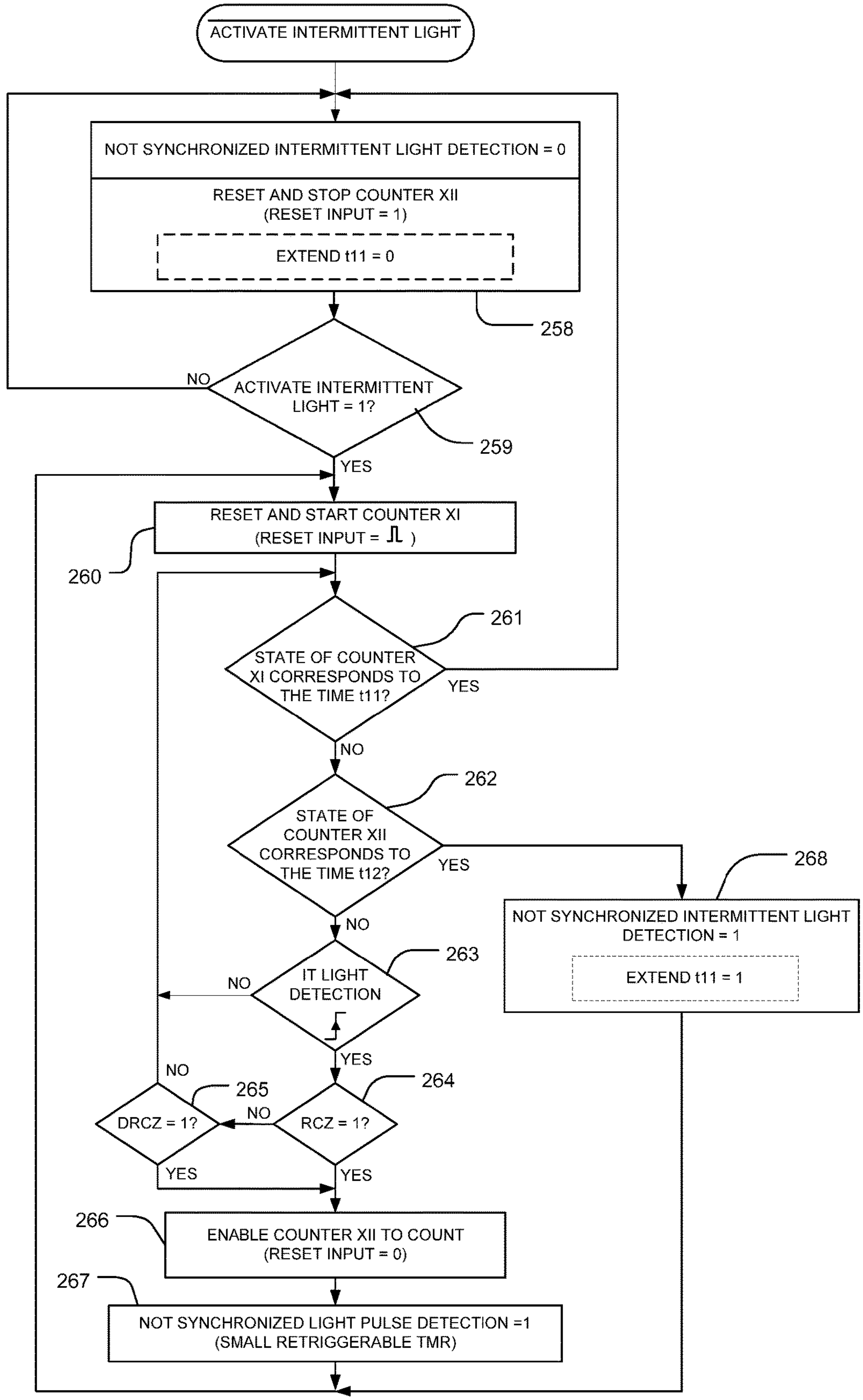
FIG. 59 shows the operation diagram of the block "Non-synchronized flashing light" in FIG. 56, according to an exemplary embodiment of the invention.

The "Non-Synchronized Blink Detection" block 248 has the primary function of determining when the vehicle has been involved in a non-synchronized NVE. When this happens the output "Non-synchronized flashing light detection" will be activated and the "Inter-vehicular synchronization with external assistance" block 233 will also be activated as will be described later. FIG. 59 shows the operation diagram of said block 248. When the "turn on flashing" signal from block 241 is set to low value, the sequence starts at step 258 and is maintained in said passage 258 until the signal "activate light Flashing" is set to high value (see step 259). Since in said step 258 the "Non-synchronized flashing light detection" output is set to low value, this "Non-synchronous flashing light detection" block 248 will remain inactive if the vehicle does not participate in an NVE. To activate the output "Non-synchronized flashing light detection", it is necessary to carry out the temporary analysis of the "light detection IT" signal in relation to the "RCZ" and "DRCZ" zone signals. This is because the vehicle may be receiving non-synchronized light with or without phase shift depending on its location within a non-synchronized NVE. This time analysis will be performed using the "tolerant verification" algorithm already used. When the signal "light detection IT" has a positive edge within the RCZ or within the DRCZ the sequence will advance through the steps . . . 263, 264, 266, 267, 260 . . . , or by the steps . . . 263, 264, 265, 266, 267, 260 . . . , as appropriate.

Either of these two sequences is enabled to count "counter XII" at step 266, activates the re-displayable timer "unsynchronized light pulse detection" at step 267 (this timer is of short duration, 2 or 3T, and is used in block 246) and zeroes the counter XI in step 260. If any of these sequences is repeated, without the counter XI reaching the value corresponding to the time "t11", the counter XII will reach the value corresponding to the time "T12" at step 262, the "non-synchronized flashing light detection" output will be activated at step 268 and then counter XI will be set to zero at step 260. On the other hand, when the vehicle stops detecting pulses of Light whose positive flanks fall in the RCZ or DRCZ zones the counter XI will reach the value corresponding to the time "t11" and the sequence will pass from the decision point 261 to the step 258 whereby the "non-synchronized flashing light" Will be deactivated and the counter XII treated as indicated by step 258. The signal "extend t11" is shown in the diagram framed in broken line indicating that its use is optional. This signal "extend t11" is activated and deactivated next to the "non-synchronized flashing light detection" output signal in steps 268 and 258 respectively, and will be used to extend the time delay "(For example using said signal to give value to one or more of the bits that make up the value corresponding to the time "t11").

However, when the "non-synchronized flashing light detection" output is inactive, "t11" will be less than "t12" since "t12" is the time during which "pulses" of light are being" Either in the RCZ or in the DRCZ, with a regularity conditioned by "t11".

Figure 60:
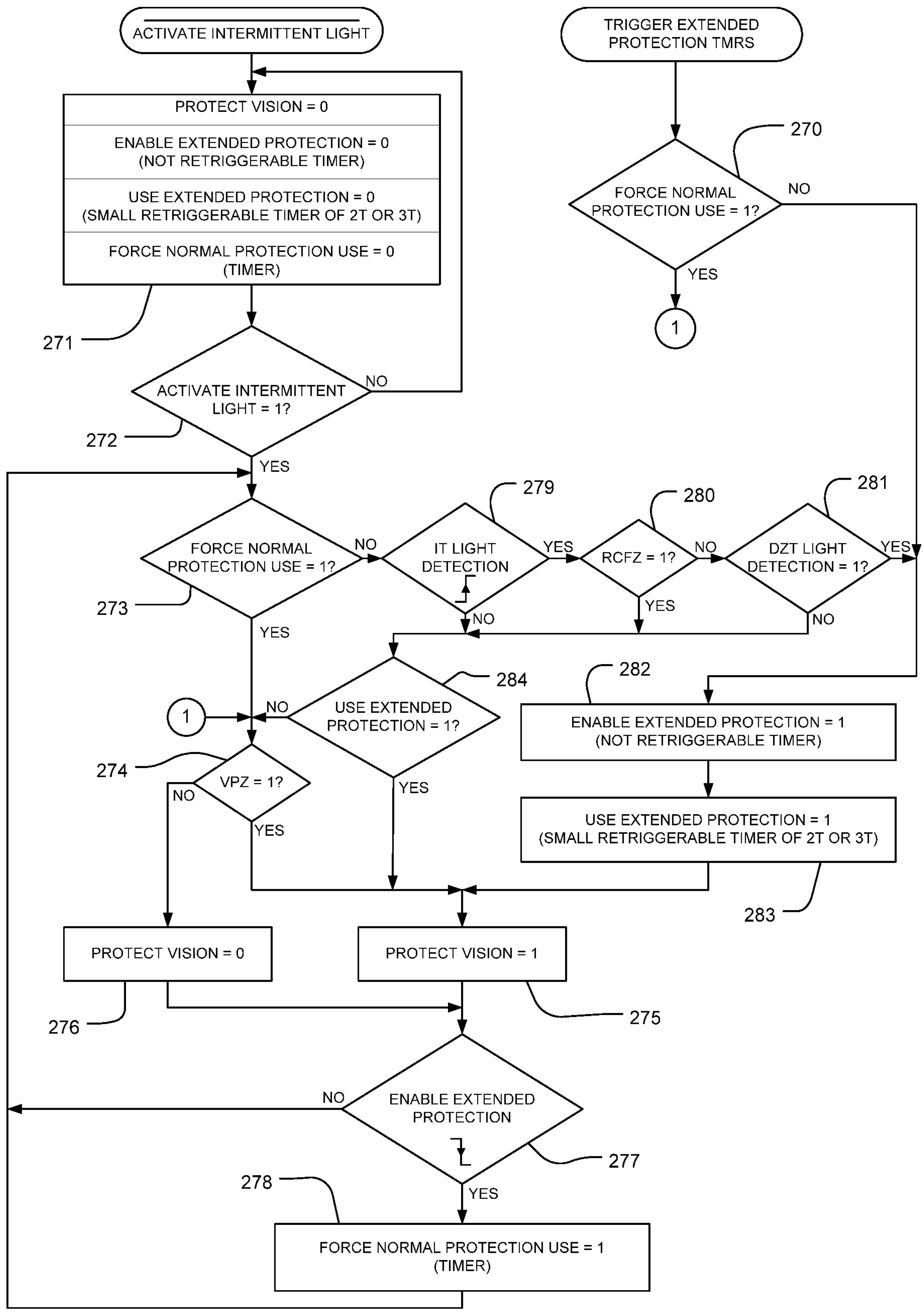
FIG. 60 shows the operation diagram of the block "Vision protection" in FIG. 56, according to an exemplary embodiment of the invention.

The operation diagram of the "Vision protection" block 243 of FIG. 56 is shown in FIG. 60. Remember that while the "protect vision" output of said block 243 is maintained at high value the "Protection device of Vision "243A shall prevent or attenuate the passage of light. This block constitutes an enlarged version of its homonymous block 167 of FIG. 34 and this extension is because in this system, unlike previously described, encounters with non-synchronized vehicles may be more frequent, encounters in which the driver of a vehicle that must propagate a phase change could be exposed, for a brief instant of time, to intense non-synchronized light. This is because in the propagation of a phase change the vehicles may be shorter than the one that normally separates the vehicles that initiate a non-synchronized NVE and therefore would not be affected in the same way as those that Synchronize their lights when they are still far apart. For a vehicle involved in the propagation of a phase change the exposure time to the non-synchronized intermittent light is initiated when the vehicle preceding it in said phase change (" ancestor" vehicle) begins to emit pulses of light with phase displacement, and can be extended until its "successor" (if any), in turn, emits pulses of light with phase displacement. Although the duration of this exposure to the non-synchronized flashing light is very short (its duration will be specified below for "the worst case") a possible nuisance to the driver of the vehicle may be avoided by extending, during said brief instant of time, the range of vision protection.

This has been contemplated in one embodiment of the "vision protection" block 243, whose operating diagram is shown in FIG. 60, and the description of which is now taken up. When the "turn on flashing" signal is set to low value, the sequence starts at step 271 and is maintained at said step 271 until the "turn on flashing" signal is set to high value (see step 272). Since in said step 271 the "protect vision" output remains in value under said block 243 will remain inactive if the vehicle does not participate in an NVE. In step 271 the timers "enable extended protection", "use extended protection" and "force use of normal protection" are also inactive. The "enable extended protection" timer is not re-displayable and, as the name implies, it sets a time span during which it is possible to extend the vision protection, if necessary. The "use extended protection" timer is short (2 or 3T may be sufficient) but it is re-displayable and indicates when it is necessary to enforce such extended protection. The timer "force use of normal protection" is triggered each time the "enable extended protection" timer is extinguished, preventing, while active, the two timers used to extend the vision protection can be triggered again. This is done to ensure that there can be no two periods of extended vision protection without there being in the meantime a much longer period of "normal" vision protection that makes it practically imperceptible to the driver that such extended protection existed.

Thus, the "enable extended protection" timer will be triggered when the timer "forcing normal protection" is inactive, the vehicle detects a non-synchronized strong light pulse, or when the "Trigger Extended Protection TMRs" signal is active in the form of a narrow pulse being inactive said timer "to force use of normal protection" (hereinafter "this particular case" is described). Said "enable extended protection" timer will have the minimum duration necessary to prevent the driver from being exposed to unsynchronized intense light pulses, which could occur during the propagation of a phase change. This "enable extended protection" timer must be triggered next to the "use extended protection" timer, the latter timer being retriggered with the arrival of each new non-synchronized high beam pulse, so that the extended vision protection is only maintained if said Pulses continue to arrive with some regularity. If this is not the case, the vision protection is again the "normal", that is to say the one that applies only in the VPZ. However, such extended protection could be re-applied as long as the "enable extended protection" timer has not been extinguished. We will now see which sequences correspond in the diagram of FIG. 60, each of the situations just described:

If the timer "force use of normal protection" is active, either at step 273 or 270, the only possible sequences are . . . 274, 275, 277 . . . and . . . 274, 276, 277 . . . through which the "protect vision" output is activated within the VPZ and deactivated outside of said zone respectively. Without giving rise to the use of extended vision protection.

If the timer "forced use of normal protection" is not active in step 273, and an unsynchronized pulse of intense light is detected, the sequence given by steps 273, 279, 280, 281, 282, 283, 275 . . . triggering the "enable extended protection" timers—in step 282—and "using extended protection", at step 283, and activating the "protect vision" output at step 275, regardless of the state of The VPZ signal. If a new non-synchronized high beam pulse has not been detected but the "use extended protection" timer is still active—at step 284 the "protect vision" output will also remain active, at step 275, regardless of the status of the VPZ signal.

If the "triggering extended protection TMRs" signal is activated, the timer "forcing use of normal protection" is inactive in step 270, the sequence given by steps 270, 282, 283, 275 is executed. By triggering the "enable extended protection" timer, at step 282, and the "use extended protection" timer at step 283.

When the "enable extended protection" timer expires—at step 277—the timer "force use of normal protection" is triggered at step 278. The sequences 273, 279, 284, 274, . . . or 273, 279, 280, 284, 274, . . . or 273, 279, 280, 281, 284, 274, . . . correspond to the use of the "normal viewing protection" even though the timer "force use of normal protection" is inactive, since the "use extended protection" timer will also be inactive.

To further optimize the operation of one embodiment of the "Vision protection" block, it should be noted that, except when the "triggering extended protection TMRs" signal is activated in the vehicle, the driver of the vehicle will only have the protection of vision extended after receipt of a first non-synchronized pulse of intense light. Protection that will then remain active while the "use extended protection" timer is active, thus anticipating the possible arrival of a next unsynchronized pulse of intense light during the propagation of a phase change. Thus, normally, the driver will not have vision protection for said first non-synchronized high beam pulse, unless the onset of said pulse falls within the VPZ. As this will not occur if said pulse is emitted by a propagating vehicle after reversing its phase, protection for said first pulse can be obtained by doing the following two things:

1. Adopting for the phase shift that vehicles will eventually apply to their EPILs, a value (DESP) close to the minimum valid value between 0° and 180°. Thus, the beginning of each light pulse (and a good part of the pulse) that a vehicle emits with said phase shift will be received by another vehicle synchronized with the previous one inside its VPZ (the minimum value "DESP" must be higher Than the width of the RCFZ to ensure that this phase-shifted emission is recognized as such by the receiving vehicle, see FIG. 57).

Figure 61:
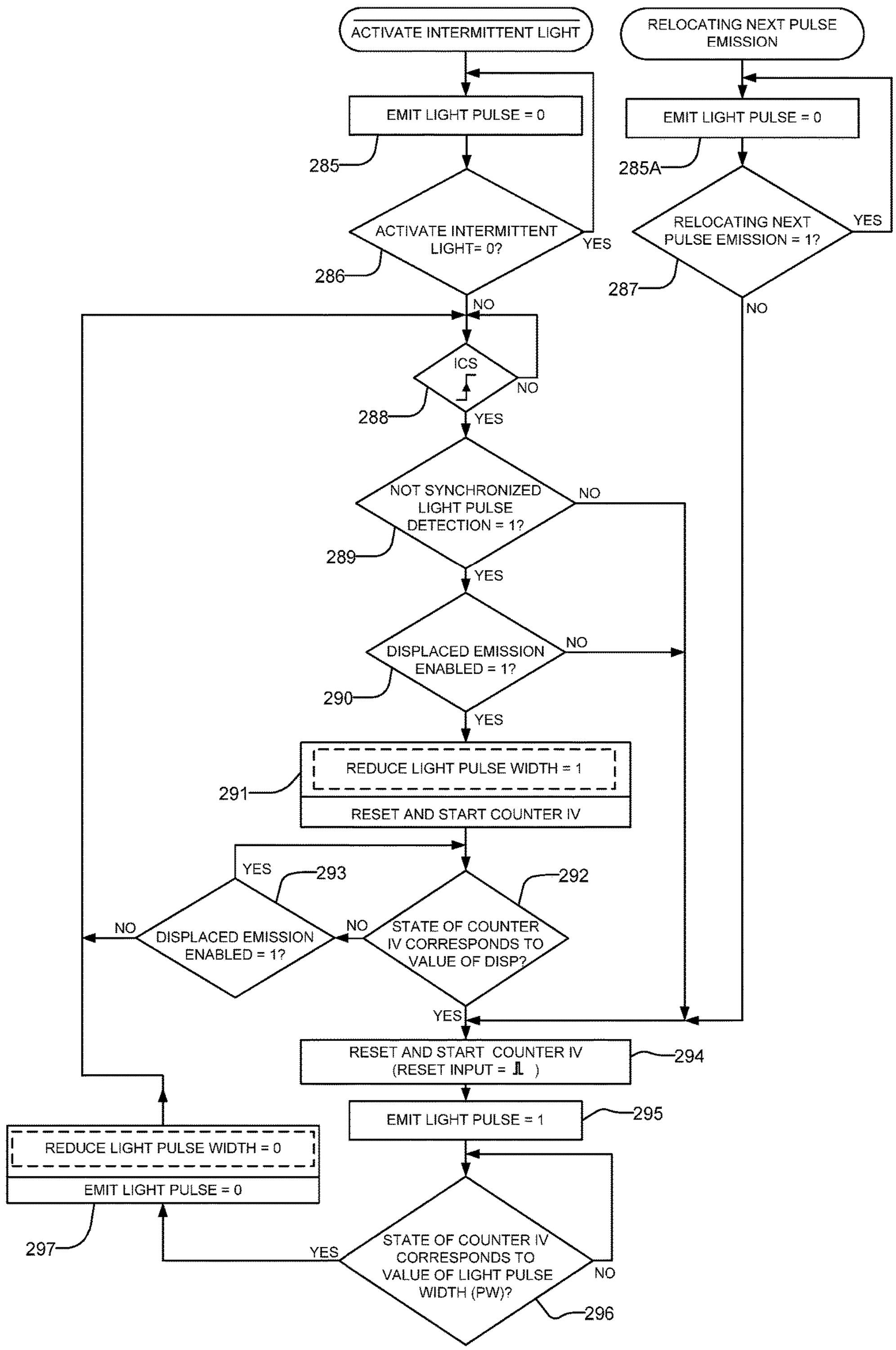
FIG. 61 shows the operation diagram of the block "Light pulse emission control" in FIG. 56, according to an exemplary embodiment of the invention.

2. Making "propagating" vehicles emit at least one displaced light pulse before changing phases, i.e. when they are still synchronized with their "successors". FIG. 61 shows the operation diagram of the block "Light pulse emission control" 246 of FIG. 56. As already mentioned, this block has the same function as its namesake of FIG. 51 or 34, that is to say, "to handle the emission of pulses of intermittent light from the vehicle", but differs in its content since, in contrast to what happens in the systems previously described, in this system is altered by brief intervals of time the EPIL of the vehicle applying a predetermined phase shift to transmit information to other vehicles within a non-synchronized NVE. On the other hand, as already described in describing the inter-vehicular synchronization procedure with external assistance, in addition to using said predetermined phase shift (defined in the system by the value DESP) there are times when the vehicle must emit its "next pulse of light" with a non-predetermined delay (for example to end a competition). This last type of emission will be controlled by the system through a signal that we will call "relocating emission of the next pulse". This signal once activated delays the emission of the next pulse of light until it is deactivated, at which moment that pulse will be emitted.

Referring again to the operation diagram of FIG. 61, when the "turn on flashing" signal is set to low under the sequence initiated in step 285 by setting the "emitting light pulse" value to low, and is maintained in said step 285 until the "turn on flashing" signal is set to high value (see step 286). Similarly, when the signal "relocating emission of the next pulse" is set to high value, the sequence starts at step 285A by setting the "emitting light pulse" value low, and is maintained in said step 285A until Signal "relocating emission of the next pulse" is set to low value (see step 287). It is worth mentioning that the signal "relocating the next pulse" is only activated during the synchronization of an NVE, so that the signal can only be activated when the signal "activate flashing" is already active and therefore the sequences starting in Steps 285 and 285A cannot occur simultaneously. When the "enable flashing" input is activated, the sequence proceeds from step 286 to step 288 in which a positive edge of the ICS input is expected. With this positive edge, the immediate emission of a light pulse will occur if the "non-synchronized light pulse detection" timer is not in high value or if the "enable emitted emission" signal is deactivated, which corresponds to the sequences 288, 289, 294, 295, . . . or . . . 288, 289, 290, 294, 295, . . . respectively.

The emission of a displaced light pulse, with respect to the positive ICS flank, begins to take place when the "non-synchronized light pulse detection" timer and the "enable displaced emission" signal are active (both at high value) In steps 289 and 290 respectively. However, only if the "enable shift off" signal remains active until the IR counter reaches the "OFF" value (see steps 293 and 292) the emission of said offset light pulse will take place (see steps 292, 294, 295 . . . ). However, since the "non-synchronized light pulse detection" timer is activated only if the vehicle is detecting pulses of light starting at the RCZ or the DRCZ (see FIG. 59), we cannot that a vehicle that Receiving phase-shifted pulses of light will not displace its EPIL (even if it is enabled to do so) unless such phase-shifted light pulses come from vehicles not synchronized with it. Broadening the description of FIG. 61, step 291 includes the option of activating the "reduce light pulse width" signal used to reduce the width of the pulses of light being emitted displaced (the reason for this is Explained below). In said step 291, the counter IV is also set to zero and the displacement meter (DESP) to be applied to the emission of said light pulse is started. When said counter IV reaches the value DESP the sequence proceeds from decision point 292 to step 294 where the counter IV is again set to zero and started to control the width of the light pulse whose emission starts at step 295 and ends in step 297, after said counter IV has reached the value corresponding to the width of the light pulse "PW" in step 296 (in step 297 also the deactivation of the "reduce light pulse width" signal must be included) If this option is used). Upon completion of the emission of a light pulse the sequence returns to step 288 waiting for the next positive ICS flank. If the signal "relocating next pulse emission" is activated, the next emission will occur at the time that the signal is deactivated again, which corresponds to the sequence 285A, 287, 294, 295, . . . . Clock signal for said counter IV will be conformed by the output Qi of the counter/divider 11 which provides the time base for measuring the width of the light pulses and the offset or offset that a vehicle will apply to its EPIL.

Figure 62:
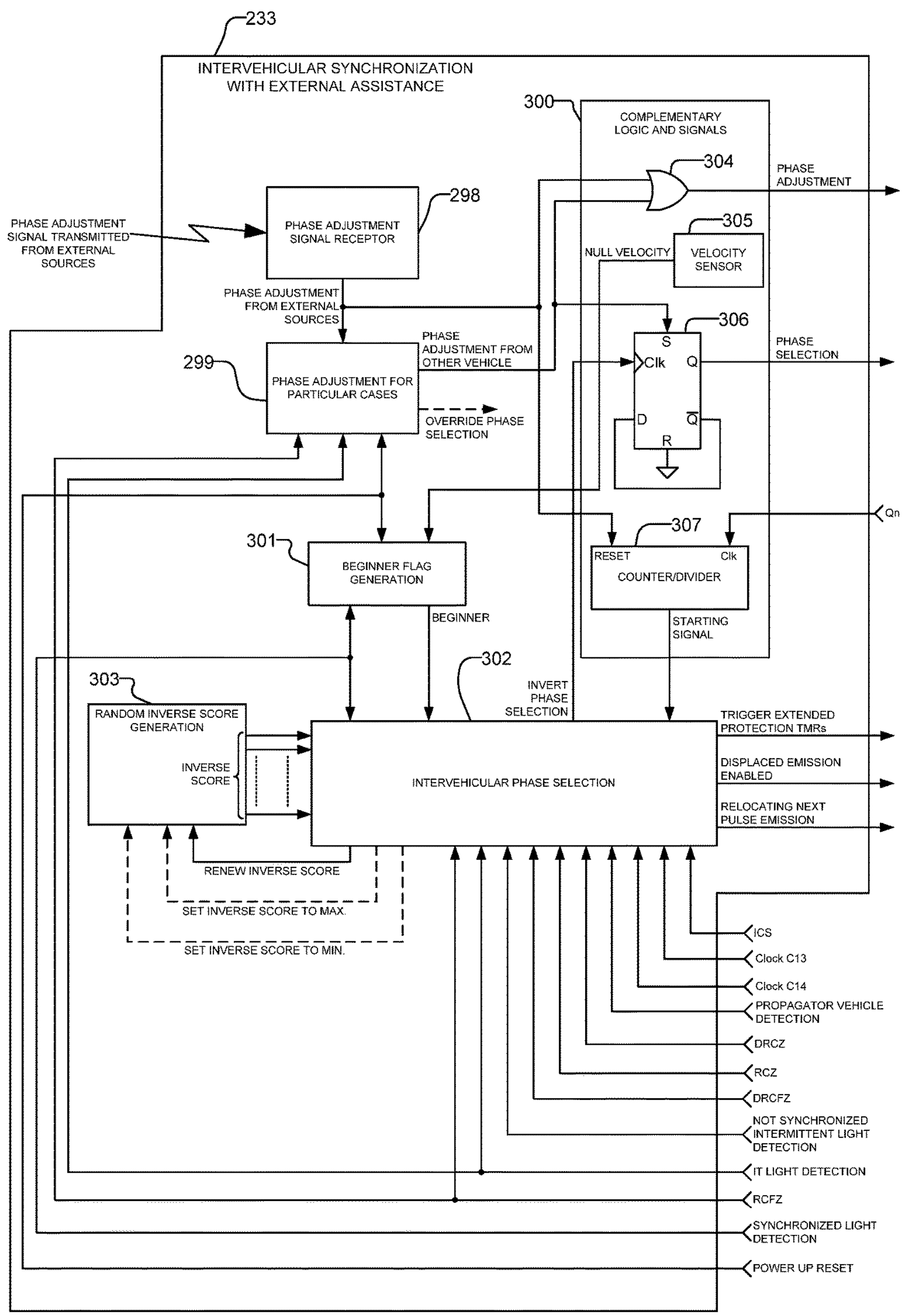
FIG. 62 is a Diagram showing the contents of a version of the composite block "Inter-vehicular synchronization with external assistance" in FIG. 56, which makes use of "Synchronization with pseudo randomization", according to an exemplary embodiment of the invention.
Figure 63:
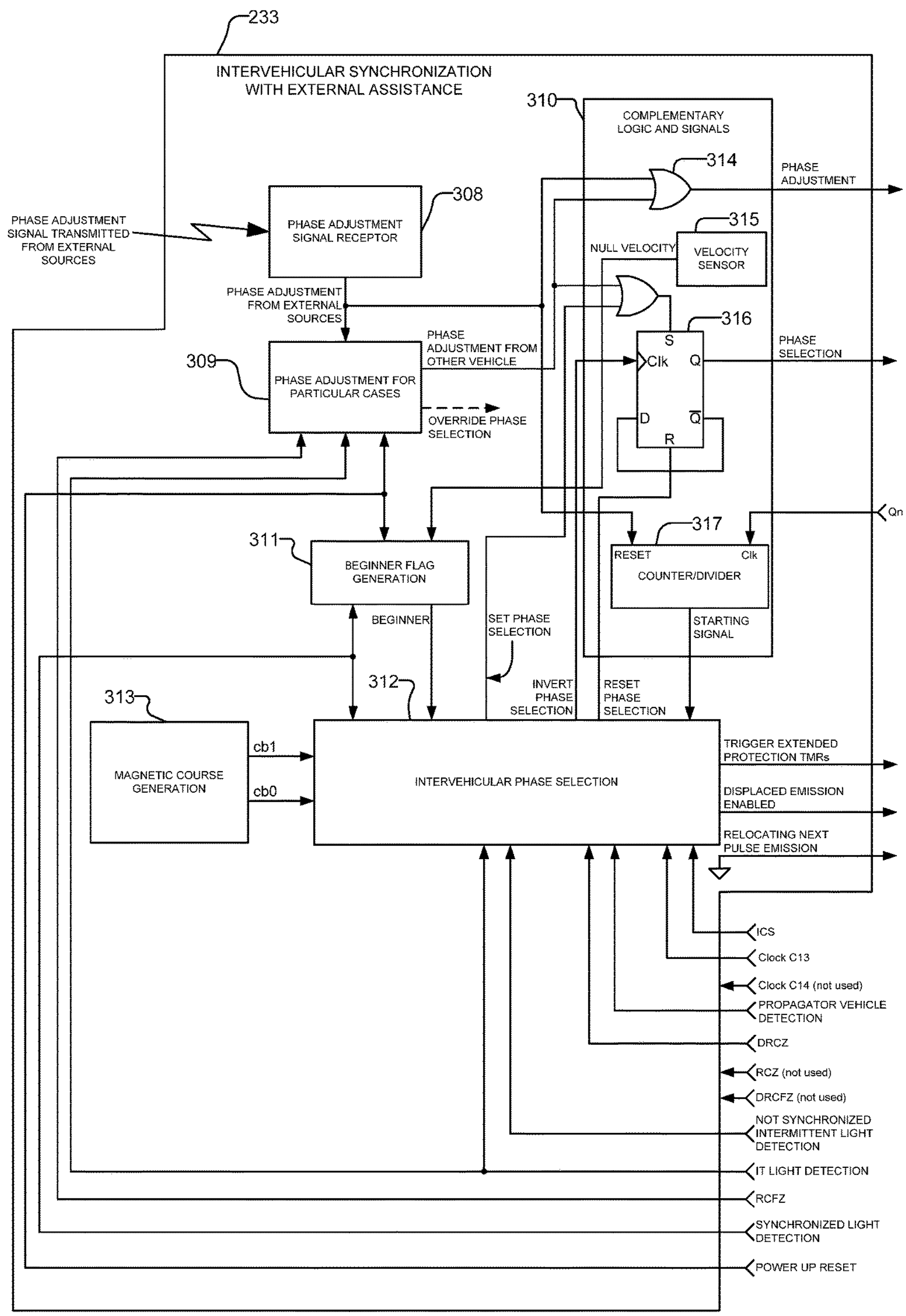
FIG. 63 is a diagram showing the contents of a version of the composite block "Inter-vehicular synchronization with external assistance" in FIG. 56, which makes use of "synchronization with magnetic heading hierarchy", according to an exemplary embodiment of the invention.

The block to be described, "Inter-vehicular synchronization with external assistance" 233 of FIG. 56, is a composite block and will be presented in two versions whose contents are shown in the simplified diagrams of FIGS. 62 and 63 respectively. These two versions of block 233 arise due to the existence of two versions for the component block "Inter-vehicular selection of phase", which in one version makes use of "Synchronization with pseudo-randomization" and in the other version it uses "synchronization with Hierarchization by magnetic heading" (see inter-vehicle synchronization procedure with external assistance).

In the version of said block 233 schematized in FIG. 62, the "Inter-phase selection" block 302 uses Synchronization with pseudorandom Hierarchy, so that version includes the block "Generation of pseudorandom inverse score" 303. In the version of said block 233 schematized in FIG. 63, the "Inter-vehicular phase selection" block 312 uses synchronization with magnetic heading hierarchy, so the latter version includes the "Magnetic bearing" block 313.

The block "Generation of pseudo-random inverse score" 303 of FIG. 62 has the function of generating the pseudo-random value mentioned in the inter-vehicular synchronization procedure with external assistance and which we have called "inverse score". This block has the following entries: "renew inverse score", "put inverse score at maximum" and "put inverse score at minimum". When the "renew reverse score" signal is activated, block 303 generates, in a pseudo-random fashion, a new inverse score value. When the "put reverse score at maximum" signal is activated, block 303 generates the expected maximum value for the inverse score. And when the "reverse score in minimum" signal is activated, block 303 generates the minimum predicted value for the inverse score. The minimum predicted value for the inverse score is 1 and the maximum depends on the number of bits used to generate that score.

The "Magnetic bearing" block 313 of FIG. 63 has the function of determining the sector or quadrant that corresponds to the vehicle in function of its magnetic direction, to be used as described in the inter-vehicular synchronization procedure with External assistance. Since the 360° of the compass will be divided into four sectors or quadrants the output of said block 313 will be coded using two bits that we will call "cb0" and "cb1", where "cb0" is the least significant bit.

The blocks "Phase adjustment signal receiver", "Phase adjustment for particular cases" and "Beginner Flag Generation" have identical function and content in the versions of FIGS. 62-63, while the Block "Logic and complementary signals" has the same function and similar content in the versions of FIGS. 62-63, and will be described below:

The "Phase Adjustment Signal Receiver" block, 298 in FIGS. 62 and 308 in FIG. 63, allows vehicles to acquire the "Phase Adjustment Transmitted by External Sources" signal to be able to adjust the two alternate phases For the EPIL given by Qn and therefore the ICS phase of the vehicle. This block contains an Omni-directional receiver of the same characteristics as the receiver of block 51 of FIG. 35 corresponding to the "externally synchronized anti-dazzling system". The already demodulated received phase adjustment signal will be available at the output of said block 298 or 308 as appropriate under the name "phase adjustment obtained from external sources".

The "Phase adjustment for particular cases" block, 299 in FIGS. 62 and 309 in FIG. 63, has the function of adjusting the phase of the vehicle's ICS when block 298 or 308, as appropriate, has left to provide the signal "phase adjustment obtained from external sources" for a time greater than the admissible. This block "Phase adjustment for particular cases" has the same name, function and content as block 203 of FIG. 52, described for the "externally synchronized anti-dazzle system with vehicular assistance" (with the only proviso that the "block Phase selection at high value" is not used in this system) and its operating diagram is shown in FIG. 55, the description of which is reproduced below:

Each time a pulse appears in the "phase adjustment obtained from external sources" signal, the "validate phase adjustment" timer is triggered (or redisplayed) at step 214. while said timer is active the "block Phase selection at high value" will remain at low value, see sequence given by steps 214, 215, 216, 215. If for some reason the"phase adjustment obtained from external sources" signal stops pulsating, allowing the Timer "to validate phase adjustment" is extinguished, then the sequence proceeds to step 217. The same happens when a power up reset pulse is given. From step 217, when the vehicle engages in an NVE and receives no synchronized light pulses, i.e. when it is receiving only non-synchronized blinking light, this block 203 will adjust the phase of the vehicle's ICS. For this purpose, the temporal analysis of the signal "detection of light UI" in relation to the signal "RCFZ" will be carried out by means of a "tolerant verification" algorithm as described for block 202. Thus, if the counter VIII achieves the value Corresponding to the time "t8", in step 220, it is confirmed that the vehicle is receiving only non-synchronized blinking light. On the other hand, the regularity of the flashing light will be controlled by another counter which we will call "counter VII", which will be reset each time the "light detection IT" signal has a positive edge.

So that if said counter VII reaches the value corresponding to the time "t7", the reception of intermittent light is discarded because it does not present the required regularity and the counter VIII is reset, thus avoiding reaching the value corresponding to the time "t8". That said, we can see that the sequence that includes steps . . . 221, 222, 223, 218 . . . corresponds to the situation that keeps the counter VIII enabled to count. The return path from step 221 to step 219 corresponds to waiting for the next unsynchronized light pulse. The sequence . . . 222, 217, 218, . . . occurs when the vehicle has received a synchronized light pulse which calls into question that said vehicle must readjust its phase and therefore both meters VIII and VII in steps 217 and 218 respectively. The sequence 219, 217 and 218 occurs when the vehicle is not receiving flashing light and thereby zeroes both counters VIII and VII. When the counter VIII reaches the value corresponding to the time "$t_8$" the sequence passes from the decision point 220 to the step 224 in which said counter is stopped, but not reset. This is done to enable the sequence 225, 219, 220, 224, 225 corresponding to the wait of the first light pulse after confirming reception of non-synchronized flashing light. When said first light pulse is presented, the sequence goes to steps 226 and 227 in which the "phase adjustment obtained from another vehicle" signal is activated in the form of a narrow pulse. Said "phase adjustment obtained from another vehicle" signal enters, through the OR gate 229, the "reset" input of the counter/divider 11 used in the "Generation of the flashing control signal" block 186 of the FIG. 51. Thus, the output Qn of said counter/divider 11 (like all its other outputs) is set to low value at the time the ICS of the vehicle emitting said first light pulse was set to high. Therefore, Qn must be selected as the ICS of the vehicle "receiver" of said first pulse of light to achieve the synchronization of its lights. To achieve this in step 228 the "block phase selection at high value" signal is activated. This signal, through OR gate 231, sets a high value at the "select" input of said block 186 of FIG. 51, which sets Qn as the ICS of the vehicle (see FIG. 20). The sequence then returns to step 217 whereby the phase adjustment will continue to be charged to the "Phase adjustment for particular cases" block 203 until the "phase adjustment obtained from external sources" signal is received again.

The block "Logic and complementary signals", 300 in FIGS. 62 and 310 in FIG. 63, will be described, given its simplicity, based on the logical scheme drawn therein. The "phase adjustment" output is obtained by the logic OR operation between the "phase adjustment obtained from external sources" and "phase adjustment obtained from another vehicle" signals. Said logic operation is shown in FIGS. 62-63 by OR gates 304 and 314 respectively. The "phase selection" output is obtained at block 300 of FIG. 62, from output Q of Flip-Flop Type D 306. The "phase adjustment obtained from another vehicle" signal enters the "S" input of Said Flip-Flop D 306 (to set the "phase selection" output to high value, thereby establishing the output Qn of the counter/divider 11 of FIG. 20 as the vehicle's ICS). The "reverse phase selection" signal enters the clock input of said Flip-Flop 306 while its data input is powered by the output of the Flip-Flop D 306 itself (thus the "phase selection" output will change of state with each positive edge of the "reverse phase selection" signal). In block 310 of FIG. 63, the "phase selection" signal is obtained by the Flip-Flop type D 316 which is handled in the same manner as said Flip-Flop D 306 with the addition that to its "Set" and "reset" inputs enter "set phase selection" and "reset phase selection" respectively from block 312 of said FIG. 63.

Figure 64:
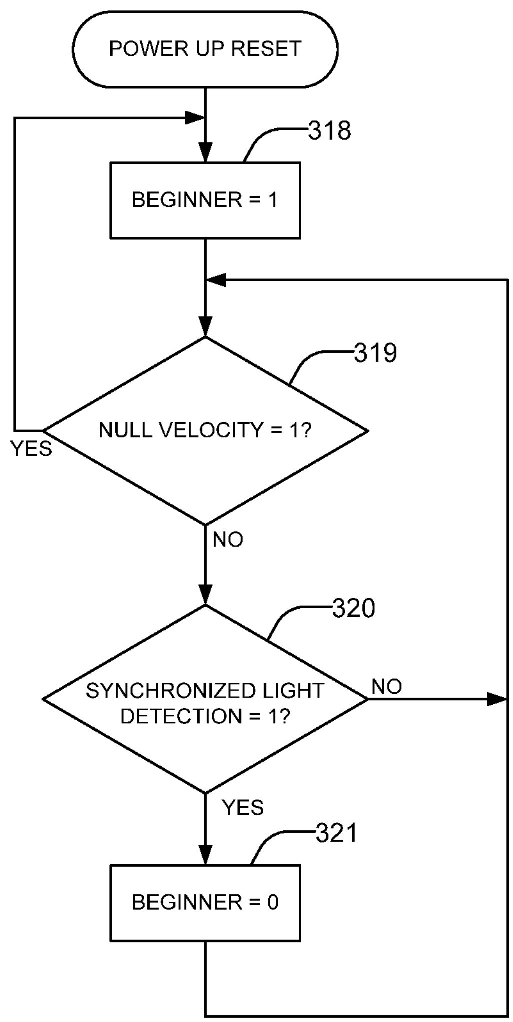
FIG. 64 shows the operation diagram of the block "Beginner Flag Generation" of FIGS. 62-63, according to an exemplary embodiment of the invention.

The counter/divider 307 in FIGS. 62, and 317 in FIG. 63, generates the "start signal" defined when the inter-vehicle synchronization procedure with external assistance was described so that the vehicles have the possible times for the execution of the inter-vehicular phase selection algorithm. In order to keep the "start signal" synchronized on all vehicles, said counter/splitter (307 or 317 as appropriate) is reset by the signal "phase adjustment obtained from external sources" and its clock input is fed by output Qn of the block "Generation of the flicker control signal" 234 of FIG. 56. Said block 234 will be simultaneously reset to said counter/divider (307 or 317 as appropriate) if the "phase adjustment transmitted by external sources" signal is receiving normally. The speed sensor, 305 in FIGS. 62 and 315 in FIG. 63, produces the "minimum or zero speed" signal to be activated when the vehicle reduces its speed below a permissible minimum or stops. This signal enters the block "Beginner Flag Generation", that will be described next:

The block "Beginner Flag Generation", 301 in FIGS. 62 and 311 in FIG. 63, has the function of indicating, by means of said flag, when the vehicle is initiating or restarting its night traffic for a certain path. The utility of generating this information has been analyzed in the procedure of inter-vehicular synchronization with external assistance, but we will remember that a vehicle that has this flag active will resign when, within an NVE, it interacts with a non-synchronized vehicle with a valid phase. FIG. 64 shows the operation diagram of this block "Beginner Flag Generation". When the "power up reset" signal is activated the "Beginner" flag is raised. The same happens if at the decision point 319 the signal "minimum or zero speed" is active. Otherwise, said flag will be set low if the sequence reaches step 321, i.e. when at the decision point 320 the "synchronized light detection" signal is active.

It should be noted that the entries "Clock C14", "RCZ" and "DRCFZ" are used in the version of the block "Inter-vehicular synchronization with external assistance" 233 of FIG. 56 schematized in FIG. 62 but are not used in the version of said block 233 schematized in FIG. 63. However, since the set of inputs and outputs for both versions of said block 233 has been unified in FIG. 56, in FIG. 63 these inputs are included as "unused". In addition, when block 233 of FIG. 56 is implemented according to the embodiment outlined in FIG. 63, the "relocating emission of the next pulse" signal, which enters the "light pulse emission control" block 246, will never be Activated. Therefore, said signal, which is one of the outputs of block 233, is shown grounded (low value) in said FIG. 63.

Figure 65A:
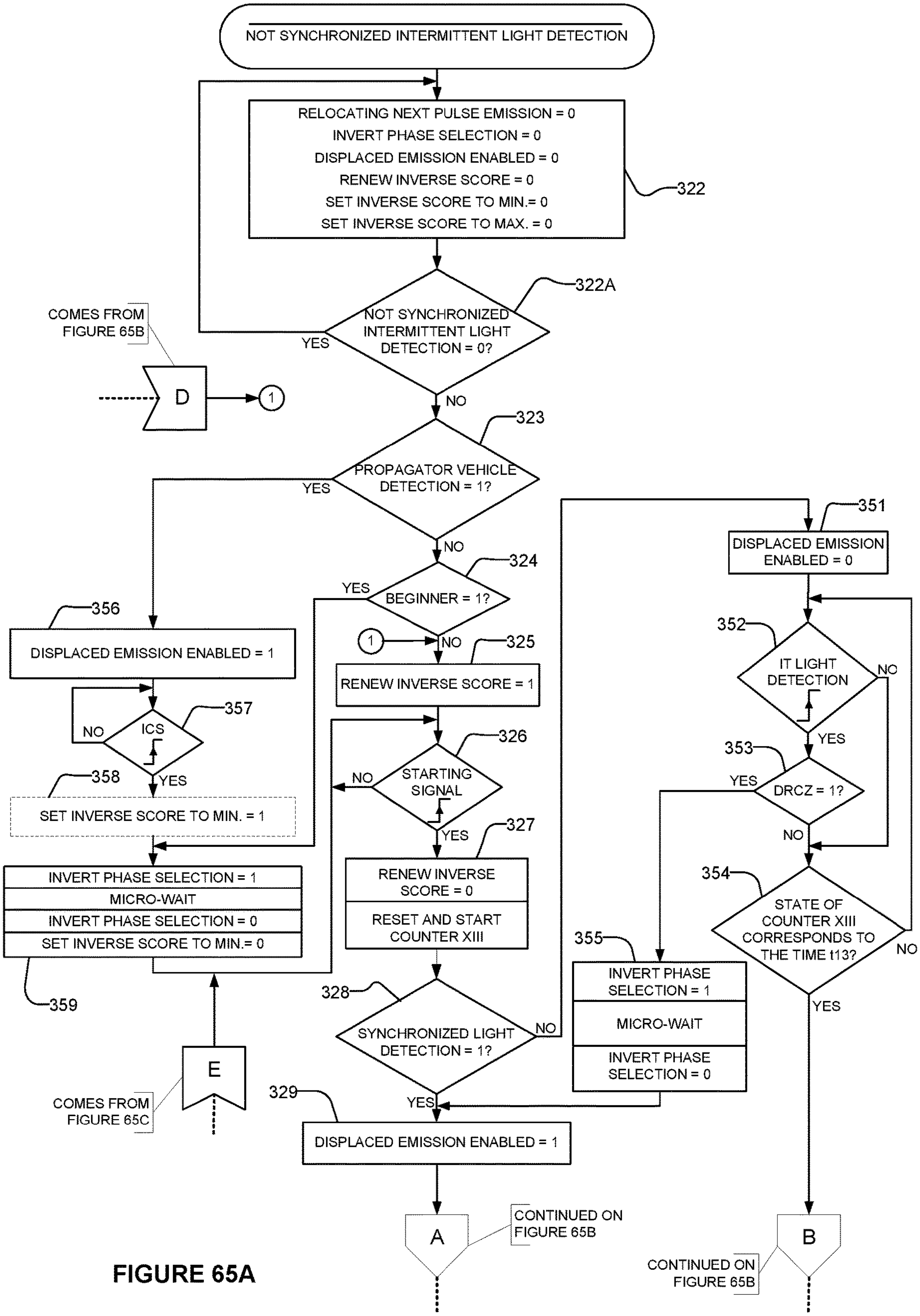
FIGS. 65-65F show the operating diagram of the block "Inter-vehicular phase selection" in FIG. 62, according to an exemplary embodiment of the invention.
Figure 65B:
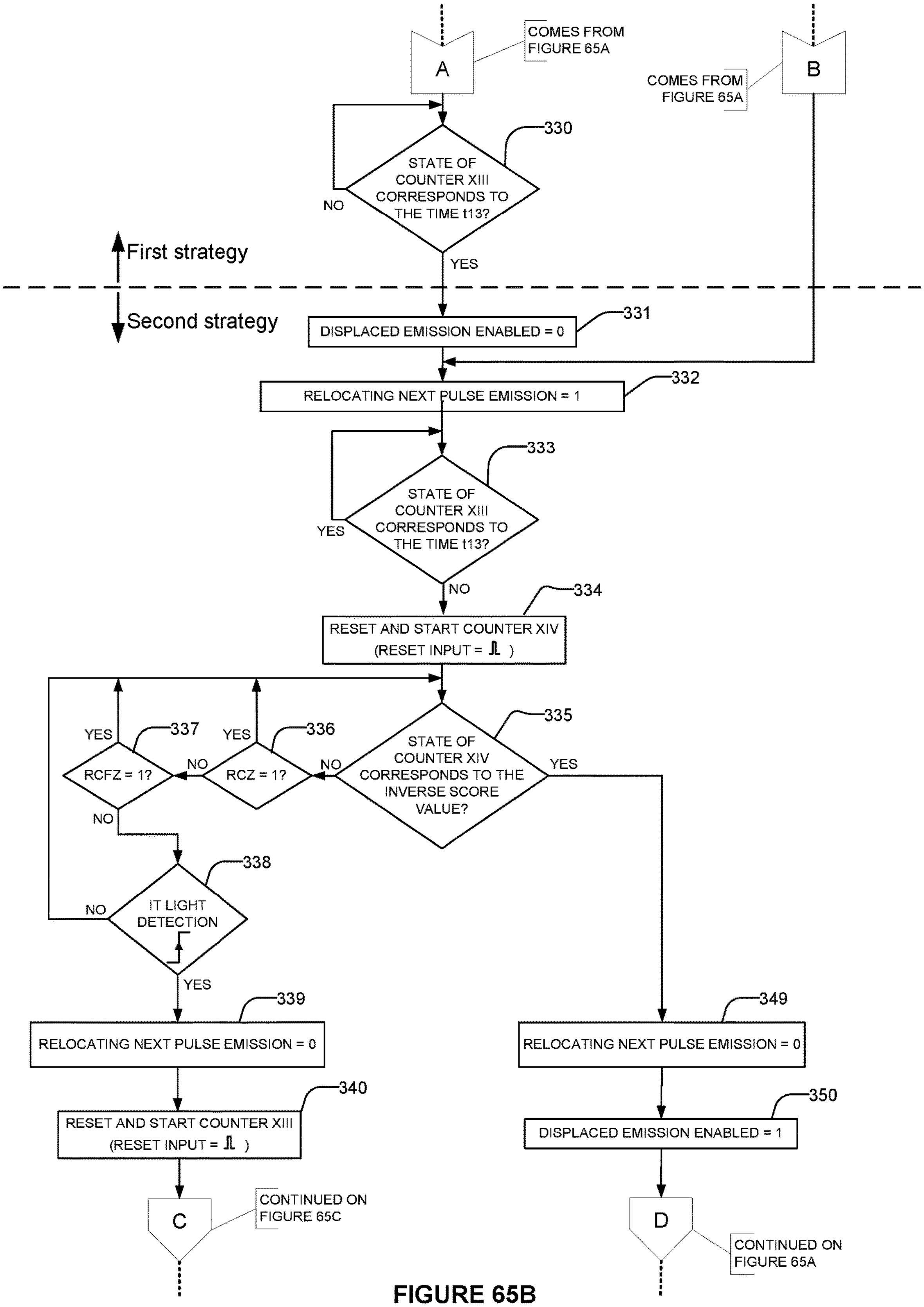
Figure 65C:
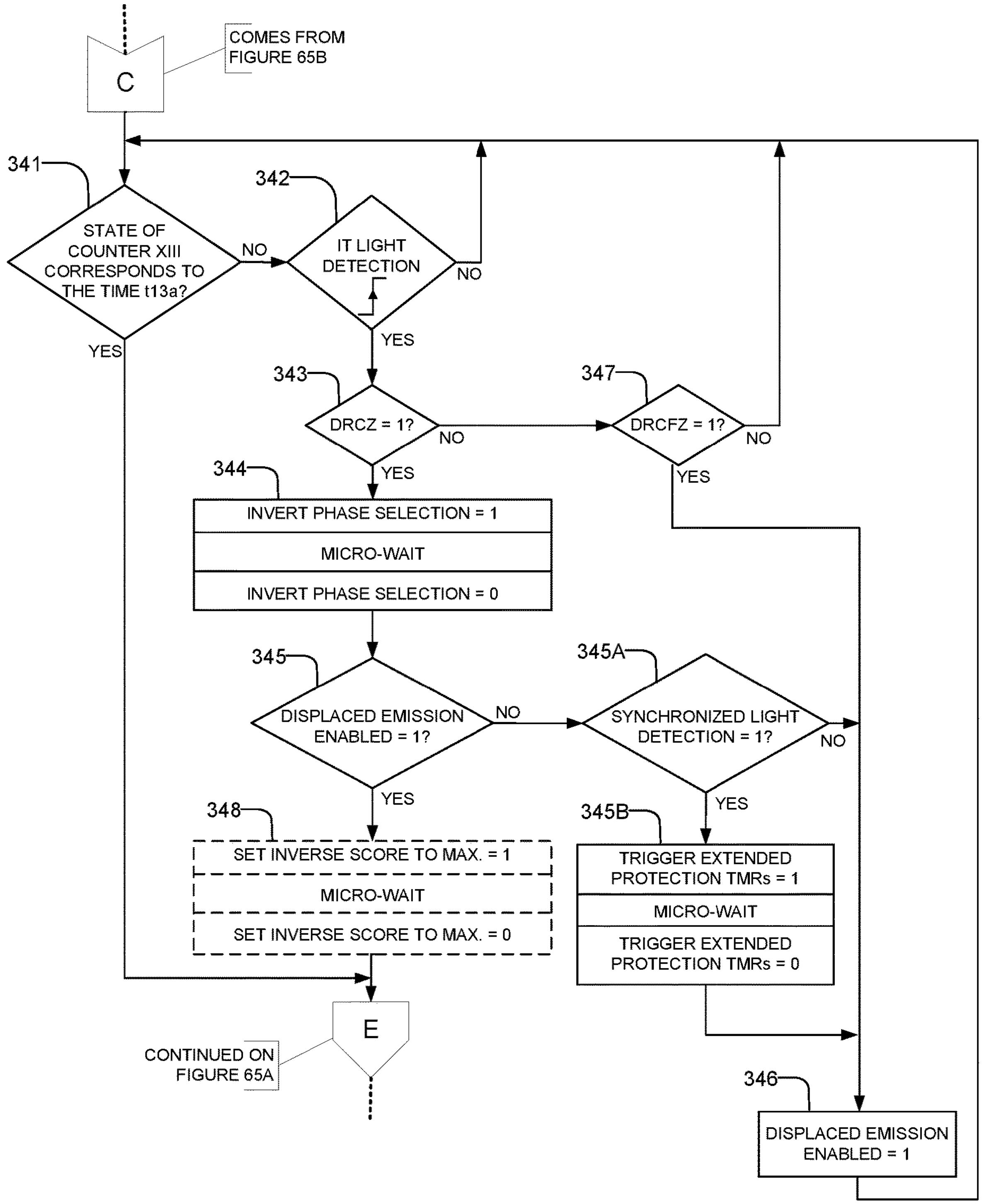

In order to complete the description of the system there is no description of the block "Inter-vehicular phase selection", which has been designed to implement the algorithm of the same name already described in the formulation of the Inter-Vehicular Synchronization with External Assistance procedure. This algorithm, as already mentioned, uses two strategies in order to establish different hierarchies between the vehicles of a non-synchronized NVE and obtain its synchronization. The first strategy that is applied is the one that hierarchies the vehicles according to their situation within the non-synchronized NVE, in order that some of these vehicles prevail their phase over that of the other vehicles. If this does not happen, a second strategy is applied in which each non-synchronized vehicle independently generates a second hierarchy to compete with the other vehicles for imposing its phase. From this second strategy, two alternatives have been described: "synchronization with pseudorandom hierarchy" and "synchronization with hierarchization by magnetic heading", giving rise to the two versions of this block "Inter-vehicular phase selection" that will be described as follows:

FIGS. 65A-65C shows the operation diagram of the "Inter-phase phase selection" block 302 of FIG. 62, which uses synchronization with pseudorandom hierarchy as the second synchronization strategy. When the "non-synchronized flashing light detection" signal is set to low, the sequence starts at step 322 by setting the following values to "Low Relay", "Reverse Phase Selection", "Offset", "reverse score at minimum" and "reverse score at maximum", and is maintained at said step 322 until the "non-synchronized flashing light" signal is set to high value (See step 322A). If the vehicle is not designated as a "successor" in the propagation of a phase change or as a "Beginner", the sequence proceeds from step 322A to the decision point 326 in which a positive edge of the start. In step 325 the "reverse scoring"

signal is activated which, acting on block 303 of FIG. 62, allows to obtain a new pseudorandom inverse score which will be used when the vehicle has to implement the second synchronization strategy. In step 327, said "renew reverse score" signal is deactivated and the counter XIII is started from scratch. The sequence then passes to the decision point 328 in which the state of the "synchronized light detection" signal is analyzed and that is where the sequence of non-synchronized NVE vehicles coming from a synchronized NVE (high hierarchy) of the sequence that will follow the vehicles that at the moment of being involved in said non-synchronized NVE were not interacting with any other vehicle (these "isolated" vehicles have low hierarchy).

We will analyze the different cases that solve the algorithm and we will see which sequences each case generates on the diagram (to facilitate this analysis, in FIG. 65A-65C it has been marked which part of the diagram corresponds to the application of the first strategy and what part to the Implementation of the second strategy).

Case 1: This is a non-synchronized NVE that has been formed due to the interaction between vehicles of an NVE synchronized with one or more "isolated" vehicles not synchronized with the former. At the decision point 328 vehicles from the synchronized NVE will have the "synchronized light detection" signal active, therefore in said vehicles the "enable shifted emission" signal is activated at step 329 and then a waiting time at the decision point 330. Enabling the shifted emission in step 329 is intended, in this case, for the vehicle to transmit information to the "isolated" vehicles as we shall see below. In "isolated" vehicles, as no synchronized light is detected, the sequence passes from the decision point 328 to step 351 where the "enable shifted emission" signal is deactivated. Then in step 352 the sequence initiates a cycle which will be controlled by the counter XIII in step 354, a cycle which can be interrupted by detecting a light pulse whose positive edge falls on the DRCZ (see steps 352, 353 and 355).

This sequence occurs because, in this Case 1, vehicles from the synchronized NVE are enabled to shift the emission of their light pulses to the non-synchronized light emitted by "isolated" vehicles. These "isolated" vehicles, upon receiving this "information", execute the sequence including steps 352, 353, 355, 329, 330 . . . , so by step 355 the status of the vehicle phase selection signal (see Flip-Flop 306 in FIG. 62) is reversed and then in step 329 the "enable shifted emission" signal is activated so that, if necessary, this vehicle can "defend" its new phase as a vehicle more synchronized NVE than just added. After the synchronization is completed, the "non-synchronized flashing light detection" signal will be deactivated, thereby resetting the "phase inter-selection" block 302 of FIG. 62, which we are describing.

Therefore, by properly choosing the value "t13" said block 302 can be reset during the waiting time at the decision point 330, returning the sequence to step 322 without that sequence becoming involved, for Case 1 that we are analyzing, to the steps corresponding to the second strategy. In an initial estimate, which will then be refined, we can say that the time "t13" must be greater than the sum of the time it takes the "isolated" vehicles, in this case 1, to change phase plus the "t11" time the "non-synchronized flashing light detection" signal is deactivated. This time "t13" is also used as the account limit for the counter XIII at the decision point 354, where there apparently the said limit could be lower. The reason will be explained later.

Case 2: When in any of the non-synchronized NVE vehicles the "synchronized light detection" signal is active, the sequence in each of said vehicles will go from step 328 to step 351 where the ""Will be disabled. Then, from step 352, the sequence enters a cycle controlled by the counter XIII in step 354, which cycle in this case 2 will only be interrupted when said counter reaches the value corresponding to the time "t13". This is because in this case 2 there are no vehicles coming from a synchronized NVE that emit their displaced light pulses. When the counter XIII reaches the value corresponding to the time "t13" the sequence passes to the part of the diagram corresponding to the application of the second strategy in order to be able to solve the synchronization of this NVE whose conformation is not enough to establish differences of "hierarchy" in vehicles. The description of that part of the diagram will be done after describing the remaining "cases".

Case 3: This is a non-synchronized NVE that is formed from the confiding union of two synchronized NVEs whose respective vehicles are not synchronized with each other. Said non-synchronized NVE starts when the closest vehicles of both synchronized NVEs begin to interact with each other. Once in these non-synchronized NVE initiating vehicles, the "unsynchronized flashing light" signal is activated in all of them, the sequence including 322, 322A, 323, 323, 324, 325, 326, 327, 328, . . . at decision point 328 said "initiator" vehicles will have the "synchronized light detection" signal active and then the sequence will go to step 329 where each vehicle is enabled to emit pulses of light shifted in phase (pulses that in This case fulfills the function of enabling, if necessary, the protection of vision extended in the first potential successors, predicting that the NVE from which they come may be the one that has to change phases). Then at the decision point 330 the wait time handled by the counter XIII will normally arrive at its end ("t13"), since in this case, as no vehicle has yet changed its phase, the "intermittent light detection Synchronized" remains active. When the counter XIII reaches the value corresponding to the time "t13", the sequence passes to the part of the diagram corresponding to the application of the second hierarchical strategy since, as in Case 2, the conformation of this type of NVE It is not enough to establish among these "initiator" vehicles differences of "hierarchy" that allow to achieve the synchronization. As already mentioned, we will now describe that part of the operating diagram.

Case 4: In this case we will discuss the synchronization of vehicles that are successors in the propagation of a phase change. In a non-synchronized NVE such as Case 3, after the NVE initiating vehicles have synchronized their lights (applying the second strategy), vehicles that have had to change phases will have to propagate that phase change (applying the first strategy). These propagating vehicles, which are now no longer synchronized with their successors, are enabled to apply a phase shift to their EPIL, therefore in said successor vehicles the "propagating vehicle detection" signal (see FIG. 58) will be activated and It will also activate the signal "detection of intermittent light not synchronized" (see FIG. 59). When the latter occurs, the "Inter-phase phase selection" block is activated in said successor vehicles and the sequence including steps 322, 322A, 323, 356, 357, 358, 359, . . . is produced in step 356 is the "enable shift" signal is activated, then at the decision point 357 the arrival of the next positive edge of the ICS is expected so that only when the latter has occurred has the sequence been advanced to the next step. In this way, the vehicle emits a displaced light pulse with respect to the phase it had before changing phases in step 359 (this is achieved because, as can be seen in the operating diagram of FIG. 61 the "detection of non-synchronized light pulse" and "displaced light emission" will be active and therefore, once the positive edge of the ICS is present, the emission offset with respect to said positive edge will be unavoidable, even though before Said issue changes the phase of said ICS). This displaced emission has been designed to allow the next "successor vehicle" (if any) to extend, if necessary, the vision protection before it is exposed to the pulses of light that it will receive outside the VPZ. Note the term "if necessary" is stated in order to remember that "the extension of the vision protection" will only become effective if the intensity of these pulses of light justify it, see diagram of operation of the block "Vision protection" in FIG. 60).

The phase change generated in step 359 of said FIGS. 65A-65C will cause said "successor vehicle" to become a "propagating vehicle" since the phase change has been synchronized with its "predecessor vehicle" but not with its "vehicle successor" (if any). The option of including in step 358 the activation of the "reverse score minimum" signal indicated in FIGS. 65A-65C with dashed lines will be discussed below. From the decision point 328 the path that the sequence will take on a vehicle that still has successors will be that given by steps 328, 329, 330, . . . this is so because a vehicle that has successors receives from them synchronized light until the moment of changing its phase in step 359, and will continue to receive synchronized light after changing phase but now its predecessor (with which it was synchronized when changing phase). On the other hand, the path that the sequence will take in a vehicle that no longer has successors will be the one given by steps 328, 351, 352, 353, 354 . . . this is so because the vehicle has no one to receive synchronized light until That the sequence reaches step 359, wherein said vehicle begins to receive synchronized light upon phase change, but the "synchronized light detection" signal has not yet been activated upon reaching the sequence to said step 328 (see block diagram of operation "Synchronized Light Detection" 238 in FIG. 38).

As already mentioned, a vehicle that has changed its phase in step 359 will be synchronized with its predecessor but will still detect non-synchronized light from its successors (if any) until they change phase. When the latter occurs, the vehicle will s Synchronized by resetting the "Inter-phase phase selection" block 302 of FIG. 62, returning the sequence to step 322 when the "non-synchronized flashing light detection" signal is deactivated in the vehicle. This must occur without the sequence having passed the decision point 330 or 354, depending on whether or not the vehicle has successors respectively, since case 4 does not apply the second synchronization strategy (which can start either in the Step 331 or step 332). Therefore, the wait at decision point 330, given by the time "t13", must be greater than the time a vehicle needs, already converted into a propagator, to cause the "(Signals which in this case will be activated at about the same time) together with the time it takes to deactivate the "non-synchronized flashing light detection" signal.

We can now refine the initial estimate made for time "t13" in Case 1. The time from the time a propagating vehicle changes its phase in step 359 until it is synchronized with its successor is given Practically by the time "t12" that it takes to activate in said successor vehicle the signal "detection of intermittent light not synchronized". In order to estimate the value of "t13" we must add the time "t11", which is delayed in said propagation vehicle (already synchronized with its successor) to said "non-synchronized flashing light detection" signal. This time estimate "t13" is greater than that done in Case 1, since the time it takes for the "isolated" vehicles of Case 1 to change phase will be less than the time "t12". This "t13" estimate is also sufficient for the last vehicle to make use of the "Inter-vehicular phase selection" block as a successor, since in that vehicle, after changing phase in step 359, only the deactivation of the "non-synchronized flashing light detection" signal, which will occur during the waiting time of the decision point 326 or during the cycle controlled by the counter XIII at the decision point 354. In either case the reset of the "Inter-vehicular phase selection" block 302 of FIG. 62 without the second synchronization strategy being applied.

Case 5: we will now deal with the synchronization of an NVE in which one or more vehicles that have the flag flagging them as "novices" participate. When the "non-synchronized flashing light detection" signal is activated in a vehicle having said flag active, the sequence including steps 322, 322A, 323, 324, 359, 326, . . . will be executed by said step 359 Vehicle reverses the phase of your ICS. If the phase shift of the Beginner vehicle or vehicles achieves synchronization of the NVE, in the vehicles of said NVE the sequence will return to step 322 either from the decision points 326 or 330 or from the cycle controlled by the counter XIII At the decision point 354, upon deactivating the "non-synchronized flashing light detection" signal therein. Otherwise, the vehicles of said NVE wait for the arrival of a positive edge of the "start signal", at the decision point 326, to obtain the synchronization in the regular form. After the description of the part of the operation diagram of FIGS. 65A-65C corresponding to the application of the first synchronization strategy is finished, we will now describe the rest of said diagram, in which synchronization with pseudorandom hierarchy is applied as Second synchronization strategy.

In all vehicles participating in an NVE of the type discussed in "Case 2", the sequence will arrive at the part of the operation diagram corresponding to the application of said second strategy through decision point 354. on the other Part in all "starter vehicles" of the non-synchronized NVE type analyzed in "Case 3" (conflicting union of two synchronized NVEs) the sequence will arrive at this part of the diagram through the decision point 330. Note that by any of the two paths that the sequence arrives at step 332 will already have the "enable displaced emission" signal turned off (see steps 351 and 331), thereby suspending the exchange of information between vehicles to initiate competition. Recall that, as we said in describing synchronization with pseudo-random hierarchy, the suspension of the exchange of information between vehicles can be done either by suspending for a moment the EPIL (with which the competition can be resolved a little faster) or without suspending the EPIL. In the diagram of FIGS. 65A-65C we are describing, it has been decided to suspend the EPIL until the competition has a winner (however, later on the changes that can be introduced to this diagram are mentioned later so that the vehicles can compete without having to discontinue their EPILs at any time). So that in step 332, when the signal "relocating emission of the next pulse" is activated the vehicles suspend for an instant and in a practically simultaneous way the emission of intermittent light and initiate a waiting time controlled by the counter XIV, which is Started from zero at step 334.

The previous step 333 inserts into the sequence a wait whose duration is equal to the period of the clock signal of the counter XIII and is intended to avoid the remote possibility that a phase-shifted light pulse Which could be emitted by a vehicle at the precise time that said offset emission is being deactivated in step 331) could cause undesired detection in another vehicle at step 338. However, such undesired detection can also be avoided by causing the time "T13" is a multiple of T or T/2 since said time is counted from the start signal upon arrival of the sequence to said step 331 the ICS of Vehicle would be giving a positive edge or a negative edge, times in which there is no displaced emission. However, step 333 has been included because it also ensures that the vehicle will be able to emit a pulse of light as a "triumph signal", if it were necessary, or the competition started well. It is desirable that the clock signal for counter XIII, which we call "clock C13", is the output Qn−1 or Qn of the block "Generation of the flashing control signal" 234 since they are signals that are synchronized in all Vehicles and have a suitable period (T/2 or T respectively). In step 334, a time delay controlled by counter XIV is started, as already mentioned. Said time-out will be determined by a binary number which we have called "inverse score" (generated, in each vehicle, by block 303 of FIG. 62). The first vehicle in which the XIV meter reaches the value corresponding to its inverse score (see decision point 335) will be the winner of the competition (high hierarchy) and will, first, make the rest of the vehicles (non-winners) Interrupt their respective waiting times.

To do this, in said winning vehicle the sequence proceeds to step 349 in which the signal "relocating emission of the next pulse" is deactivated which causes the immediate emission of a light pulse (see FIG. 61), whereas in vehicles Which have not yet completed their waiting time, the sequence will be within the cycle formed by steps 335, 336, 337, 338, 335 at the time that said light pulse is emitted, whereby said pulse will be replicated by these vehicles (Non-winners) in step 339, said light pulse being detected either directly or replicated at step 338. Decision points 336 and 337 are to make the vehicles participating in this competition only respond to light pulses received outside the RCZ and RCFZ zones. This allows vehicles to detect the pulse of light emitted as a "triumph signal" even though they were receiving pulses of light emitted with either of the two "regular" alternative phases by other vehicles belonging to or not to the NVE. However, to avoid that the pulse of light emitted as a "triumph signal" by the winning vehicle can fall into the RCZ or the RCFZ of the other vehicles (since that would be ignored) it is necessary to feed the XIV meter with a clock signal whose positive flanks fall outside said zones.

For this reason, said clock signal, which we will call "clock C14", will be provided by one of the outputs of the counter/divider 11 whose period is smaller than that of the ICS and greater than the width of the RCZ (or, Is equal, of the RCFZ). This is because the said outputs of the counter/divider 11 give a negative flank both on the negative flank and on the positive flank of the ICS (see FIG. 22) and thus give positive flanks on both sides of each flank of the ICS, Flanks that will fall out of the RCZ and RCFZ areas of the vehicle itself since these zones are centered on the positive and negative flanks respectively of the ICS (see FIG. 53). However, in order to ensure that such positive flanks will also fall outside the RCZ and the RCFZ of the other vehicles, it is necessary to take into account the predetermined tolerance (Δt) within which the ICS of the different vehicles are considered to be in (See FIGS. 23B-D) therefore the output of counter/divider 11 used as a clock signal for counter XIV must have a period which is at least twice the width of said RCZ (or of said RCFZ). As we have just said, have vehicles emit and detect pulses of light outside the RCZ zones and RCFZ allows competition between vehicles to be carried out even when those vehicles are receiving pulses of light emitted by other vehicles belonging to the NVE or not. This happens for example to "starter" vehicles of an unsynchronized NVE of the type analyzed in "Case 3", which receive pulses of light in the RCFZ from their "successors".

Figure 65D:
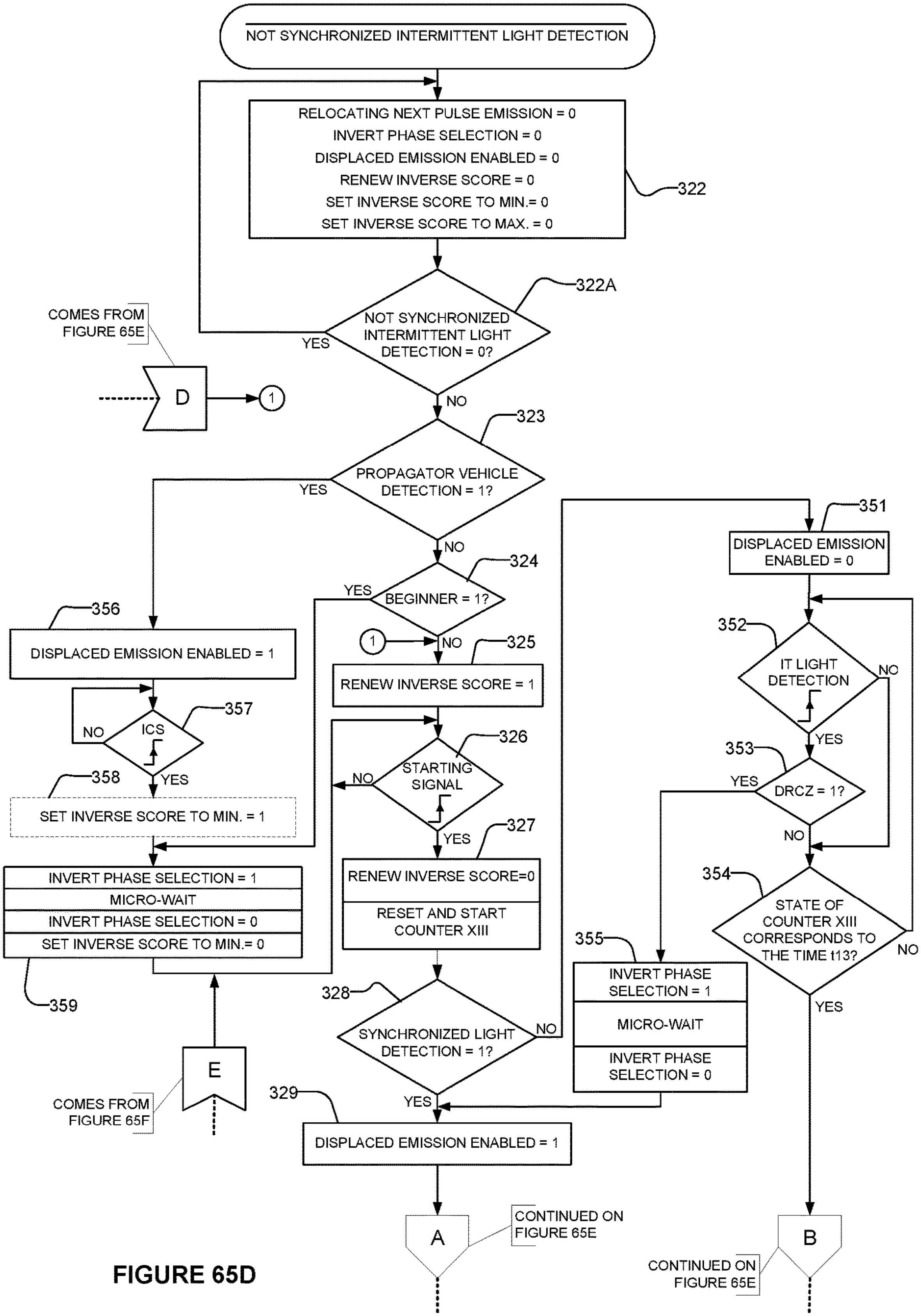
Figure 65E:
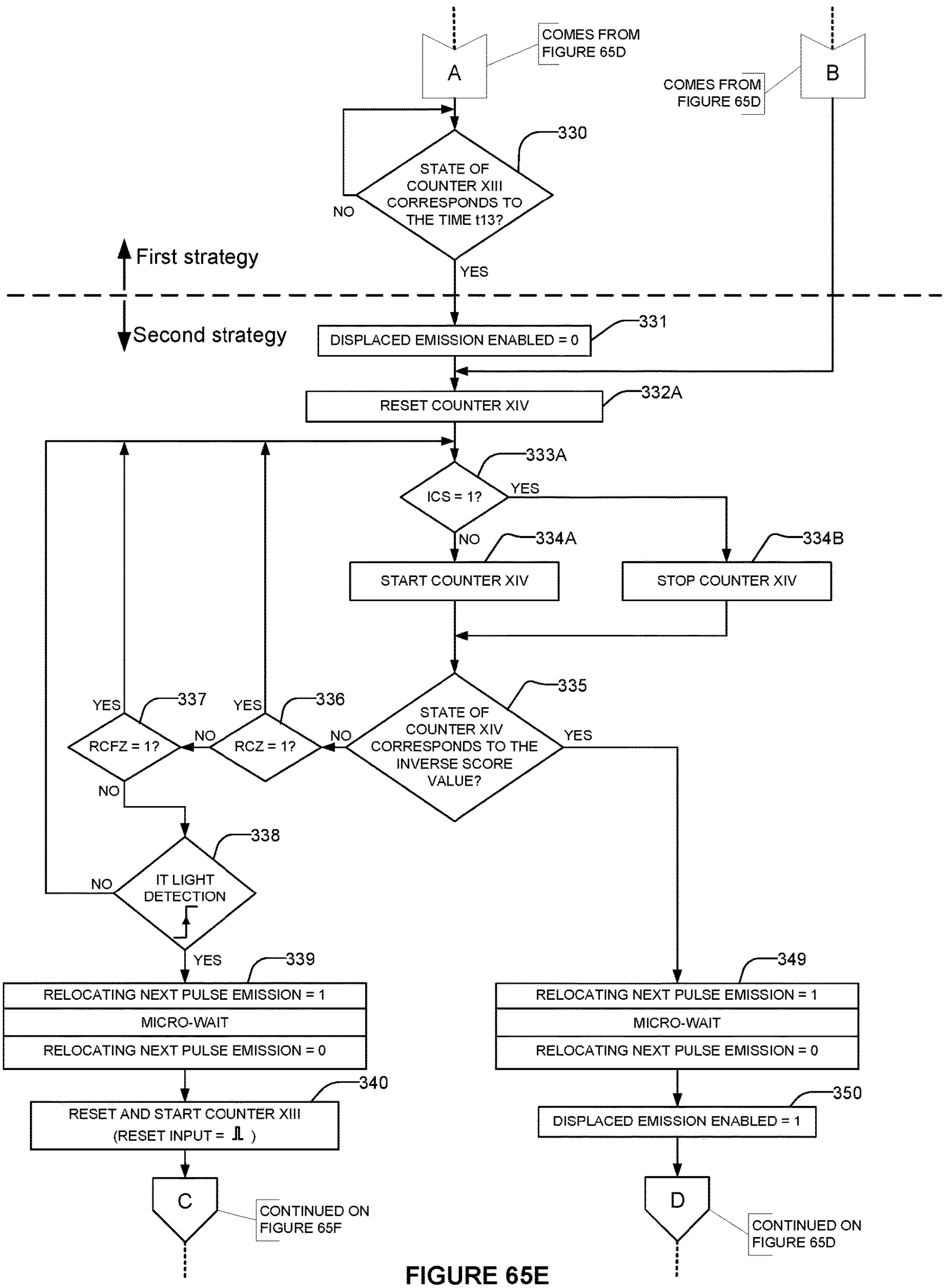
Figure 65F:
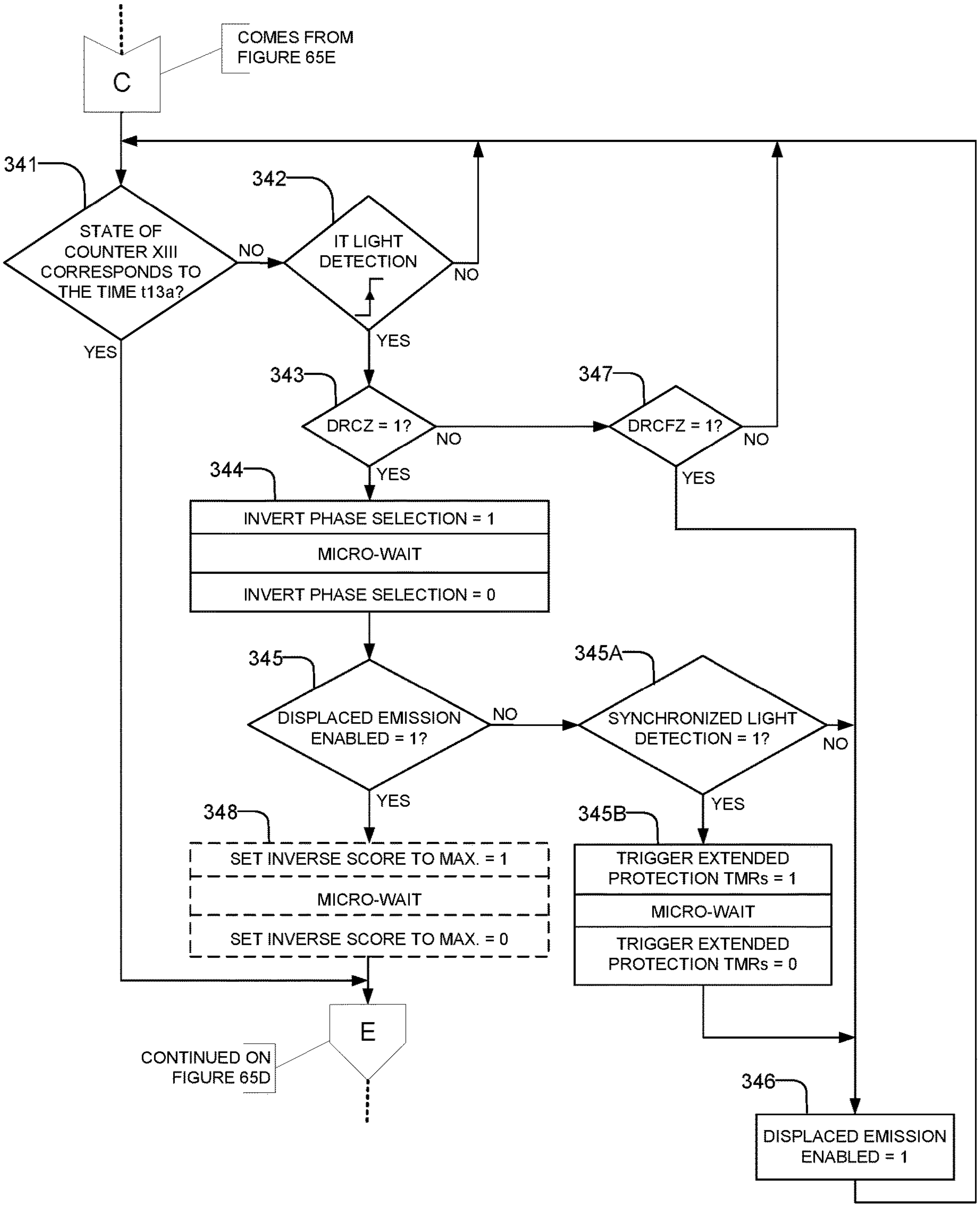

This could also be due to the eventual "intrusion" of a distant vehicle, not included in the NVE, but that could be detected by some vehicle of said NVE, for this reason the RCZ has also been included in step 336. From what we have just said, another benefit can be drawn from the fact that vehicles could keep their "regular" intermittent light emissions while participating in the competition as long as this does not affect the vehicles' ability to produce or replicate the "Triumph" of the winning vehicle. The changes to be made to the diagram of FIGS. 65A-65C so that vehicles can compete without ever having to interrupt their EPILs are shown in FIGS. 65D-65F and will be described at the end of the description of FIGS. 65A-65C. We now return to the analysis of the operating diagram of FIGS. 65A-65C from step 349, in which the winning vehicle of the competition emits a light pulse in a triumph signal, and in parallel from step 339, in which the non-winning vehicles of this competition emit a pulse of light replicating said signal of triumph.

In the winning vehicle, the sequence proceeds to step 350 in which the "enable shifted emission" signal is activated and then the sequence returns to step 325. whereas in the non-winning vehicles the sequence starts, in step 341, a controlled cycle by the counter XIII which has been reset in the previous step 340. Thus, a cycle with the steps 341, 342, 343, 344, 345, . . . , 346, 341 will take place, initially, in non-winning vehicles that emit in direction Contrary to the winning vehicle and which are not synchronized with said winning vehicle. These vehicles will receive within the DRCZ the positive edge of the emitted light pulses displaced by said winning vehicle (see steps 342 and 343), and by step 344 they will change phase, upon activating in them the signal "reverse phase selection", thus becoming vehicles losing the competition. Then the "enable shifted emission" signal, which in said vehicles is still deactivated, will be activated at step 346 in order to transmit information to non-winning vehicles circulating in the same direction as said winning vehicle. Pre-steps 345A and 345B have been included to determine whether a vehicle that has just reversed its phase is from a synchronized NVE, in which case the sequence will include step 345B to activate, in the form of a narrow pulse, the "Shoot Extended Protection TMRs" and thereby provide the driver with vision protection for the first non-synchronized light pulse that said vehicle will receive from its successor during phase change. On the other hand, cycle 341, 342, 343, 347, 346, 341 will take place initially on the non-winning vehicles which emit in the opposite direction to the winning vehicle and which were synchronized with said winning vehicle.

Said non-winning vehicles will receive within the DRCFZ the positive edge of the emitted light pulses displaced by the winning vehicle (see sequence 342, 343, 347) then in said non-winning vehicles, which will retain their phase, the "enable Emitted offset" at step 346 to transmit information to non-winning vehicles that circulate in the same direction as the winning vehicle. The description also applies to those vehicles that are not directly synchronized by the winning vehicle but detect the shifted emissions of vehicles cooperating with the winning vehicle to complete NVE synchronization. If everything works normally, the non-winning vehicles already synchronized will exit the cycle controlled by the counter XIII (step 341) when it reaches the value corresponding to the time "t13*a*" (see steps 341, 326, . . . ). The value "t13*a*" must be less than the time it takes for a vehicle that has changed its phase (losing vehicle) to cause the "non-synchronized intermittent light detection" signal to be activated in its successor, if any. "T12" described in relation to FIG. 59).

This must be so that the vehicles leave the cycle controlled by the counter XIII (step 341) before their synchronization can be altered by the pulse of light that said successor vehicle will emit displaced announcing that it will change phase. The minimum value that can be given to "t13*a*" is around 3T which is the approximate time that the synchronization of the vehicles may require within that cycle. However, if one were to ignore the restriction imposed by the "t12" value, it would suffice to reverse the order of steps 356 and 357, regardless of the displaced emission with which a "successor" vehicle announces to its possible successors that it will change phase, since said displaced emission only serves so that these successors extend, if necessary, the protection of vision in advance.

Finally, we will analyze what would happen if there were an eventual tie situation, that is to say, if there were more than one vehicle winning the competition, trying to impose its phase on the rest. Obviously, a tie is not a problem when it occurs between vehicles that are synchronized with each other, but if the tie were produced between vehicles not synchronized with each other, the synchronization process should be repeated. For this reason, in the winning vehicles the sequence includes step 325 by means of which said vehicles will renew their inverse score. However, if a non-winning vehicle was forced to change phases twice, it is a sign that a tie occurred between non-synchronized vehicles. After the first phase change the sequence will follow steps 344, 345, 345A . . . , and after the second phase change the sequence will be 344, 345, 348, 326, . . . whereupon the vehicle will recover its original phase and abandon the cycle controlled by counter XIII to participate again in the synchronization process. The option of including the activation of the "put reverse maximum score" signal at step 348 is intended to m Minimize the possibility of a repeat of a tie, because since the winning vehicle will be the one with the lowest inverse score, vehicles that did not win in the first competition will also not win in the second competition if they adopt a maximum inverse score, possibility of tie only to the winning vehicles that tied in the previous attempt.

In a tie situation it may also happen that a non-winning vehicle is first confirmed by its winner by one of the winners, in which case the sequence will be given by cycle 341, 342, 343, 347, 346, 341, and then Another winning vehicle causes said vehicle to change phase and leave the cycle controlled by the counter XIII, through the sequence 341, 342, 343, 344, 345, 348, 326, whereupon this vehicle will again participate in the Synchronization with the opposite phase to the one that had initially. Something similar (although unlikely) would occur in the conflicting union of two synchronized NVEs if there were winning vehicles in both NVEs and one (or more) non-winning vehicles in one of those NVEs. In this case, the non-winning vehicle would change phase following the sequence 341, 342, 343, 344, 345, 345A, 345B, 346, 341 and then exit the cycle controlled by the counter XIII (when it reaches the value corresponding to the time "T13*a*") with opposite phase to the one that had. This is not a problem, but the propagation of a phase change would begin to take place without the initiating vehicles of said phase change being synchronized. Therefore, to resolve this as quickly as possible, it has been envisaged to include the activation of the "reverse score minimum" signal at step 358 whereby the first successor, become a competitor, would be a sure winner If competition should be repeated. The minimum value for the inverse score is 1 and the maximum depends on the number of bits used to generate that score.

As already mentioned, in vehicles which have already completed the application of the second synchronization strategy, the sequence returns to step 325 or to 326 as appropriate. If the application of said second strategy resulted in the synchronization of the involved vehicles, in said vehicles the deactivation of the signal "intermittent intermittent light detection" will occur either during the waiting time at the decision point 326 or during the Cycle controlled by counter XIII at decision point 330 or 354 as appropriate. This will result in resetting the "Inter-phase phase selection" block 302 of FIG. 62, whereupon the sequence starts again at step 322. It should be mentioned that in vehicles which must propagate a phase change, the deactivation of the signal "Non-synchronized intermittent light detection" will occur either at said decision point 326 or at said decision point 330 as in said vehicles the "synchronized light detection" signal is kept active (see step 328).

We now turn to the changes to be made to the diagram in FIGS. 65A-65C so that vehicles can compete without having to interrupt their EPILs at any time. Such changes are shown in FIGS. 65D-65F and are described below. The "relocating emission of the next pulse=1" command from step 332 of FIGS. 65A-65C is moved to steps 349 and 339 preceding the "relocating emission of the next pulse=0" order and interposing between the two commands a small delay "Microhope"). With this, as in the diagram of FIGS. 65A-65C, the winning vehicle of the competition will emit a light pulse in triumph at step 349, which pulse will be replicated by non-winning vehicles at step 339, but Without the vehicles having suspended their EPILs during the competition. To ensure that whatever technology is used to generate the EPIL, the vehicle will be able to emit or replicate the light pulse that ends the competition, in the diagram of FIGS. 65D-65F the entry of clock pulses is prevented from Counter XIV while the vehicle's ICS is at a high value. With this it is ensured that at least half of the ICS period has elapsed since the last emission (see steps 332A, 333A, 334A and 334B of said FIGS. 65D-65F) when the vehicle is to emit or replicate the triumph signal.

The description of the composite block "Inter-vehicular synchronization with external assistance" 233 of FIG. 56, according to the version of FIG. 62, has been completed, thus also completing the description of the system that applies synchronization with pseudorandom hierarchy as Second synchronization strategy.

To now complete the description of the system that applies synchronization with magnetic heading hierarchy as the second synchronization strategy, the composite block "Inter-vehicular synchronization with external assistance" 233 will now be described according to the version of FIG. 63, For describing the component block "Inter-vehicular phase selection" 312.

Figure 66A:
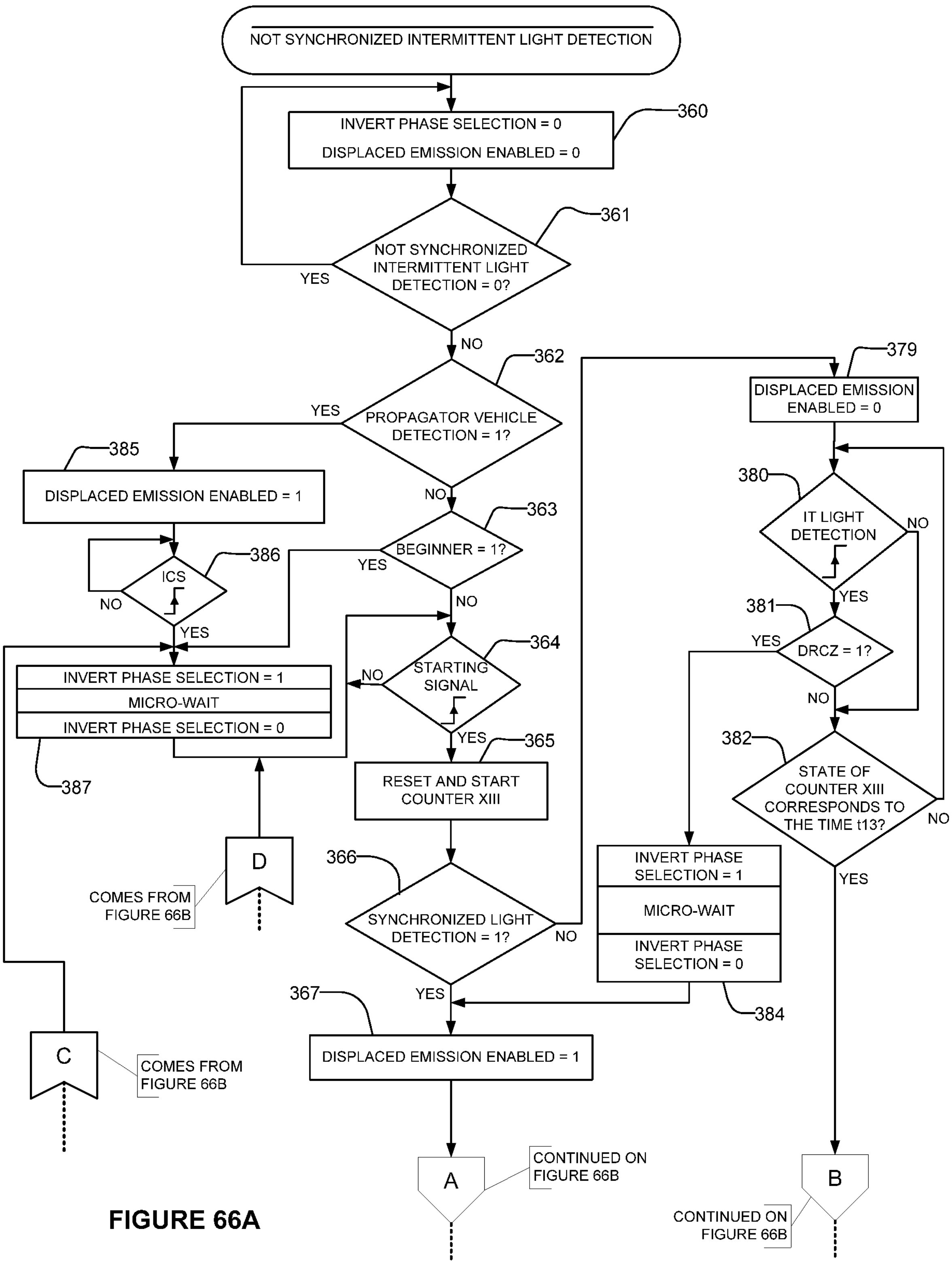
FIGS. 66A-66B show the operation diagram of the block "Inter-vehicular phase selection" in FIG. 63 according to an exemplary embodiment of the invention.
Figure 66B:
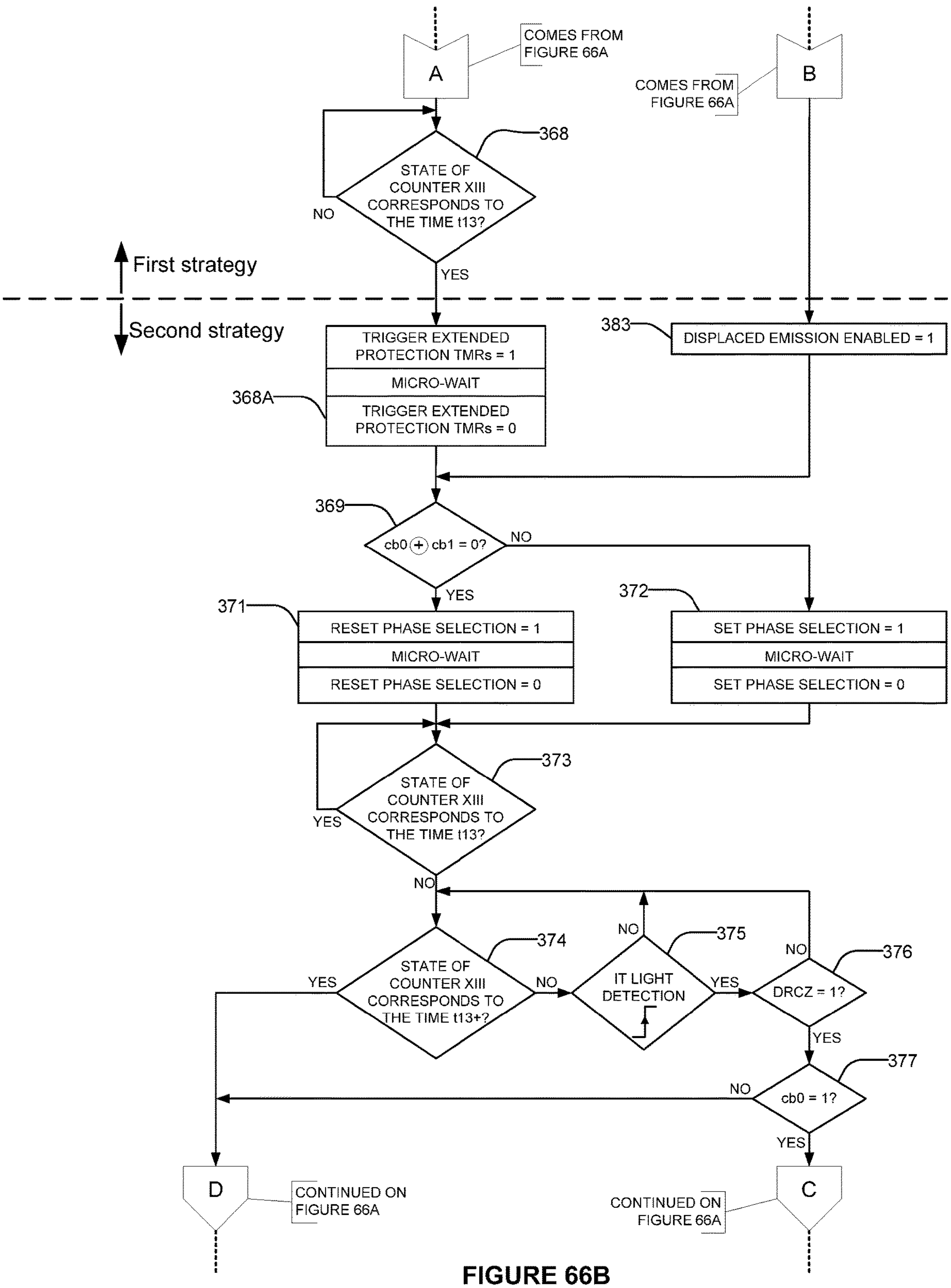

FIG. 66 shows the operation diagram of said "Inter-phase phase selection" block 312 of FIG. 63, which, as can be seen, is very similar to the operation diagram of FIGS. 65A-65C. Referring to the implementation of the first synchronization strategy. When the "non-synchronized flashing light detection" signal is set to low under the sequence initiated in step 360 by setting the "reverse phase selection" and "enable offset" signals to low value, and is maintained in said step 360 Until the "non-synchronized flashing light detection" signal is set to high value (see step 361).

If the vehicle is not designated as a "successor" in the propagation of a phase change or as a "Beginner", the sequence proceeds from step 361 to the decision point 364 in which a positive edge of the start. In step 365 the counter XIII is started from zero. Then the sequence passes to the decision point 366 in which the state of the "synchronized light detection" signal is analyzed and that is where the sequence that the non-synchronized NVE vehicles coming from a synchronized NVE (high hierarchy) of the sequence that will follow the vehicles that at the moment of being involved in said non-synchronized NVE were not interacting with any other vehicle (these "isolated" vehicles have low hierarchy). We will analyze the different cases that the algorithm solves and see which sequences each case generates on the diagram (to facilitate this analysis, FIG. 66 shows which part of the diagram corresponds to the application of the first strategy and which part to the application of the second strategy).

Case 1: This is a non-synchronized NVE that has been formed due to the interaction between vehicles of an NVE synchronized with one or more "isolated" vehicles not synchronized with the former. At the decision point 366 the vehicles from the synchronized NVE will have the "synchronized light detection" signal active, therefore in said vehicles the "enable shift" signal is activated at step 367 and then a waiting time at the decision point 368. Enabling the shifted emission in step 367 is intended, in this case, for the vehicle to transmit information to the "isolated" vehicles as we shall see below. In "isolated" vehicles, as no synchronized light is being detected, the sequence passes from the decision point 366 to step 379 where the "enable shifted emission" signal is deactivated. Then in step 380, the sequence initiates a cycle which will be controlled by the counter XIII in step 382, Which can be interrupted by the detection of a light pulse whose positive edge falls on the DRCZ (see steps 380, 381 and 384). This sequence occurs because, in this Case 1, vehicles from the synchronized NVE are enabled to shift the emission of their light pulses to the non-synchronized light emitted by "isolated" vehicles. These "isolated" vehicles, on receiving this "information", execute the sequence including steps 380, 381, 384, 367, 368 . . . so by step 384 the state of the phase selection signal of the (See Flip-Flop 316 in FIG. 63), and then in step 367 the "enable shifted emission" signal is activated so that, if necessary, said vehicle can "defend" its new phase as a vehicle over NVE synchronized at Which has just joined. Once the synchronization is completed, the "non-synchronized flashing light detection" signal will be deactivated, thus resetting the "phase inter-selection" block 312, of FIG. 63, which we are describing. Therefore, by properly choosing the value of "t13" said block 312 can be reset during the waiting time at decision point 368, returning the sequence to step 360 without that sequence becoming involved, for Case 1 that we are analyzing. In an initial estimate, which will then be refined, we can say that the time "$t_{13}$" must be greater than the sum of the time it takes the "isolated" vehicles, in this case 1, to change from phase to hi the "non-synchronized flashing light detection" signal is deactivated. This time "t13" is also used as the account limit for the counter XIII at the decision point 382, when apparently, said limit could be lower. The reason will be explained later.

Case 2: When in any of the non-synchronized NVE vehicles the "synchronized light detection" signal is active, the sequence in each of said vehicles will go from step 366 to step 379 where the ""Will be disabled. Then, from step 380, the sequence enters a cycle controlled by the counter XIII in step 382, which cycle in this case 2 will only be interrupted when said counter reaches the value corresponding to the time "t13". This is because in this case 2 there are no vehicles coming from a synchronized NVE that emit their displaced light pulses. When the counter XIII reaches the value corresponding to the time "t13", the sequence passes to the part of the diagram corresponding to the application of the second strategy in order to be able to solve the synchronization of this NVE whose conformation is not enough to establish differences of "hierarchy" in vehicles. The description of that part of the diagram will be done after describing the remaining "cases".

Case 3: This is an unsynchronized NVE that is formed from the conflicting junction of two synchronized NVEs, whose respective vehicles are not synchronized with each other. Said non-synchronized NVE starts when the closest vehicles of both synchronized NVEs begin to interact with each other. Once the "non-synchronized intermittent light detection" signal is activated in all of these non-synchronized NVE initiating vehicles, the sequence including steps 360, 361, 362, 363, 364, 365, 366 . . . . At the decision point 366 said "initiator" vehicles will have the "synchronized light detection" signal active and then the sequence will go to step 367 where each vehicle is enabled to emit pulses of light shifted in phase (pulses that in this case comply the function of enabling, if necessary, extended vision protection in the first potential successors, predicting that the NVE from which they come may be the one that has to change phase). Then at the decision point 368 the waiting time handled by the counter XIII will normally arrive at its end ("t13"), since in this case, as no vehicle has yet changed its phase, the "intermittent light detection Synchronized" remains active. When the counter XIII reaches the value corresponding to the time "t13", the sequence passes to the part of the diagram corresponding to the application of the second hierarchical strategy since, as in Case 2, the conformation of this type of NVE It is not enough to establish among these "initiator" vehicles differences of "hierarchy" that allow to achieve the synchronization. As already mentioned, we will now describe that part of the operating diagram.

Case 4: In this case we will treat the synchronization of the vehicles that are successors in the propagation of a phase change. In a non-synchronized NVE such as Case 3, after the NVE initiating vehicles have synchronized their lights (applying the second strategy), vehicles that have had to change phases will have to propagate that phase change (applying the first strategy). These propagating vehicles, which are now no longer synchronized with their successors, are enabled to apply a phase shift to their EPIL, therefore in said successor vehicles the "propagating vehicle detection" signal (see FIG. 58) will be activated and It will also activate the signal "detection of intermittent light not synchronized" (see FIG. 59). When the latter occurs, the "Inter-phase phase selection" block is activated in said successor vehicles and the sequence including the steps 360, 361, 362, 385, 386, 387 . . . is produced in step 385, the signal "Enable shifted emission", then at the decision point 386 the arrival of the next positive edge of the ICS is expected so that only when the latter has occurred the sequence can advance to the next step. In this way the vehicle emits a displaced light pulse with respect to the phase it had before changing phase in step 387 (this is achieved because, as can be seen in the operating diagram of FIG. 61 the "detection of non-synchronized light pulse" and "displaced light emission" will be active and therefore, once the positive edge of the ICS is present, the emission offset with respect to said positive edge will be unavoidable, even though before said issue changes the phase of said ICS).

This displaced emission has been designed to allow the next "successor vehicle" (if any) to extend, if necessary, the vision protection before it is exposed to the pulses of light it will receive outside the VPZ. (We say "if necessary" to remember that "the extension of the vision protection" will only become effective if the intensity of those pulses of light warrants it, see operation diagram of the "Vision protection" block in FIG. 60). The phase change generated by step 387 of said FIG. 66 will cause said "successor vehicle" to become a "propagating vehicle" since the phase change has been synchronized with its "predecessor vehicle" but not with its "successor vehicle" (if any). From decision point 366 the path that the sequence will take in a vehicle that still has successors will be given by steps 366, 367, 368, . . . this is so because a vehicle that has successors receives from them synchronized light Until the moment of changing its phase in step 387, and will continue to receive synchronized light after changing phase but now its predecessor (with which it was synchronized when changing phases). On the other hand, the path that the sequence will take in a vehicle that no longer has successors will be given by steps 366, 379, 380, 381, 382 . . . this is so because the vehicle has no one to receive light synchronized until That the sequence reaches step 387, wherein said vehicle begins to receive synchronized light upon phase change, but the "synchronized light detection" signal has not yet been activated upon reaching the sequence to said step 366 (see block diagram "Synchronized Light Detection" 238 in FIG. 38).

As already mentioned, a vehicle that has changed its phase in step 387 will be synchronized with its predecessor but will continue to detect non-synchronized light from its successors (if any) until they change phase. When the latter occurs, the vehicle will be synchronized by resetting the "Vehicle phase selection" block 312 of FIG. 63, returning the sequence to step 360 when the "non-synchronized flashing light detection" signal is deactivated in the vehicle. This must occur without the sequence having passed decision point 368 or 382, depending on whether or not the vehicle has successors respectively, since in this Case 4 it is not applicable to apply the second synchronization strategy (which can start either in the Step 369 or at step 383). Therefore, the wait at decision point 368, given by the time "t13", must be greater than the time a vehicle needs, already converted into a propagator, to have its successors" (Signals which in this case will be activated at about the same time) together with the time it takes to deactivate the "non-synchronized flashing light detection" signal.

Thus, we can now refine the initial estimate we made of time "t13" in Case 1. The time from the time a propagating vehicle changes its phase in step 387 until it is synchronized with its successor is given practically by the time "t12" that it takes to activate in said successor vehicle the signal "detection of intermittent light not synchronized". In order to estimate the value of "t13" we must add the time "t11", which is delayed in said propagating vehicle (already synchronized with its successor) to said "non-synchronized flashing light" signal. This time estimate "t13" is greater than that done in Case 1, since the time it takes for the "isolated" vehicles of Case 1 to change phase will be less than the time "t12". This "t13" estimate is also sufficient for the last vehicle to make use of the "Inter-phase phase selection" block as a successor, since the vehicle, after changing phase at step 387, only has to wait for the deactivation of the Signal", which will occur during the waiting time of the decision point 364 or during the cycle controlled by the counter XIII at the decision point 382. In any case, the block will be reset "Inter-vehicular phase selection" 312 of FIG. 63 without the second synchronization strategy being applied.

Case 5: we will now discuss the synchronization of an NVE in which one or more vehicles that have active the flag that points them as "novices" participate. When the "non-synchronized flashing light detection" signal is activated in a vehicle having said flag active, the sequence including steps 360, 361, 362, 363, 387, 364, . . . is executed by step 387 Vehicle reverses the phase of your ICS. If the phase shift of the novice or beginner vehicle (s) achieves synchronization of the NVE, in the vehicles of said NVE the sequence will return to step 360 either from the decision points 364 or 368 or from the cycle controlled by the counter XIII At decision point 382, upon deactivating the "non-synchronized flashing light detection" signal therein. Otherwise, the vehicles of said NVE wait for the arrival of a positive edge of the "start signal", at the decision point 364, to obtain the synchronization in the regular form.

After the description of the part of the operation diagram of FIG. 66 corresponding to the application of the first synchronization strategy is finished, we will now describe the rest of said diagram, in which synchronization with magnetic heading hierarchy is applied as Second synchronization strategy.

In all vehicles participating in an NVE of the type discussed in "Case 2", the implementation of said second strategy is initiated at step 383 in which the "enable displaced emission" signal is activated. On the other hand in all "starter vehicles" of the non-synchronized NVE type analyzed in "Case 3" (conflicting union of two synchronized NVEs) the application of said second strategy starts at step 368A, in which the Signal "trigger extended protection TMRs" so that the driver has vision protection against the first unsynchronized pulse of intense light that the vehicle could receive during a phase change. Before proceeding, it is noted that by either path the sequence arrives at decision point 369 the vehicles will have active the "enable displaced emission" signal (see steps 367 and 383). As described in the inter-vehicle synchronization procedure with external assistance, when applying the "Synchronization with magnetic heading hierarchy" strategy, each vehicle will adopt, depending on the quadrant that corresponds at that moment to its magnetic direction, one of the two alternative phases such as its current phase of EPIL, and a hierarchy to "defend" that phase. Initially each vehicle will adopt the hierarchy and phase assigned to its magnetic quadrant according to a "Predetermined distribution of phases A", in which alternative phases are assigned opposite opposing quadrants and, in addition, high hierarchy to two of said opposite quadrants and low hierarchy to the other two. If such a "Phase A Default Distribution" does not lead to NVE synchronization, then each vehicle will adopt the phase corresponding to its magnetic quadrant according to a "Predefined Phase B Distribution", which is obtained simply by making the vehicles with hierarchy Low phase, which will lead to the synchronization of said NVE.

As already mentioned, the function of the "Magnetic bearing generation" block 313, of FIG. 63, is to determine which quadrant corresponds to the vehicle as a function of its magnetic direction, and to identify said quadrant using two bits to the Which we have called "cb1" and "cb0", where cb0 is the least significant bit. Thus, the four magnetic quadrants will be identified in sequence as "00", "01", "10" and "11" (for example: NW=00, NE=01, SE=10 and SW=11). In the operating diagram of FIG. 66, the description of which is now taken as the "predetermined phase distribution A", the alternative phase given by the adjacent quadrants "00" and "11" is assigned, and the alternative phase (Qn) to the adjacent quadrants "01" and "10". Giving high hierarchies to the opposing quadrants "00" and "10" and hierarchy goes down to the opposing quadrants "01" and "11". When the magnetic direction of the vehicle corresponds to the quadrant 00 or the quadrant 11 the sequence will advance from the decision point 369 to the step 371, since the EXCLUSIVE OR between the bits cb0 and cb1 will result in zero. In said step 371 a pulse is generated on the output "reset phase selection" to set low "phase selection" (see Flip-Flop 316 in FIG. 63) to low value and thereby to cause said vehicles, with quadrant Magnetic "00" or "11", adopt as its ICS (see FIG. 20). Conversely, if the magnetic direction of the vehicle corresponds to quadrant 01 or quadrant 10 the sequence will advance from decision point 369 to step 372, since the EXCLUSIVE OR between bits cb0 and cb1 will have a nonzero result. In said step 372 a pulse is generated on the "set phase selection" output to set the "phase selection" output to high value (see Flip-Flop 316 in FIG. 63) and thereby make these vehicles, with a magnetic quadrant "01" or "10", adopt Qn as their ICS (see FIG. 20).

If the vehicles that adopted this initial phase distribution are synchronized with each other, in all of them the sequence will be confined, after step 373 (whose function will be explained later), to decision points 374, 375 and 376 until the counter XIII reaches the value corresponding to the time "t13+". This is so because these vehicles, being synchronized with each other, will not receive pulses of light whose positive flanks fall into the DRCZ. When the counter XIII reaches the value corresponding to the time "t13+" the sequence will go to step 364. Step 374 fulfills the function of causing the sequence in a vehicle to leave cycle 374, 375, 376, 374 before a possible "Successor" of said vehicle emits a displaced pulse with respect to the phase that said "successor" has before changing said phase in step 387. Since if said pulse were detected in steps 375 and 376 it could produce a wrong phase change In the propagating vehicle. Accordingly, the value "t13+" is obtained by adding to "t13" a time which must be less than the time "t12" which takes place in the "unsynchronized flashing light detection" signal in said successor vehicle. In fad the minimum value that can be given to "t13+" is around 3T (anyway if we do not have the subtlety of having a successor vehicle emit a displaced pulse before changing phases—reversing the order of steps 385 and 386—Then the restriction on the value of "t13+" disappears and decision point 374 could even be eliminated in which case, when the initial phase distribution was correct, the sequence would remain in a cycle between steps 375 and 376 until occurrence The deactivation of the signal "detection of intermittent light not synchronized").

The function of step 373 is to ensure that the first displaced emission that a vehicle can detect, within the cycle given by steps 374, 375, 376 and 374, corresponds to that performed by another vehicle with the phase already adjusted by the Steps 371 or 372, and not with the phase that said vehicle had before making said adjustment. To ensure that this is accomplished it is necessary to introduce a delay of at least 1T between the output of decision point 368 and the output of said decision point 373, as well as between the output of decision point 382 and the output of said point of decision 373. If it is selected as clock signal for counter XIII (signal which we have called "clock C13") to the output Qn of the block "Generation of the signal of intermittence control" 234 said delay will be of 1T, that is A period of the ICS.

If the initial phase distribution does not lead to the synchronization of these vehicles, it will suffice to achieve that change of phase for those vehicles whose magnetic heading corresponds to a low hierarchy, i.e. all vehicles whose magnetic quadrant is "01" or "11". In these vehicles, the sequence will be given by steps 374, 375, 376, 377, 387, 364, . . . in step 377 asks for the status of bit cb0 to determine whether the vehicle quadrant corresponds to it Low hierarchy, since the quadrants with low hierarchy have in common the bit cb0 in high value. In step 387 the phase selection signal is inverted in vehicles with low hierarchy and then the sequence advances to decision point 364. In contrast, in vehicles with high hierarchy (magnetic direction in quadrant 00 or 10) the sequence will be Given by the steps . . . 374, 375, 376, 377, 364, . . . .

As already mentioned, in vehicles which have already completed the application of the second synchronization strategy the sequence will return to step 364. With said vehicles already synchronized, the "non-synchronized intermittent light detection" Either during the waiting time at the decision point 364 or during the cycle controlled by the counter XIII at the decision points 368 or 382 as appropriate. This will result in resetting the "Inter-phase phase selection" block 312 of FIG. 63, whereupon the sequence starts again at step 360. It should be mentioned that in vehicles which must propagate a phase change, the deactivation of the signal "Non-synchronized intermittent light detection" will occur either at said decision point 364 or at said decision point 368 because in said vehicles the "synchronized light detection" signal remains active (see step 366).

The description of the composite block "Inter-vehicular synchronization with external assistance" 233 of FIG. 56 has been completed, both for the version of FIG. 63 that we have just described and for the version of FIG. 62 described above, the following are reviewed below: Values that can be assigned to some "time controls" used in that system.

"Phase adjustment obtained from external sources" signal period: The period of this signal must be M times the period of the "start signal". "M" being an integer equal to or greater than 1. On the other hand, the period of the signal "phase adjustment obtained from external sources" should obviously be significantly less than the duration of the "validate phase adjustment" timer (see FIG. 55).

"Start signal" period: The period of the "start signal" must be longer than the time it takes to execute the "complete inter-vehicular phase selection" algorithm. If you choose to apply "Synchronization with pseudo-randomization" in the second strategy, the period of the "start signal" should be greater than the sum of the time "t13", plus the time that the counter XIV takes to equal the maximum score Inverse, plus time "t13*a*". As for the time necessary to count the maximum inverse score, it is necessary to define the value of said maximum score and the period of the clock signal for the counter XIV which must, as already stated, be at least twice the width of the RCZ (or the RCFZ). For example, assuming that we can choose a clock signal for that counter whose period is T/16 and a range of 48 different scores would only take 3T so that the XIV counter reaches the value of the maximum inverse score. On the other hand, the time "t13" should be, as already stated, greater than the sum of "t11" and "t12" being "t11" the deactivation time of the signal "intermittent intermittent light detection" The extended value of "t11" if applicable) and "t12" being the activation time of said "non-synchronized flashing light detection" signal. Following the example values and assuming that in step 268 of FIG. 59 "t11" is extended to 8T and "t12" has also been set to 8T we must set for the period of the start signal a value greater than 23T (Note that "t11" must be greater than the time needed to count the maximum inverse score since the latter is the maximum time that the signal "relocating emission of the next pulse" can remain active and should be avoided because of this Deactivate in another vehicle the signal "detection of intermittent light not synchronized").

It is worth mentioning that if we choose to apply "synchronization with magnetic heading hierarchy" in the second strategy, the calculation of the period of the "start signal" shows values similar to the previous ones. Accordingly, to vehicles of a non-synchronized NVE that must apply the second strategy to synchronize, i.e. vehicles having to execute the complete "inter-vehicular phase selection" algorithm, it would take them a fraction of a second to do so considering the Frequency of the ICS to be used (for example, if a frequency of 200 Hz were used, that time would be about one tenth of a second). Anyway, it should be mentioned that vehicles that need to synchronize their lights using the second strategy are vehicles that just begin to interact with each other, therefore, because they are still separated by a considerable distance, the intensity of the light they receive is still Relatively low, and since the process of synchronization is very brief, even if they had to repeat it more than once the effect would be almost imperceptible.

Timer Duration "Use Extended Protection"

For the versions shown in FIGS. 65A-65F, the duration of the timer (redisplayable) "use extended protection" should be greater than the time needed to count the maximum inverse score. This would avoid that during the competition said timer is extinguished in the first successor vehicle (if any) of a vehicle involved in such competition. This remedies the fact that during a competition the timer will not be redisplayed in that successor vehicle, since its predecessors suspend the EPIL in phase while participating in that competition (see FIG. 60, FIGS. 65A-65F). To give this timer the suggested duration has no other importance than to ensure that said successor vehicle will have active vision protection when this competition ends, thus preventing the driver from being exposed (before said timer is retriggered) to the non-synchronized light pulse Which terminates it (see steps 339 and 349 of FIGS. 65A-65F).

Timer Duration "Enable Extended Protection"

During the propagation of a phase change the longer exposure time to the reception of non-synchronized light could occur in the first successor vehicle, as long as it has successors which in turn have successors. A vehicle in such conditions could receive non-synchronized pulses of light for a maximum time that can be estimated in T13+3t12. This time must be taken into account to set the timer value "enable extended protection" (see FIG. 60). Thus, for the values given as an example, said timer could have a duration of no more than two tenths of a second. However, since depending on the role of the vehicle in the propagation of a phase change, it will receive non-synchronized light pulses falling in different zones (RCZ, DRCZ, or DRCFZ). Value t13+2t12, causing pulses received in the DRCFZ to fall completely within the "normal" VPZ. This can be achieved by reducing the width of the pulses of light emitted by the vehicle (pulses that the vehicle uses to transmit information).

Furthermore, the duration of said "enable extended protection" timer could be reduced to 2t12 provided that, in addition to shortening the width of the light pulses that the vehicles emit displaced, the extended vision protection is prevented from activating when said pulses of light are detected in the DRCFZ. To do this, simply change the contents of the decision point 280 of FIG. 60 to "RCFZ=1 OR DRCFZ=1". So that the timers "enable extended protection" and "use extended protection" would cease to be activated in the vehicle in front of the phase-shifted light pulses emitted by a synchronized vehicle. In addition, the latter would make the displaced emission predicted for a "successor" vehicle to be unnecessary to announce a phase change to its possible successors, and therefore it could be dispensed with by such a displaced emission by inverting the order in the diagrams of the FIGS. 65A-65F, from steps 356 and 357, and further, in the diagram of FIG. 66, also reversing the order of steps 385 and 386. For the same reason the duration of the "Extended protection", reducing it to 1T or 2T. The "cost" of reducing the duration of such timers is limited to that the driver could be exposed (before those timers are first fired during the propagation of a phase shift) to the first unsynchronized high beam pulse. It should be mentioned that, for the values given as an example, the time 2t12 would be of the order of one tenth of a second. Anyway, since during the propagation of a phase change the time that said driver could be exposed to the intense light is very brief, one could even opt to do without the "extended vision protection".

Reducing the width of the emitted displaced light pulses: As already stated in the description of the anti-dazzling method, the intermittent pulses of light emitted by synchronized vehicles circulating in opposite directions should be prevented from overlapping. For this, it is necessary that each pulse of light emitted by a vehicle is extinguished before the positive side of the ICS of another vehicle synchronized with the previous one and that it circulates in the opposite direction with respect to the road. Therefore, the maximum width that these pulses can have is given by the expression:

T/2—width of the RCFZ/2 or, expressed in periods of the output Qi of the counter/divisor 11, by the expression: $2n-i/2-\Delta$. However, if it is desired to avoid such overlapping even when said synchronized vehicles are emitting pulses of light displaced in phase, it is necessary that the width of said pulses of light be reduced to the value $2n-i/2-\Delta-DESP$, being, as already mentioned:

- $2n-i$: the duration of the period T of the ICS measured at periods of a output Qi of the counter/divider 11 (see FIG. 20).
- $\Delta$: the tolerance range already described when defining the measured CFZ in periods of said output Qi of the counter/divider 11.
- DESP: The offset or offset that a vehicle will apply to its EPIL to transmit information to other vehicles, measured in periods of said output Qi of the counter/divider 11.

Detection of Propagating Vehicle:

The time required for the activation of the "Propagating Vehicle Detection" signal (t10) must be less than the time required for the activation of the "non-synchronized intermittent light detection" signal (t12) The correct treatment of said "propagating vehicle detection" signal in the "inter-vehicular phase selection" block of FIGS. 62 and 63 (see operating diagrams of FIGS. 65A-65F and 66).

Intense Non-Synchronous Light Detection:

Vehicles involved in propagating a phase change will receive pulses of light outside the VPZ for a time that has been contemplated in the duration of the "enable extended protection" timer. If these pulses of light exceed the threshold of intense light ("DZT light detection"=1) the "extended vision protection" will be activated in those vehicles. This makes it unnecessary for "automatic low/high beam control"

(block 242 of FIG. 56) to act during the propagation of a phase change to reduce the intensity of the vehicle's lights. Therefore, the signal "Intense non-synchronous light detection" (see FIG. 40), which acts on this low/high automatic light control, should have an activation time ("nT") that is longer than the duration of the timer "Enable extended protection". However, if the "extended vision protection" option was to be implemented when the system was implemented, it could also be decided to reduce the activation time of the "Intense Light Detection" signal.

Phase Adjustment on Vehicles Having an Invalid Phase:

The time "$t_8$" is approximately the time it takes for a vehicle to have its phase invalidated (timer "validate phase adjustment"=0) in resetting said phase by the non-synchronized light pulses received from another vehicle (See FIG. 55). In order to avoid that the pulses of light emitted by a vehicle with the invalid phase can cause a signal with the correct phase to activate the signal "Detection of intermittent light not synchronized", and to activate the block "Inter-vehicular selection of Phase", it is desirable that the time "$t_8$" be less than the time"t12".

The time "t13+"

The value of "t13+", used in the operating diagram of FIG. 66, exceeds "t13" by a value which must be less than "t12". Otherwise a vehicle which has changed phase (via step 371 or 372 of said FIG. 66) could receive a phase shift light pulse in the DRCZ zone (see step 376) emitted by a successor vehicle (if any) After the "non-synchronized intermittent light detection" signal is activated in this last vehicle (see steps 361, 362, 385 . . . ). This could result in an erroneous phase change in said propagating vehicle. In fad, simply give "t13+" a value that only exceeds "t13" in 2 or 3T. Anyway, as has already been said, one could choose to reverse the order of steps 385 and 386, thus dispensing with the "subtlety" of having that successor vehicle emit a displaced light pulse before changing phases, with which would remove the above restriction.

Figure 83A:
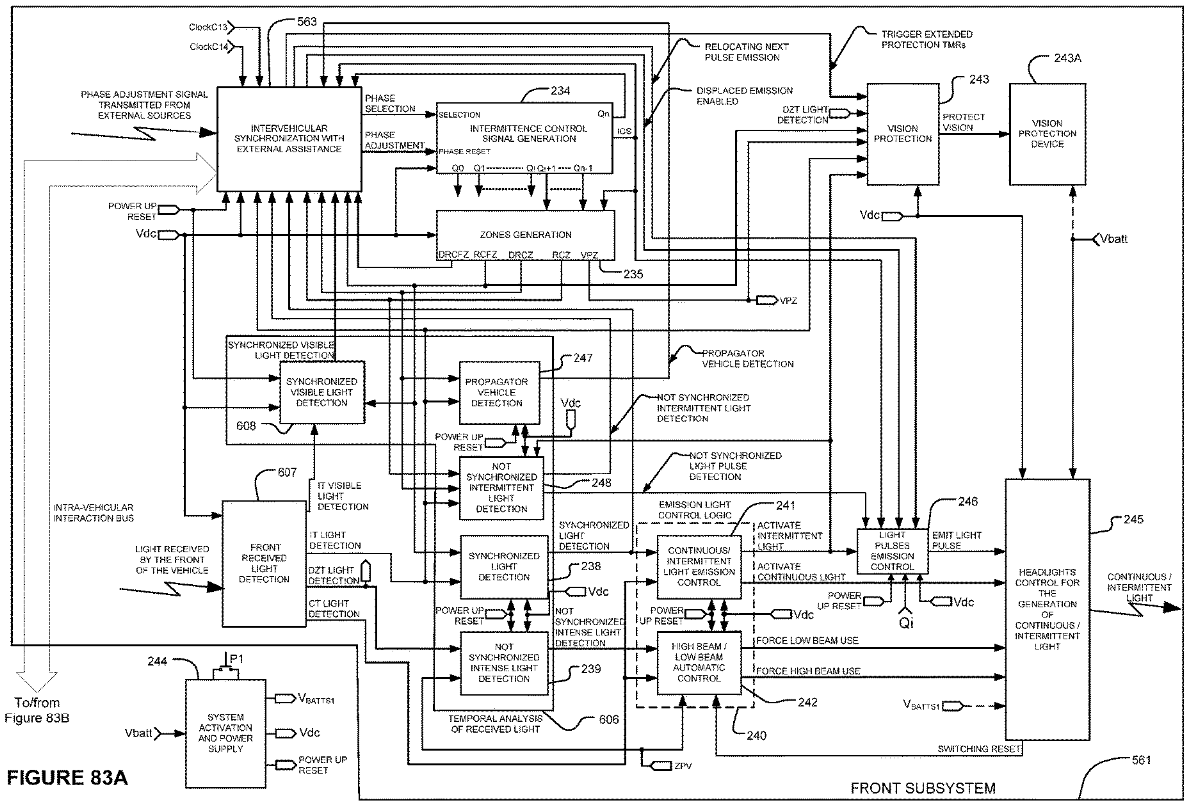
Figure 83B:
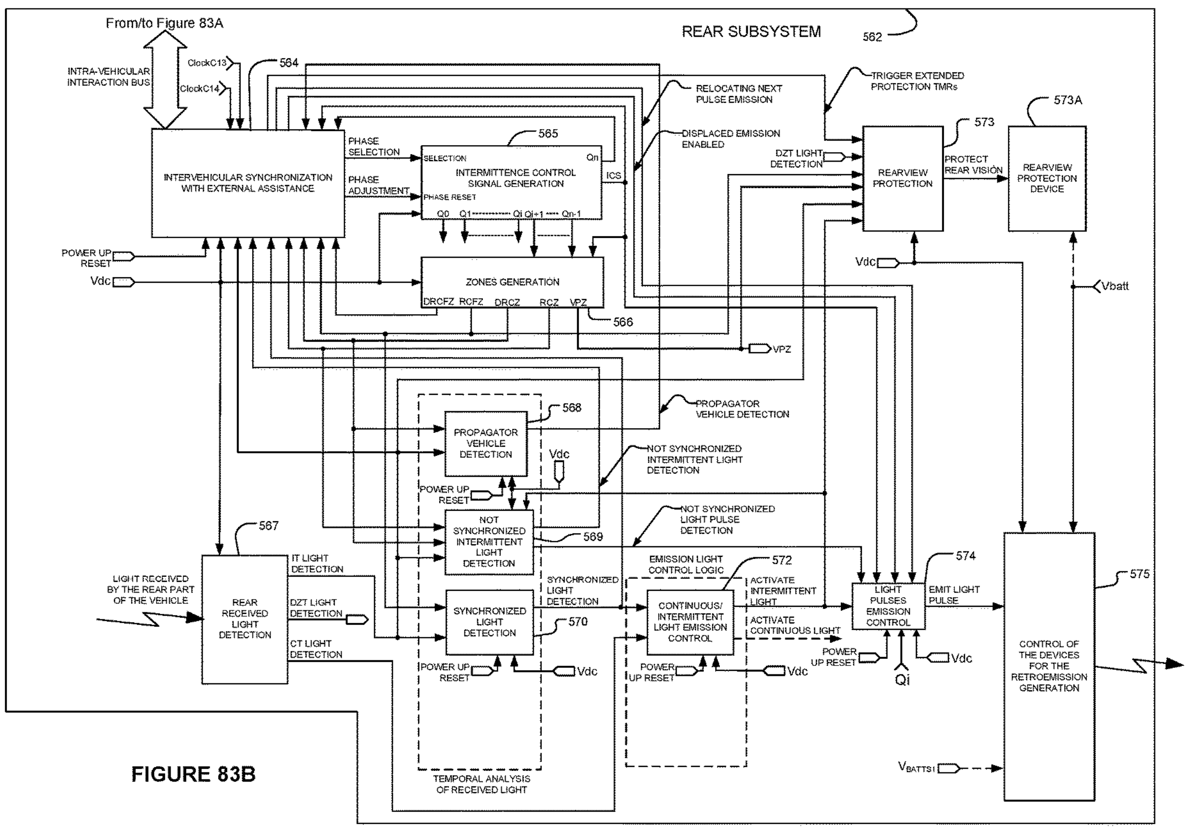

Anti-Dazzling System with Inter-Vehicular Synchronization and External Assistance and with Rear-View Protection This system is based on the "Anti-dazzling method with rear-view protection" and makes use of the "Inter-vehicular synchronization procedure with external assistance". As previously announced, this system will be configured as two subsystems which we will call "Front Subsystem" and "Rear Subsystem", to treat each end of the vehicle as a separate entity when the front and/or tail of a vehicle participate in a NVE. FIG. 83 shows the block diagram of a first version of the "anti-dazzle system with inter-vehicle synchronization and external assistance and with Rear-view protection". In FIG. 83, the front subsystem, represented by the composite block 561, is basically formed by the same blocks that make up the "anti-dazzling system with inter-vehicular synchronization and external assistance" described above (see FIG. 56). Accordingly, the same block numbers 234, 235, 247, 248, 238, 239, 241, 242, 243, 243A, 246 and 245 of FIG. 56 have been used in said composite block 561 (that is) those blocks that do not vary from system to system. On the other hand, the blocks of the front subsystem which exhibit some variation with respect to those of the system of FIG. 56 are referred to below:

The "light sensing received by the front" block 607 of FIG. 83 corresponds to an enlarged version of block 236 of FIG. 56 (and hence of block 65 of FIG. 34). This extended version has already been described under the heading "Concepts and Characteristics Common to Anti-dazzling Systems with Rear-view Protection", and is shown in FIG. 76.

The composite block 606 of the front subsystem of FIG. 83 is an enlargement of the composite block 237 of FIG. 56 which incorporates the "Synchronized visible light detection" block 608 into the front subsystem. The content of this block 608 is equal to content of block 238, and its operating diagram corresponds to that shown in FIG. 38, with the proviso that the entry "Light Detection IT" changes to "Detection of Visible Light UI", and that the "Synchronized Light Detection" changes to "Synchronized visible light detection". So that said block 608 has the inputs "Visible light detection IT" from block 607 and the "RCFZ" signal from block 235, and outputs the signal "Synchronized visible light detection", output which will remain In high value while the vehicle is receiving pulses of synchronized visible light. The output of said block 608 enters the block "Inter-vehicular synchronization with external assistance" 563 of the front subsystem. Said block 563 will be described below.

In the rear subsystem, represented by the composite block 562 of FIG. 83, the blocks 565, 566, 568, 569, 570, 572 and 574 have the same name and content as the "front subsystem" blocks 234, 235, 247, 248, 238, 241 and 246 respectively. The contents of the rear view mirror block 573 of the rear subsystem are equal to the content of the "Vision protection" block 243 of the front subsystem. While the "protect rear-view" output of said block 573 is held high, the "rear-view protection device" 573A should prevent or attenuate the light path. The design of this device 573A will be conditioned by the techniques used to implement the protection of rear-view, some of which have been mentioned together with the formulation of the anti-dazzle method with rear-view protection. The contents of the block "Light detection received from behind" 567 corresponds to that shown diagrammatically in FIG. 77, and described under the heading "Concepts and characteristics common to anti-ignition systems with rear-view protection". In one embodiment of the system, the "Control of Devices for Generating Retro-emission" block 575 has the sole function of generating the light emission that the vehicle will use to interact with other vehicles behind them. This block only enters the signal "emit pulse of light", reason why it is of less complexity than its counterpart, the block 245 of the front subsystem. The implementation of said block 575 depends on the techniques to be employed to generate this "retroemission".

Figure 84A:
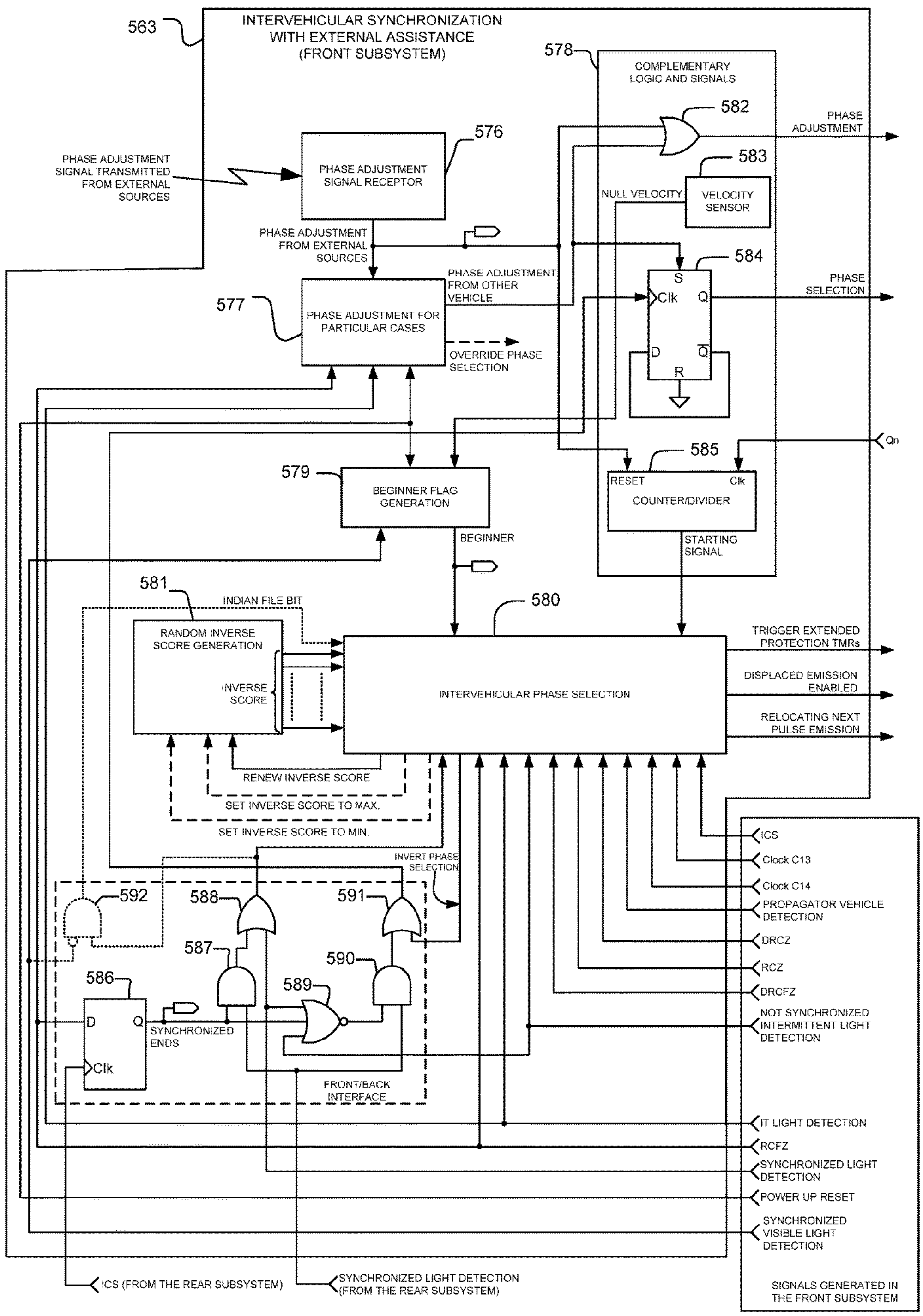
Figure 84B:
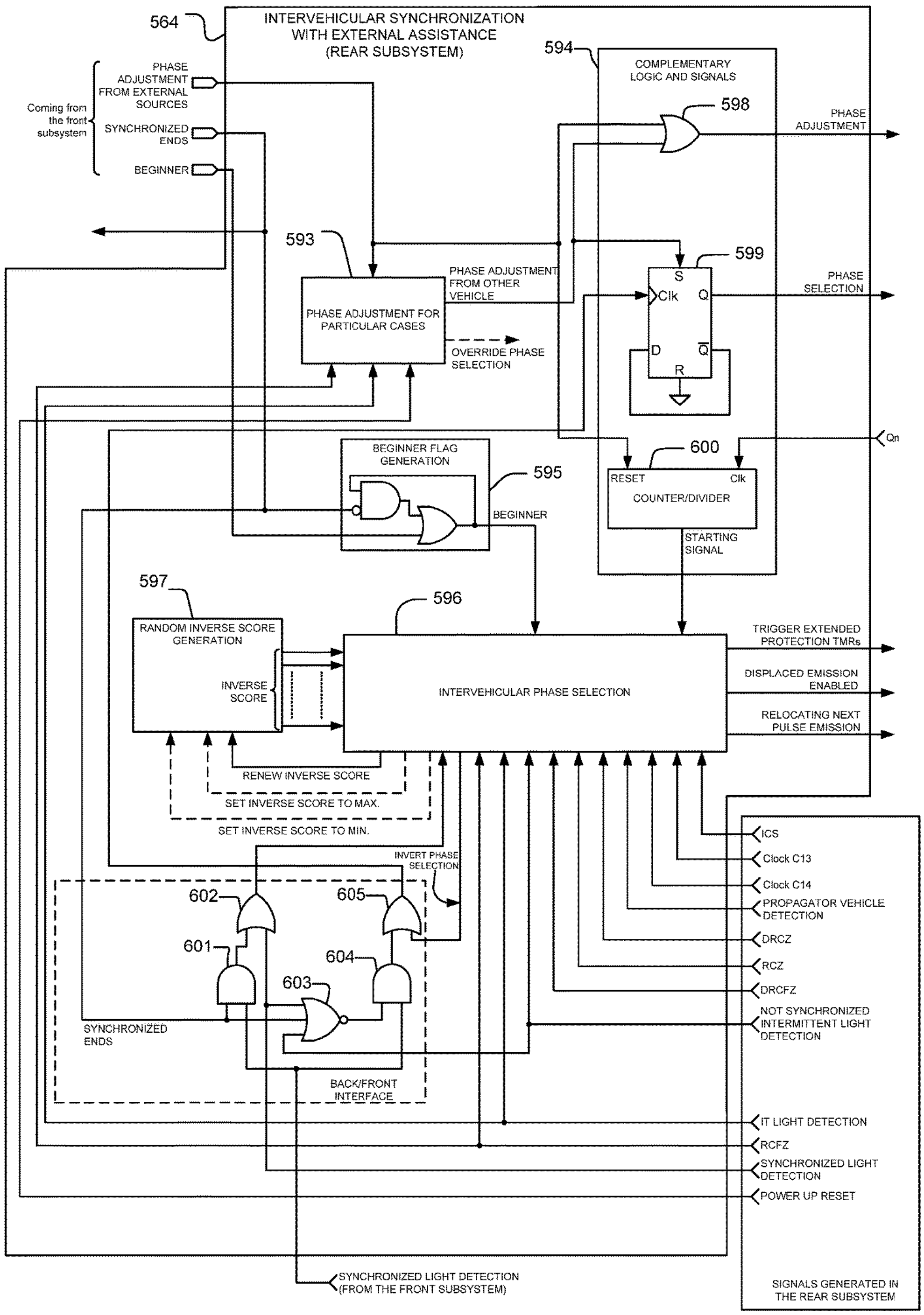

The block "Inter-vehicular synchronization with external assistance" 564 of the rear subsystem and its name 563 of the front subsystem will be described below as composite blocks: both the contents of said blocks and the interconnection between them are shown in FIGS. 84B-84B which is divided into two parts called "Interface DEL/TRAS" and "Interface TRAS/DEL" incorporated in said composite blocks 563 and 564, respectively. It should be mentioned that the interaction between the front and rear subsystems, which we will call intravehicular interaction, allows, among other things, that both ends of the vehicle are kept, most of the time, synchronized with each other. The composite block 563 of the front subsystem is, like the composite block 564 of the rear subsystem, an adaptation of the block "Inter-vehicular synchronization with external assistance" 233 of the "anti-dazzle system with inter-vehicular synchronization and external assistance" already described in connection with the FIG. 56. The content of the composite block 563 basically comprises the contents of said block 233 plus the content of said DEL/TRAS interface. The content of the composite block 564 basically comprises the contents of said block 233 plus the contents of said TRAS/DEL interface.

Remember that block 233 of FIG. 56 was described in two versions: one that uses "Synchronization with pseudorandom hierarchy" (see FIG. 62) and another that makes use of "Synchronization with hierarchization by m Magnetic heading" (see FIG. 63). The version of block 233 shown in FIG. 62 is that which will be used below to describe the content of blocks 563 and 564 of FIGS. 84A-84B. Thus, blocks 576, 577, 578, 579, 580 and 581 of the FIGS. 84A-84B, belonging to the composite block 563 of the front subsystem, have the same function and content as the following blocks of FIGS. 62: 298, 299, 300, 301, 302 and 303 respectively. The rest of the components of said block 563 correspond to the DEL/TRAS interface which, given its simplicity, will be described based on the logic scheme formed by the components 586, 587, 588, 589, 590 and 591. The output Q of Flip-Flop D 586 will indicate when the two ends of the vehicle are synchronized with each other. Remember that both ends of a vehicle are synchronized if the positive ICS flank of one of these ends falls on the RCFZ at the other end (and vice versa).

Accordingly, the ICS corresponding to the rear subsystem feeds to the clock input of said Flip-Flop D 586 and the front subsystem signal RCFZ feeds to the Data input of said Flip-Flop D 586, so that at output Q of Said Flip-Flop D 586 signal "synchronized ends" will be set high if the RCFZ signal is at high value when said ICS goes to high value. Now, as can be seen in said FIG. 62, the "synchronized light detection" signal directly enters the "inter-vehicular phase selection" block 302. In said block 302, which will be activated when the vehicle has been involved in an NVE Synchronized, said "synchronized light detection" signal is used to give the vehicle, when applying the first synchronization strategy, high hierarchy when it comes from a synchronized NVE. Although this same can be applied without changes to both subsystems (front and rear), it has been chosen to extend this idea by having the vehicle have high hierarchy at one end not only when it is receiving "light synchronized" by that end but also When said vehicle, having both ends synchronized, is receiving light synchronized by the opposite end.

With this extension, a vehicle having its two ends synchronized and at least one of them involved in a synchronized NVE is maintained, the synchronization of these ends is maintained when the other end is involved in an NVE not synchronized with an "isolated". This is done so that said isolated vehicle is synchronized with the vehicles of said synchronized NVE, thus avoiding the possible propagation of a phase change. This extension has been implemented in the front subsystem by the gates OR 588 and AND 587. The front end of the vehicle will have high hierarchy, when applying the first synchronization strategy, when the output of said OR gate 588, which enters the selection block Phase inter-vehicular "580, is in high value. This will occur when the signal "synchronized light detection" of the front subsystem, which enters one of the inputs of said OR gate 588, is at a high value or when the signal "synchronized ends" is high, entering a of the inputs of the AND gate 587, the "synchronized light detection" signal of the rear subsystem is also in high value, which enters the other input of said AND gate 587 whose output is in turn connected to the other input Said OR gate 588.

Taking again as a starting point FIG. 62, we see that in said figure the "reverse phase selection" output of the "inter-vehicular phase selection" block 302 enters directly into the clock input of the Flip-Flop D 306, which outputs the "phase selection" signal that will change state when participating in a non-synchronized NVE, the vehicle has to reverse its phase. While this could be implemented without change for both subsystems (front and rear), it has been chosen to make a vehicle also be able to change the state of the phase selection signal of the front end or the rear end, as appropriate, to recover the synchronization of its two ends (intravehicular synchronization). For this reason, in block 563 of FIGS. 84A-84B, the "reverse phase selection" output of block 580 enters, via OR gate 591, the clock input of Flip-Flop D 584.

Another input of said OR gate 591 may be given a clock pulse to said Flip-Flop D 584 when it is appropriate to synchronize both ends of the vehicle by reversing the forward end phase selection signal. It is to be noted that both inputs of said OR gate 591 will never be active simultaneously since block 580, which can activate one of the inputs of said OR gate 591, will only remain active while the "non-synchronized flashing light detection", which enters said block 580 and also to one of the inputs of the NOR gate 589. So, as long as said "non-synchronized flashing light detection" signal is at high value, the output of the NOR gate 589 will be at low value and Therefore, the output of the AND gate 590 which is connected to the other input of said OR gate 591 cannot be set high. The conditions for synchronizing the two ends of the vehicle with each other by reversing the phase, in this case the front end, Are: that the rear end being involved in a synchronized NVE (i.e., the "synchronized light detection" signal coming from the subsystem and enters one of the AND gate inputs 590) that said forward end is not involved in an NVE and obviously that both ends are not synchronized with each other.

These latter conditions will be fulfilled when the signals of the front subsystem "synchronized light detection" and "non-synchronized intermittent light detection" entering the NOR 589 are both low and when the signal "synchronized ends" Enters another of the entries of said gate NOR 589 is also in low value. We will now describe the option to add to the bits of the "inverse score", which enter into block 580 of the front subsystem, one more bit in the most significant position, whose value will be given by the "single line bit" signal, which will be ligh value when the vehicle is involved in a synchronized NVE in which it is not receiving visible light synchronized by the front (see gate AND 592). The only utility that this has is to make, when there is a conflicting union of two synchronized NVEs and in one of them all the vehicles are moving in the same direction (Single line), it is the vehicles of the latter NVE that change from phase to synchronize, causing them to have a greater inverse score than the other NVE. This is done so that the propagation of phase change occurs between vehicles that are not receiving visible light from the front. To conclude the description of the composite block 563 of FIGS. 84A-84B, we note that the name of the signal entering the "Beginner flag generation" block 579 is "synchronized visible light detection" instead of "synchronized light detection" as In FIG. 62, since in this system the signal "synchronized light detection" generated in the front subsystem is activated by both synchronous visible and non-visible synchronized flashing. This change is made so that the front end of the vehicle loses the "Beginner" condition only when it has synchronized its lights with that of a vehicle that comes in the opposite direction.

Next, we will describe the composite block 564 of the rear subsystem only pointing out the differences that said block presents with respect to the composite block 563 just described for the front subsystem. To begin with, we note that the signal "phase adjustment obtained from external sources" is shared by both blocks 563 and 564, so that the receiver of the phase adjustment signal 576, included in block 563, has no equivalent in said block 564. Also unique is the speed sensor 583 included only in said front subsystem block 563. The signal "synchronized ends" is also shared by said blocks 563 and 564, whereby the Flip Flop D 586 included in block 563 also has no equivalent in block 564. It should be mentioned that the "start signal" generated in the subsystem Forward by the block 585 of FIGS. 84A-84B could also be used as a start signal for the rear subsystem, although it was chosen to present in FIGS. 84A-84B to said independently generated signals (see block 600). It remains to be said that the "Beginner flag" is generated in the composite block 564 differently than in the composite block 563, since the beginner flag state of the rear subsystem depends on the state of its homonymous flag in the front subsystem. This is because the vehicle loses its "Beginner" condition first by the front and then, as soon as both ends of the vehicle are synchronized with each other, it will lose its Beginner condition at the rear end. Once the vehicle loses the "Beginner" condition at its rear end, it will only regain that condition if the Beginner signal from the front end is re-activated. This Beginner flag is generated in the rear subsystem by block 595 of FIGS. 84A-84B, the contents of which, given their simplicity, have been schematized within the same block 595 and their operation responds to the behavior just described for said flag. On the other hand, in said composite block 564, components 593, 596, 597, 598, 599, 600, 601, 602, 603, 604 and 605 have the same function and content as components 577, 580, 581, 582, 584, 585, 587, 588, 589, 590 and 591 of the composite block 563 respectively.

Figure 85A:
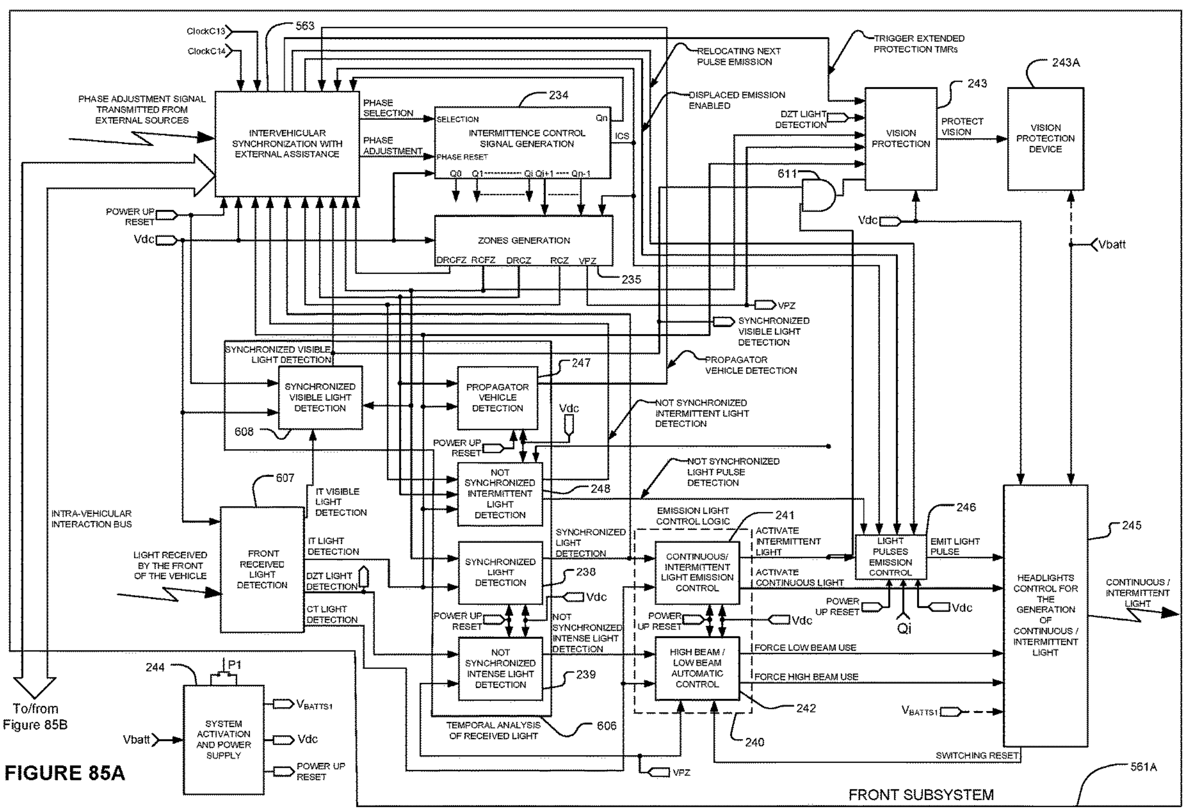
Figure 85B:
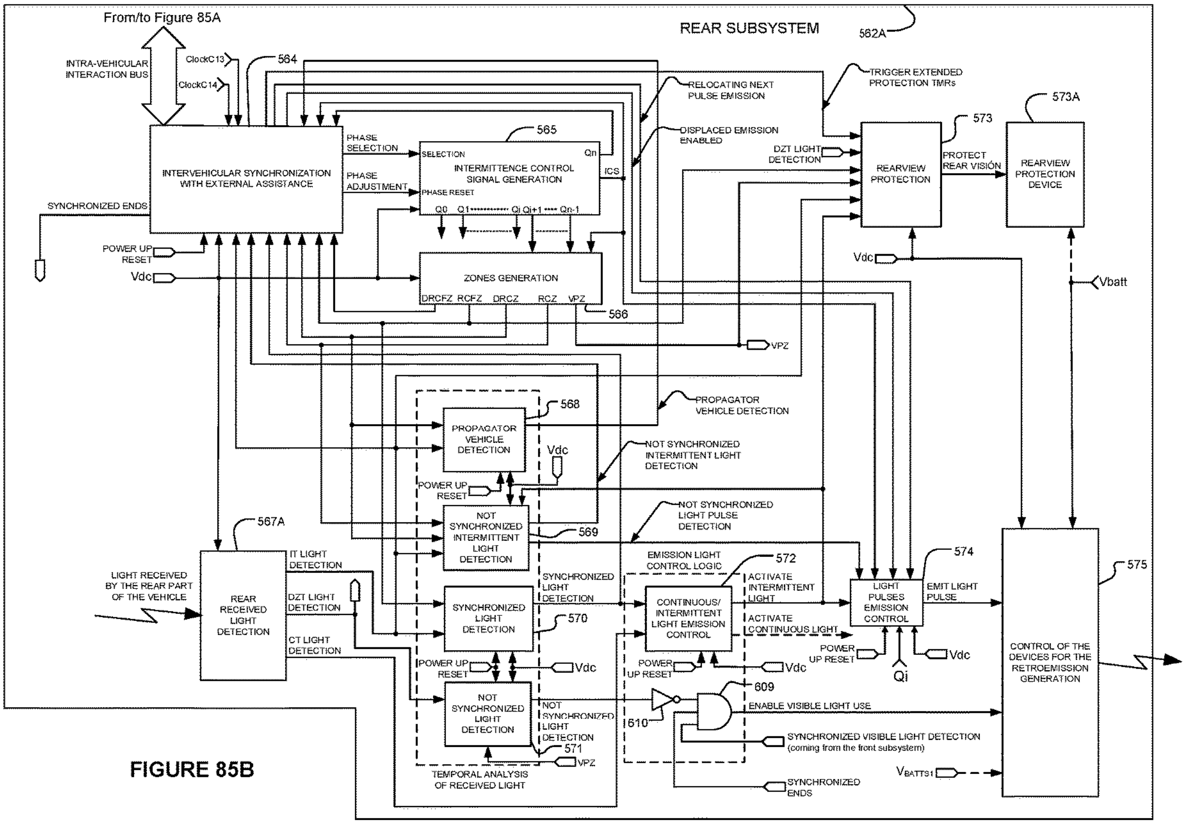

FIGS. 85A-85B shows the block diagram of a second version of the "Interlocking System with Interveular Synchronization and External Assistance and Rear View Protection", which introduces two improvements to the first version of said system. Improvement No. 1 is to prevent the vehicle from activating the vision protection when the vehicle is detecting from the front only pulses of light not visible from the tail of another vehicle or other vehicles, as would for example in an NVE composed of vehicles that advance in Single line. Improvement No. 2 has the purpose of allowing, under certain conditions, a vehicle to be able to emit pulses of visible light rearward, in order to cooperate with the vehicles that circulate in the opposite direction extending the area of the road that these vehicles can illuminate. The conditions for a vehicle to be able to emit pulses of visible light backwards using the frequency and phase of the rear ICS are:

Condition #1: that the vehicle to emit pulses of visible light backwards faces other vehicles approaching in the opposite direction, so that there are drivers that can benefit from this additional illumination.

Condition No. 2: that the vehicle that is to emit pulses of visible light backwards does not have behind it on the road to unsynchronized vehicles whose drivers could be harmed by the light emitted backwards by the vehicle of the front.

Condition No. 3: that the vehicle to be emitted pulses of visible light backwards have both ends synchronized with each other, otherwise the visible light that the vehicle could emit backwards would not be really useful for a synchronized vehicle that is approaching in the opposite direction.

From the block diagram of FIGS. 85A-85B only those blocks differing from those shown in FIG. 83 will be described. The composite block 561A of FIGS. 85A-85B, corresponding to the front subsystem, presents the following modifications with respect to block 561 of FIG. 83: on the "Vision protection" block 243 of FIGS. 85A-85B, as in FIG. 83, the "Activate flashing" signal acts, with the difference that it does so through the AND gate 611 when the Signal "Synchronized visible light detection", which also enters said AND gate 611, is in high value.

The composite block 562A of FIGS. 85A-85B, corresponding to the rear subsystem, has the following modifications with respect to block 562 of FIG. 83: the contents of the block "Light detection received from behind" 567A corresponds to that shown schematically in FIG. 15, wherein the light sensor 2 of said FIG. 15 should respond only to visible light to prevent vehicles that have just crossed the road from interacting with each other. The "Non-synchronized light detection" block 571 (which does not have its equivalent in the rear subsystem of FIG. 83) has the same content as the front subsystem block 239. The AND gate 609 and the inverter 610 represent another extension present in the rear subsystem of FIGS. 85A-85B. The manner in which the modifications described affect the behavior of this system is described below. In order to implement the enhancement No. 1, that is to prevent vehicle protection from activating the vision protection when said vehicle is only detecting on the front only pulses of non-visible light, in the front subsystem the "Synchronized visible light detection" signals coming from the block 608 and "Activate flashing light" from block 241, enter the inputs of the AND gate 611, whose output, when it is at high value, enables the "Vision protection" block 243 to be activated by the "Protect vision" within the VPZ zone. In this way the vision protection will only be activated when the vehicle is using its flashing light, but in front of vehicles that are also emitting pulses of visible light. This will prevent the vehicle from activating the vision protection when the vehicle is detecting from the front only pulses of invisible light coming from the tail of another vehicle, as it would for example in an NVE integrated by vehicles that advance in single line.

Next, the implementation of improvement #2 is described, that is to say, a vehicle can emit pulses of visible light backwards, in order to cooperate with the vehicles that circulate in the opposite direction. The output of the front subsystem block 608, "Synchronized Visible Light Detection", enters one of the inputs of the rear subsystem AND gate 609, while the output of block 571 "Unsynchronized light detection" enters, inverted by Denier 610, to another input of said AND gate 609 and the "synchronized ends" output of block 564 enters the other input of said AND gate 609. In this way, the output of said AND gate 609, which we will call "Enable use of Visible light" and entering the "Control of Devices for Generating Retro-emission" block 575, will be set to high value when the vehicle can emit visible light backwards. This is so because the signal "Synchronized visible light detection" in high value indicates that it fulfills said condition No. 1, while the signal "Synchronized light detection" in low value indicates that condition No. 2 is fulfilled, and the signal "extremes Synchronized" in high value indicates that condition #3 is met. So that the output of the AND gate 609 at high value indicates that all three conditions are met. It is to be noted that at block 567A it is desirable to adapt the activation threshold of the "DZT light detection" signal, which signal to block 571, to ensure that when a vehicle has behind it on the road to non-synchronized vehicles, the Signal" is set to high value before the drivers of said non-synchronized vehicles could be adversely affected by the visible light emitted back by the vehicle ahead.

Remember that said block 233 of FIG. 56 was described in two versions: one that makes use of "Synchronization with pseudorandom hierarchy" (see FIG. 62) and another that makes use of "Synchronization with magnetic heading hierarchy" (See FIG. 63). The contents of blocks 563 and 564, FIGS. 83 and 85, have been described using "Synchronization with pseudorandom hierarchy" (see FIGS. 62 and 84). A totally analogous work can be done to describe the contents of said blocks 563 and 564, FIGS. 83 and 85, making use of "Magnetization with a magnetic heading hierarchy" (see FIG. 63), and using, in said blocks 563 and 564, of the DEL/TRAS and TRAS/DEL interfaces already described. The only "special" consideration to be taken into account is that the magnetic direction obtained for the vehicle must be assigned to the front end of said vehicle (front subsystem) and that the opposite magnetic direction must be assigned to the rear end of said vehicle (rear subsystem).

Formulation of the Inter-Vehicular Synchronization Procedure

A further procedure for establishing the synchronization required by the anti-dazzle methods already described is described below. In this procedure, which is called the "Inter-vehicular Synchronization Procedure", no external transmission sources are required to transmit information to vehicles. An anti-dazzle system that applies this synchronization procedure will be autonomous, in the sense that you will not need any infrastructure on the road or from external devices to vehicles. Since in this synchronization procedure the vehicles do not have any preset phases for the emission of intermittent light pulses (EPIL), each vehicle that has not yet participated in any NVE will acquire any initial phase for the EPIL. Vehicles that participate in a non-synchronized NVE, even if they all have different phases of EPIL, can agree on a phase based on which all of them will synchronize their EPILs. This synchronization will be carried out by exchanging information between vehicles participating in the same non-synchronized NVE so that vehicles, using a predetermined algorithm, compete to make their EPIL phase prevail and tell the other vehicles which phase they should adopt to Synchronization of said NVE. Said exchange of information between vehicles will be carried out, using a predetermined means of communication, by the directional transmission/reception of signals by said vehicles, and is performed to solve, by means of said predetermined algorithm that we will call "inter-vehicular adjustment algorithm Phase", which or which of these vehicles will retain their current phase of EPIL and which or which of those vehicles will readjust their current phase of EPIL to achieve synchronization of said NVE.

Said inter-vehicular phase adjustment algorithm is based on establishing differences between the non-synchronized vehicles of said NVE to rank them, so that based on said hierarchy said vehicles compete to make their EPIL phase prevail. Where the winning vehicle of this competition initiates the synchronization of said NVE by imposing the counter-phase of its current phase of EPIL as the emission phase for the vehicles issuing in the opposite direction to said winning vehicle and where the vehicles already synchronized with the winning vehicle collaborate With it in turn imposing the counter-phase of its current EPIL phase as the emission phase for vehicles not yet synchronized emitting in the opposite direction to said already synchronized vehicles, thus completing the synchronization of said NVE.

The "information" that a vehicle receives from another vehicle or other vehicles within an NVE allows it to determine inter alia whether it is synchronized with those vehicles and therefore whether it should eventually change its phase to be.

Valid aspects relating to vehicle interaction for this synchronization procedure have already been addressed in describing the inter-vehicular synchronization procedure with external assistance. However, they are reproduced below:

In the anti-dazzle methods already described, it has been established that the vehicles must interact with one another to engage each other in an NVE. In this synchronization procedure, in the case of a non-synchronized NVE, the vehicles must also exchange information to achieve the synchronization of said NVE. Vehicles should be able to directionally transmit signals both at the front and at the rear if they have the capability to provide vision and rear-view protection and only at the front if the vehicles only provide vision protection. To explain the characteristics that such exchange of information should have if vehicles provide vision protection and rear-view, we will consider as separate entities the front and rear of the vehicles. The front of a vehicle can interact with the front or rear of another vehicle, while the rear of a vehicle does not interact with the back of another vehicle (vehicles that have already crossed the road do not interact with each other). Thus, the vehicle must have means to receive from the front both the signals that a vehicle can transmit by the front and those that another can transmit by the rear and also means for the reception behind the signals that a vehicle can transmit by the front. Making a vehicle exchange information backwards also makes it possible to apply this synchronization procedure to an NVE composed of vehicles that all move in the same direction with respect to the road.

Obviously, the EPIL phase of a vehicle is the basic information that another vehicle, exposed to said EPIL, needs to determine whether or not it is synchronized with the "issuing" vehicle of said EPIL. For this reason, it is necessary that backwards the vehicles emit a periodic adjustable phase signal equivalent to said EPIL with respect to being able to pass phase information to the vehicles that come behind, where that backward emission will be controlled by a signal equivalent to Said ICS (rear end ICS) and will be a non-visible emission (e.g. infrared light), at least as long as said NVE is not synchronized. We will say that both ends of a vehicle are synchronized with each other when the signals that the vehicle can directionally transmit through each end are in counter phase. Thus, when this is met, the phase information that a vehicle will transmit backward will be the same phase information that will forward another vehicle synchronized with it that advances in the opposite direction. From this point of view, we can say that the back of a vehicle behaves like the front of another vehicle coming in the opposite direction.

What we have just expressed and the statement made under the title "Definition of NVE", that when the anti-dazzle method with rear-view protection is applied a vehicle could be involved in an NVE in front and another in the back, allow us to highlight Something that is implicit in what has been said and is that, in relation to vehicle interaction, each end of the vehicle will have the ability to act separately. Much of the following has been written with reference to the vehicle in general and not to any of its particular ends, unless this were necessary, and was written in this way with the intention of facilitating its comprehension and in being applicable both To vehicles that can provide rear-view protection as to those that do not have that capability, since in the latter case, where vehicles interact only at the front, it does not make sense to specify for each action of the vehicle the end by which said Action takes place. Therefore, in vehicles that provide rear-view protection and in relation to aspects related to vehicle interaction, the actions attributed to the vehicle must be referred to the extreme (s) involved in those actions. By way of example, if we say "the losing vehicle of the competition will change its current emission phase" it must be interpreted that: if the front end of the vehicle is the one that loses the competition, that front end will change its current phase of EPIL, or if it is the rear end of the vehicle that loses competition, that rear end will change the current phase of the signal equivalent to that EPIL, or if both ends of the vehicle are losers of competition, both ends will change phase. Other aspects and characteristics of the vehicle interaction valid for this synchronization procedure will be treated at the end of the description of the same.

The inter-phase phase tuning algorithm is described below. This algorithm is similar to the inter-vehicular phase selection algorithm used in the inter-vehicular synchronization procedure with external assistance, but with certain implementation differences. Once the vehicles determine that they are part of a non-synchronized NVE, the execution of said inter-vehicular phase adjustment algorithm is started. This algorithm sets the hierarchies of the vehicles of a non-synchronized NVE so that based on said hierarchy said vehicles compete with each other to make their phase prevail when synchronizing. For this, said algorithm applies two strategies in the following order:

First strategy: when a vehicle determines that it is part of a non-synchronized NVE, it obtains a first hierarchy based on the information it has and exchanges with another vehicle or other NVE, and on the basis of it determines whether or not it should Adjust its current emission phase. The basic principle of this first strategy is to make the more hierarchical a vehicle within said non-synchronized NVE, the longer the vehicle later, within a preset timing, to readjust its phase against the non-synchronized emissions coming from other vehicles. If this first strategy does not lead to the synchronization of the NVE, the inter-vehicular phase adjustment algorithm will apply a second strategy to obtain the synchronization of said NVE.

Second strategy: If a certain time interval has elapsed since the beginning of the inter-vehicular phase adjustment algorithm (the interval that will be given by the time required by the application of the first strategy), a vehicle determines that it is still part of an NVE Not synchronized, will apply this second strategy to obtain a new hierarchy and on the basis of it decides whether or not to adjust its current emission phase to obtain the synchronization of said NVE. This second synchronization strategy will make use of the algorithm we will call "phase hierarchy synchronization" and eventually, in some infrequent configurations of non-synchronized NVEs, of the algorithm we will call "pseudo-random hierarchy" and which is a variant of the "Synchronization by pseudorandom hierarchy" already described for the "inter-vehicular synchronization procedure with external assistance".

The following is how the phase adjustment is performed. In the formulation of the anti-dazzle methods we have said that the emission of intermittent light is carried out with the frequency and phase of a periodic signal that we have called "intermittent control signal" (ICS) and is the one that maintains the phase adopted by a vehicle Even if it is not emitting a flashing light (or its equivalent signal as appropriate). Thus, such phase adjustment will be carried out by resetting the vehicle's ICS at low value with the arrival of an unsynchronized light pulse (or its equivalent signal), thus synchronizing the emissions of the "emitter" and "receiver" of said pulse, so that the phase that had the vehicle "receptor" of said pulse will be eliminated from the NVE. For this phase removal mechanism to work properly, when a vehicle changes phase it will be disabled to re-phase until it has emitted, at least once, its new phase.

The following will be detailed, depending on the type of non-synchronized NVE that vehicles integrate, when and how each of these strategies is applied:

The implementation of the first strategy is sufficient to obtain the synchronization of a non-synchronized NVE when it has been formed from a synchronized NVE by the incorporation of one or more non-synchronized vehicles. In this case, the vehicles that will have the highest hierarchy will be those coming from the synchronized NVE and the "information" that they receive and that allows them to identify this situation is given by the synchronized EPIL and/or by the signal equivalent to the synchronized EPIL (if said Information comes from the rear of a vehicle) that said vehicles are detecting since before said non-synchronized NVE was formed. In this way, the best hierarchical vehicle within said NVE will not have to change phases to synchronize with the rest and will be the winner of the competition. Vehicles that do not come from a synchronized NVE will be the ones with the lowest hierarchy and will reset their phase with the first non-synchronized light pulse (or equivalent signal) that they receive after the execution of said inter-vehicular phase algorithm has started.

By making vehicles that do not come from the synchronized NVE be those that have to change phase, it is avoided having to propagate a phase change between the vehicles that do come from said synchronized NVE. In the scheme of FIG. 13E, an unsynchronized NVE generated by the incorporation of V4 into the synchronized NVE forming the vehicles V1, V2 and V3 shown encircled in said figure is shown by way of example. in one embodiment, vehicles can only be involved in an NVE by vehicles moving in the opposite direction (for simplicity it has been assumed that these vehicles do not provide rear-view protection). V4 is interacting directly only with V1. This is because it has been assumed that V4 is "out of reach" of V3 and because V4 cannot interact directly with V2 (since in this case vehicles do not provide rearview protection). The broken line drawn between V4 and V1 indicates that the EPILs of said vehicles are not synchronized. Analyzing this example, we can see that if V1 were to be replaced by V1 vehicle, this phase change should be propagated to V2 and then through V2 to V3 so that all the vehicles are synchronized. By avoiding this "chain" propagation the synchronization of the entire NVE can be completed in less time and it is further achieved that the vehicles furthest from each other, represented in the example by V1 and V4, are the only ones to exchange non-synchronized light during the short sync time.

The implementation of the first strategy will also normally be sufficient to obtain the synchronization of a non-synchronized NVE when none of the vehicles involved in said non-synchronized NVE is detecting synchronized light, or its equivalent, at the time of starting the execution of the inter-vehicular phase adjustment algorithm, i.e. when none of Said vehicles come from a synchronized NVE. Unlike the inter-vehicular synchronization procedure with external assistance, in which vehicles can only adopt one of two alternative phases (phase/counter phase), in the inter-vehicular synchronization procedure that we are describing the vehicles can initially adopt any phase, this characteristic being Which we will use to establish "differences" between these vehicles. Thus, as long as said vehicles have different phases, among said vehicles the lowest hierarchy will correspond to the first vehicle that, having started the execution of said inter-vehicular phase adjustment algorithm, receives a light pulse (or its equivalent signal) Not synchronized, pulse with which said vehicle will readjust its phase, being eliminated from the NVE the phase that said vehicle had. Thus, each vehicle that resets its phase (vehicle of low hierarchy) is synchronized with another vehicle of greater hierarchy within the NVE, process that leads, by elimination of phases, to the synchronization of said NVE. Remember that for this phase-removal mechanism to work properly, when a vehicle changes phase it will be disabled to re-phase until it has emitted at least once with its new phase (eventually a vehicle could phase change more once during the synchronization of said NVE).

If, on the other hand, any such vehicles had, within a predetermined tolerance range, a single phase (i.e. non-synchronous vehicles emitting their pulses at almost the same time), this first strategy will not be sufficient to obtain the synchronization of said NVE, since such phases would no longer be distinguishable and therefore would have the same hierarchy. In practice this means that both vehicles could detect the arrival of a pulse of light (or its equivalent signal) emitted by the other when they have just emitted their own pulse of light, which would cause a mutual phase readjustment that would leave to said vehicles not synchronized with each other and with opposite phase to that previously had. Bearing in mind that in this “inter-vehicle synchronization procedure” the phase initially adopted by a vehicle is not predetermined, it is quite unlikely that this “equal phases” situation is presented in a “casual” manner. If this happens the vehicles will apply the second strategy to synchronize (in fad they will apply the second algorithm of this second strategy, which we have called “pseudo-random hierarchy”, and which will be described under the heading “Particular cases”).

The application of the second strategy is necessary when a non-synchronized NVE has been formed from the encounter of two synchronized NVEs. This non-synchronized NVE will be composed of those non-synchronized vehicles coming from both synchronized NVEs that have been close enough to interact with each other. FIG. 13F shows an example of a non-synchronized NVE formed from the encounter of two synchronized NVEs E1 and E2, which in the figure are encircled. It has been assumed, as in the example of FIG. 13E, that vehicles can only be involved in an NVE by vehicles traveling in the opposite direction. We will assume that V1 and V5 are two vehicles not synchronized with each other, coming from E1 and E2 respectively, that have approached enough to interact with each other. When this second strategy is applied, the non-synchronized vehicles (V1 and V5 in the example) will adopt, through the algorithm we have called “phase hierarchy synchronization”, a new hierarchy to compete, and based on this hierarchy vehicles They will agree which phase should be changed and which should not.

As long as said vehicles have different phases, between said vehicles the lowest hierarchy Will correspond to the first vehicle that, having begun the execution of said second strategy, receives a light pulse (or its equivalent signal) not synchronized having its ICS in high value. That is to say, the phase adjustment will be carried out in the vehicle of lower hierarchy, restarting in value under the ICS with the arrival of a non-synchronized light pulse (or equivalent signal), whose positive edge is present in the moment the vehicle has its ICS in high value. This will synchronize the emissions of the vehicles “emitter” and “receiver” of said pulse.

It is worth mentioning that if a vehicle has its ICS in high value when it receives the positive edge of the pulses emitted by another vehicle, this last vehicle will have its ICS in low value when it receives the positive flanks of the pulses emitted by the first one. In the type of NVE we are describing, after said non-synchronized vehicles (V1 and V5 in the example) have applied the second strategy and agreed which one or which of them will have to change phase, the propagation of said phase change Between vehicles coming from the same NVE synchronized as that or those vehicles that have resigned their phase. In the propagation of a phase change we will identify as “propagator” the vehicle(s) that just changed its phase and as a “successor” to the vehicle (s) to which the next turn corresponds to change phases. It should be clarified that the successor vehicles, among which this phase change should be propagated, will receive information from the propagating vehicle(s) which will cause them to adopt a minimum hierarchy and apply the first strategy to synchronize.

On the other hand, if these non-synchronized vehicles (V1 and V5 in the example) coincidentally had within a predetermined tolerance range the same phase (i.e. they are non-synchronous vehicles emitting their pulses practically at the same Time), this first algorithm of the second strategy will not be sufficient to obtain the synchronization of said NVE since in this type of NVE the phase changes are propagated to the successor vehicles and therefore it is necessary that to synchronize only one Change of phase and in vehicles that all come from the same synchronized NVE, something that could not happen when these phases were very similar. This is because, because of the mentioned tolerance range, a vehicle of one of the synchronized NVEs could be receiving pulses of light (or its equivalent signal) coming from the other synchronized NVE when its ICS is already high, while another vehicle of the same NVE could be receiving those pulses when its ICS is still in low value and the same could happen in the other synchronized NVE.

Obviously, if we only applied phase hierarchy to a particular case like this the synchronization would not be achieved. We conclude then that phase hierarchy leads to the synchronization of vehicles whose phases differ from each other at least in the value of said tolerance range, or in other words, whose phases are not the same if they are compared with the tolerance expressed by said margin predetermined. Although the possibility of such a phase equation occurring casually between two or more vehicles is, as already mentioned, quite remote, it has been taken into account and the solution is to apply the second algorithm of this second strategy, which we have called the “pseudo-random hierarchy” algorithm, which will be described under the heading “Particular cases”.

The implementation of the first strategy will also suffice, as we just announced, to propagate a phase change within an NVE. Before a vehicle becomes a “propagator” of a phase change, its “successor” has been receiving synchronized light or its equivalent signal, and therefore, if it did not receive information from the propagating vehicle (s), it would maintain the “hierarchy” Which confers it to belong to a synchronized NVE and would not change its phase Without using that hierarchy to compete (which could put an end to this spread). For this reason, it is necessary that a vehicle that can become a propagator is identified as such before the successor before changing phase, for example, altering in a pre-established way the synchronization that still maintains with that successor. One way of doing this is to emit, for a short time, the EPIL or its equivalent signal as appropriate with a certain phase shift that allows the successor to differentiate said emission from a considered emission synchronized. Thus, when a propagating vehicle changes phase, the vehicle or vehicles that have detected that phase shift (successor vehicles) will also change phase and become propagators to communicate to their successors, if any, that they will in turn change also of phase, and so on will be propagated the phase change until complete the synchronization of the NVE. Returning to the example of FIG. 13F, we will show the dynamics of the propagation of a phase change: we will assume that vehicle V1, when applying the second strategy, is the one that has changed phase to synchronize with vehicle V5.

Therefore V1, which is now no longer synchronized with V2, becomes vehicle propagator so that the successor vehicle V2, applying the first strategy, change phase to synchronize with V1. Done this V2 now becomes vehicle propagator and V3 in successor vehicle, which when phase change completes the synchronization. As can be seen, except for the synchronization initiating vehicles (V1 and V5 in the example), which apply the second strategy, the rest of the non-synchronized vehicles will change phase when applying the first strategy, since they will do so in function of the information they receive from other vehicles. It should be mentioned that drivers of vehicles that propagate a phase change could be exposed to intense non-synchronized light for a brief instant of time. This can be avoided by "extending" the vision/rear-view protection during that instant of time. The scheme of FIG. 13G is another example of non-synchronized NVE that has been formed from the encounter of two synchronized NVEs (E1 and E2) but integrated by vehicles that can be involved in an NVE both in the front and rear, corresponds to vehicles that provide vision protection and rear-view. in one embodiment, it has been assumed that V1 and V4 are non-synchronized vehicles, coming from E1 and E2 respectively, which are close enough to interact with each other. Note that if V4 imposes its phase on V1, the propagation of the phase change, between the vehicles of E1, will be initiated by the front of V1. Instead if V1 imposes its phase on V4, the propagation of the phase change between E2 vehicles will be initiated by the tail of V4.

Particular Cases:

The application of the first strategy is also enough to cause a vehicle to re-adjust its phase when that vehicle participates in a non-synchronized NVE having started or restarted its nocturnal displacement by a certain path, that is to say when it has not yet synchronized its lights with those of no other vehicle traveling in the opposite direction. When a vehicle in this condition participates in a non-synchronized NVE will be the first to be enabled to readjust its phase assuming that said NVE is formed by vehicles with a higher hierarchy than the own and therefore will adjust its phase to synchronize it with the first emission That you receive from another non-synchronized vehicle. In this case, the information used by the vehicle to determine this situation is given by: a "flag" that indicates it as a "Beginner" on the road and also by the non-synchronized emission from another vehicle. Assigning this "Beginner" condition to vehicles that initiate or restart their nocturnal displacement along the way tends to achieve, through successive NVEs, a single-phase assignment for the entire road, as long as the vehicles have oscillators Sufficiently stable to maintain, within an admissible tolerance, the phase adopted. This is because in each non-synchronized NVE all phases except the phase (and counter phase) of the winning vehicle are eliminated, which produces a gradual reduction in the number of different phases. While providing a single-phase assignment for the entire path is not necessary to avoid dazzling, if it is something that will gradually reduce the occurrence of non-synchronized NVEs.

The Beginner flag can be activated using a speed sensor, thus invalidating the vehicle's phase when the vehicle slows down to a stop or, for example, to change its direction of travel with respect to the road To the non-random presence of the same phase in vehicles that emit in opposite directions). The Beginner flag will be deactivated the moment the vehicle receives the synchronized flashing front.

Next, we analyze how the synchronization of an NVE whose vehicles come from two synchronized NVEs and that carry very similar phases is analyzed. The initiators of the synchronization, using the second strategy, will try to agree which of them will change phase and which will not first apply the "synchronization by phase hierarchy". If this is not achieved the synchronization of said NVE may be due to one of the following:

It may occur that when applying "phase hierarchy synchronization" none of these vehicles will change phase. Which means that none of them is detecting non synchronized pulses of light (or equivalent signal) whose phase is different from the vehicle itself as they are compared to each other with the tolerance already described.

There may be vehicles in one of the NVEs that change phase and other vehicles in the same NVE that do not change phase. This can be due to the margin of tolerance with which the vehicles are synchronized in each NVE and a little difference between the "average" phases of both NVEs (what cannot happen, given the restrictions already described, is that there are vehicles that change phase In both NVEs).

For both cases the solution consists of applying the second algorithm of said second strategy to what we have called the algorithm of "pseudorandom hierarchy". In both cases, competition through pseudorandom hierarchy will be done in the same way. What is different in the second case is that, having vehicles in one of the NVEs that changed phase when applying phase hierarchy synchronization, it is desirable that the other vehicles of the same NVE also change phase when applying pseudo-random hierarchy. These latter vehicles will detect the phase change of the former indirectly upon receiving the signals that the successor vehicles (already exposed to said phase change) transmit to their own successors announcing that they are ready to change phases. Thus, non-synchronized NVE initiating vehicles that did not change phase and receive such signals, instead of competing with a pseudo-random hierarchy, will do so with the lowest possible hierarchy reserved for this case. In this way these vehicles will be the losers of the competition and will change phase.

It should be remembered that such pseudo-random hierarchy is also applicable to any non-synchronized NVE whose vehicles are carriers in a casual manner of the same phase, although such vehicles do not come from synchronized NVEs.

In general, the synchronization by pseudo randomization hierarchy is developed as follows: vehicles that, under the second strategy, have unsuccessfully applied "phase hierarchy synchronization" (because these phases are "very similar") Compete by running a waiting time whose duration will be given by a value generated in each vehicle in pseudorandom form (except in those vehicles that, as explained above, have adopted the lowest possible hierarchy to lose the competition). Such waiting time is in inverse relation with the hierarchy that will have the vehicle, therefore the first vehicle to complete its waiting time will be the winner of the competition. It should be noted that from this point the algorithm differs somewhat from that described in the "inter-vehicular synchronization procedure with external assistance" because in the procedure we are describing the vehicles do not receive an external synchronization signal. This means that said waiting times cannot be as brief as in said procedure. For this reason the way in which the winning vehicle ends the competition against non-winning vehicles and how the latter communicate with each other is a little different in this case.

The winning vehicle may transmit information to other vehicles by emitting, at the ends of the vehicle involved in the competition, a predetermined phase shift. Thus non-winning vehicles that have been emitting in the opposite direction and in phase with the winning vehicle, upon detecting said phase shift will change phase (becoming losers) and will be enabled to emit with a predetermined phase shift intended to warn the Non-winning vehicles, which emit in the same sense as the winning vehicle, that the competition is over and that they have the right phase. These vehicles may then cooperate with the winning vehicle by transmitting the same information to vehicles that may be out of the reach of said winning vehicle. Finally, if the competition produces a tie between vehicles that emit in the same direction is not a problem since these vehicles are synchronized. If the tie occurs between vehicles that emit in opposite directions the process is repeated with new pseudorandom scores.

The following are detailed examples of cases in which the vehicles can provide rear-view protection, other characteristics and consequences of the vehicular interaction that can be inferred from what has already been said:

A vehicle having both ends synchronized with each other may lose this condition when participating in a non-synchronized NVE having only one of its ends involved in said NVE. In this situation is for example V4 of FIG. 13E which, in this case, must resign the phase of its front end in front of the vehicles that come from the synchronized NVE of the circulation. In the same situation would be a vehicle with both ends involved in different non-synchronized NVEs.

A vehicle that loses the synchronization of its ends could recover it immediately if one of its ends is "free", that is to say not involved in any NVE, since that end can change of phase following to the other end (propagation "intravehicular" Phase). If the vehicle does not have a free end said synchronization will be delayed until the moment one of the ends of the vehicle is "free". This is done so that one end of the vehicle does not interfere or disturb the NVE in which the other end is involved.

From the above, it follows that when there is conflicting joining of two synchronized NVEs there will be no "intra-vehicular" phase propagation, i.e. a phase change will have to reach from one end to the other of the vehicle indirectly through of another vehicle, using the "propagator/successor" roles. This is done in order not to extend the propagation of a phase change beyond what is necessary.

Normally if a vehicle has both ends synchronized with each other and only one of these ends is involved in a synchronized NVE, when the other end, which is free, is involved in a non-synchronized NVE will participate in it with the same hierarchy With which it would do the first, that is to say with the hierarchy that grants to belong to a synchronized NVE. In this way both ends of the vehicle acquire such hierarchy to try to stay synchronized. Otherwise, even an "isolated" vehicle could prevail in said non-synchronized NVE in front of said free end, which would generate in the "limits" of the synchronized NVE another synchronized but conflicting NVE. And later when both NVEs begin to interact with each other there would be a propagation of a phase change that can be prevented by making said "isolated" vehicle resign its phase and incorporated into a single synchronized NVE. A specific example has not been included for the presented situation, but it can be observed in FIG. 13G making abstraction of the vehicles V5 and V6, that is considering V4 as if it were an isolated vehicle.

If one chooses to cause the vehicles to transmit forward the signals necessary to achieve synchronization of an NVE using the vehicle's own EPIL, then it would be desirable for the vehicles to emit back the equivalent signal of the EPIL using also pulses of Light, and we will call it "Rear EPIL", where said rear EPIL will be controlled by said ICS for the rear end. If the back EPIL is used solely for the purpose of transmitting information, then such emission could be made using light in the non-visible spectrum (e.g. infrared light). But an additional utility might be given to the rear EPIL as described below: within a synchronized NVE, vehicles moving in a certain direction with respect to the road could cooperate with those traveling in the opposite direction by extending the area of the road that these Vehicles can illuminate. For this, obviously, said rear EPIL should be performed using visible light. The pulses of visible light of said rear EPIL will not disturb the drivers of vehicles driving behind as these drivers will have the vision protected when said pulses of light become present.

Anti-Dazzle System with Inter-Vehicular Synchronization

Figure 67:
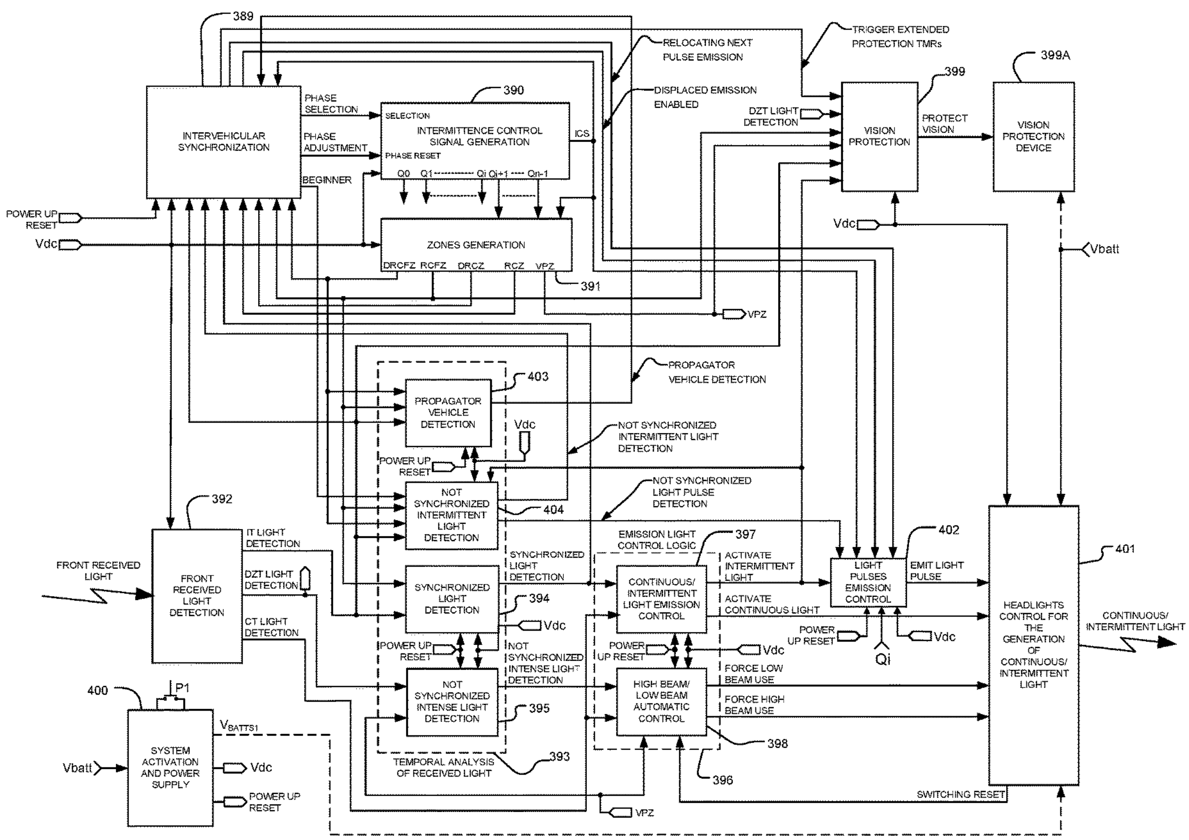
FIG. 67 shows the block diagram of the Anti-Dazzling System with Inter-Vehicular Synchronization, according to an exemplary embodiment of the invention.

FIG. 67 shows the block diagram of this system, which is based on the anti-dazzle method already described and makes use of the inter-vehicular synchronization procedure. The blocks 390, 392, 394, 395, 396, 397, 398, 400 and 401 of said FIG. 67 respectively correspond in name, function and content with blocks 234, 236, 238, 239, 240, 241, 242, 244 and 245 of FIG. 56 corresponding to the "anti-dazzle system with inter-vehicular synchronization and external assistance" and thus with the corresponding blocks 186, 188, 190, 191, 192, 193, 194, 196 and 197 of FIG. 51 To the "externally synchronized system with vehicular assistance" and to the blocks 61, 65, 67, 68, 109, 110, 111, 171 and 172 of FIG. 34 corresponding to the "externally synchronized anti-dazzle system", all of which have already been described.

To be more specific, it should be mentioned that the operation of the block "Generation of the signal of intermittent control" 390 was explained in describing the characteristics common to all the systems (see FIG. 20). The same is true of the block "Light detection received by the front" 392 whose operation was described under the heading "Formation of an NVE" (see FIG. 15). The description of the block "System activation and power supply" 400 is also included within the characteristics common to all systems (see FIG. 29). The same applies to the block "Control of the headlamps for the generation of continuous/intermittent light" 401 (described in relation to FIGS. 32 and 33). On the other hand the operation of the "Synchronized Light Detection" blocks 394, "Detection of Intense Light Detection" 395, "Control for Continuous/Blinking Light Emission" 397 and "Automatic Control of Low/High beam" 398 was Explained in relation to the operating diagrams of FIGS. 38, 40, 43 and 45, respectively.

The "Zone generation" blocks 391, "Vision protection" 399 and "Light pulse emission control" 402 have the same function and content as their homonyms of FIG. 56 (blocks 235, 243 and 246 respectively) That were described for the "anti-dazzle system with inter-vehicular synchronization and external assistance". Remember that as long as the "protect vision" output of said block 399 is kept at high value the "Vision Protection Device" 399A should prevent or attenuate the light passage. The design of this device 399A will be conditioned by the techniques used to implement vision protection, some of which have been mentioned along with the formulation of the anti-dazzle method.

"Propagating vehicle detection" blocks 403 and "Non-synchronized flashing light detection" 404 also have the same function as their homonyms of FIG. 56, but their contents are not identical to those of such homonyms so they will be described later as subblocks of the block "Temporal analysis of received light" 393. Finally, the synchronization block that is called "Inter-vehicle synchronization" will be described in this system 389.

As already mentioned, the "Zone Generation" block 391 produces the same zone signals that have already been defined for the "interlocking system with inter-vehicular synchronization and external assistance". (DRCZ) and "Displaced Restricted Conflict Free Zone" (DRCFZ) signals are used in a vehicle to determine when and under what circumstances another vehicle is transmitting information by applying a certain phase shift to its EPIL regular. If a vehicle is de-phasing its EPIL, the positive flanks of said EPIL will be detected by another vehicle within the DRCFZ if both vehicles are synchronized with each other, instead, they will be detected within the DRCZ if those vehicles have their ICS in phase (remember That for a vehicle to emit with phase shift it will be necessary that it be enabled to do so and also that it is receiving pulses of light not synchronized outside the DRCFZ). It should be mentioned that in this system the "RCZ" and "DRCZ" zone signals are used to detect and treat those particular situations in which vehicles issuing in the opposite direction bear, in a casual manner, the same EPIL phase, and That the vehicle could generally determine whether it is receiving non-synchronized ("valid") pulses of light for this system only by analyzing whether the positive flanks of said pulses fall outside the RCFZ.

Figure 68:
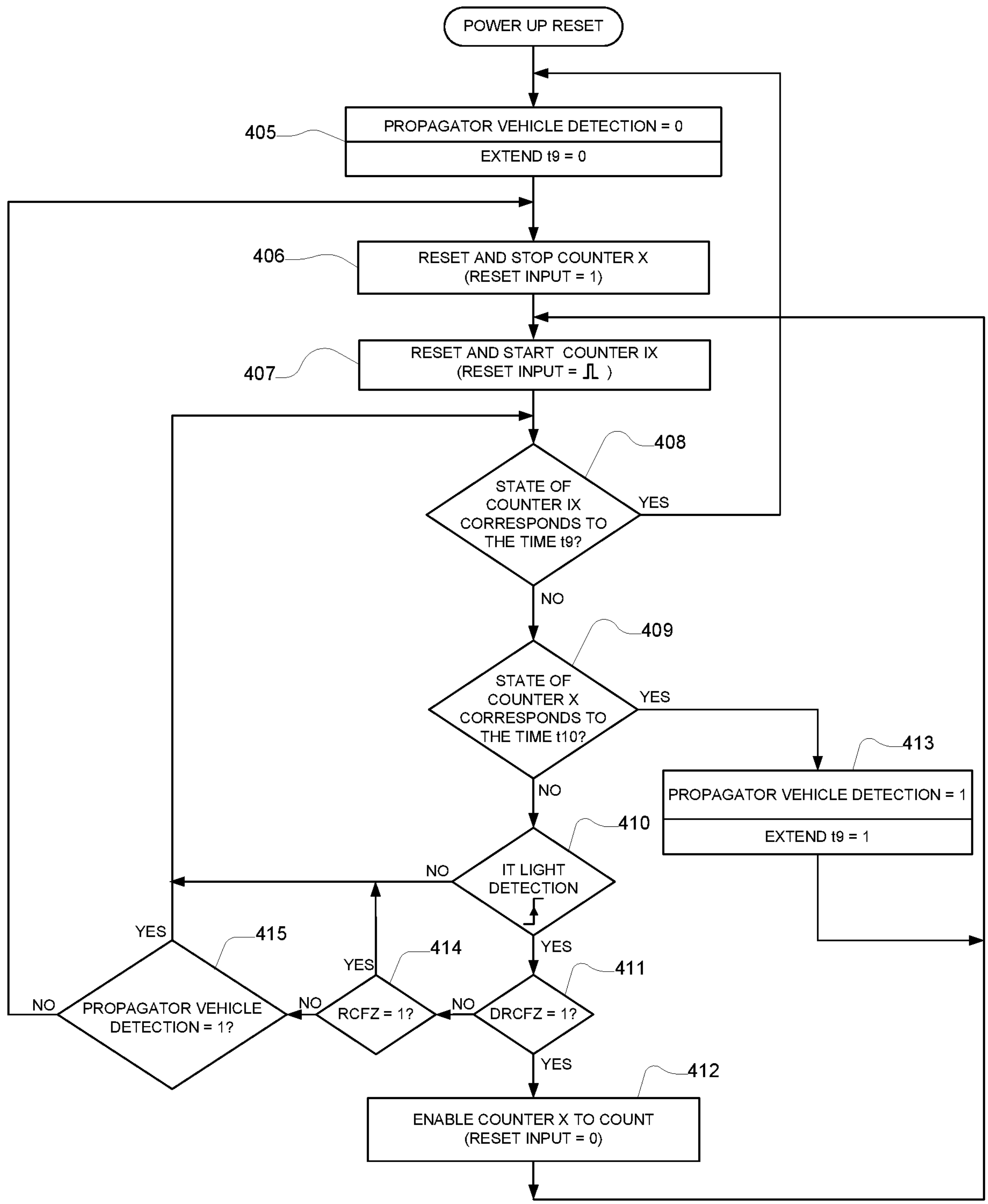
FIG. 68 shows the operation diagram of the block "Propagating vehicle detection" in FIG. 67, according to an exemplary embodiment of the invention.

FIG. 68 shows the operation diagram of the "Propagating Vehicle Detection" block 403. This block allows determining when a vehicle can assume the role of "successor" in the propagation of a phase change (see propagator relationship-success in the inter-vehicular synchronization procedure). When this block 403 determines that the vehicle is detecting pulses of light whose positive flanks fall into the DRCFZ it will activate the "vehicle propagation detection" output (this signal is used in the system synchronization block to make vehicles with phase "Loser" to synchronize its ICS with that of the propagating vehicle without "competing" with it and propagate the phase change as will be described in due course). Activation of said "propagating vehicle detection" output requires the temporal analysis of the "UI light detection" signal in relation to the DRCFZ and RCFZ zones and is performed by the "tolerant verification" algorithm already used in the previously described systems. Before starting the description of the operation diagram of this block 403, it is convenient to explain why the signal "propagating vehicle detection" is generated and used differently, in this system, as was done in the "anti-dazzle system with inter-vehicular synchronization and external assistance" already described, in which a "loser" vehicle activates in its successor the signal "detection of propagating vehicle" after having resigned the phase of its ICS and to provoke such activation it emits, for a brief lapse of Time, its EPIL applying a certain phase shift to its new ICS. In said "anti-dazzle system with inter-vehicle synchronization and external assistance" the successor vehicle can recognize said phase shift because the possible phases for its ICS are predetermined (and restricted to the two alternative phases used in said system for the regular emission of pulses Flashing light).

On the other hand, in the system we are describing, due to the different phases that different vehicles may initially have, the "propagating vehicle detection" signal must be activated in a possible successor vehicle before the propagating vehicle changes phase, That then a successor vehicle could not recognize a phase shift applied to a new phase that would be unknown to him. For this reason, the "initiating" vehicles of a non-synchronized NVE before competing with each other (i.e. before they know whether or not to change phases) will activate the "possible propagation vehicle" signal in their respective "possible successors" If they subsequently detect a phase change they must adhere to it (as losers) but after "transmitting information" to their own successors to activate also the signal "propagating vehicle detection" in them.

Figure 69:
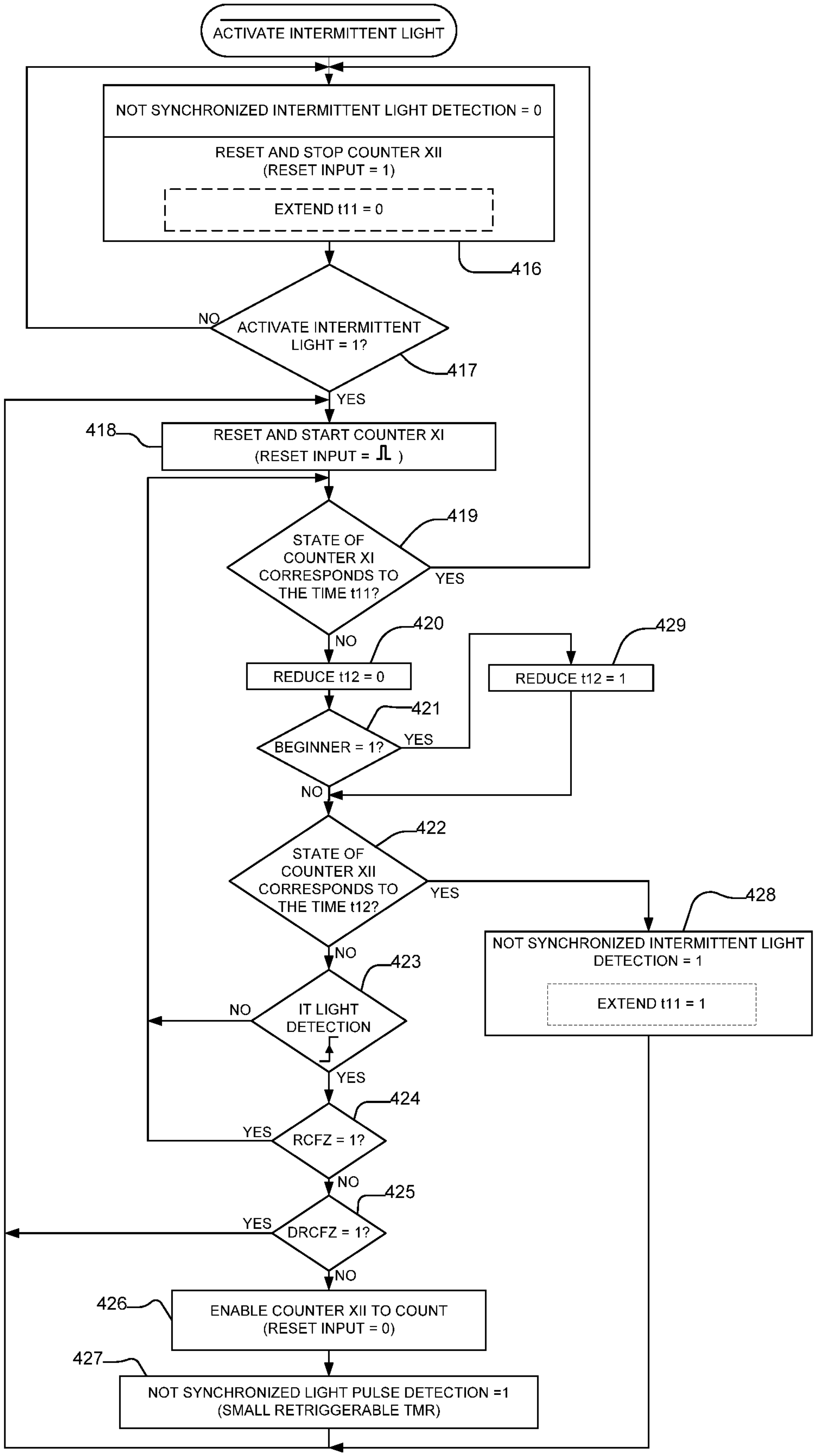
FIG. 69 shows the operation diagram of the block "Non-synchronized flashing light" in FIG. 67, according to an exemplary embodiment of the invention.
Figure 70:
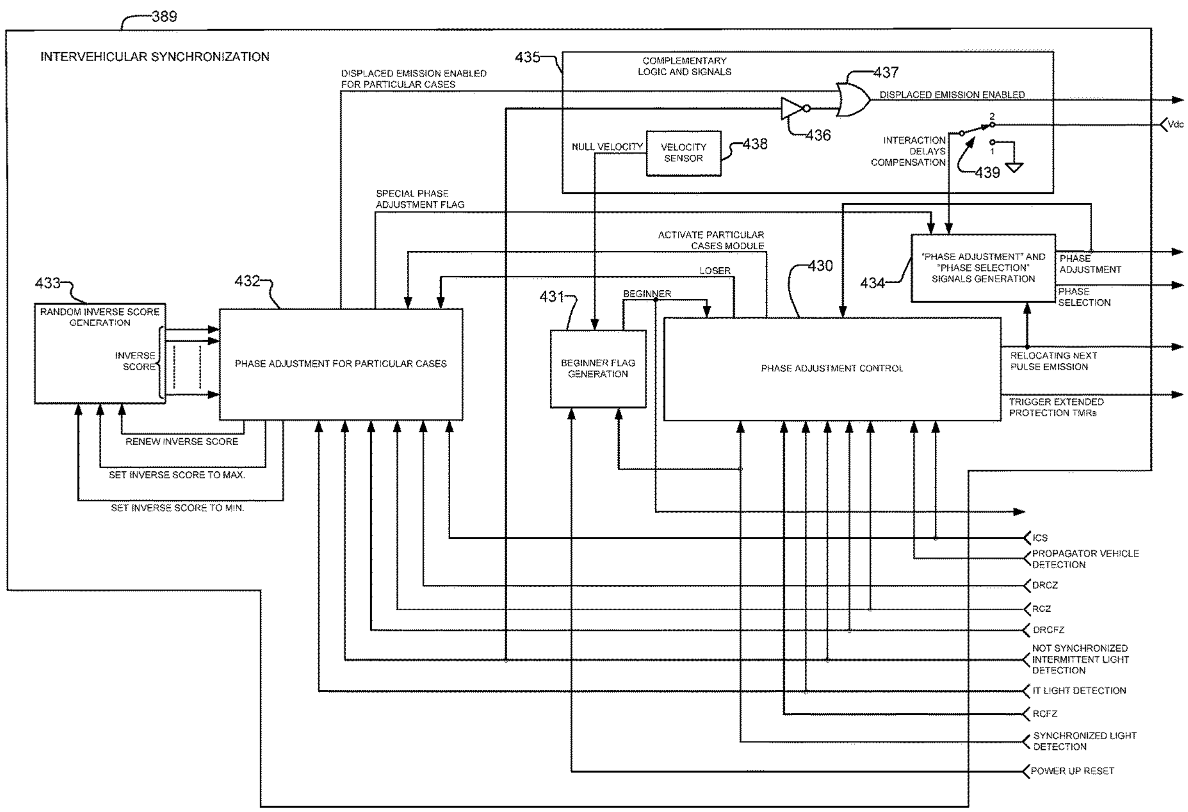
FIG. 70 shows contents of the composite block "Inter-vehicular synchronization" of FIG. 67, according to an exemplary embodiment of the invention.

For this reason, a vehicle must emit a phase shift from the moment the "non-synchronized light pulse detection" signal is activated (see FIGS. 61 and 69) and until the signal "light detection Intermittent not synchronized" activates the synchronization block on the vehicle (see FIG. 70). However, non-synchronized light pulses that will cause a vehicle to emit with phase shift do not include those pulses whose positive edge is received within the DRCFZ of the vehicle. This is done so that the signal "propagating vehicle detection" is activated in a vehicle that is a "possible successor" (through the EPIL run in phase of its predecessor) without that said "possible successor" can in turn emit of phase unless its predecessor has resigned its phase (only then that vehicle will receive pulses of light outside the DRCFZ). We will then call a "possible successor" to any vehicle of a non-synchronized NVE in which the signal "propagating vehicle detection" is activated.

It should be noted that excluding the detection of such positive flanks in the DRCFZ does not prevent two non-synchronized vehicles from emitting, both at the time and in phase, even when the positive flank of the ICS of one of them Fall casually in the DRCFZ of the other since when the first of them emits with phase shift the second will receive a pulse of light whose positive edge will fall out of its DRCFZ and can also emit with phase shift.

As already mentioned, the "tolerant verification" algorithm already described will be used for the activation of the "propagating vehicle detection" output. Said algorithm checks for a time interval that we will call "t10" if the signal "light detection IT" is giving positive flanks inside the DRCFZ with some regularity proper to the flashing light. Said time "t10" will have a duration of several periods T and will be controlled by the "counter X" which, upon reaching the value corresponding to the time "t10", will cause activation of the "propagating vehicle detection" output. On the other hand, such regularity of the flashing light will be controlled by another counter which we will call "counter IX", which will be reset each time the "light detection IT" signal has a positive edge inside the DRCFZ. If said counter reaches a value corresponding to the time "t9", the counter X will be reset, thus avoiding reaching the value corresponding to the time "t10". If the vehicle receives non-synchronized pulses of light outside the DRCFZ when the "vehicle propagation detection" output has not yet been activated, said X counter will also be reset since these pulses cannot be from an ancestor vehicle that has not yet changed from phase. Obviously the minimum value that can be given to "t9" is T. assigning a higher value (e.g. 2T or greater) makes this algorithm "tolerant".

We now start the description of the operation diagram of FIG. 68. A "power up reset" pulse causes: zeroing of the "propagating vehicle detection" output and the "extend t9" signal in step 405, resetting and stopping the counter X in step 406 and resetting and starting the counter IX in step 407. When the "light detection IT" signal gives a positive edge within the DRCFZ the sequence will include the steps 410, 411, 412, 407, . . . leaving counter X enabled for counting, see step 412, and zeroing counter IX at step 407. If this sequence is repeated without counter IX reaching the value Corresponding to the time "t9" and without receiving synchronous pulses of light outside the DRCFZ, when the counter X reaches the value corresponding to the time "t10", in step 409, the "propagating vehicle detection" output will be activated in step 413 and then the counter IX will be set to zero in step 407. When the vehicle stops detecting pulses of light whose positive flanks fall on the DRCFZ the counter IX will reach the value corresponding to the time "t9" and the sequence will go from the decision point 408 to the step 405 whereby the "Propagating vehicle detection" output will be deactivated and counters X and IX treated as when a power up reset pulse is given (see steps 406 and 407). On the other hand, if a non-synchronized light pulse is received outside the DRCFZ before the "vehicle propagation detection" signal has been activated the sequence will also return to the steps 406 and 407 but through the path . . . 410 , 411, 414, 415, 406, 407. The time "t10" must be greater than the time "t9" since "t10" is the time during which it is verified that pulses of light arrive to the DRCFZ with a conditioned regularity by "t9". However, once the "propagating vehicle detection" output has been activated in a successor vehicle, the value of "t9" is increased by activating the "extend t9" signal, included in step 413, to prevent said output "Propagating vehicle detection" is deactivated when its predecessor vehicle is no longer capable of being emitted with a phase shift, that is, from the time that the synchronization block has been activated in that ancestor vehicle and until such time as the successor vehicle must change If applicable. Later this time "t9" will be expressed in more detail.

The "Non-Synchronized Blink Detection" block 404 has the primary function of determining when the vehicle has been involved in a non-synchronized NVE. When this happens, the output "Non-synchronized flashing light detection" will be activated and the "Inter-vehicle synchronization" block 389 will also be activated as will be described later. The operation diagram of said block "Non-synchronized flashing light detection" 404 is shown in FIG. 69. When the "turn on flashing" signal from block 397 is set to low value, the sequence starts at step 416 and is maintained at said step 416 until the "turn on flashing" signal is set to high value (see step 417). Since in said step 416 the "Non-synchronized flashing light detection" output is set low, this block 404 will remain inactive as long as the vehicle does not participate in an NVE. The "Non-synchronized flashing light detection" output is activated by the "tolerance check" algorithm already used, which performs the temporary analysis of the "light detection IT" signal in relation to the "RCFZ" and "DRCFZ". This is because a vehicle will receive pulses of light whose positive flanks will fall out of said zones when interacting with another or other non-synchronized vehicles enabled to emit with phase shift.

When the signal "Light detection IT" from a positive edge outside said zones RCFZ and DRCFZ the sequence will follow steps . . . 423, 424, 425, 426, 427, 418, . . . thus enabling "counter XII" to be Counting at step 426, activates the redisplayable "non-synchronized light pulse detection" timer at step 427 (of 1T duration for this system) and zeroes counter XI at step 418. when counter XII reaches Value "t12" the "non-synchronized flashing light detection" output will be activated in step 428, but for that to occur it is necessary that the counter XI does not reach the value corresponding to the time "t11", for which, once The counter XII has been enabled to count, the vehicle must continue to receive pulses of light whose positive edge falls outside the zones RCFZ and DRCFZ, in which case the sequence 422, 423, 424, 425, 426, 427, 418, . . . , or at least receive pulses of light whose positive edge falls out of the RCFZ, in which case the sequence 422, 423, 424, 425, 418, . . . is produced, since in both cases the counter XI will be reset at step 418. Note that while the light pulses received in the DRCFZ Produce counter XI reset does not enable counter XII to start counting. This is done to prevent the "non-synchronized flashing light detection" output from being activated when the only non-synchronized light pulses being received by the vehicle come from a synchronized vehicle enabled to emit with phase shift (i.e. from a predecessor vehicle Involved in a non-synchronized NVE that still retains its phase).

However, this does not prevent said "non-synchronized intermittent light detection" output from being activated and remaining active if said light pulses come from a non-synchronized vehicle which has already ceased to emit with phase shift and whose ICS is switching to high value within The DRCFZ of the vehicle in question. In relation to these unique encounters between non-synchronized vehicles in which the positive side of the ICS of one of the vehicles casually falls within the DRCFZ of another, it is opportune to point out that when the first of these vehicles emits with phase shift the second Will continue to receive non-synchronized light. But as long as the second vehicle emits with phase shift the first will stop receiving pulses of non-synchronized light. Therefore, to give a certain regularity to the non-synchronized pulses of light that such vehicles exchange is that it has been suggested to give a duration of 1T to the "non-synchronized light pulse detection" timer, since this timer controls the emission of pulses Phase light when such emissions are enabled (see operating diagram of FIG. 61).

Under these conditions the first of these vehicles will receive a non-synchronized light pulse for every two pulses of light emitted by the second while the latter is enabled to emit with phase shift, for this reason the time "t11" must be greater than 2T. When the vehicle stops receiving non-synchronized pulses of light, the counter XI will reach the value corresponding to the time "t11" and the sequence will pass from the decision point 419 to the step 416 whereby the "non-synchronized flashing light" output will be deactivated and the counter XII treated as indicated by step 416. The signal "extend t11" is shown in the diagram framed in broken line indicating that its use is optional. This signal "extend t11" is activated and deactivated next to the output signal "non-synchronized flashing light" in steps 428 and 416 respectively, and will be used to extend the time it takes to "(For example using said signal to give value to one or more of the bits that make up the value corresponding to the time "t11").

However, when the "non-synchronized flashing light detection" output is inactive, "t11" will be less than "t12" since "t12" is the time during which "pulses" of light are being "Synchronized with a regularity conditioned by "t11". Finally, the "reduce t12" signal will be activated when the vehicle has high the "Beginner" flag (see steps 421 and 429).

Thus, by reducing the activation time of the "non-synchronized intermittent light detection" output, it is intended that in said "Beginner" vehicle the inter-vehicle synchronization block 389 is activated before in the other vehicles of the NVE and thus, as we will see later, that the "Beginner" vehicle is the first to resign its phase.

It remains to describe the "Inter-vehicle synchronization" block 389 of FIG. 67 which is a composite block whose contents, shown in FIG. 70, is given by the following blocks: "Control for phase adjustment" 430 "Beginner Flag Generation" 431. "Phase adjustment for particular cases" 432. "Generation of pseudorandom inverse score" 433. "Generation of phase adjustment and phase selection signals" 434 and "Logic and signals Complementary".

The "Beginner flag generation" blocks 431 and "Pseudorandom inverse score generation" 433 have the same function and content as their homonymous blocks described for the "interlocking system with inter-vehicular synchronization and external assistance".

Figure 71A:
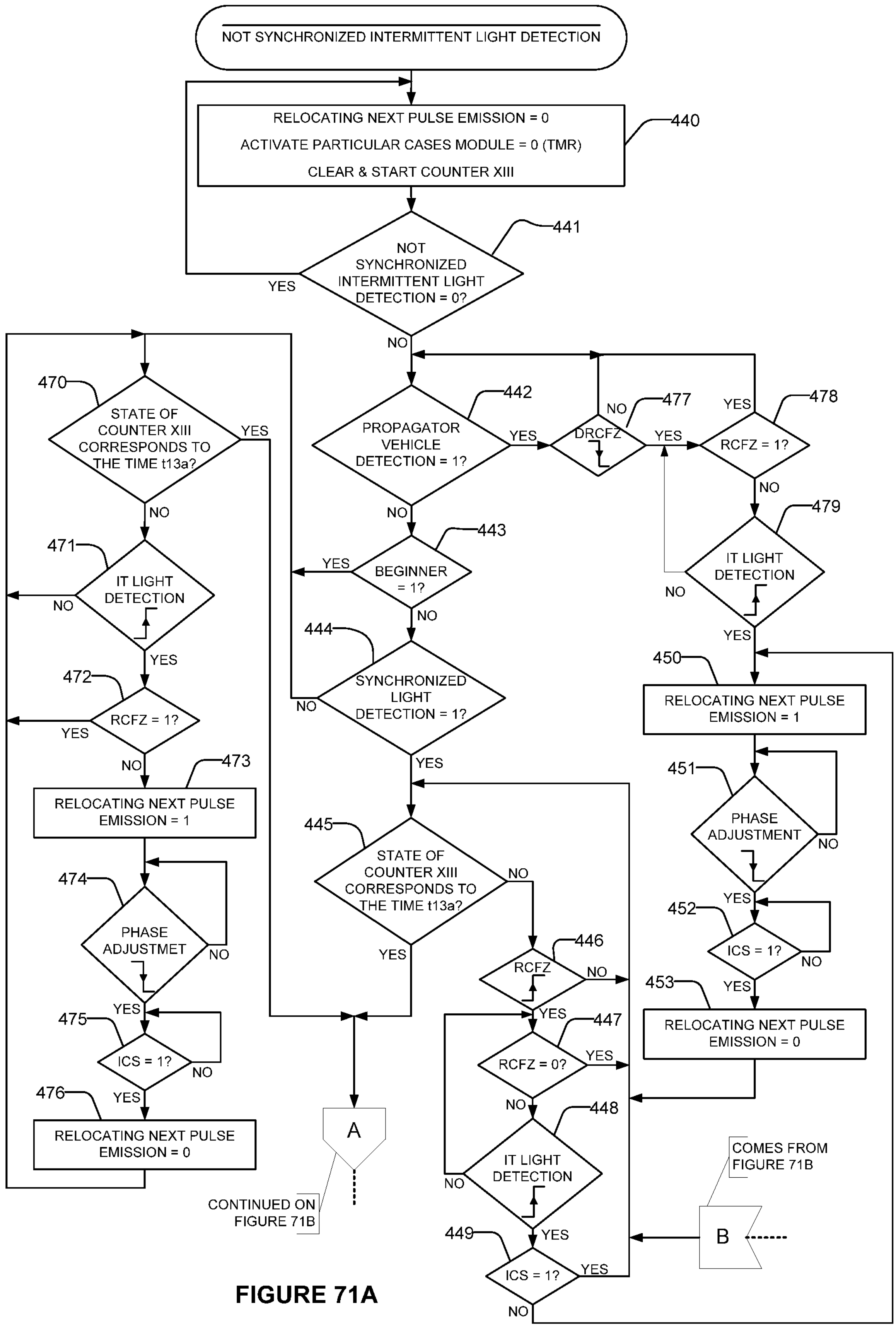
FIGS. 71A-71B show the operation diagram of the block "Control for phase adjustment" in FIG. 70, according to an exemplary embodiment of the invention.
Figure 71B:
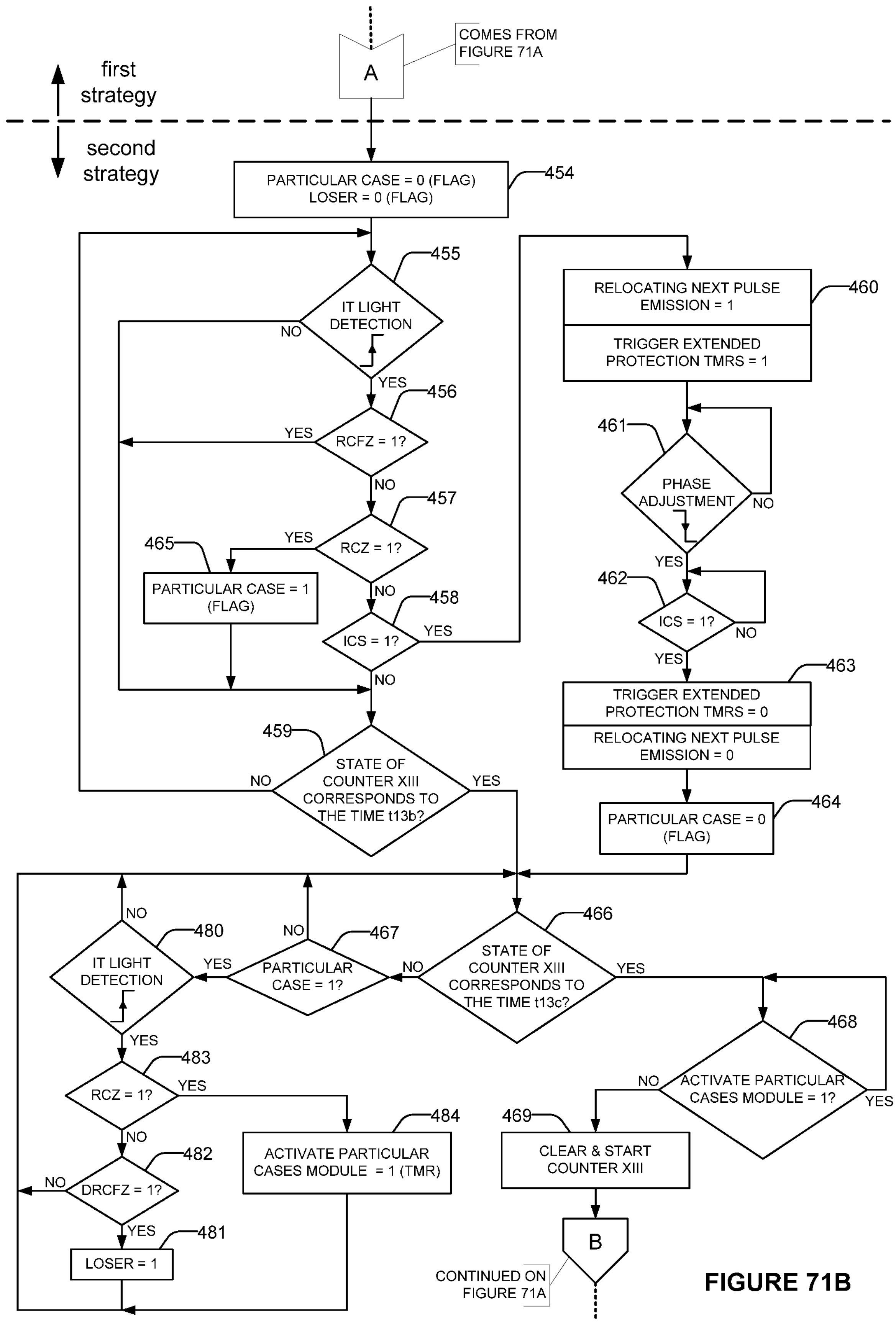

Operation of the "Control for phase adjustment" block 430 is based on the application of the inter-vehicle synchronization procedure. Therefore, this block controls, based on the exchange of information of the vehicle with other vehicles of the NVE, the actions that allow to synchronize the ICS of that vehicle with that of the rest of the vehicles of said NVE. Block 434 performs said actions, ie, when necessary, modifies the ICS phase of the vehicle via the "phase adjustment" and "phase selection" outputs. The "Phase adjustment for particular cases" block 432 acts, as its name indicates, when the vehicles to be synchronized are part of a rare NVE in which the vehicles that emit in opposite directions are carriers, in a casual way, of a Same phase. The following corresponds to the detailed description of the block "Control for phase adjustment" 430 whose operating diagram is shown in FIG. 71. When the "non-synchronized flashing light detection" signal is set to low under the start sequence in Step 440 by setting the low signal "re-emitting the next pulse" and "activating the particular case module" and activating the "clear & start counter XIII" signal. And is maintained in said step 440 until the "non-synchronized flashing light detection" signal is set to high value (see step 441). When the latter occurs, if the vehicle is not designated as a "successor" in the propagation of a phase change or as a "Beginner" the sequence proceeds from step 440 to the decision point 444 in which the state of the Signal "synchronized light detection" and this is where the sequence that will follow the vehicles of the non-synchronized NVE that come from a synchronized NVE (high hierarchy) of the sequence that will follow the vehicles that at the moment of being involved in said non-synchronized NVE They were not interacting with any other vehicle (these "isolated" vehicles have low hierarchy). We will analyze the different cases or situations that solves the phase adjustment algorithm (through the first and second strategy) and we will see which sequences each generate on the diagram.

Case 1: This is a non-synchronized NVE that has been formed due to the interaction between vehicles coming from an NVE synchronized with one or more "isolated" vehicles not synchronized with the former. At the decision point 444 vehicles from a synchronized NVE will have the signal "synchronized light detection" active, therefore in step 445, the sequence enters a cycle controlled by the counter XIII during which said vehicles (Although in the same cycle they are subject to small corrections to improve, for reasons that will be explained later, the synchronization of these vehicles). While in the "isolated" vehicles the sequence passes from the decision point 444 to the decision point 470 at which a cycle is started, also controlled by the counter XIII, during which said "isolated" vehicles will change the phase of their ICS When steps 471 and 472 indicate that the vehicle has received an unsynchronized light pulse. Step 473 will cause the ICS to be synchronized with the received light pulse (the "relocating next pulse emission=1" command activates block 434 which generates the "phase adjustment" and "phase selection" signals as we shall see below when describing the operating diagram of FIG. 72). Steps 474 and 475 ensure that the pulse of light that the vehicle will emit when the "relocating emission of the next pulse" signal returns to low value, at step 476, will have the correct phase (remember that block 402 of FIG. 67 controls the emission of pulses of light initiates the emission of a pulse "asynchronically" at the moment when the signal "relocating emission of the next pulse" is put in low value). The commands given in steps 473 to 476 will be used elsewhere in the diagram whenever the vehicle has to readjust its phase and the reasons for doing so will be better explained when describing the block "Generation of phase and phase adjustment signals of phase selection".

After step 476 the sequence returns to the decision point 470 by closing the cycle in which said sequence will remain until the counter XIII reaches the value corresponding to the time "t13*a*", which time should be sufficient for an isolated vehicle to adjust the phase of its ICS with the EPIL of vehicles coming from a synchronized NVE. From this point of view the time "t13*a*" could be as small as 1T or 2T, however there are other reasons (to be given later) to assign "t13*a*" a higher value. To complete the description of this "Case 1" we will explain in what circumstances, why and how vehicles from a synchronized NVE might have to introduce minor corrections to their EPIL phase during the cycle controlled from step 445 by counter XIII. As the night progresses, the proportion of NVEs in which none of the vehicles involved has to change phase to achieve synchronization will increase in the way. In these circumstances and depending on factors such as the tolerance range for synchronization, the stability of the oscillators used to generate the ICS in the vehicles (see FIG. 20) and the time elapsed since these vehicles last set their phase, it could happen that NVE vehicles moving in the same direction, despite being synchronized with NVE vehicles coming in the opposite direction, are not synchronized with each other according to the required tolerance. In which case an "isolated" vehicle joining said NVE would not be able to synchronize its lights with that of said non-synchronized vehicles, unless those vehicles previously made minor corrections in their ICS phases. This situation (without phase correction) has been exemplified by FIGS. 73A and 73B.

Figure 73A:
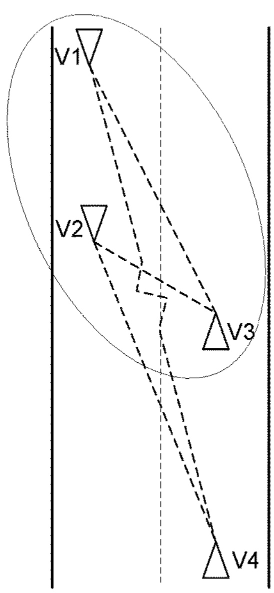
FIG. 73A shows an example of a non-synchronized NVE composed of the V1, V2, V3 and V4, wherein V3 is synchronized with V1 and V2 without V1 and V2 being synchronized with each other, while V4 represents an "isolated" vehicle, according to an exemplary embodiment of the invention.
Figure 73B:
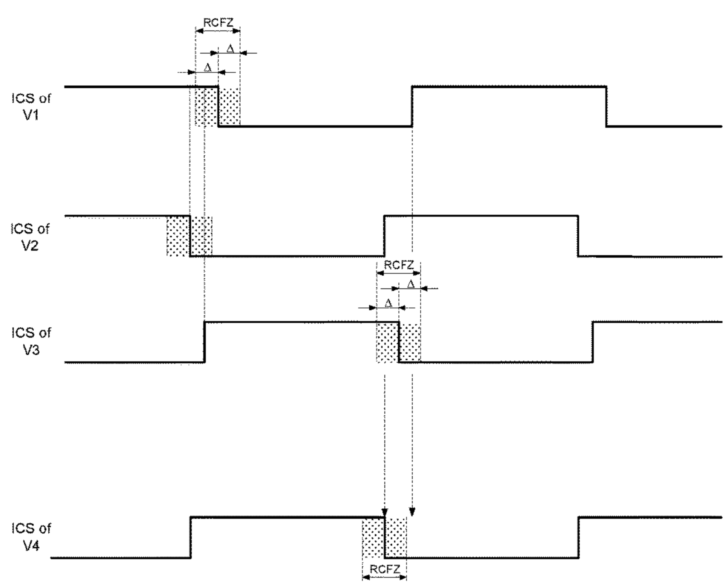
FIG. 73B shows the timing of the ICS of the vehicles of FIG. 73A, on which the corresponding CFZR has been shaded, according to an exemplary embodiment of the invention.

The schematic of FIG. 73A corresponds to an unsynchronized NVE composed of the vehicles V1, V2, V3 and V4. The vehicles of the circulation (V1, V2 and V3) come from an NVE such as the one just described, where V3 is synchronized with V1 and V2, without V1 and V2 being synchronized to each other according to the required tolerance range, while V4 represents an "isolated" vehicle that will try to synchronize with the rest by adjusting its phase to that of V1 or V2. FIG. 73B shows the ICS of each vehicle, on which the corresponding RCFZ has been shaded. As can be seen, the positive edge of the ICS of V3 falls within the RCFZs of V1 and V2 and vice versa, as corresponds to vehicles synchronized with each other moving in the opposite direction. The ICS drawn for V4 reflects the moment when this vehicle has already synchronized its lights with those of one of the vehicles of said NVE (V2 in this case). However this does not leave V4 synchronized with V1 since, since the phase shift between the ICs of V1 and V2 is greater than Δ, the positive ICS flank of V1 falls outside the "new" RCFZ of V4 as shown in FIG. 73B.

Referring to FIG. 74 we see how a vehicle, coming from a synchronized NVE, determines whether or not to make minor corrections to the phase of its ICS and how to perform them. In FIGS. 74 V1 and V2 are synchronized with V3 and V4 and are initiators of an NVE not synchronized with V5, and will also be those where it is if necessary, they will correct the phase of their ICS with the EPIL of V3 and V4 involved in said non-synchronized NVE as "possible successors". For V1, V2, V3 and V4 we will analyze the relative "extreme" positions that could have their respective ICS (considering that all of them are detecting synchronized light) and for each case we will see when it is necessary that some of these vehicles involved as initiators of the NVE not synchronized (V1 or V2 in this example) to submit their phase to To minor corrections. A phase arrangement is shown in FIG. 74A in which the phase shift between the ICS of the "possible successors" V3 and V4 has the maximum value (2A) which still makes it possible for these vehicles to maintain synchronization with the vehicles V1 and V2.

Figure 74A:
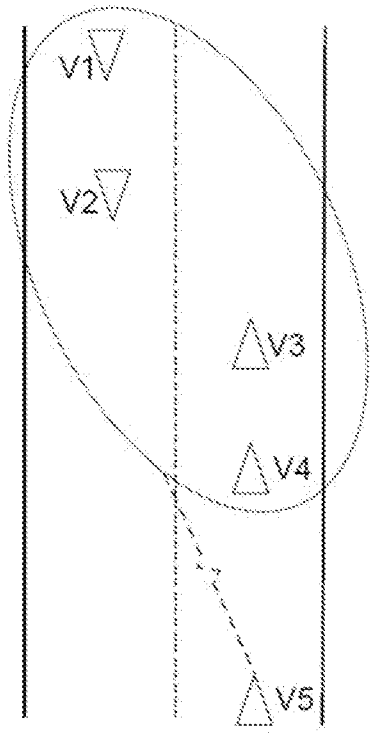
FIGS. 74A-74E describe how a vehicle, coming from a synchronized NVE, determines whether to make small corrections in the phase of its ICS and how to perform them, according to an exemplary embodiment of the invention.
Figure 74B:
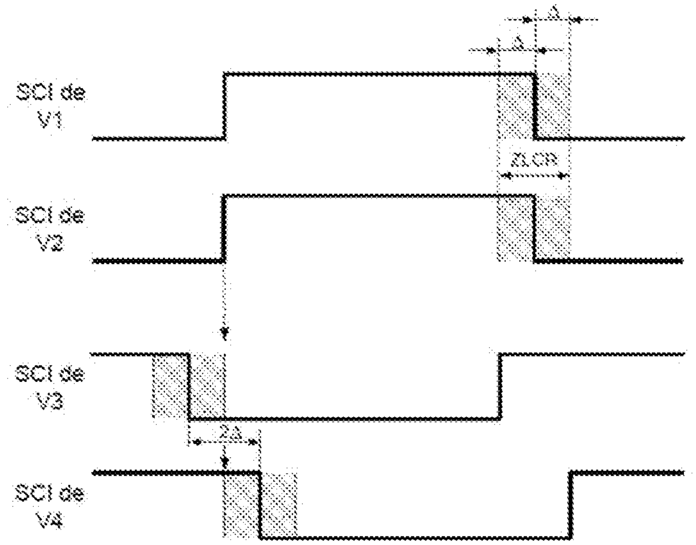

Therefore both V1 and V2 must have the positive flank of their respective ICS centered between the negative flanks of V3 and V4. From this it follows that with this phase arrangement neither V1 nor V2 will need to introduce corrections in their phases (which are in fad "perfectly" synchronized with each other) so that another vehicle, like V5, can synchronize its ICS with that of both vehicles. We can also note that as the phase mismatch between V3 and V4 decreases, the feasibility of a greater phase mismatch between V1 and V2 increases, as will be seen below. A phase arrangement is shown in FIG. 74B in which the phase shift between the ICS of the "possible successors" V3 and V4 is less than 2A but greater than Δ. Therefore as the vehicles V1 and V2 are synchronized with both vehicles must have among their ICS a phase shift less than Δ. From the above, it follows that neither V1 nor V2 will require phase correction, since another vehicle, such as V5, can synchronize its ICS with the pulses of light emitted by one of them (e.g. V1) and synchronized, within the range of Tolerance, with the other vehicle (e.g. V2). Note that with the phases arranged as in FIGS. 74A and 74B it is not only unnecessary for V1 or V2 to introduce corrections in their phase but also it would be inconvenient to do so, since the one that readjusts its phase with that of V3 or V4 could no longer maintain Synchronization with both vehicles at the same time.

Figure 74C:
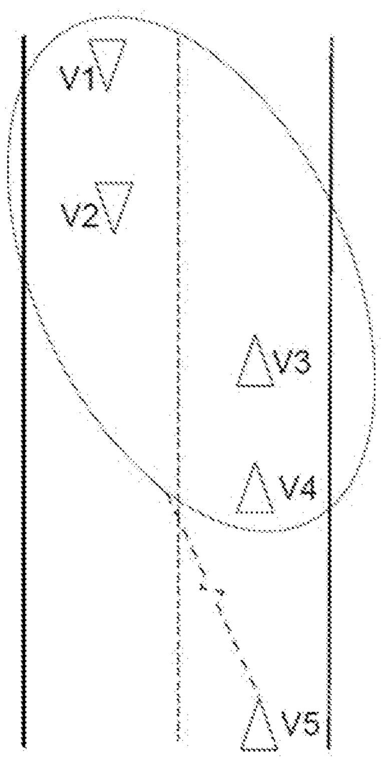
Figure 74D:
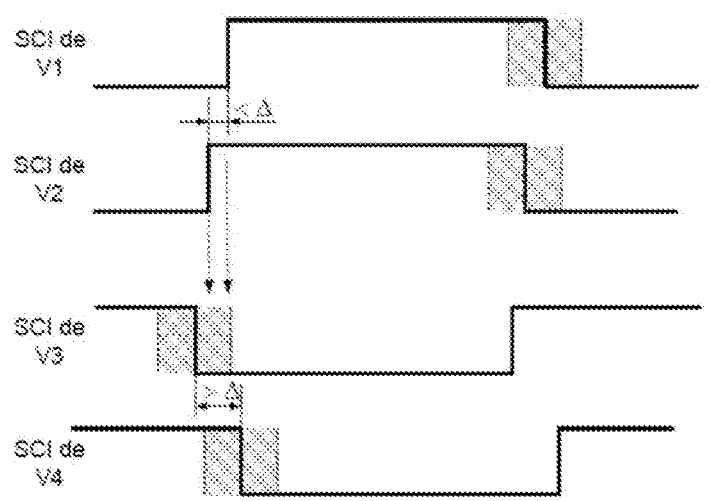
Figure 74E:
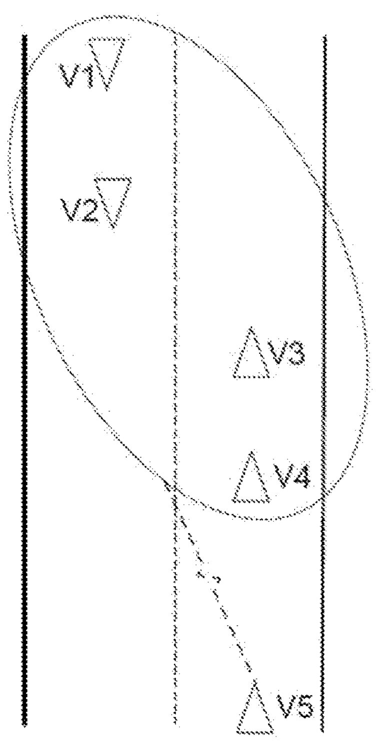
Figure 74F:
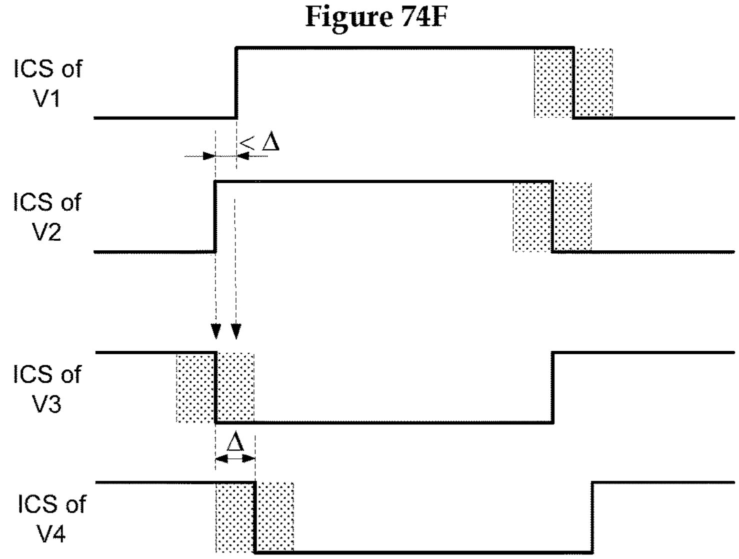

A phase arrangement is shown in FIG. 74C in which it is also not necessary for V1 or V2 to correct their phase since between V3 and V4 a phase shift equal to A and therefore between V1 and V2 has been assumed the phase shift cannot be greater than Δ. However in the phase arrangements shown in FIGS. 74D and 74E the situation is different since in them the ICS of V1 and V2 have a phase shift greater than Δ. Therefore for a vehicle like V5 to synchronize its ICS with that of both vehicles, it is necessary that one of these vehicles V1 or V2 correct its phase (readjusting it with the one of V3 or V4) to reduce said phase shift to a value less than Δ. We will now see how the system determines, within the cycle controlled from the step 445 by the counter XIII, when the vehicle should or should not perform such phase corrections:

If the vehicle receives within the RCFZ the positive edge of a light pulse before its ICS is set to low then that vehicle is excluded from those which will have to correct its phase (see steps 445, 446, 447, 448, 449, 445).

Conversely, when a vehicle receives within the RCFZ the positive edge of a light pulse with its ICS being low, then the phase of said ICS will be resynchronized with the received light pulse. All of this is accomplished by the sequence 445, 446, 447, 448, 449, 450, 451, 452, 453, 445 within which steps 450 to 453 correspond to the actual phase readjustment So that the phase readjustment of steps 473 to 476). If we apply these rules to vehicles V1 and V2 of FIG. 74 we can see that in the phase arrangements of FIGS. 74A-74C both vehicles would be exempt from correcting their phase upon receiving a pulse of light from V3. On the other hand in the phase arrangements of FIGS. 74D-74E V2 will readjust the phase of its ICS upon receiving a light pulse of V3, in correspondence with what has been explained.

In conclusion, if "small phase corrections" in vehicles from a synchronized NVE were not taken into account in this design, if there were "isolated" vehicles that would not be able to synchronize Their lights by applying this "first strategy", they would do so immediately afterwards applying the "second strategy" as if it were the "Case 3" described later, although this could cause the propagation of a phase change that could Be avoided. Once the "isolated" vehicles have resigned their phase, this block "Control for the phase adjustment" 430 will be reset, in each vehicle, when the "non-synchronized intermittent light detection" signal is deactivated.

Case 2: If in a non-synchronized NVE there are no vehicles that have the "synchronized light detection" signal active, then the sequence will pass in each of them from step 444 to the cycle controlled by the counter XIII from the As previously stated, in said cycle controlled by counter XIII a vehicle will change the phase of its ICS if steps 471 and 472 indicate that it has received a non-synchronized light pulse, this phase change being controlled by Steps 473 to 476. Step 473 causes the ICS to be synchronized with the received light pulse and steps 474, 475 and 476 ensure that the vehicle, before closing the cycle on step 470, will emit with its new phase.

After the cycle controlled by the counter XIII, normally the NVE vehicles will already be synchronized with each other, and therefore the "Control for phase adjustment" block 430 will be reset on each vehicle at the time the "Flashing light not synchronized". If this NVE is eventually not synchronized (for example due to the presence of non-synchronized distant vehicles that are outside the EPIL range of any of the NVE vehicles or, for example, in the case, as much or more infrequently than the NVE above, of a non-synchronized NVE in which vehicles that emit in opposite directions are carriers, in a casual way, "exactly" of the same phase) in said NVE will be used (as in "case 3"). A second synchronization strategy encompasses the algorithm we have called "phase hierarchy synchronization", which is applied from step 454, and the algorithm we have called "pseudorandom hierarchy", which is used by the "Stage for particular cases" 432.

Case 3: This is a non-synchronized NVE formed from the conflicting union of two synchronized NVEs. The synchronization of this type of NVE is initiated by the closest vehicles coming from both synchronized NVEs. Since in these vehicles the "synchronized light detection" signal is active, in all of them the sequence will enter, through steps 440, 441, 442, 443 and 444, the cycle starting at decision point 445. In this cycle the waiting time controlled by counter XIII will reach its normal end ("t13*a*") in all vehicles, since by the way indicated none of them will resign their phase (they will only make small corrections if necessary) and in Consequently, as the synchronization is pending, in all vehicles, this block 430 will remain active. When, as in this case, the application of said first strategy does not lead to the synchronization of the NVE, then said vehicles will apply, from step 454, "Phase hierarchy synchronization" as part of what we have termed the second synchronization strategy.

Thus, when one of these vehicles detects the arrival of a non-synchronized light pulse, having its ICS at a high value, it will synchronize its phase with that of the "emitter" vehicle except that the latter vehicle has (within a certain tolerance range) Same phase as the first. This is in accordance with the description of "phase hierarchy synchronization" and is performed by the following steps: 455 and 456 to detect the arrival of an unsynchronized light pulse (the positive edge of an unsynchronized pulse will fall out of the RCFZ). 457 to discard a "phase" light pulse with the vehicle's ICS 458 to determine if the ICS is at high value and then steps 460 to 463 to control the phase change (performed in the same manner as in steps 473 to 476 and 450 to 453).

On the other hand, as long as the vehicle has not changed phase and the counter XIII has not yet reached the value corresponding to the time "t13*b*" (in step 459) the possible sequences are as follows: . . . 455, 456, 459, 455, . . . which will occur when the vehicle detects a synchronized light pulse coming from, for example, a "possible successor" . . . 455, 456, 457, 465, 459, 455 . . . when the vehicle detects a non-synchronized "in phase" light pulse with its own ICS (in step 465 the "particular case" flag is activated and will then use to verify whether the vehicle will require the action of the "Phase Adjustment for Particular Cases" block 432 of FIG. 70 to synchronize with the rest). The sequence . . . 455, 456, 457, 458, 459, 455, . . . takes place when the vehicle receives the positive edge of a non-synchronized light pulse outside the RCZ and having its ICS at a low value, which causes the vehicle to retain its phase (high hierarchy).

By relocating again at step 463 we can continue to say that, in a vehicle that has just been "synchronized" by another, the "particular case" flag will be disabled in step 464. The sequence, upon arriving at decision point 466, will initiate a Wait time within the cycle 466, 467, 466 and then, upon reaching the counter XIII at value "t13*c*" the sequence will return to step 445 through steps 468 and 469. The difference between times "t13*c*" and "t13*b*" Is intended to be able to verify whether a vehicle with the "particular case" flag activated (ahead of time "t13*b*") continues to receive light pulses not in phase with their own when the counter XIII has exceeded the value "t13*b*". The "Activate particular case module" timer will be triggered (see sequence 466, 467, 480, 483, 484, 466). The time interval between "t13*c*" and "t13*b*", as well as the interval between "t13*b*" and "t13*a*", may be given a small value but not less than, for example, 4T or 5T.

On the other hand, to assign a value to the time "t13*a*" it is necessary to take into account that in the vehicles that have already synchronized their lights with another or other vehicles of the NVE, or have not had to do that to change of phase, the sequence will return To include, in all of them, the cycle controlled by the counter XIII beginning at step 445. focusing attention on vehicles that have changed phase and have to propagate said phase change, we must remember that in a vehicle that has "Successors" the system must ignore the non-synchronized pulses of light that the vehicle will receive after changing phases and until such successors have adopted the new phase. Therefore "t13*a*" must be greater than the time "t12" which requires the activation of the "non-synchronized intermittent light detection" signal in said successor vehicles (see FIG. 69) so that, upon being activated in said successor vehicles the block "Control for phase adjustment" 430, execute the sequence 440, 441, 442, 477, 478, 479, 450, 451, 452, 453, 445, . . . to adhere to the new phase (and propagate it from be necessary). We can now calculate the "extended" value of "t9", which is the time the "propagating vehicle detection" signal will remain active in a vehicle after it has stopped receiving pulses of light that begin within its DRCFZ (see FIG. 68).

This time should be sufficient for the vehicle to adhere as a successor to a phase change occurring in its predecessor. For this reason, the "extended" value of "t9" must be greater than the time that elapses since the "non-synchronized intermittent light detection" signal is activated in an ancestor vehicle (at which time the vehicle ceases to emit with Phase shift) and until such a signal is activated in the successor vehicle, if that ancestor changed phase. Analyzing the "worst case" we see that this time is the sum of the time it takes to synchronize the initiating vehicles of a non-synchronized NVE plus the time "t12" that the "non-synchronized intermittent light detection" In the successor vehicles of those that have changed phase. Normally the starter vehicles of a non-synchronized NVE (which is the result of the "conflicting" joining of two synchronized NVEs) synchronize their lights in a time less than "t13*b*", but attending to the "worst case" must be added to This time the duration of the timer "activate module of particular cases". Therefore, finally, the "extended" value of "t9" must be greater than the sum of "t13*b*" plus the duration N of the timer "activate module of particular cases" plus the time "t12". It should be noted, as opposed to the "worst case", that during the propagation of a phase change the time that passes from a successor's vehicle to a successor ceases to receive pulses of light in the DRCFZ and until it is his turn to change is only slightly longer than the activation time of its "non-synchronized intermittent light detection" signal "t12", during which said vehicle will also be enabled, as already said, to emit with phase shift.

Regarding the duration of the timer "activate module of particular cases" this could be, for example, of the order of 20T or 30T, values that will be justified later when the operation of the block "Phase adjustment for particular cases" is described 432, Which is activated with said timer. To this block 432 of FIG. 70 also enters the signal "loser" that can be activated in a vehicle, that will call V1, that has the flag "particular case" in high value. This will occur when it is necessary to indicate that said vehicle V1 is receiving, in addition to pulses of light not synchronized in phase with its own, pulses of light in the DRCFZ (see sequence . . . 480, 483, 482, 481, . . . ). This would mean that another vehicle, which we will call V2, which emits in the same sense as V1, and which comes from the same synchronized NVE, has changed phase (by the sequence . . . 458, 460, 461, . . . ), Causing one of the successor vehicles of V2, upon commencing to emit with phase shift, to activate the "loser" signal in V1. Thus, when the vehicles initiating the conflicting junction of two synchronized NVEs have very similar phases and, as a result, only some of said vehicles succeed in synchronizing with each other by the normal path (i.e. by block 430) The rest of the vehicles coming from the same NVE as those that have changed phase when synchronizing, should occasionally do the same by the block "Phase adjustment for particular cases" 432, and for that purpose the signal "Loser".

To complete the description of the functional diagram of this block 430, it remains to be said that a vehicle having in step 443 the "Beginner" flag in high value will synchronize its ICS in the same way as an "isolated" vehicle, is Say with the non-synchronized light pulses that it receives within the cycle controlled from step 470 by counter XIII. Finally, if we look at the sequence 440, 441, 442, 477, 478, 479, 450, . . . by which a successor vehicle obtains a new phase, step 477 may seem unnecessary since steps 478 and 479 are sufficient to Detect the positive edge of any non-synchronized light pulse. In fact in the vast majority of non-synchronized NVEs in which a phase change has to be propagated, step 477 serves no purpose except in those NVEs in which some vehicles have changed phase using this block 430 and others do so later Using the block "Phase adjustment for particular cases" 432. in this "particular case" there may be successors exposed to emissions displaced with respect to the new phase, which are generated, for reasons to be explained later, in the vehicles initiating said phase NVE in which said block 432 is acting. In this case, step 477, by giving a higher priority to the pulses of light received by the vehicle in the RCZ than to those received in the DRCZ, causes a successor to ignore said displaced emission when synchronizing.

Next, the block "Generation of phase adjusting and phase selection signals" 434 of FIG. 70 is described, the function of which is to produce the signals necessary to modify the phase of the vehicle's ICS. The signals entering this block are: "Relocating the next pulse" from the "Control for phase adjustment" block 430, "Special phase adjustment flag" from the "Phase adjustment for particular cases" block 432 and "Interaction Delay Compensation" from the "Logic and Complementary Signals" block 435. In this system the "phase adjustment" and "phase selection" signals, instead of being generated directly in blocks 430 and 432 that control the Synchronization, are generated separately by block 434. This block allows correcting, if desired, a small phase shift that various technological factors could introduce between the ICS of two vehicles when one of them, when synchronizing, adjusts the phase of its ICS with the Arrival of a pulse of light emitted by the other. When a phase shift is propagated several times, across a plurality of vehicles, the accumulated offset between vehicles that are not interacting with each other directly could become significant. Although such accumulated lag is not a problem, it can be avoided by correcting the unit lag in each vehicle that adjusts its phase. To do this, the entry "Interaction Delay Compensation" must be set to high value by the switch 439.

Figure 72:
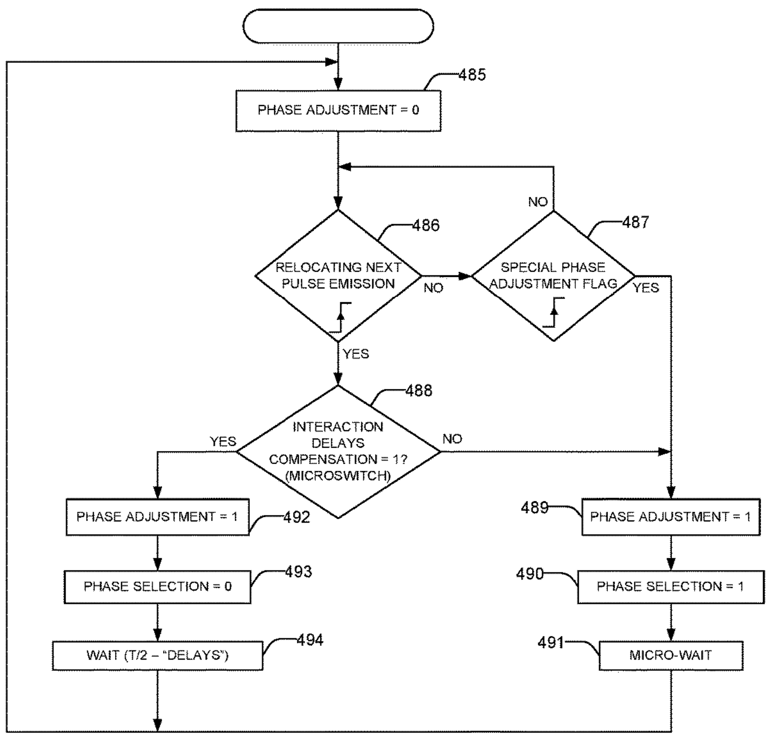
FIG. 72 shows the operation diagram of the block "Generation of phase adjustment and phase selection signals" in FIG. 70, according to an exemplary embodiment of the invention.

The operation diagram corresponding to block 434 is shown in FIG. 72. As long as the vehicle does not have to make changes in its phase the "relocating next pulse emission" and "special phase adjustment flag" inputs remain low and the sequence 486, 487, 486 maintains said block is inactive. When block 434 is activated from block 430, a sequence 486, 488, 489, 490, 491, 485, . . . will occur via a positive edge of the "relocating next pulse" signal. 1, or the sequence 486, 488, 492, 493, 494, 485, . . . will take place if said switch is in position 2. When block 434 is activated from block 432, by a positive edge of the signal "special phase adjustment flag", the sequence 487, 489, 490, 491, 485, . . . takes place regardless of the position of the switch 439.

Thus, when the block 434 is activated without "Delay Compensation", simply generate a narrow pulse on the "Phase Adjustment" output and set the "Phase Selection" output to high, see steps 489, 490, 491, 485, to adjust the phase of the vehicle with the arrival of the light pulse causing said activation (this can be verified by analyzing the block "Generation of the flashing control signal" 390 of FIG. 67 already described for other systems with the aid of F FIGS. 20 and 21). The ICS of the vehicle will adopt the waveform shown in FIG. 21 for the signal Qn, which, once the light pulse causing said phase change is detected, will give a positive positive half-period (T/2) after Be reset. When phase adjustment is performed with "delay compensation" the ICS should give said first positive edge a predefined fraction of time before said time T/2 or what is equivalent, give a first negative edge a half period later. The latter is precisely what produces the sequence of steps 492, 493, 494, 485 on the ICS. It should be noted that the aforementioned "time fraction", which we call "delays", corresponds to the small time delay or delay to correct. In this case the "phase adjustment" output is not activated as a narrow pulse but is held high for a time which is equal to T/2 minus said delays time fraction, see steps 492, 493, 494 and 485. During this time the counter/divider 11 of FIG. 20 will remain reset and the signals Qn and will remain low and high respectively. Then, half a period after that time period has expired, the signals Qn and will switch (for the first time with the new phase) to high and low respectively. As you can see the signal behaves after a phase change as the ICS must. For this reason in step 493 the "phase selection" signal is set to low value thus establishing a as the ICS of the vehicle.

Figure 75A:
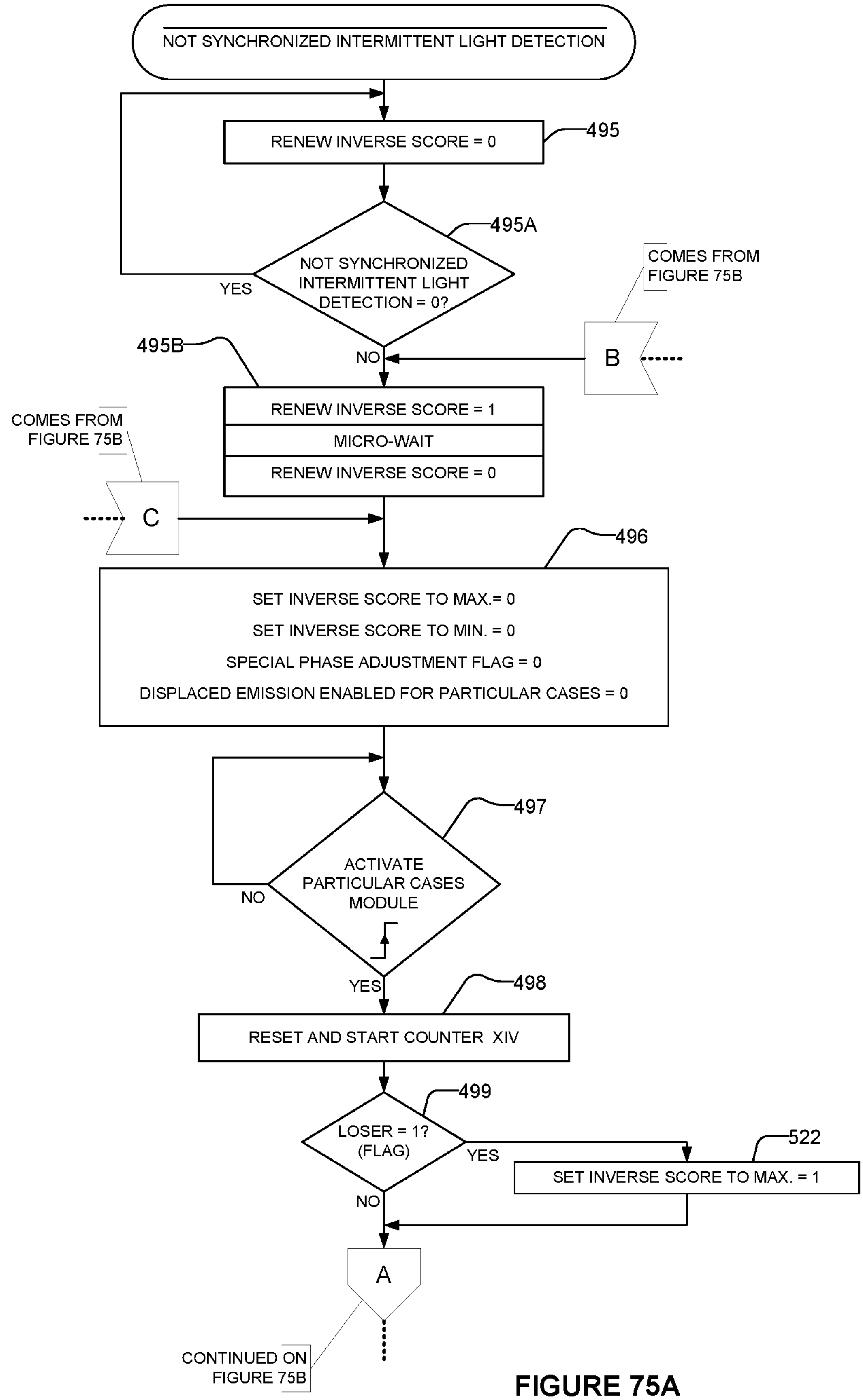
FIGS. 75A-75B show the operation diagram of the block "Phase adjustment for particular cases" in FIG. 70, according to an exemplary embodiment of the invention.
Figure 75B:
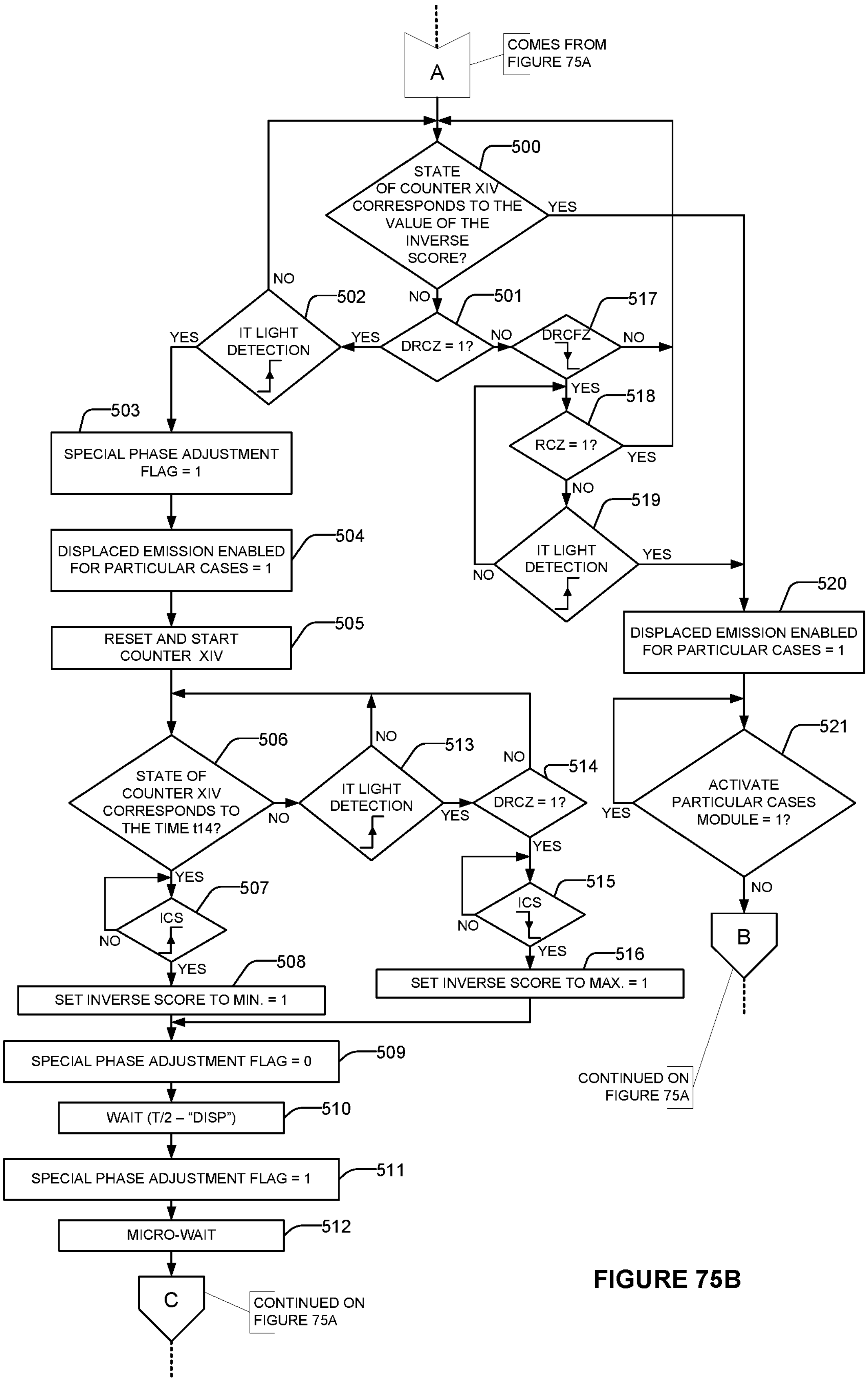

FIG. 75 shows the operation diagram of the block "Phase adjustment for particular cases" 432 of FIG. 70. When the "non-synchronized flashing light detection" signal is set to low under the sequence starting at Step 495 by setting the "reverse reverse score" value to low, and is maintained in said step 495 until said "non-synchronized flashing light detection" signal is set to high value (see step 495A, 495B, 496, 497 . . . ). Once this happens, the actual activation of said block 432, which occurs when the timer "activate particular case module" is triggered from block 430, is seen as possible, see steps 497, 498, . . . . This activation will occur, as has already been said, in those vehicles which could not be synchronized by said block 430, as part of a very rare NVE in which the vehicles that emit in opposite directions are carriers, in a casual way, of the same phase. These vehicles, with block 432 already activated, will compete with each other to synchronize their lights by applying the "pseudorandom hierarchy" algorithm (the description of which was included in the "inter-vehicular synchronization procedure").

We return to the description of block 432 in step 495B of FIG. 75, where the "reverse reverse score" output is activated in the form of a narrow pulse, and in step 496 the rest of the outputs of this block, whose functions will be Explained below, are set to low value. Among the signals that enter this block 432 are those that make up the "inverse score", which is a binary number (generated in each vehicle by the block "Generation of pseudo-random inverse score" 433 of FIG. 70) that determines The hierarchy that the vehicle will use to compete with the rest. The smaller the reverse score, the greater the hierarchy conferred on the vehicle within that competition. For this reason when a vehicle has the "loser" flag raised in step 499, the inverse score will be forced (see step 522) to adopt the maximum predicted value. (Remember that the flag "loser" is flagged in block 430 to indicate to block 432 that the vehicle, conditioned by other vehicles that managed to synchronize before, must lose the competition and resign its phase).

At step 498 a timeout is initiated which will be controlled in each vehicle by the XIV counter. The first vehicle whose reverse score is reached by said counter XIV, at decision point 500, will be the winner of the competition and must communicate it to the others. In order to do this, in the step 520 the signal "enable displaced emission for particular cases" is activated (as we have already said, a vehicle can transmit information to others by applying to its EPIL a certain phase shift "DESP" To make, for example, that a successor be prepared to propagate a possible phase change when it receives such emission in the DRCFZ or, as in this case, to make a vehicle assume the role of loser of competition when it receives the pulses of Light of the winner in the DRCZ). Then the sequence advances in said winning vehicle to decision point 521 and from there returns to step 495B when the timer "activate particular case module" comes to an end.

Vehicles that are interacting directly with the winner and are not synchronized with the winner will be the first to assume that the competition is over. These losing vehicles will detect the positive edge of the light pulses displaced in phase of the winner in the DRCZ, giving rise to the sequence 500, 501, 502, 503, 504, 505, . . . . It is noteworthy that a losing vehicle, given The particular conditions in which this block 432 is activated could be synchronized with the winner by simply inverting his ICS. However, step 503 produces in the vehicle a "special phase adjustment" by which its ICS is not synchronized (initially) with the ICS of the winning vehicle but with the EPIL shifted in phase of the latter. This is done in order for the losing vehicle to cooperate with the winner by transmitting information to the non-winning vehicles synchronized with said winning vehicle, so that said non-winning vehicles (if any) will quickly abandon competition while retaining the phase of their ICS.

Since at step 504 a losing vehicle is enabled to emit with phase shift and that at step 503 said vehicle has not been "well synchronized" with the winner phase, non-winning vehicles synchronized with the winner (if any) Will cause in the losing vehicle the emission of phase pulses of light to be received by said non-winning vehicles after the DRCFZ. More precisely, the positive side of those pulses will be received by these non-winning vehicles between the DRCFZ and the RCZ, see sequence 500, 501, 517, 518, 519, . . . , and when this happens they will follow the path of the winner leaving the Competition without having changed phases (see steps 520 and 521). These vehicles by behaving as the winner of the competition may cause other vehicles not yet synchronized with that winner (if any) to leave the competition and change phases as the other losers have already done (this will only happen when within the NVE Vehicles not synchronized with the winner that are not interacting with him directly, for example, being out of reach).

We now turn to the description of the sequences that take place in the loser vehicles, from step 505 in which the counter XIV is re-started from scratch. In this step 505 a small waiting time controlled by said XIV counter is started in order to verify that there have been no losing vehicles of competition on both sides of the NVE, which could only occur if there had been a tie between vehicles not Synchronized, i.e. if there were winners on both sides of said NVE. If so the phase change of such losing vehicles must be canceled out to prevent a phase change, which does not lead to the Synchronization of the NVE, could be propagated on both sides of said NVE. By the sequence of steps 506, 513, 514, 506, . . . a losing vehicle can determine if there is another losing vehicle on the opposite side of the NVE.

Since, if so, each of these vehicles would receive in the DRCZ the positive flanks of the pulses of light emitted by the other vehicle because both vehicles would have changed of phase and both would be able to emit with phase shift. Therefore, if it is necessary to override said phase change, the sequence 506, 513, 514, 515, 516, 509, 510, 511, 512, 496 will be executed. In contrast when it is not necessary to override a phase change. That is to say when the verification is successfully concluded because on the other side of the NVE there were (or are not) vehicles which have changed phase, the sequence 506, 507, 508, 509, 510, 511, 512, 496, . . . As in the latter case the phase change has been confirmed it is necessary to "correctly" synchronize this losing vehicle with the winning vehicle (remember that the losing vehicles were transiently synchronized with the EPIL shifted in phase of the winner by means of the Steps 501, 502 and 503). This is accomplished as follows: decision point 507 delays the advance of the sequence to the next step until the appearance of a positive edge in the ICS.

Then, at step 509, the "special phase adjustment flag" signal is set to low value and after a timeout, represented by step 510, which equals a half period of the ICS minus the value of the shift of Phase to be corrected ("OFF"), said "special phase adjustment flag" signal is again set to high value to produce at that instant a phase reset in the losing vehicle that coincides with a positive edge of the ICS of the winning vehicle. Similarly, when it is necessary to override a phase change, a losing vehicle can recover the phase it had previously if steps 509, 510 and 511 are executed from the negative flank of its ICS (see steps 515 and following). In this case, in which losing vehicles have detected (indirectly) the presence of winning vehicles on both sides of the NVE, step 516 allows to reduce the likelihood of another draw occurring when all these vehicles have to compete again, since At least those who were losers, adopting the expected maximum inverse score, cannot be the cause of a new tie (this assuming that the expected maximum inverse score can only be acquired by a vehicle by activating the signal "put inverse score in maximum"). It should be noted that the winning vehicles, in order to resolve said tie situations, pre-emptively renew their reverse score by step 495B.

We now turn to the sequence 506, 507, 508, 509, 510, 511, 512, 496, . . . that takes place in the loser vehicles when all of them are on the same side of the NVE. It has already been explained how through steps 507, 509, 510 and 511 said losing vehicles synchronize their ICS with that of the winning vehicle facing them. Then we will see with what object the activation of the "reverse score minimum" signal was included in step 508 of that sequence: it is obvious that when the competition has a single winning vehicle (or winners not facing each other) all losing vehicles will be on the same side of the NVE and such vehicles, winners and losers, will be synchronized after competing. But the opposite is not true, i.e. the fact that all the losing vehicles are on one side of the NVE does not guarantee that a tie has not occurred (for example, the competition could have a winning vehicle on either side of the NVE and Rest of the participating vehicles, which will be losers, are all located on the same side in the NVE). Therefore, in the face of the possibility of draws, the vehicles that are forced to change phases adopt, at step 508, the minimum inverse score. So that if the competition had to be repeated these vehicles will be the new winners, thus avoiding the possibility of having to propagate a new phase change.

Step 512 represents the activation time given to the signal "special phase adjustment flag" between steps 511 and 496. As we have just seen the losing vehicles, prepared for a possible repetition of the competition, they return to the step 496 (thus avoiding to renew its inverse score in step 495B). Once the timer "activate particular case module" has been extinguished, each vehicle will determine, through the "Control for phase adjustment" block 430 of FIG. 70, if it is necessary to repeat the competition, in which case the timer will be Tripped again (see step 484 of FIG. 71). The duration of this timer must be longer than the time required for the XIV counter to count from zero to the maximum predicted value for the inverse score. As for the clock signal which supplies said counter XIV, it is desirable that it has a period equal to or greater than T. Accordingly, if we used a clock signal having period T (such as) and a Maximum inverse score equal to 24, the timer "activate particular case module" could have, for example, a duration of 28T or 30T. Thus, using values like the above, the duration of the competition could be around the tenth of a second. Increasing the maximum inverse score decreases the probability of draws, although this increases the average duration of a competition. However, the choice of such maximum inverse score is not critical since neither the occurrence of draws nor the duration of competition is a problem considering that:

If a tie occurs in the competition the reverse score of the participating vehicles is "manipulated" to minimize the possibility of a second tie occurring.

Extending the duration of competition (within reasonable limits) would have no greater effect on drivers' vision, since non-synchronized vehicles participating in such competition will still be far enough away to be starter vehicles of an NVE.

To complete the description of the block "Phase adjustment for particular cases" we must mention two aspects referring to successor vehicles:

The time "t14", used to check if a "loser" vehicle must cancel or confirm a phase change, must be less than the activation time of the "non-synchronized intermittent light detection" signal ("t12")—see FIG. 69—. This is so because if a phase change has to be canceled in a vehicle must be done before its "successors" adhere to it (remember that a successor vehicle, by having active the signal "detection of vehicle propagator", adhere To a phase change practically at the moment when the "non-synchronized intermittent light detection" signal activates the "Control for phase adjustment" block (see FIGS. 70 and 71).

The time "t9" (which was described in connection with FIG. 68) is the time the "propagating vehicle detection" signal continues to be active in a vehicle that has stopped receiving pulses of light in the DRCFZ. As has already been said, this time should be sufficient for the successor vehicle to adhere to a phase change occurring in its predecessor. Therefore, when "t9" was defined for "worst case" the duration of the "activate particular case module" timer was included in it, preventing block 432 from having to intervene in the synchronization of an NVE. What was not included in the value of "t9" is the "extra time" that may require the synchronization of said NVE if competition occurs in draws. This is not really necessary since the vehicles making use of said block 432 emit, at some point, with phase shift causing their successors to receive light pulses in the DRCFZ again.

The speed sensor 438 included in the "Logic and complementary signals" block of FIG. 70, produces the "minimum or zero speed" signal that enters the "Beginner Flag Generation" block 431 of the same figure. This signal will be activated when the vehicle reduces its speed below a permissible minimum or stops.

To finalize the detailed description of this system, the values that can be assigned to some time controls are reviewed below:

Timer "Enable Extended Protection" Timer:

During the propagation of a phase change the longer exposure time to the reception of non-synchronized light could occur in the first successor vehicle, provided that it has successors which in turn have successors. A vehicle in such conditions could receive non-synchronized light pulses for a maximum time that can be estimated at the quadruple of "t12". This time must be taken into account to set the timer value "enable extended protection" (see FIG. 60). Thus, for the values given as an example, said timer could have a duration of no more than two tenths of a second. However, since depending on the role the vehicle is playing in propagating a phase change it will receive non-synchronized light pulses falling in different zones, the duration of said timer could be reduced to little more than twice the time "t12", Causing pulses received in the DRCFZ to fall completely within the "normal" VPZ. This can be achieved by reducing the width of the pulses of light emitted by the vehicle (pulses that the vehicle uses to transmit information) and also by modifying the decision points 279 and 280 of the operation diagram of the "Vision protection" block of the FIG. 60 as follows:

At decision point 279, it does not decide as a function of the positive edge of the "light detection IT" signal but as a function of the level of said signal. At decision point 280 change the "RCFZ" signal by the "VPZ" signal. This has the additional advantage that when the intensity of said pulses does not justify the use of extended protection these same pulses will go unnoticed for those vehicles receiving them in their DRCFZ. Anyway, since during the propagation of a phase change the time that said driver could be exposed to the intense light is very brief, one could even opt to do without the "extended vision protection". The maximum values for fixing the width of the pulses of light with and without displacement are suggested below.

Reducing the Width of the Emitted Displaced Light Pulses:

As already stated in the description of the anti-dazzling method, intermittent pulses of light emitted by synchronized vehicles circulating in opposite directions should be prevented from overlapping. For this, it is necessary that each pulse of light emitted by a vehicle is extinguished before the positive side of the ICS of another vehicle synchronized with the previous one and that it circulates in the opposite direction with respect to the road. Therefore, the maximum width that these pulses can have is given by the expression: T/2—width of the RCFZ/2 or, expressed in periods of the output Qi of the counter/divisor 11, by the expression: $2n-i/2-\Delta$.

However, if it is desired to avoid such overlap even if said synchronized vehicles are emitting pulses of light shifted in phase, it is necessary that the width of said pulses of light be reduced to the value $2n-i/2-\Delta-$DESP, Being, as already stated:

- $2n-i$: the duration of the period T of the ICS measured at periods of a output Qi of the counter/divider 11 (see FIG. 20).
- $\Delta$: the tolerance range already described when defining the measured CFZ in periods of said output Qi of the counter/divider 11.
- DESP: The offset or offset that a vehicle will apply to its EPIL to transmit information to other vehicles, measured in periods of said output Qi of the counter/divider 11.

Intense Non-Synchronous Light Detection:

Vehicles involved in propagating a phase change will receive pulses of light outside the VPZ for a time that has been contemplated in the timer's duration "enable extended protection". If these pulses of light exceed the threshold of intense light ("DZT light detection"=1) the "extended vision protection" will be activated in these vehicles. This makes it unnecessary for "automatic low/high beam control" (block 242 of FIG. 56) to act during the propagation of a phase change to reduce the intensity of the vehicle's lights. Therefore, the signal "Non-synchronized intense light detection"

(see FIG. 40), which acts on this low/high automatic light control, should have an activation time ("nT") that is longer than the duration of the timer "Enable extended protection". However, if the "extended vision protection" option was to be implemented when the system was implemented, it could also be decided to reduce the activation time of the "Intense Light Detection" signal.

Figure 86A:
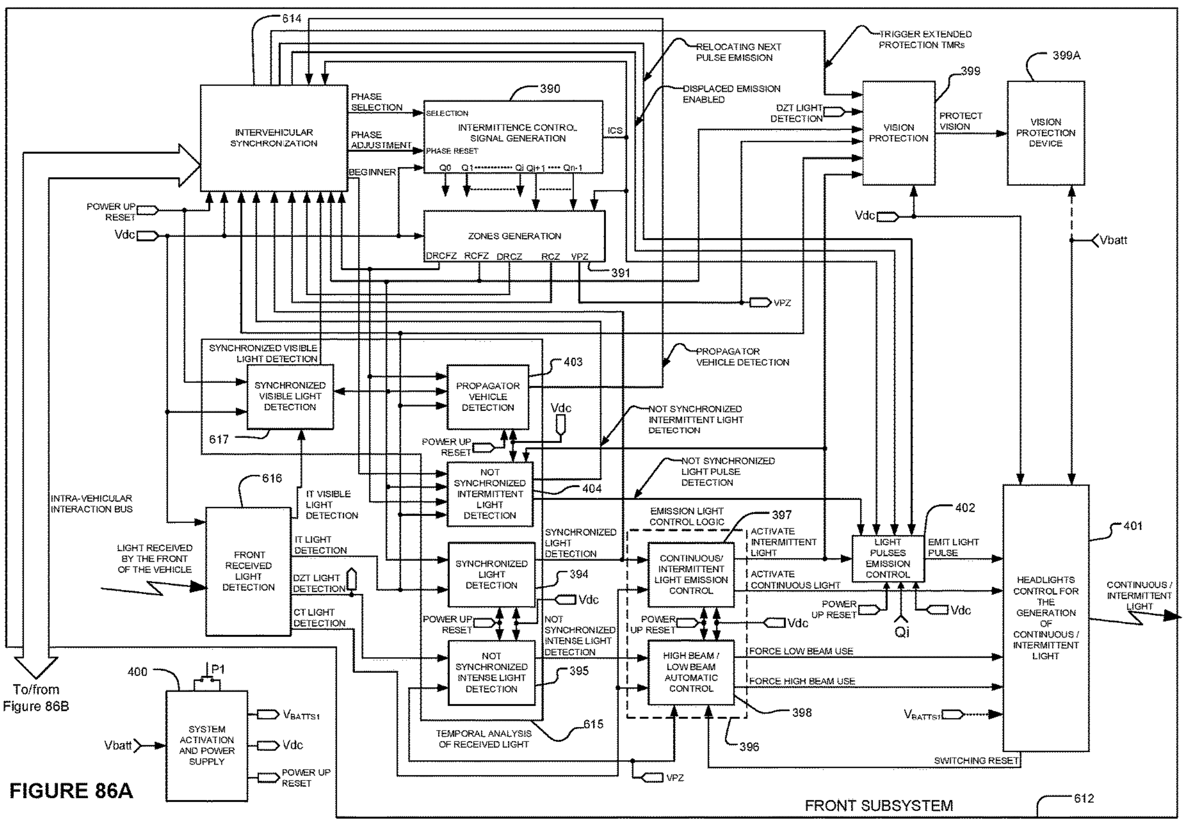
Figure 86B:
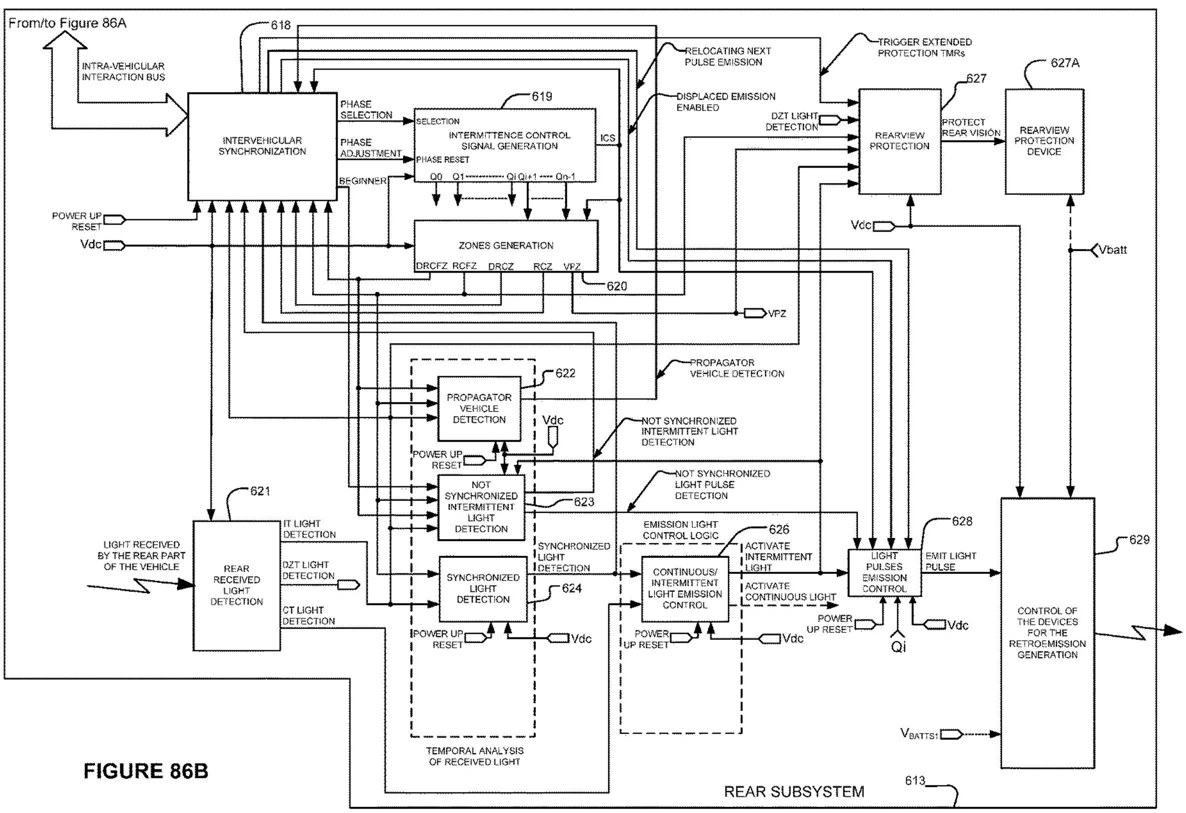

Anti-Dazzling System with Inter-Vehicular Synchronization and Rear-View Protection This system is based on the anti-dazzling method with rear-view protection and makes use of the inter-vehicular synchronization procedure. As previously announced, this system will be configured as two subsystems, which we will call the "front subsystem" and "rear subsystem", to treat each end of the vehicle as a separate entity when the front and/or tail of a vehicle participate in an NVE. FIG. 86 shows the block diagram of a first version of the "anti-dazzling system with inter-vehicle synchronization and rear-view protection". In FIG. 86, the front subsystem, represented by the composite block 612, is basically formed by the same blocks that make up the "anti-dazzling system with intervehicle synchronization" described above (see FIG. 67). Accordingly, the same block numbers 390, 391, 394, 395, 397, 398, 399, 399A, 401, 402, 403, 404 of FIG. 67 have been used in said composite block 612 of FIG. 86 to identify Those blocks that do not vary from system to system. On the other hand, the blocks of the front subsystem which show some variation with respect to those of the system of FIG. 67 are referred to below:

The "light sensing received by the front" block 616 of FIG. 86 corresponds to an enlarged version of block 392 of FIG. 67 (and hence of block 65 of FIG. 34). This extended version has already been described under the heading "Concepts and Characteristics Common to Anti-dazzling Systems with Rear-view Protection", and is shown in FIG. 76.

The composite block "Temporal analysis of light received by the front" 615 of FIG. 86 is an enlargement of the composite block 393 of FIG. 67 incorporating the "Synchronized Visible Light Detection" block 617 into the front subsystem. Content of this block 617 is equal to the content of the block 394 "Synchronized light detection" already described, and its operation diagram corresponds to that shown in FIG. 38, with the proviso that the entry "Light Detection IT" changes to "Detection of visible light UI", and that the "Synchronized light detection" output changes to "Synchronized visible light detection". So that said block 617 has the "Signal Light Detection IT" signal coming from the block 616 and the "RCFZ" signal from the block 391 as inputs and outputs the "Synchronized Visible Light Detection" signal, which output will remain In high value while the vehicle is receiving pulses of synchronized visible light. The output of said block 617 enters the "Inter-vehicle synchronization" block 614 of the front subsystem. Said block 614 will be described below.

In the composite block 613 of FIG. 86, which we will call the "rear subsystem", blocks 619, 620, 622, 623, 624, 626 and 628 have the same name and content as the "front subsystem" blocks 390, 391, 403, 404, 394, 397 and 402, respectively. The contents of the rear view mirror block 627 of the rear subsystem are equal to the contents of the "Vision protection" block 399 of the front subsystem. While the "protect rear-view" output of said block 627 is held high, the "rear-view protection device" 627A shall prevent or attenuate the light path. The design of this 627A device will be conditioned by the techniques used to implement the rear-view protection, some of which have been mentioned together with the formulation of the anti-dazzling method with rear-view protection.

The contents of the block "Light detection received from behind" 621, corresponds to that shown schematically in FIG. 77, and described under the heading "Concepts and Characteristics Common to Anti-dazzling Systems with Rear-View Protection". In one embodiment of the system, the "Controlling Devices for Generating Retro-emission" block 629 has the sole function of generating the light emission that the vehicle will use to interact with other vehicles backwards. To this block only enters the signal "emitting pulse of light", reason why it is of less complexity than its counterpart, block 401 of the front subsystem. The implementation of said block 629 depends on the techniques to be employed to generate this "retroe-mission".

Figure 87A:
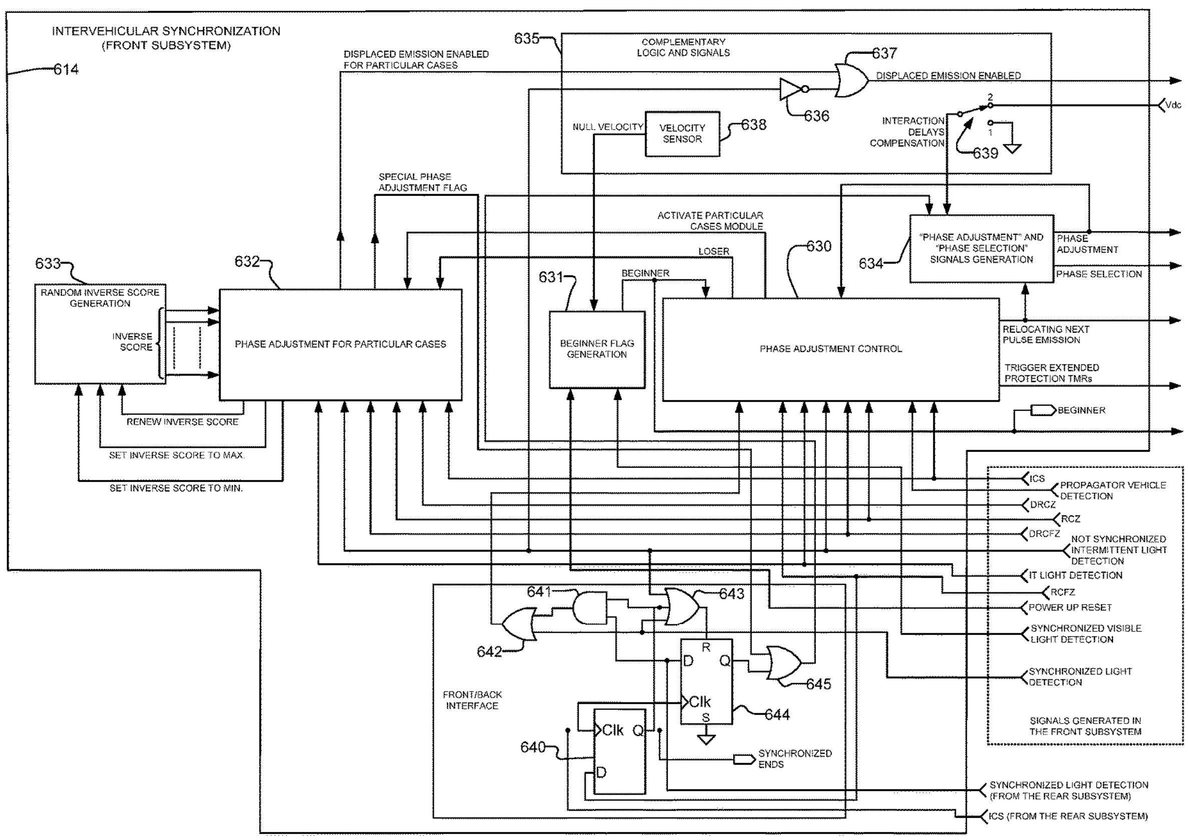
Figure 87B:
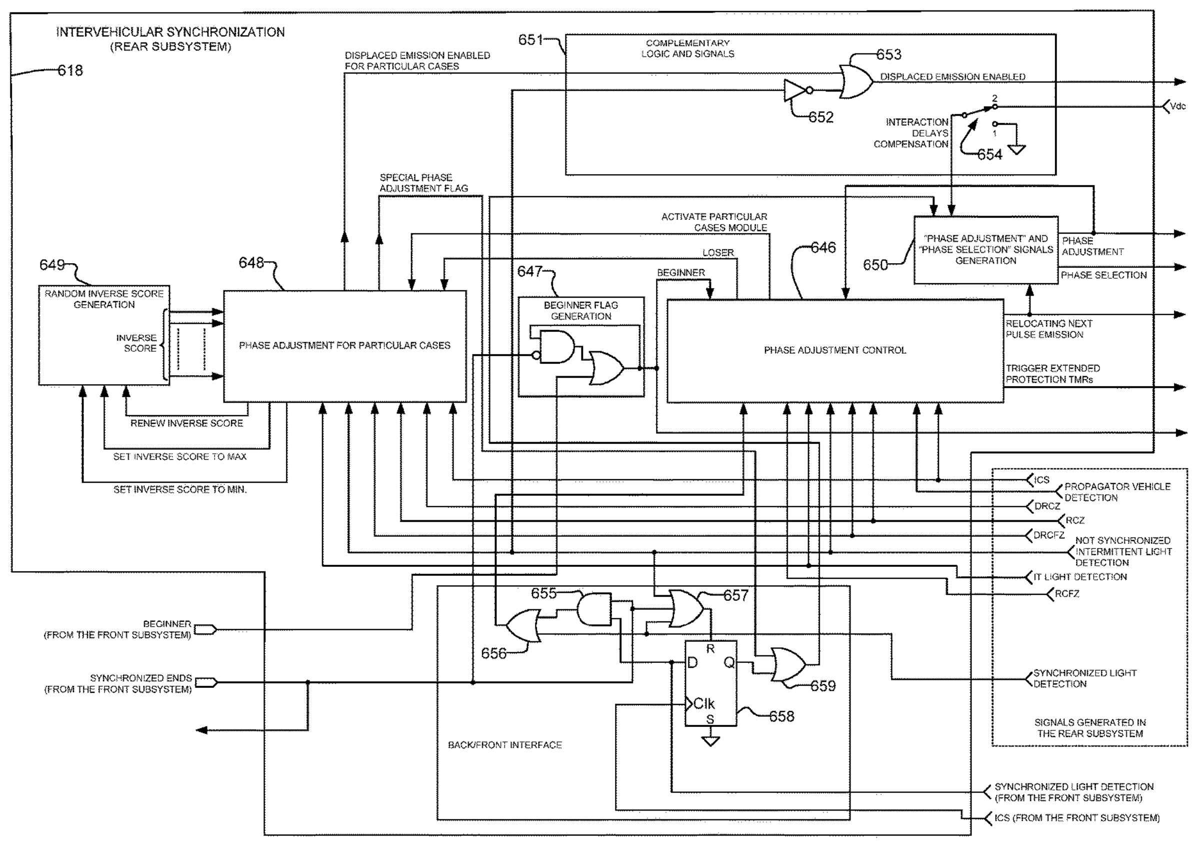

The "Inter-vehicle synchronization" block 614 of the front subsystem and its namesake 618 of the rear subsystem will be described below as composite blocks: both the contents of said blocks (614 and 618) and the interconnection between them are shown in FIG. 87. This interconnection is carried out by means of a bidirectional interface whose logic diagram has been divided into two parts called "Interface DEL/TRAS" and "Interface TRAS/DEL" incorporated in said composite blocks 614 and 618 respectively.

It is important to mention that the interaction between the front and rear subsystems, which we will call intravehicular interaction, allows inter alia that both ends of the vehicle (Front and Rear) remain, most of the time, synchronized with each other. The composite block 614 of the front subsystem is, as is the composite block 618 of the rear subsystem, an adaptation of the block "Inter-vehicular synchronization" 389 of the "anti-dazzling system with inter-vehicle synchronization" already described in relation to FIG. 67. Compound 614 basically comprises the contents of said block 389 plus the content of said DEL/TRAS interface. The content of the composite block 618 essentially comprises the contents of said block 389 plus the contents of said TRAS/DEL interface. Note that said block 389 of FIG. 67 has already been described and its contents shown in FIG. 70.

Thus, blocks 630, 631, 632, 633, 634 and 635 of FIG. 87, belonging to the composite block 614 of the front subsystem, have the same function and content as the following blocks of FIGS. 70: 430, 431, 432, 433, 434 and 435 respectively. The rest of the components of said composite block 614 correspond to the DEL/TRAS interface which, given its simplicity, will be described based on the logic scheme formed by the components 640, 641, 642, 643, 644 and 645. The output Q of the FF D 640 will indicate when the two ends of the vehicle are synchronized with each other. Remember that both ends of a vehicle are synchronized if the positive ICS flank of one of these ends falls on the RCFZ at the other end (and vice versa). Accordingly, the ICS corresponding to the rear subsystem feeds the clock input of said FF D 640 and the signal RCFZ of the front subsystem feeds to the data input of said FF D 640, so that at the output Q of said FF D the Signal" will be set to high value if the RCFZ signal is at high value when said ICS goes to high value. Now, as can be seen in said FIG. 70, the "synchronized light detection" signal enters directly into the "phase adjustment control" block 430.

In said block 430, which will be activated when the vehicle has been i nvolved in a non-synchronized NVE, said "synchronized light detection" signal is used to give the vehicle, when applying the first synchronization strategy, high hierarchy when it comes from a synchronized NVE.

Although this same can be applied without changes to both subsystems (front and rear), it has been chosen to extend this idea by having the vehicle have high hierarchy at one end not only when it is receiving "light synchronized" by that end but also When said vehicle, both ends being synchronized with each other, is receiving light synchronized by the opposite end. With this extension, a vehicle having its two ends synchronized and at least one of them involved in a synchronized NVE is maintained, the synchronization of these ends is maintained when the other end is involved in an NVE not synchronized with an "isolated". This is done so that said isolated vehicle is synchronized with the vehicles of said synchronized NVE, thus avoiding the possible propagation of a phase change. This extension has been implemented in the front subsystem by the gates OR 642 and AND 641. The front end of the vehicle will have high hierarchy when applying the first synchronization strategy when the output of said OR gate 642, which enters the control block For phase adjustment "630, is in high value. This will occur when the signal "synchronized light detection" of the front subsystem, which enters one of the inputs of said OR gate 642, is at a high value or when the signal "synchronized ends" is high, entering the inputs of the AND gate 641, the "synchronized light detection" signal of the rear subsystem is also in high value, which enters the other input of said AND gate 641 whose output is in turn connected to the other input Said OR gate 642.

Taking again as a starting point FIG. 70, we see that in said figure the signal "special phase adjustment flag", from the "phase adjustment for particular cases" block 432, enters directly into the "Generation of phase-adjusting and phase-selection signals" 434 While this could be implemented without change for both subsystems (front and rear), it has been decided to make a vehicle also be able to readjust the phase in one of its ends either at the front end or at the rear end as appropriate, to regain the synchronization of its two ends (intra-vehicular synchronization). For this reason, in the composite block 614 of FIG. 87 the output "special phase adjustment flag" of block 632 enters the block "generation of phase adjusting and phase selection signals" 634 through the gate OR 645.

In this way, the other input of said OR gate 645 may be activated when it is appropriate to synchronize both ends of the vehicle by adjusting the phase of the front end (it should be mentioned that both inputs of said OR gate 645 will never be active simultaneously since block 632, which Can activate one of the inputs of said OR gate 645 will only remain active while the signal "non-synchronized intermittent light detection" is high which enters said block 632 and also to one of the inputs of the OR 643 gate. While said signal is at high value the output of OR gate 643, which feeds to the reset input of FF D 644, will remain at high value and therefore output Q of said FF D 644 which is connected to the other input of said OR gate 645 will remain in low value).

The conditions for synchronizing the two ends of the vehicle between the two ends of the vehicle by adjusting the phase, in this case, the front end are: that the rear end being involved in a synchronized NVE, that is to say being high the signal "synchronized light detection" of the rear subsystem and enters the data input of the FF D 644, it occurs that said leading end is not involved in an NVE and obviously that both ends are not synchronized with each other. The first will be fulfilled when the signals from the front subsystem "synchronized light detection" and "non-synchronized intermittent light detection" entering the OR gate 643 are both low and the second is fulfilled when the signal "synchronized ends" That enters another of the inputs of said OR 643 gate is also in low value. When these conditions are met both ends of the vehicle will be synchronized with each other by adjusting the front end phase at the instant the rear end ICS provides a positive edge to the clock input of said FF D 644. To end the description of the Composite block 614 of FIG. 87 we note that the name of the signal entering the "Beginner flag generation" block 631 is "synchronized visible light detection" rather than "synchronized light detection" as in FIG. 70, since in this system the "synchronized flashing light" signal generated in the front subsystem is activated by both synchronous visible and non-visible synchronized flashing. This change is made so that the front end of the vehicle loses the "Beginner" condition only when it has synchronized its lights with that of a vehicle that comes in the opposite direction.

Next, we will describe the composite block 618 of the rear subsystem only pointing out the differences that said block presents with respect to the composite block 614 that we just described for the front subsystem. To begin with, we note that the velocity sensor 638 included in said block 614 is unique, meaning that it has no equivalent in the rear subsystem. The signal "synchronized ends" is also shared by said blocks 614 and 618, whereby the Flip Flop D 640 included in said block 614 also has no equivalent in block 618. It should be noted that the signal "delayed interaction compensation" generated in the front subsystem by micro switch 639 could also be used as an "interaction delay compensation" signal for the rear subsystem, although it was chosen to present in FIG. 87 such independently generated signals.

It remains to be understood that the "Beginner flag" is generated in block 618 differently than in block 614, since the Beginner flag status of the rear subsystem depends on the state of its homonymous flag in the front subsystem. This is because the vehicle loses its "Beginner" condition first by the front and then, as soon as both ends of the vehicle are synchronized with each other, it will lose its Beginner condition at the rear end. Once the vehicle loses the "Beginner" condition at its rear end, it will only regain that condition if the Beginner signal from the front end is re-activated. This Beginner flag is generated in the back subsystem by block 647 of FIG. 87, the contents of which, given their simplicity, have been schematized within the same block 647 and their operation responds to the behavior just described for said flag. On the other hand, in the said composite block 618, the components 646, 648, 649, 650, 652, 653, 654, 655, 656, 657, 658 and 659 have the same function and content as the components 630, 632, 633, 634, 636, 637, 639, 641, 642, 643, 644 and 645 of the composite block 614 respectively.

Figure 88A:
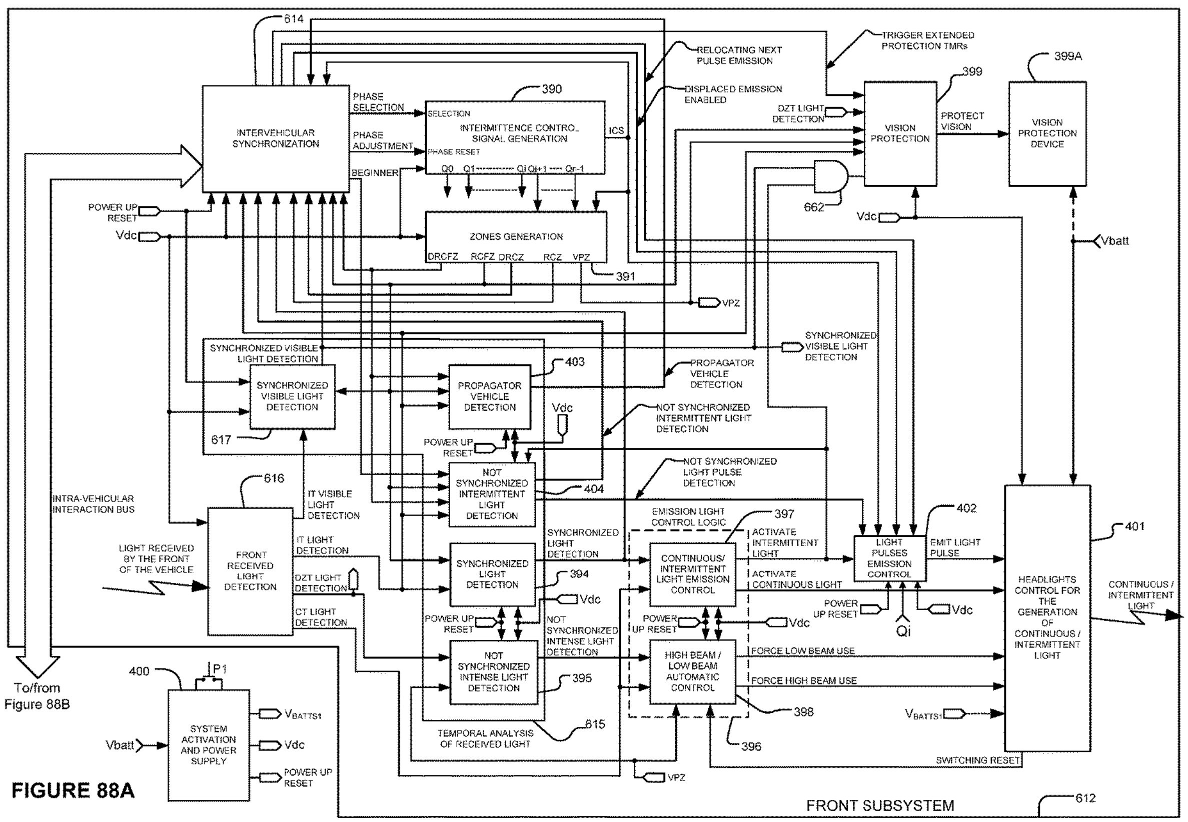
Figure 88B:
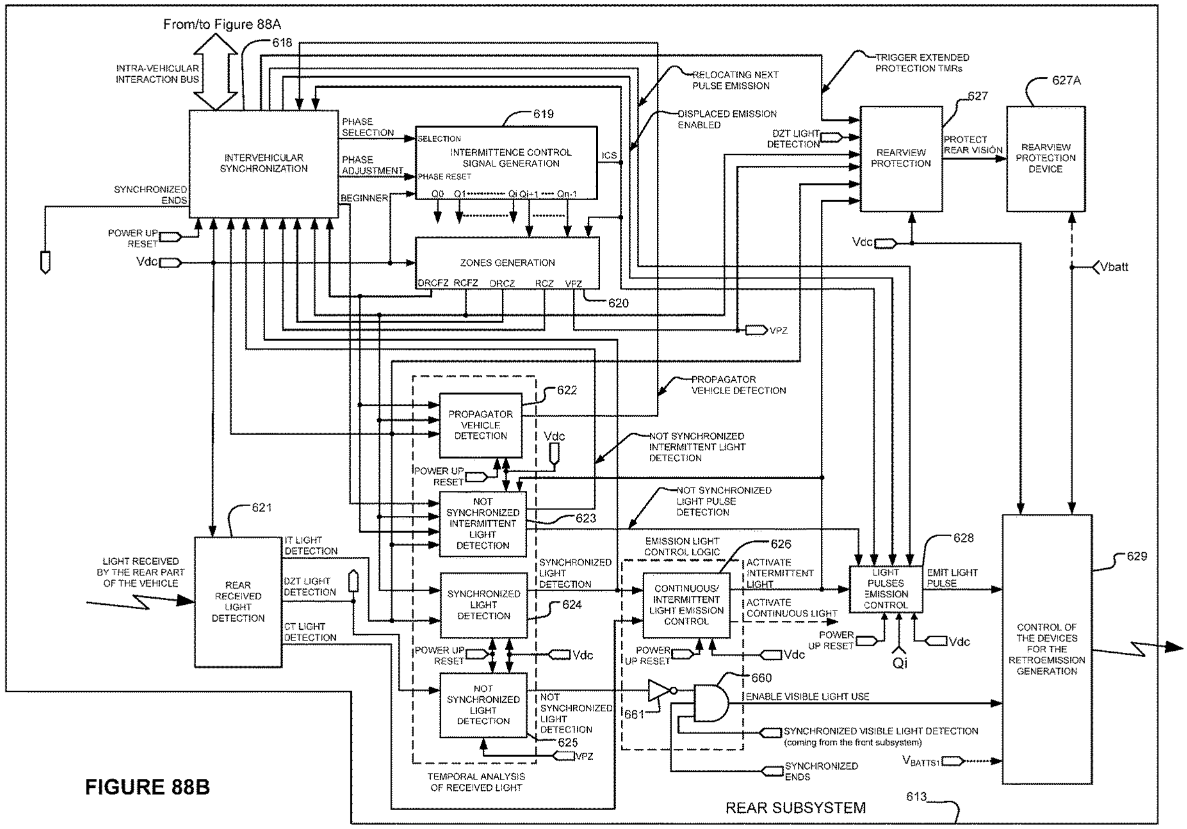

FIG. 88 shows the block diagram of a second version of the "Interlocking System with Inter-vehicular and Retrograde Protection", which introduces two improvements to the first version of said system. Improvement No. 1 is to prevent the vehicle from activating the vision protection when the vehicle is detecting from the front only pulses of light not visible from the tail of another vehicle or other vehicles, as would for example in an NVE composed of vehicles that advance in Single line. Improvement No. 2 has the purpose of allowing, under certain conditions, a vehicle to be able to emit pulses of visible light backwards, in order to cooperate with the vehicles that circulate in the opposite direction extending the area of the road that these vehicles can illuminate. The conditions for a vehicle to be able to emit pulses of visible light backward using the frequency and phase of the rear ICS are:

Condition No. 1: that the vehicle to emit pulses of visible light backwards faces other vehicles approaching in the opposite direction, so that there are drivers that can benefit from this additional illumination.

Condition No. 2: that the vehicle which is to emit pulses of visible light backwards does not have behind it on the road to non-synchronized vehicles whose drivers could be harmed by the light emitted backwards by the vehicle in front.

Condition No. 3: that the vehicle to be emitted pulses of visible light backwards have both ends synchronized with each other, otherwise the visible light that the vehicle could emit back would not be really useful for a synchronized vehicle that Is approaching in the opposite direction.

From the block diagram of FIG. 88 only those blocks differing from those shown in FIG. 86 will be described. The composite block 612 of FIG. 88, corresponding to the front subsystem, has the following modifications (with respect to block 612 of FIG. 86): on the "Vision protection" block 399 of FIG. 88, it ads, as in FIG. 86, the "Turn on flashing" signal, with the difference that it does so through the gate AND 662 When the "Synchronized visible light detection" signal, which also enters said AND gate 662, is at a high value.

The composite block 613 of FIG. 88, corresponding to the rear subsystem, has the following modifications with respect to block 613 of FIG. 86: The contents of the block "Light detection received from behind" 621 corresponds to that shown schematically in FIG. 15, wherein the light sensor 2 of said FIG. 15 must respond only to visible light if it is desired to prevent vehicles which have just crossed the road from interacting with each other. The "Unsynchronized Light Detection" block 625 (which does not have its equivalent in the rear subsystem of FIG. 86) has the same content as the front subsystem block 395. The AND gate 660 and the inverter **6*t*1 represent another extension present in the rear subsystem of FIG. 88. The manner in which the described modifications affect the behavior of this system is described below: to implement the improvement No. 1, i.e. to avoid that in the vehicle activates the vision protection when said vehicle is detecting from the front only pulses of non-visible light, in the front subsystem the signals "Synchronized visible light detection" from block 617 and "Activate flashing light" from block 397, input to the gate inputs AND 662, whose output, when high, allows the output "protect vision" within the VPZ zone to be activated through the "Vision Protection" block 399**.

In this way, the vision protection will only be activated when the vehicle is using its flashing light, but in front of vehicles that are also emitting pulses of visible light. This will prevent the vehicle from activating the vision protection when the vehicle is detecting from the front only pulses of invisible light coming from the tail of another vehicle, as would be the case, for example, in an NVE composed of moving vehicles in Single line. Next, the implementation of improvement #2 is described, that is to say, a vehicle can emit pulses of visible light backwards, in order to cooperate with the vehicles that circulate in the opposite direction. The output of the front subsystem block 617, "Synchronized Visible Light Detection", enters one of the inputs of the rear subsystem AND 660 gate, while the output of the block 625 "Unsynchronized light detection" enters, inverted by the denier 661, to another input of said AND gate 660 and the "synchronized ends" output of block 618 enters the other input of said AND gate 660. In this way the output of said AND gate 660, which we will call "Enable use of Visible light" and entering the "Control of Devices for Generating Retro-emission" block 629, will be set to high value when the vehicle can emit visible light backwards.

This is so because the signal "Synchronized visible light detection" in high value indicates that it fulfills said condition No. 1, while the signal "Synchronized light detection" in low value indicates that condition No. 2 is fulfilled, and the signal "extremes Synchronized" in high value indicates that condition No. 3 is met. So that the output of AND gate 660 at high value indicates that all three conditions are met. It should be noted that at block 621 it is convenient to adapt the activation threshold of the signal "DZT light detection", signal that enters block 625, to ensure that when a vehicle has behind it on the road to non-synchronized vehicles, the signal "Non-synchronized light detection" is set to high value before the drivers of said non-synchronized vehicles can be harmed by the visible light emitted back by the vehicle ahead.

Other options could be modifications of the block "Light detection received by the front" of FIG. 34 so that the front subsystem of the systems that provide protection of vision and of rear-view can detect by the front not only visible light but also The kind of light that vehicles use to interact with other vehicles backwards. Also another simplified version of the block "Light detection received from behind" of the "Rear Subsystem" of a vehicle. Another version could be the one of a first version of the Anti-Dazzling System Externally Synchronized and with rear-view protection, another a version with Vehicle Assistance and Rear-View Protection. One would be a composite block "External synchronization with vehicular assistance" of the front subsystem and its similarly named block of the rear subsystem, and also shows the signals generated in the front subsystem and that are also used in the rear subsystem. Another would be a version of the System Externally Synchronized anti-dazzling system with Vehicle Assistance and with rear-view protection. In another embodiment, a first version of the "Anti-dazzling System with Inter-vehicular Synchronization and External Assistance and with rear-view protection".

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A method to avoid the glare that may affect the vision of a vehicle driver, due to the intense light from oncoming vehicles in a scenario of night vision encounter (NVE), said method comprises:

(m1) Intermittent light pulses emission (ILPE) beamed from the headlights of the vehicles involved in said NVE, on the road area that each of them needs to light up, in replacement of the conventional continuous light produced by the headlamps of said vehicles at least when said vehicles are involved in a NVE; where said ILPE must have a gap between pulses ($T_{OFF}$) shorter than the retention time of the human eye retina, and light pulses duration ($T_{ON}$) shorter or, at most, equal to said gap between pulses $T_{OFF}$; where said ILPE is done with the frequency and the phase of a periodical signal (ICS) which controls the intermittence of said emission; where said frequency will have a preset value and where said phase will have to be adjustable;

(m2) Synchronization of the ILPEs of vehicles of said NVE (i.e. synchronization of said NVE) by adjusting the ILPE phase of each vehicle in order to make that vehicles travelling along a same direction respecting the road have, within a predetermined margin of tolerance, a same ILPE phase, and that vehicles travelling along the opposite direction respect to the road, have, within said predetermined margin of tolerance, opposite ILPE phases (i.e. ILPE phases 180° out of phase with each other);

(m3) Vision protection for the driver of a vehicle involved in an NVE from the incoming light of the headlamps of other vehicle or vehicles of said NVE which are moving in the opposite direction; where said vision protection is achieved by either avoiding or lessening significantly the arrival of said light to the eyes of said driver at regular time intervals ($T_P$), where each of said time intervals $T_P$ will have a location and extension within each gap between pulses $T_{OFF}$, corresponding to the ILPE of the vehicle of said driver, so that said $T_P$ includes the light pulses of the synchronized ILPEs received from the vehicles which travel in the opposite direction to the vehicle of said driver.

2. The method of claim 1 where the synchronization step (m2) comprises:

i) obtaining, on the part of the vehicles going along the same road, a phase adjusting signal so that, in said vehicles, through said phase adjustment signal, the possible ILPE phases of said vehicles are reduced to two alternatives: a definite phase; and its corresponding counter phase; where each one of said alternative phases will be pre assigned, to a given driving direction, respecting to the road;

ii) obtaining, on the part of said vehicles, of a phase selection signal, in a way that, through the use of said phase selection signal and said phase adjustment signal, each one of said vehicles adopts for its corresponding ILPE, the pre-assigned alternative phase corresponding to its driving direction on the road;

and where said phase adjustment and phase selection signals will be obtained by said vehicles through the reception of signals transmitted by transmission sources external to the vehicles, using a predetermined communication means; said communication means is included among those based on the transmission/reception of electronic, magnetic, optical, acoustical signals or a combination of them.

3. The method of claim 2 also comprising for a vehicle participating at a NVE which, for any given reason, does not count with the ILPE phase corresponding to its driving direction respecting the road, the obtainment of said ILPE phase by means of the following steps:

iii) front reception by said vehicle of an incoming synchronization signal which contains the ILPE phase corresponding to opposite-driving vehicles; wherein said synchronization signal is directionally forward-transmitted, using a predetermined communication means, by one or more vehicles participating at said NVE, which have the ILPE phase corresponding to their travelling direction respecting the road;

iv) obtaining of the phase contained in the synchronization signal received by said vehicle, which corresponds to the ILPE phase of vehicles driving in opposite direction, in order to allow said vehicle to elaborate and adopt the corresponding counter-phase as its ILPE phase;

and wherein the communications means for the transmission/reception of said synchronization signal are included among those based on the transmission/reception of electronic, magnetic, optical, acoustical signals or a combination of them.

4. A system to avoid the glare that may affect the vision of a vehicle driver according to the method of claim 2, comprising:

(a) means in the vehicle to generate and to control said ILPE comprising:

(a1) means to generate said ICS; where said ICS will be a periodic signal, of a predetermined frequency, and of adjustable phase;

(a2) means to decide when a vehicle will make use of said ILPE instead of said conventional continuous lighting;

(a3) means to dispose the emission of each intermittent light pulse; where said means (a3) are coupled to said means (a1) and to said means (a2) to receive said ICS signal and the order for activating said ILPE, respectively;

(a4) means for making that said vehicle can generate, besides conventional continuous light to illuminate the road, said ILPE; where said means (a4) are coupled to said means (a3) and to said means (a2) to receive the order for emitting a light pulse, or the order for activating the conventional continuous light respectively;

(b) means that provide information to said means (a1) to adjust the ICS phase of said vehicle for obtaining the ILPE synchronization of said vehicle with the ILPEs of other vehicles that integrate together with said vehicle a same NVE; and where the means (b) for obtaining said synchronization comprise:

(b1) transmission means external to the vehicles to transmit signals to the vehicles travelling along a same road;

(b2) means mounted in said vehicle for receiving and processing the signals transmitted by said transmission means (b1) to obtain said phase adjustment signal and said phase selection signal; where said phase adjustment signal provides information to the means (a1) which generate said ICS for reducing the possible phases of said ICS to one determined phase and its corresponding counter-phase; and where said phase selection signal provides information to the means (a1) which generate said ICS for selecting said determined phase or said corresponding counter-phase as the phase of said ICS, as it corresponds;

(c) means to generate and control the vision protection of the driver of a vehicle involved in an NVE comprising:

(c1) means to generate a signal (VPZ) that is kept active during said time intervals $T_P$ in order to obtain, through said signal VPZ, a vision protection zone within each space between pulses $T_{OFF}$ corresponding to the ILPE of said driver's vehicle, so that said signal VPZ indicate, within each $T_{OFF}$, where said vision protection can be activated; where said means (c1) are coupled to said means (a1) for receiving information related to said ICS;

(c2) means of decision to decide when the vision protection of the driver of a vehicle should be activated; where said means (c2) are coupled to said means (c1) and to said means (a2) for receiving said VPZ signal and the order of activation of the ILPE respectively; and where said means (c2) generate a signal ("Protect vision") that will activate said vision protection during the time said VPZ signal is active while the means (a2) are indicating to the vehicle the use of said ILPE;

(c3) means to prevent or attenuate the arrival to the eyes of the driver of said vehicle of the light coming from the headlights of other or other vehicles of said NVE that circulate in opposite direction to said driver's vehicle; where said means (c3) will be able to be operated at regularly spaced time intervals defined by the VPZ; and wherein said means (c3) are coupled to said means (c2) for receiving the order of activation of said vision protection.

5. The system of claim 4 where the transmission means (b1) comprise:

(b1a) one or more omnidirectional transmission sources to transmit said phase adjustment signal;

(b1b) directional transmission sources located on the same side of the road for transmitting to said vehicles a signal so that from the reception of said signal said vehicles obtain said phase selection signal;

and where the means (b2) mounted in said vehicle comprise:

(b2a) reception means to receive said phase adjustment signal transmitted by said one or more omnidirectional transmission sources (b1a);

(b2b) directional reception means mounted in the vehicle so that when said vehicle passes through the coverage area of one of said directional transmission sources (b1b), the vehicle receives only the signal transmitted by said directional transmission source if said signal comes from the left respecting to the moving direction of the vehicle;

(b2c) directional reception means mounted in the vehicle so that when said vehicle passes through the coverage area of one of said directional transmission sources (b1b), the vehicle receives only the signal transmitted by said directional transmission source if said signal comes from the right respecting to the moving direction of the vehicle;

(b2d) means to set said phase selection signal in a pre-selected state between two possible states when the directional reception means (b2b) are the ones which have received the signal transmitted by one of said transmission sources (b1b); or to set said phase selection signal in the other of said possible states when the directional reception means (b2c) are the ones which have received the signal transmitted by one of said transmission sources (b1b).

6. The system of claim 4 where the transmission means (b1) comprise:

(b1a) one or more omnidirectional transmission sources to transmit said phase adjustment signal;

(b1b) directional transmission sources located on the same side of the road for transmitting to said vehicles a first signal so that from the reception of said first signal said vehicles could obtain said phase selection signal;

(b1c) directional transmission sources located on the opposite roadside to the roadside where said directional transmission sources (b1b) are located, in order to transmit to said vehicles a second signal so that from the reception of said second signal said vehicles could also obtain said phase selection signal;

and where the means (b2) mounted in said vehicle comprise:

(b2a) reception means to receive said phase adjustment signal transmitted by said one or more omnidirectional transmission sources (b1a);

(b2b) directional reception means mounted in the vehicle so that when said vehicle passes through the coverage area of one of said directional transmission sources (b1b) or (b1c) the vehicle receives only the signal transmitted by said directional transmission source if said signal comes from the left respecting to the moving direction of the vehicle;

(b2c) directional reception means mounted in the vehicle so that when said vehicle passes through the coverage area of one of said directional transmission sources (b1b) or (b1c) the vehicle receives only the signal transmitted by said directional transmission source if said signal comes from the right respecting to the moving direction of the vehicle;

(b2d) means to set said phase selection signal in a pre-selected state between two possible states, when the directional reception means (b2b) are the ones which have received the signal transmitted by one of said directional transmission sources (b1b) or when the directional reception means (b2c) are the ones which have received the signal transmitted by one of said directional transmission sources (b1c), or to set said phase selection signal in the other of said possible states when the directional reception means (b2b) are the ones which have received the signal transmitted by one of said directional transmission sources (b1c) or when the directional reception means (b2c) are the ones which have received the signal transmitted by one of said directional transmission sources (b1b).

7. The system of claim 4 where the transmission means (b1) comprise:

(b1a) directional transmission sources located on the same side of the road for transmitting to said vehicles said phase adjustment signal;

and where the means (b2) mounted in said vehicle comprise:

(b2a) directional reception means mounted in the vehicle so that when said vehicle passes through the coverage area of one of said directional transmission sources (b1a) the vehicle receives only the phase adjustment signal transmitted by said directional transmission source if said signal comes from the left respecting to the moving direction of the vehicle;

(b2b) directional reception means mounted in the vehicle so that when said vehicle passes through the coverage area of one of said directional transmission sources (b1a) the vehicle receives only the phase adjustment signal transmitted by said directional transmission source if said signal comes from the right respecting to the moving direction of the vehicle;

(b2c) means to set said phase selection signal in a pre-selected state between two possible states when the directional reception means (b2a) are the ones which have received the phase adjustment signal transmitted by one of said transmission sources (b1a), or to set said phase selection signal in the other of said possible states when the directional reception means (b2b) are the ones which have received the signal transmitted by one of said transmission sources (b1a).

8. The system of claim 4 where the transmission means (b1) comprise:

(b1a) directional transmission sources located on the same side of the road for transmitting to said vehicles said phase adjustment signal; where said phase adjustment signal will have a period which is an odd multiple of the ICS period of the vehicle;

(b1b) directional transmission sources located on the opposite roadside to the roadside where said directional transmission sources (b1a) are located, in order to transmit to said vehicles said phase adjustment signal but 180° out of phase with respect to the signal transmitted by said directional transmission sources (b1a);

and where the means (b2) mounted in said vehicle comprise:

(b2a) directional reception means mounted in the vehicle so that when said vehicle passes through the coverage area of one of said directional transmission sources (b1a) or (b1b) the vehicle receives only the phase adjustment signal transmitted by said directional transmission source if said signal comes from the left respecting to the moving direction of the vehicle;

(b2b) directional reception means mounted in the vehicle so that when said vehicle passes through the coverage area of one of said directional transmission sources (b1a) or (b1b) the vehicle receives only the phase adjustment signal transmitted by said directional transmission source if said signal comes from the right respecting to the moving direction of the vehicle;

(b2c) means to set said phase selection signal in a pre-selected state between two possible states when the directional reception means (b2a) are the ones which have received the phase adjustment signal transmitted by one of said directional transmission sources (b1a) or (b1b), or to set said phase selection signal in the other of said possible states when the directional reception means (b2b) are the ones which have received the phase adjustment signal transmitted by one of said directional transmission sources (b1a) or (b1b).

9. The method of claim 1, wherein the synchronization step (m2) comprises: i) obtainment, on the part of vehicles travelling along the same road, of a phase adjustment signal, in order that, through said phase adjustment signal, the possible ILPE phases of said vehicles can be reduced to just two alternatives, i.e. one given phase and its corresponding counter-phase; wherein each of these alternative phases will not be pre-assigned to any given driving direction respecting the road, therefore, this assignation will have to be resolved at each NVE that has to be synchronized (i.e., at each not-synchronized NVE) wherein any given vehicle that has not yet participated in any NVE, since it started the driving or re-started travelling along said road, will initially adopt one of the two alternative phases as its current ILPE phase; wherein said phase adjustment signal will be obtained by said vehicles through the reception of signals transmitted by transmission sources external to the vehicles, using a pre-determined communications means that is included within those ones based on the transmission/reception of electronic, magnetic, optical, acoustical signals or a combination of them; ii) Exchange of information among vehicles participating at a same not-synchronized NVE, in order that, by processing said information through a pre-determined algorithm, said vehicles can coordinate among themselves which one or ones will need to change its actual ILPE phase by the opposite phase and which one or ones will need to keep its actual ILPE phase so as to achieve the synchronization of said NVE; wherein said information is obtained by a vehicle of said NVE by means of receiving from the front the signals directionally transmitted forward by one or more vehicles of said NVE; and where the pre-determined communications means to be used in this exchange of information among vehicles are included within those ones based on the transmission/reception of electronic, magnetic, optical, acoustical signals or a combination of them.

10. The method of claim 9 where said pre-determined algorithm is based on establishing differences among not-synchronized vehicles of said NVE, in order to allow each one of these vehicles to acquire a hierarchy to compete against the others for making its actual ILPE phase to prevail; wherein the winning vehicle of this competence, which will be the one with the highest hierarchy, will start the synchronization of said NVE imposing the counter-phase of its actual ILPE phase as the ILPE phase for the vehicles emitting on the opposite direction to said winning vehicle; and wherein the vehicles already synchronized with said winning vehicle will impose the counter-phase of their current ILPE phase as the current ILPE phase for vehicles of said NVE that are driving in opposite direction to that of the already synchronized vehicles, thus completing the synchronization of said NVE.

11. A system to avoid the glare affecting a vehicle driver's vision, according to the method of claim 9, comprising:

(a) means in the vehicle to generate and to control said ILPE comprising:

(a1) means to generate said ICS; where said ICS will be a periodic signal, of a predetermined frequency, and of adjustable phase;

(a2) means to decide when a vehicle will make use of said ILPE instead of said conventional continuous lighting;

(a3) means to dispose the emission of each intermittent light pulse; where said means (a3) are coupled to said means (a1) and to said means (a2) to receive said ICS signal and the order for activating said ILPE, respectively;

(a4) means for making that said vehicle can generate, besides conventional continuous light to illuminate the road, said ILPE; where said means (a4) are coupled to said means (a3) and to said means (a2) to receive the order for emitting a light pulse, or the order for activating the conventional continuous light respectively;

(b) means that provide information to said means (a1) to adjust the ICS phase of said vehicle for obtaining the ILPE synchronization of said vehicle with the ILPEs of other vehicles that integrate together with said vehicle a same NVE; and where the means (b) for obtaining said synchronization comprise:

(b1) one or more transmission sources external to the vehicles, for transmitting said phase adjustment signal to the vehicles travelling along a same road;

(b2) reception means mounted on said vehicle, for obtaining from said means (b1) said phase adjustment signal; wherein said phase adjustment signal is provided to said means (a1) that generate said ICS, in order to reduce the number of possible phases of said ICS to just one determined phase and its corresponding counter-phase;

(b3) means of directional transmission/reception mounted in said vehicle, in a way that said vehicle be capable of performing, through said vehicle's front, said information exchange with one or more vehicles participating at said non-synchronized NVE;

(b4) means mounted in said vehicle for updating, on the basis of the information that said vehicle exchanges with one or more vehicles at said NVE, the state of a phase selection signal so as to make, during the synchronization of said NVE, that said means (a1) select as the phase for said ICS, said determined phase, or its corresponding counter-phase, depending on the updated value of said phase selection signal;

(c) means to generate and control the vision protection of the driver of a vehicle involved in an NVE comprising:

(c1) means to generate a signal (VPZ) that is kept active during said time intervals $T_P$ in order to obtain, through said signal VPZ, a vision protection zone within each space between pulses $T_{OFF}$ corresponding to the ILPE of said driver's vehicle, so that said signal VPZ indicate, within each $T_{OFF}$, where said vision protection can be activated; where said means (c1) are coupled to said means (a1) for receiving information related to said ICS;

(c2) means of decision to decide when the vision protection of the driver of a vehicle should be activated; where said means (c2) are coupled to said means (c1) and to said means (a2) for receiving said VPZ signal and the order of activation of the ILPE respectively; and where said means (c2) generate a signal ("Protect vision") that will activate said vision protection during the time said VPZ signal is active while the means (a2) are indicating to the vehicle the use of said ILPE;

(c3) means to prevent or attenuate the arrival to the eyes of the driver of said vehicle of the light coming from the headlights of other or other vehicles of said NVE that circulate in opposite direction to said driver's vehicle; where said means (c3) will be able to be operated at regularly spaced time intervals defined by the VPZ; and wherein said means (c3) are coupled to said means (c2) for receiving the order of activation of said vision protection.

12. The system of claim 11 wherein said means (a) also perform the function corresponding to means (b3) for implementing said exchange of information among vehicles, by means of operating on the light pulses that said vehicles exchange among themselves during a non-synchronized NVE; wherein said means (a3) also perform the function of managing the vehicle's ILPE during said non-synchronized NVE, so as to make that said ILPE be the carrier of the information to be transmitted to other vehicles participating at said non-synchronized NVE.

13. The method of claim 1, wherein the synchronization step (m2) comprises:

i) generation in a vehicle that starts or re-starts its night drive along the road, of a pseudo-random phase which will be adopted by said vehicle as its actual ILPE phase;

ii) exchange of information among vehicles of a same not-synchronized NVE so that, by processing said information through a predetermined algorithm, said vehicles coordinate which one or ones will keep their actual ILPE phase and which one or ones will readjust their actual ILPE phase in order to attain synchronization of said NVE; wherein said information is obtained in a vehicle of said NVE by means of the reception from the front of signals directionally transmitted forward by other vehicle or vehicles of said NVE; and where the communications means to be used in this exchange of information are included within those ones based on the transmission/reception of electronic, magnetic, optical, acoustical signals or a combination of them.

14. The method of claim 13 where said pre-determined algorithm is based on establishing differences among not-synchronized vehicles of said NVE, in order to allow each one of these vehicles to acquire a hierarchy to compete against the others for making its actual ILPE phase to prevail; wherein the winning vehicle of this competence, which will be the one with the highest hierarchy, will start the synchronization of said NVE imposing the counter-phase of its actual ILPE phase as the ILPE phase for the vehicles emitting on the opposite direction to said winning vehicle; and wherein the vehicles already synchronized with said winning vehicle will impose the counter-phase of their current ILPE phase as the current ILPE phase for vehicles of said NVE that are driving in opposite direction to that of the already synchronized vehicles, thus completing the synchronization of said NVE.

15. The method of claim 14 wherein said pre-determined algorithm uses two strategies in order to allow each one of the not-synchronized vehicles of said NVE to acquire a hierarchy; where in the first of said strategies, the obtainment of said hierarchy will be determined by the conformation of said NVE; wherein the conformation of said NVE allows that there exist different hierarchies among said vehicles for the following cases: 1) when said not-synchronized NVE has been formed from a synchronized NVE into which one or more vehicles not-synchronized with the vehicles of this last synchronized NVE are incorporated; wherein the vehicles from the synchronized NVE will obtain the highest hierarchy so that they keep their actual ILPE phase when synchronizing with the rest of the vehicles of said not synchronized NVE, to avoid this way the propagation of a phase change among the vehicles that come from said synchronized NVE; 2) when a vehicle is a successor in the propagation of a phase change within a not-synchronized NVE formed from the conflicting union of two synchronized NVEs; where said successor vehicle will be the one that obtains the lower hierarchy, and will adjust its actual ILPE phase to synchronize with the vehicle or vehicles that are propagating said phase change; 3) when none of the vehicles of said not-synchronized NVE comes from a synchronized NVE provided the actual ILPE phases of said vehicles are differentiable; where among said vehicles the lowest hierarchy will correspond to the first vehicle that, having started the execution of said pre-determined algorithm, receives a not-synchronized light pulse; 4) when in said not-synchronized NVE there participates one or more vehicles which have not taken part in any synchronized NVE since they started or re-started their night drive along the road; where said vehicles will obtain a lower hierarchy than that of any other vehicle at said not-synchronized NVE that it is not in this situation; where one or more of said vehicles having the lower hierarchy will be those that change phase; and where, when the application of this first strategy does not allow to establish different hierarchies among said not-synchronized vehicles which could lead to the synchronization of said NVE, application of the second of said strategies; where said vehicles will obtain a new hierarchy in order to allow that each of said vehicles could resolve whether it will have or not to adjust its actual ILPE phase so as to attain the synchronization of said NVE.

16. A system to avoid the glare affecting a vehicle driver's vision, according to the method of claim 13, comprising:

(a) means in the vehicle to generate and to control said ILPE comprising:

(a1) means to generate said ICS; where said ICS will be a periodic signal, of a predetermined frequency, and of adjustable phase;

(a2) means to decide when a vehicle will make use of said ILPE instead of said conventional continuous lighting;

(a3) means to dispose the emission of each intermittent light pulse; where said means (a3) are coupled to said means (a1) and to said means (a2) to receive said ICS signal and the order for activating said ILPE, respectively;

(a4) means for making that said vehicle can generate, besides conventional continuous light to illuminate the road, said ILPE; where said means (a4) are coupled to said means (a3) and to said means (a2) to receive the order for emitting a light pulse, or the order for activating the conventional continuous light respectively;

(b) means that provide information to said means (a1) to adjust the ICS phase of said vehicle for obtaining the ILPE synchronization of said vehicle with the ILPEs of other vehicles that integrate together with said vehicle a same NVE; and where the means (b) for obtaining said synchronization comprise:

(b1) means for directional transmission/reception mounted in said vehicle for performing by the front said exchange of information with other vehicle or vehicles participating in said non-synchronized NVE;

(b2) means mounted in said vehicle for generating, on the basis of the information that said vehicle exchanges with other vehicle or vehicles of said NVE, the "Phase adjustment" and "Phase selection" signals, in order to make that said means (a1) adjust the ICS phase of said vehicle for synchronizing said vehicle's ICS with that of other vehicles participating in said NVE;

(c) means to generate and control the vision protection of the driver of a vehicle involved in an NVE comprising:

(c1) means to generate a signal (VPZ) that is kept active during said time intervals $T_P$ in order to obtain, through said signal VPZ, a vision protection zone within each space between pulses $T_{OFF}$ corresponding to the ILPE of said driver's vehicle, so that said signal VPZ indicate, within each $T_{OFF}$, where said vision protection can be activated; where said means (c1) are coupled to said means (a1) for receiving information related to said ICS;

(c2) means of decision to decide when the vision protection of the driver of a vehicle should be activated; where said means (c2) are coupled to said means (c1) and to said means (a2) for receiving said VPZ signal and the order of activation of the ILPE respectively; and where said means (c2) generate a signal ("Protect vision") that will activate said vision protection during the time said VPZ signal is active while the means (a2) are indicating to the vehicle the use of said ILPE;

(c3) means to prevent or attenuate the arrival to the eyes of the driver of said vehicle of the light coming from the headlights of other or other vehicles of said NVE that circulate in opposite direction to said driver's vehicle; where said means (c3) will be able to be operated at regularly spaced time intervals defined by the VPZ; and wherein said means (c3) are coupled to said means (c2) for receiving the order of activation of said vision protection.

17. The system of claim 16 wherein said means (a) also perform the function corresponding to means (b3) for implementing said exchange of information among vehicles, through the manipulation of the light pulses that said vehicles exchange during a non-synchronized NVE; wherein said means (a3) also perform the function of manipulating the vehicle's ILPE during said non-synchronized NVE, so as to make that said ILPE be the carrier of the information to be transmitted to other vehicles participating at said non-synchronized NVE.

18. The system of claim 17 wherein, in order to perform said function of manipulating the vehicle's ILPE, said means (a3) further comprising:

(a3a) means to introduce, under given circumstances during said non-synchronized NVE, a given phase shift into said ILPE respecting the ICS phase of said vehicle; wherein said phase shift will allow a vehicle receiving said ILPE, to recognize said phase shift as information and, consequently react to it, in accordance to the situation of said receiving vehicle within such NVE (e.g., depending on whether said receiving vehicle is or is not a successor in propagating a phase change;

(a3b) means to relocate the emission of the next light pulse, in order to be able to emit an isolated light pulse at a determined moment; wherein the emission of said light pulse can be used by the vehicle to announce a given event to a vehicle or vehicles in said NVE (e.g. announcing to other vehicles that the information exchange which precedes said NVE synchronization is ending).

19. A system to avoid the glare that may affect the vision of a vehicle driver according to the method of claim 1, comprising:

(a) means in the vehicle to generate and to control said ILPE comprising:

(a1) means to generate said ICS; where said ICS will be a periodic signal, of a predetermined frequency, and of adjustable phase;

(a2) means to decide when a vehicle will make use of said ILPE instead of said conventional continuous lighting;

(a3) means to dispose the emission of each intermittent light pulse; where said means (a3) are coupled to said means (a1) and to said means (a2) to receive said ICS signal and the order for activating said ILPE, respectively;

(a4) means for making that said vehicle can generate, besides conventional continuous light to illuminate the road, said ILPE; where said means (a4) are coupled to said means (a3) and to said means (a2) to receive the order for emitting a light pulse, or the order for activating the conventional continuous light respectively;

(b) means that provide information to said means (a1) to adjust the ICS phase of said vehicle for obtaining the ILPE synchronization of said vehicle with the ILPEs of other vehicles that integrate together with said vehicle a same NVE;

(c) means to generate and control the vision protection of the driver of a vehicle involved in an NVE comprising:

(c1) means to generate a signal (VPZ) that is kept active during said time intervals $T_P$ in order to obtain, through said signal VPZ, a vision protection zone within each space between pulses $T_{OFF}$ corresponding to the ILPE of said driver's vehicle, so that said signal VPZ indicate, within each $T_{OFF}$, where said vision protection can be activated; where said means (c1) are coupled to said means (a1) for receiving information related to said ICS;

(c2) means of decision to decide when the vision protection of the driver of a vehicle should be activated; where said means (c2) are coupled to said means (c1) and to said means (a2) for receiving said VPZ signal and the order of activation of the ILPE respectively; and where said means (c2) generate a signal ("Protect vision") that will activate said vision protection during the time said VPZ signal is active while the means (a2) are indicating to the vehicle the use of said ILPE;

(c3) means to prevent or attenuate the arrival to the eyes of the driver of said vehicle of the light coming from the headlights of other or other vehicles of said NVE that circulate in opposite direction to said driver's vehicle; where said means (c3) will be able to be operated at regularly spaced time intervals defined by the VPZ; and wherein said means (c3) are coupled to said means (c2) for receiving the order of activation of said vision protection.

20. A method to avoid the glare which may affect the vision of a driver of a vehicle if his/her eyes receive intense light either in a direct way or reflected from the rear-view mirrors of said vehicle, which is beamed from the headlamps of another vehicle or vehicles involved with the first one in a NVE; said method comprises:

(m1) intermittent light pulses emission (ILPE) beamed from the headlights of the vehicles involved in said NVE on the road area that each of them needs to light up, in replacement of the conventional continuous light produced by the headlamps of said vehicles at least during the moments in which said vehicles are front involved in a NVE; where said ILPE must have a gap between pulses ($T_{OFF}$) shorter than the retention time of the human eye retina and light pulses duration ($T_{ON}$) shorter than or, at most, equal to said gap between pulses $T_{OFF}$; where said ILPE is done with the frequency and phase of a periodical signal (ICS) which controls the intermittence of said emission; where said frequency will have a preset value and where said phase will have to be adjustable;

(m2) synchronization of the ILPEs of the vehicles front involved in said NVE by adjusting the ILPE phase of each vehicle in order to make that vehicles travelling along a same direction respecting the road have, within a predetermined margin of tolerance, a same ILPE phase, and that vehicles travelling along the opposite direction respect to the road, have, within said predetermined margin of tolerance, opposite ILPE phases (i.e. ILPE phases 180° out of phase with each other);

(m3) vision protection for a driver of a vehicle front involved in a NVE from the incoming light of the headlamps of other vehicle or vehicles travelling in the opposite direction; wherein said vision protection is achieved by blocking or significantly dimming said light that reaches the eyes of said driver at regular time intervals ($T_P$), wherein each of said time intervals $T_P$ will have a location and an time extension within each gap between pulses $T_{OFF}$ corresponding to the ILPE of the vehicle of said driver, so that said $T_P$ includes the light pulses of the synchronized ILPEs received from said vehicles travelling in the opposite direction to the vehicle of said driver;

(m4) vision protection of a driver of a vehicle rear involved in a NVE from the lights coming from the headlamps of other vehicle or vehicles of said NVE driving behind said vehicle to avoid the dazzling which said light may cause to the driver when it is reflected by the rear view mirrors of said vehicle; this vision protection is achieved by blocking or dimming (i.e., reducing) the intensity of said light reflected to the eyes of said driver at regular time intervals ("$T_{RP}$"), where each $T_{RP}$ time intervals will have such a location and extension so that it includes the light pulses of the synchronized ILPEs received from the vehicles driving on the same direction and following said vehicle.

21. The method of claim 20 wherein the synchronization step (m2) comprises:

i) obtaining, on the part of the vehicles going along the same road, a phase adjustment signal so that, in said vehicles, through said phase adjustment signal, the possible ILPE phases of said vehicles are reduced to two alternatives: a definite phase and its corresponding counter phase; where each one of said alternative phases will be preassigned to a given driving direction respecting to the road;

ii) obtaining, on the part of said vehicles, of a phase selection signal, in a way that, through the use of said phase selection signal and said phase adjustment signal, each one of said vehicles adopts for its corresponding ILPE, the pre-assigned alternative phase corresponding to its driving direction on the road;

and where said phase adjustment and phase selection signals will be obtained by said vehicles through the reception of signals transmitted by transmission sources external to the vehicles, using a predetermined communication means; said communication means is included among those based on the transmission/reception of electronic, magnetic, optical, acoustical signals or a combination of them.

22. The method of claim 21 also comprising, for a vehicle participating at a NVE which, for any given reason, does not have the ILPE phase corresponding to its driving direction respecting the road, the obtainment of said ILPE phase by means of the following steps:

iii) reception at the front, or at the back or at both ends of said vehicle, of one or more synchronization signals directionally transmitted forward, backward or both by other vehicle or vehicles that are taking part in said NVE which have the ILPE phase corresponding to their driving direction with respect to the road; wherein the reception by a vehicle of said synchronization signals trough the front, the rear or both will depend on whether said vehicle is involved in said NVE either for the front, for the rear or both respectively; and wherein the transmission on the part of a vehicle of said synchronization signals forward, backward or both will depend on whether said vehicle is involved in said NVE either for the front, for the rear or both respectively; and wherein the phase contained in the synchronization signal transmitted forward by a vehicle will be the own ILPE phase of said vehicle; and where, in order to make that from the rear end of a vehicle the phase information be transmitted to the front end of other or others following vehicles at said NVE, said rear end will emit backwardly a periodic signal having adjustable phase that is equivalent to said ILPE, as regards passing phase information to the vehicles following behind; and wherein the phase contained in the synchronization signal transmitted backward by a vehicle will be the ILPE counterphase of said vehicle; wherein the backward emission will be controlled by a signal equivalent to said ICS (ICS for the rear end) and this one will be a non-visible emission, at least when said NVE is not synchronized; and wherein in order to transmit said phase information to the vehicles following behind, communications means will be used included among those based on the transmission/reception of electronic, magnetic, optical, acoustical signals or a combination of them;

iv) obtaining of the phase contained in the synchronization signal received on the front end of the vehicle, which corresponds to the ILPE phase of vehicles driving in opposite direction, in order to allow said vehicle to elaborate and adopt the corresponding counter-phase as its ILPE phase; or, obtaining of the phase contained in the synchronization signal received on the rear end of said vehicle, which corresponds to the ILPE phase of the vehicles driving in the same direction to that of said vehicle, in order to allow said vehicle adopt this same phase as its own ILPE phase;

and wherein the communications means for the transmission/reception of said synchronization signal are included among those based on the transmission/reception of electronic, magnetic, optical, acoustical signals or a combination of them.

23. The method of claim 20, wherein the synchronization step (m2) comprises:

i) obtainment, on the part of vehicles travelling the same road, of a phase adjustment signal, in order that, through said phase adjustment signal, the possible ILPE phases of said vehicles can be reduced to just two alternatives, i.e. one given phase and its corresponding counter-phase; wherein each of these alternative phases will not be pre-assigned to any given driving direction respecting the road, therefore, this assignation will have to be resolved at each NVE that has to be synchronized (i.e., at each not-synchronized NVE); wherein any given vehicle that has not yet participated in any NVE, since it started or re-started travelling along said road, will initially adopt one of the two alternative phases as its current ILPE phase; wherein said phase adjustment signal will be obtained by said vehicles through the reception of signals transmitted by transmission sources external to the vehicles, using a pre-determined communications means that is included within those ones based on the transmission/reception of electronic, magnetic, optical, acoustical signals, or a combination of them;

ii) exchange of information among vehicles participating at a same not-synchronized NVE, in order that, by processing said information through a pre-determined algorithm, said vehicles can coordinate among themselves which vehicles will have to change their current ILPE phase for the corresponding counter-phase, and which ones will have to keep their current ILPE phase in order to achieve synchronization of said NVE; said information will be obtained by a NVE vehicle by receiving from the front end, from the rear end or from both ends of the vehicle the signals directionally transmitted either forward or backward, or directionally forward and backward by other or others vehicles of said NVE; where the reception by a vehicle of said signals from the front end or from the rear end, or from both ends, will depend on whether said vehicle is involved at said NVE by the front, rear or both ends, respectively; and wherein the transmission by a vehicle of said signals forward, backwards or both will depend on whether the vehicle is involved at said NVE by the front, rear or both ends, respectively; and wherein, in order to allow the synchronization even of an NVE comprised of vehicles driving, all of them, in the same direction, then each vehicle will be capable of exchanging information with other vehicles by both ends independently, i.e., considering these vehicle ends as separate entities; and wherein, in an NVE, in order to allow the rear end of a vehicle exchange phase information with the front end of other vehicle or vehicles of said NVE coming behind, the rear end of said vehicle will transmit backward a periodical and phase adjustable signal, equivalent to said ILPE as regards being able to transmit phase information to the vehicles behind it; wherein said backward emission will be controlled by a signal equivalent to said ICS (rear ICS), and it will be a non-visible emission, at least when said NVE is not synchronized; and wherein, when said NVE is synchronized, the signal equivalent to said ILPE will have the same phase as those vehicles driving in opposite direction; and wherein said information exchange will be made by communication means that include those ones based on the transmission/reception of electronic, magnetic, optical, acoustical signals, or a combination of them.

24. The method of claim 23 where said pre-determined algorithm is based on establishing differences among not-synchronized vehicles of said NVE, in order to obtain at each vehicle, a hierarchy for each of those vehicle ends that are involved at said NVE, i.e., in order to allow each vehicle end to compete, based on said hierarchy, against the other vehicle ends so as to make prevail its current phase (i.e., its current ILPE phase or the current phase of the signal equivalent to said ILPE, according to whether said vehicle end is front or rear, respectively); wherein the winning vehicle end of said competence, which will be the vehicle end with the highest hierarchy, will start the synchronization of said NVE, imposing the counter-phase of its current phase as the current phase for the vehicles' end emitting in opposite direction to that of the winning vehicle end; and wherein the vehicle ends already synchronized with said winning vehicle end will impose the counter-phase of their current phase as the current phase for vehicle ends of said NVE that are emitting in opposite direction to that of the already synchronized vehicle ends, thus completing the synchronization of said NVE.

25. The method of claim 20, wherein the synchronization step (m2) comprises:

i) generation, in a vehicle that starts or re-starts its night drive along the road, of a pseudo-random phase which will be adopted by said vehicle as its actual ILPE phase;

ii) exchange of information among vehicles of a same not-synchronized NVE so that, by processing said information through a predetermined algorithm, said vehicles coordinate which one or ones will keep their actual ILPE phase and which one or ones will readjust their actual ILPE phase in order to attain synchronization of said NVE; where said information is obtained in a vehicle at said NVE by means of the reception from the front end, or from the rear end, or from both ends of said vehicle of signals transmitted directionally forward or directionally backward or directionally forward and backward by other vehicle or vehicles of said NVE; where the reception by a vehicle of said signals from the front end or from the rear end, or from both ends, will depend on whether said vehicle is involved at said NVE by the front, rear or both ends, respectively; and wherein the transmission by a vehicle of said signals forward, backwards or both will depend on whether the vehicle is involved at said NVE by the front, rear or both ends, respectively; and wherein, in order to allow the synchronization even of an NVE comprised of vehicles driving, all of them, in the same direction, then each vehicle will be capable of exchanging information with other vehicles by both ends independently, i.e., considering these vehicle ends as separate entities; and wherein, in an NVE, in order to allow the rear end of a vehicle exchange phase information with the front end of other vehicle or vehicles of said NVE coming behind, the rear end of said vehicle will transmit backward a periodical and phase adjustable signal, equivalent to said ILPE as regards being able to transmit phase information to the vehicles behind it; wherein said backward emission will be controlled by a signal equivalent to said ICS (rear ICS), and it will be a non-visible emission, at least when said NVE is not synchronized; and wherein, when said NVE is synchronized, the signal equivalent to said ILPE will have the same phase as those vehicles driving in opposite direction; and wherein said information exchange will be made by communication means that include those ones based on the transmission/reception of electronic, magnetic, optical, acoustical signals, or a combination of them.

26. The method of claim 25 where said pre-determined algorithm is based on establishing differences among not-synchronized vehicles of said NVE, in order to obtain at each vehicle, a hierarchy for each of those vehicle ends that are involved at said NVE, i.e., in order to allow each vehicle end to compete, based on said hierarchy, against the other vehicle ends so as to make prevail its current phase (i.e., its current ILPE phase or the current phase of the signal equivalent to said ILPE, according to whether said vehicle end is front or rear, respectively); wherein the winning vehicle end of said competence, which will be the vehicle end with the highest hierarchy, will start the synchronization of said NVE, imposing the counter-phase of its current phase as the current phase for the vehicles' end emitting in opposite direction to that of the winning vehicle end; and wherein the vehicle ends already synchronized with said winning vehicle end will impose the counter-phase of their current phase as the current phase for vehicle ends of said NVE that are emitting in opposite direction to that of the already synchronized vehicle ends, thus completing the synchronization of said NVE.

27. The method of claim 26 wherein said pre-determined algorithm uses two strategies in order to allow each one of the not-synchronized vehicles ends involved in said NVE to acquire a hierarchy; where in the first of said strategies, the obtainment of said hierarchy will be determined by the conformation of said NVE; where the conformation of said NVE allows that there exist different hierarchies among said vehicle ends for the following cases: 1) when said not-synchronized NVE has been formed from a synchronized NVE into which one or more vehicles not-synchronized with the vehicles of this last synchronized NVE are incorporated; where the vehicle ends from the synchronized NVE will obtain the highest hierarchy in order to keep their actual phase (i.e. their actual ILPE phase or the actual phase of the signal equivalent to said ILPE, depending on whether said end is a front end or a rear end, respectively) when synchronizing with the rest of the vehicles of said not synchronized NVE, to avoid this way the propagation of a phase change among the vehicles that come from said synchronized NVE; 2) when a vehicle is a successor, by means of one of its ends, in the propagation of a phase change within a not-synchronized NVE formed as a result of the conflicting union of two synchronized NVE; where said successor vehicle end will obtain the lower hierarchy and will adjust its actual phase to synchronize with the vehicle end or vehicle ends that are propagating said phase change; 3) when in said not-synchronized NVE there participate only vehicle ends not coming from a synchronized NVE, provided the actual phases of said vehicle ends are differentiable; where among said vehicle ends the lower hierarchy will correspond to the first vehicle end that, having started the execution of said predetermined algorithm, receives a not-synchronized light pulse or a not-synchronized pulse of the signal equivalent to said ILPE; 4) when in said not-synchronized NVE there participates one or more vehicles which have not taken part in any synchronized NVE with vehicles circulating in opposite direction since they started or re-started their night drive along the road; where the ends of said vehicles that are involved in said not synchronized NVE will obtain a lower hierarchy than that of any other vehicle end at said not-synchronized NVE that it is not in this situation; where one or more of said vehicle ends having the lower hierarchy will be those that change phase; and where, when the application of this first strategy does not allow to establish different hierarchies among said not-synchronized vehicle ends which could lead to the synchronization of said NVE, application of the second of said strategies where said vehicle ends will obtain a new hierarchy in order to allow that each said vehicle ends could resolve whether it will have or not to adjust its actual phase so as to attain the synchronization of said NVE.

28. A system to avoid the glare affecting a vehicle driver's vision, according to the method of claim 20, wherein the front end and rear end of said vehicle, when participating in a NVE, shall be treated as separate entities, called "Front Subsystem" and "Rear Subsystem", respectively; wherein said front subsystem will be able to detect both the visible light beamed by headlights of other vehicles, and the type of light employed by the vehicles to exchange information backwards (i.e., rear ILPE) when involved by the rear end in a NVE; and wherein said front subsystem comprise:

(a) means in the vehicle to generate and to control said ILPE comprising:
- (a1) means to generate said ICS; where said ICS will be a periodic signal, of a predetermined frequency, and of adjustable phase;
- (a2) means to decide when a vehicle will make use of said ILPE instead of said conventional continuous lighting;

(a3) means to dispose the emission of each intermittent light pulse; where said means (a3) are coupled to said means (a1) and to said means (a2) to receive said ICS signal and the order for activating said ILPE, respectively;

(a4) means for making that said vehicle can generate, besides conventional continuous light to illuminate the road, said ILPE; where said means (a4) are coupled to said means (a3) and to said means (a2) to receive the order for emitting a light pulse, or the order for activating the conventional continuous light respectively;

(b) means that provide information to said means (a1) to adjust the ICS phase of said vehicle for obtaining the ILPE synchronization of said vehicle with the ILPEs of other vehicles that integrate together with said vehicle a same NVE;

(c) means to generate and control the vision protection of the driver of a vehicle involved in an NVE comprising:

(c1) means to generate a signal (VPZ) that is kept active during said time intervals $T_P$ in order to obtain, through said signal VPZ, a vision protection zone within each space between pulses $T_{OFF}$ corresponding to the ILPE of said driver's vehicle, so that said signal VPZ indicate, within each $T_{OFF}$, where said vision protection can be activated; where said means (c1) are coupled to said means (a1) for receiving information related to said ICS;

(c2) means of decision to decide when the vision protection of the driver of a vehicle should be activated; where said means (c2) are coupled to said means (c1) and to said means (a2) for receiving said VPZ signal and the order of activation of the ILPE respectively; and where said means (c2) generate a signal ("Protect vision") that will activate said vision protection during the time said VPZ signal is active while the means (a2) are indicating to the vehicle the use of said ILPE;

(c3) means to prevent or attenuate the arrival to the eyes of the driver of said vehicle of the light coming from the headlights of other or other vehicles of said NVE that circulate in opposite direction to said driver's vehicle; where said means (c3) will be able to be operated at regularly spaced time intervals defined by the VPZ; and wherein said means (c3) are coupled to said means (c2) for receiving the order of activation of said vision protection;

and wherein said "Rear Subsystem", which is a simplification and adaptation of said Front Subsystem, comprises:

(a') means mounted in said vehicle for generating and controlling said rear ILPE, comprising:

(a'1) means to generate a rear ICS, wherein said rear ICS will be a phase-adjustable periodic signal of a pre-determined frequency;

(a'2) means for deciding when a vehicle will use said rear ILPE;

(a'3) means to dispose the emission of each intermittent light pulse; wherein said means (a'3) are connected to said means (a'1) and to said means (a'2) for receiving said rear ICS signal and the order for activating said rear ILPE, respectively;

(a'4) means for said vehicle to generate said rear ILPE; wherein said means (a'4) are connected to said means (a'3) and to said means (a'2) for receiving the order for emitting each light pulse;

(b') means that provide information to said means (a'1) for adjusting the rear ICS phase of said vehicle, in order to obtain the synchronization of the rear ILPE of said vehicle with the ILPEs of other vehicle or vehicles participating in the same NVE;

(c') means to generate and control the rear-view protection of a vehicle driver, from the headlight of following vehicles, at an NVE, comprising:

(c'1) means to generate a signal (VPZ of the rear-subsystem) which remain active during said time intervals "$T_{RP}$" for obtaining, through said rear-subsystem VPZ signal, a rear-vision protection zone within each time space between pulses $T_{OFF}$ corresponding to the rear ILPE of said driver's vehicle, in order to make that said rear subsystem VPZ signal indicate, within said $T_{OFF}$, the instant when said rear-view protection will be able to be activated; and wherein said means (c'1) are connected to said means (a'1) for receiving information related to said rear ICS;

(c'2) decision means for deciding when the rear-view protection of said vehicle driver must be activated; wherein said means (c'2) are connected to said means (c'1) and to said means (a'2) for receiving said rear-subsystem VPZ signal and the order for activating the rear ILPE, respectively; and wherein said means (c'2) generate a signal ("Protect rear vision") which will activate said rear-view protection during the time when said rear subsystem VPZ signal remain active, while said means (a'2) are indicating to said vehicle to make use of said rear ILPE;

(c'3) means for preventing or attenuating the arrival of reflected light in the eyes of the driver of said vehicle coming from the headlights of other vehicle or vehicles of said NVE driving behind; wherein said means (c'3) will be able to be operated at regularly-spaced time intervals as determined by the rear-view subsystem VPZ signal; and wherein said means (c'3) are connected to said means (c'2) for receiving the order for activating said rear-view protection.

29. The system of claim 28 wherein said vehicle counts with means for backward emission of visible light pulses using the rear ICS phase and frequency, in order to cooperate with the vehicles travelling on the opposite direction, therefore extending the area of the road that said vehicles can light up; where said backward-beamed, visible light pulse emission will be used whenever the following requirements are met:

I. that the vehicle that is going to emit pulses of visible light backwards has in front other vehicles approaching in the opposite direction, so that there are drivers that can benefit from this additional illumination;

II. that the vehicle which is going to emit pulses of visible light backwards does not have behind it on the road not-synchronized vehicles whose drivers could be harmed by the light emitted backwards by the vehicle ahead.

* * * * *